United States Patent
Urick et al.

(10) Patent No.: US 10,614,195 B2
(45) Date of Patent: *Apr. 7, 2020

(54) MECHANISMS FOR REPARAMETRIZING SURFACES TO PROVIDE INTER-SURFACE CONTINUITY

(71) Applicants: Board of Regents of the University of Texas System, Austin, TX (US); University of Utah Research Foundation, Salt Lake City, UT (US)

(72) Inventors: Benjamin Urick, Austin, TX (US); Thomas J. R. Hughes, Austin, TX (US); Richard H. Crawford, Austin, TX (US); Elaine Cohen, Salt Lake City, UT (US); Richard F. Riesenfeld, Salt Lake City, UT (US)

(73) Assignees: Board of Regents of the University of Texas System, Austin, TX (US); University of Utah Research Foundation, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/419,698

(22) Filed: May 22, 2019

(65) Prior Publication Data

US 2019/0303532 A1 Oct. 3, 2019

Related U.S. Application Data

(63) Continuation of application No. 15/433,823, filed on Feb. 15, 2017, now Pat. No. 10,339,266.
(Continued)

(51) Int. Cl.
*G06F 17/50* (2006.01)
*G06F 17/17* (2006.01)
(Continued)

(52) U.S. Cl.
CPC ........ *G06F 17/5095* (2013.01); *G06F 17/175* (2013.01); *G06F 17/50* (2013.01);
(Continued)

(58) Field of Classification Search
None
See application file for complete search history.

(56) References Cited

U.S. PATENT DOCUMENTS 5,488,684 A * 1/1996 Gharachorloo ......... G06T 15/50
345/423
8,269,770 B1 9/2012 Carr et al.
(Continued)

FOREIGN PATENT DOCUMENTS

WO 2009012370 A1 1/2009

OTHER PUBLICATIONS

Szczepaniak, Phil. "How to Get from 3D CAD to 3D rendering", May 30, 2014, 8 pages. (Year: 2014).*
(Continued)

*Primary Examiner* — Suzanne Lo
(74) *Attorney, Agent, or Firm* — Kowert Hood Munyon Rankin and Goetzel PC; Jeffrey Hood

(57) ABSTRACT

A mechanism is disclosed for reconstructing trimmed surfaces whose underlying spline surfaces intersect in model space, so that the reconstructed version of each original trimmed surface is geometrically close to the original trimmed surface, and so that the boundary of each respective reconstructed version includes a model space trim curve that approximates the geometric intersection of the underlying spline surfaces. Thus, the reconstructed versions will meet in a continuous fashion along the model space curve. The mechanism may operate on already trimmed surfaces such as may be available in a boundary representation object model, or, on spline surfaces that are to be trimmed, e.g., as part of a Boolean operation in a computer-aided design system. The ability to create objects with surface-surface intersections that are free of gaps liberates a whole host of downstream industries to perform their respective applications without the burdensome labor of gap repair, and thus, multiplies the efficacy of those industries.

29 Claims, 70 Drawing Sheets

Related U.S. Application Data

(60) Provisional application No. 62/295,892, filed on Feb. 16, 2016, provisional application No. 62/417,781, filed on Nov. 4, 2016.

(51) Int. Cl.
  *G06T 17/30* (2006.01)
  *G06T 19/20* (2011.01)

(52) U.S. Cl.
  CPC ...... *G06F 17/5009* (2013.01); *G06F 17/5018* (2013.01); *G06T 17/30* (2013.01); *G06T 19/20* (2013.01); *G06F 2217/02* (2013.01); *G06F 2217/16* (2013.01); *G06T 2219/2021* (2013.01)

(56) References Cited

U.S. PATENT DOCUMENTS

| | | | | |
|---|---|---|---|---|
| 8,284,193 | B2 * | 10/2012 | Hanisch | G06T 17/30 345/419 |
| 9,269,189 | B1 | 2/2016 | Marinov | |
| 2003/0200066 | A1 * | 10/2003 | Stewart | G06T 17/30 703/2 |
| 2012/0310604 | A1 * | 12/2012 | Bazilevs | G06F 17/5018 703/1 |
| 2015/0106065 | A1 * | 4/2015 | Hartmann | G06F 17/5018 703/2 |

OTHER PUBLICATIONS

Alias, "NURBS Modeling Version 6", 2004, 228 pages. (Year: 2004).*

European search report for European Application No. 17753759.4, dated Nov. 6, 2019, 9 pages.

\* cited by examiner

|  | | Type $C_{PSi}(u_\alpha^i)$ | | | |
|---|---|---|---|---|---|
|  | | Type 0 | Type 1 | Type 2 | Type 3 |
| Type $C_{PSi}(u_{\alpha+1}^i)$ | Type 0 | check | check | $s^i$ | $t^i$ |
|  | Type 1 | check | check | $s^i$ | $t^i$ |
|  | Type 2 | $s^i$ | $s^i$ | $s^i$ | error |
|  | Type 3 | $t^i$ | $t^i$ | error | $t^i$ |

Segment type classification, type $s^i$ or type $t^i$, based on bounding significant point pair (Type $C_{PSi}(u_a)$, Type $C_{PSi}(u_{a+1})$).

*FIG. 19*

| | | Type $(s^i, t^i)_{ja}$ | | | |
|---|---|---|---|---|---|
| | | Type 0 | Type 1 | Type 2 | Type 3 |
| Type $(s^i, t^i)_{(j+1)a}$ | Type 0 | check | check | $s^i$ | $t^i$ |
| | Type 1 | check | check | $s^i$ | $t^i$ |
| | Type 2 | $s^i$ | $s^i$ | $s^i$ | error |
| | Type 3 | $t^i$ | $t^i$ | error | $t^i$ |

Segment type classification, type $s^i$ or type $t^i$, based on bounding significant point pair (Type $(s^i, t^i)_{ja}$, Type $(s^i, t^i)_{(j+1)a}$).

*FIG. 39*

MECHANISMS FOR REPARAMETRIZING SURFACES TO PROVIDE INTER-SURFACE CONTINUITY

PRIORITY CLAIM

This application is a continuation of U.S. patent application Ser. No. 15/433,823, filed on Feb. 15, 2017, entitled "Mechanisms for Constructing Spline Surfaces to Provide Inter-Surface Continuity", by Benjamin Urick et al., which claims benefit of priority to Application No. 62/295,892 titled "Construction of Spline Surfaces to Provide Inter-Surface Continuity", filed on Feb. 16, 2016, and Application No. 62/417,781 titled "Mechanisms for Constructing Spline Surfaces to Provide Inter-Surface Continuity", filed on Nov. 4, 2016, and which are all hereby incorporated by reference as though fully and completely set forth herein.

ACKNOWLEDGEMENT OF GOVERNMENT SUPPORT

This invention was made with government support under Grant No. N00014-08-1-0992 awarded by the Office of Naval Research. The government has certain rights in the invention.

FIELD OF THE INVENTION

The present invention relates generally to the field of computer-aided design (CAD), and more particularly, to mechanisms for constructing (including reconstructing) tensor product spline surfaces to address the trim problem.

DESCRIPTION OF THE RELATED ART

The computer-aided design of models for objects is fundamentally important to a variety of industries such as computer-aided engineering (CAE), computer-aided manufacturing (CAM), computer graphics and animation. For example, a model may be used as the basis of an engineering analysis, to predict the physical behavior of the object. The results of such analysis may be used in a wide variety of ways, e.g., to inform changes to the design of the object, to guide selection of material(s) for realization of the object, to determine performance limits (such as limits on temperature, vibration, pressure, shear strength, etc.), and so forth. As another example, a model may be used to direct the automated manufacturing of the object. As yet another example, a model may be used to generate an image (or a sequence of images, e.g., as part of an animation of the object). These activities may represent typical product design development steps found across industrial market verticals such as automotive, aerospace, and oil and gas.

Modern premiere CAD software applications may be built on software kernels that utilize restrictive mathematical assumptions to approximate compound geometric objects. As a result, critical information may not be explicitly modeled, forcing designers, engineers, manufacturers, animators, etc., to repair CAD models and convert them into an acceptable format, such as polygonal meshes for Finite Element Analysis (FEA) or Computational Fluid Dynamics (CFD), 3-D printing or additive manufacturing, character animation, etc. This conversion is typically an iterative process, creating substantial amounts of work for product development teams. Designers, engineers, manufacturers, animators, etc., waste countless hours manually repairing gaps in models and dealing with redundant one-way file conversion operations, causing significant productivity losses, increased time to market and user frustration and dissatisfaction. As such, improvements in the field of CAD modeling may be desirable.

SUMMARY

Embodiments are presented herein of methods, computer systems, and computer-readable memory media for constructing gapless surface models in computer-aided design (CAD) applications. In one set of embodiments, a computer-implemented method for modifying a model is implemented, wherein the method comprises performing, by the computer: storing geometric input data describing a first and second input parametric surface associated with the model, wherein the first and second input parametric surfaces are described in a first and second parameter space domain, respectively. The method may proceed by storing a model space trim curve associated with the first and second input surfaces, wherein the model space trim curve approximates a geometric intersection of the first and second input surfaces. The method may proceed by reparametrizing the first and second parametric surfaces into a common third parameter space domain based on the model space trim curve. The method may proceed by constructing first and second output surfaces, wherein the first and second output surfaces are described in the third parameter space domain, wherein at least a portion of the boundary of each of the first and second output surfaces coincides with the model space trim curve. Finally, the method may output the first and second output surfaces as modified components of the model.

In some embodiments, the first input surface may include a first tensor product spline surface; the first geometric input data may include a first pair of knot vectors and a first set of surface control points and weights; the second input surface may include a second tensor product spline surface; and the second geometric input data may include a second pair of knot vectors and a second set of surface control points and weights.

In some embodiments, the first and second tensor product spline surfaces may be NURBS surfaces (or T-Spline surfaces).

Some embodiments may comprise a pre-SSI algorithm, wherein it is assumed the user has two boundary representations (Brep, brep, B-rep or b-rep) they wish to perform a solid modeling Boolean operation on. Other embodiments may comprise a post-SSI algorithm, wherein it is assumed the user has a valid B-rep model that contains the results of previously computed, standard CAD solid modeling Boolean operations. Pre-SSI input data may comprise two B-reps upon which it is desired to perform solid modeling Boolean operations. Post-SSI input data may comprise a valid B-rep model that contains the results of previously computed, standard CAD solid modeling Boolean operations. For both the pre-SSI and post-SSI algorithms, geometric input data may be stored describing a first and second input surface associated with the model under consideration. Each of the first and second input surfaces may be described as parametric surfaces in a first and second respective parameter space domain.

The input for the Post-SSI algorithm may be a boundary representation created using one or more (typically many) solid modeling Boolean operations on spline surfaces. (The spline surfaces may include tensor product spline surfaces such as NURBS surfaces and/or T-Spline surfaces.) In one embodiment, the boundary representation may be provided in a computer-aided design (CAD) file. In another embodiment, the Post-SSI algorithm may operate as part of the software kernel of a CAD system, in which case the boundary representation may have a specialized internal format.

In some embodiments, the first output surface geometrically approximates a subsurface of the first input surface to within model tolerance, and the second output surface geometrically approximates a subsurface of the second input surface to within the model tolerance, wherein model tolerance may be predetermined or user-defined.

In some embodiments, the boundary portion of the first output surface patch corresponds to a boundary isoparametric curve of the first output surface patch, wherein the boundary portion of the second output surface corresponds to a boundary isocurve of the second output surface. (Note that the term "isocurve" is used as a synonym for isoparametric curve.)

In some embodiments, the method may also include: numerically computing a set of intersection points that at least approximately reside on the geometric intersection of the first input surface and the second input surface; computing geometric data (e.g., knot vector and curve control points) that specify a model space curve, approximating the intersection of the first and second input surfaces as a parametric curve, based on the set of intersection points; and storing the geometric data that specify the model space curve.

In some embodiments, the method may also include executing an engineering analysis (e.g., a physics-based analysis) based on the modified model, to obtain data predicting physical behavior of the object. (The predictive data may be used to: generate display output to a user, for visualization of the physical behavior; calculate and output a set of performance limits for a manufactured realization of the object; identify locations of likely fault(s) in a manufactured realization of the object; select material(s) to be used for manufacture of the object; direct a process of manufacturing the object; direct automatic changes to geometry of the boundary representation; etc.)

In some embodiments, the above mentioned engineering analysis may comprise an isogeometric analysis.

In some embodiments, the method may also include: after having performed said modification of the model, manufacturing (or directing a process of manufacturing) the object based on the boundary representation.

In some embodiments, the method may also include: after having performed said modification of the model, generating an image of the object based on the boundary representation and displaying the image.

In some embodiments, the method may also include: after having performed said modification of the model, generating a sequence of animation images based on the boundary representation and displaying the sequence of animation images.

In some embodiments, the action of creating the first geometric output data includes: determining a first set of isocurve data specifying a first set of isocurves of the first input surface on a region within a parametric domain of the first input surface, dividing the first set of isocurves at respective locations based on the model space curve, to obtain a second set of isocurve data specifying sub-isocurves of the respective isocurves; and computing surface control points for the first output surface patch based on control points for said portion of the model space curve and a proper subset of the second set of isocurve data. (In this context, "proper subset" means a non-empty subset that excludes the end control points nearest the model space curve.)

In some embodiments, the above described sub-isocurves are reparametrized to a common parametric interval and cross-refined to achieve a common knot vector prior to said computing the surface control points for the first output surface patch.

In some embodiments, the action of computing the surface control points for the first output surface patch comprises solving one or more linear systems of equations that relate said surface control points to the control points for said portion of the model space curve and said at least a portion of the first set of isocurve data.

In some embodiments, the method may operate in the context of surface modeling, in which a topological object model (i.e., faces, edges, and vertices) has been created to reference the surface model objects (i.e., the tensor product spline surfaces, the model space curve, and a parameter space curve per tensor product spline).

Thus, the two output surfaces may meet in a $C^0$ continuous fashion along the model space trim curve, corresponding to the isoparametric curve boundaries of the surfaces, and closely respect the CAD designer's selection of original geometry for the trimmed surfaces. (The model space trim curve is associated with the topological edge between the two trimmed surfaces.) Thus, after application of this method, the above-described gaps at surface-surface intersections may no longer exist as per the user's intent. Having made the surfaces watertight, the boundary representation may be immediately ready for any of various applications such as finite element analysis (e.g., conventional analysis or isogeometric analysis), graphics rendering, animation, and manufacturing (e.g., 3D printing, such as additive manufacturing). For example, conventional mechanisms may be invoked to automatically convert the boundary representation into a continuous polygonal mesh, for any of the above listed downstream processes. As another example, the boundary representation may be subjected to an isogeometric analysis, in which the geometric basis functions, implicit in the output surfaces or refinements thereof, are used as the analysis basis functions.

Note that each of the above described output surfaces may be represented by a corresponding set of one or more output surface patches. Thus, the above stated conditions on the two output surfaces may be interpreted as conditions on the two sets of output patches. In particular, for each set of output patches, the boundary of the union of the images of the set of output patches includes the model space trim curve, and the union of the images of the set of output patches is geometrically close to the corresponding trimmed surface.

Furthermore, the above described method naturally generalizes to the reconstruction of two or more trimmed surfaces that nominally intersect along a given model space trim curve. (We use the term "nominally" because the trimmed surfaces actually meet in a non-continuous gap-replete fashion.) Thus, in some embodiments, the method may operate on the two or more trimmed surfaces to generate two or more corresponding output surfaces that meet in a $C^0$ continuous fashion along the model space trim curve, and closely respect the CAD designer's selection of original geometry for the trimmed surfaces. These embodiments may be especially useful for the design of non-manifold objects, or objects including non-manifold structures. (As an example of how more than two nominally intersecting trimmed surfaces might arise, imagine the Boolean union of two arbitrary spline surfaces that intersect in model space. This operation would give four trimmed surfaces that nominally intersect along a model space trim curve.)

In prior art solid modeling technology, the geometry of the spline surfaces $S_0$ and $S_1$ is never altered when performing the Boolean operations on the spline surfaces. Unfortunately, this commitment to unaltered geometry makes it impossible for the conventional Boolean operations to create surface-surface intersections that are gap free. (Typically, surface-surface intersections exhibit numerous small scale gaps and openings, making the model non-watertight.) The Brep object resulting from a conventional Boolean operation is un-editable and static. As a result, downstream processes such as finite element analysis and 3D printing cannot be performed until the solid model is rebuilt, typically with many hours of painstaking human labor.

According to embodiments presented herein, continuity of surface-surface interface may ensure that the boundary representation model is immediately ready for downstream applications such as engineering analysis or manufacture or graphics rendering. Because there are no gaps at the surface-surface interfaces, there may be no need for gap remediation.

In some embodiments, the action of constructing the boundary representation model of the object may be performed as part of a solid modeling Boolean operation in a CAD software system on a set of two or more input surfaces, wherein each of the output surfaces corresponds to a respective one of the input surfaces. In some embodiments, the action of constructing the boundary representation may be performed internal to a CAD software application.

In some embodiments, for each pair of the input surfaces that geometrically intersect, the corresponding pair of output surfaces meet in a continuous fashion along respective isocurves.

The method for creating the output patches may do so in a watertight configuration, such that the output surfaces meet in at least a $C^0$ continuous fashion along respective isocurves. This method may provide geometric as well as parametric compatibility, in which the domains of the output surfaces are created to define a previously missing single domain for the output surfaces for which desirable properties are furnished (e.g., properties such as geometric and parametric continuity, parametric structure, parametric fidelity, mesh resolution, mesh aspect ratio, mesh skew, mesh taper, etc.).

In some embodiments, the method may also include: (a) performing a computer-based engineering analysis on the object based on the boundary representation model (without any need for gap-remediation on the boundary representation model), wherein the computer-based engineering analysis calculates data representing physical behavior of the object; and (b) storing and/or displaying the data representing the physical behavior of the object. In some embodiments, the data represents one or more of: a predicted location of a fault in the object; a decision on whether the object will tolerate (or survive or endure) a user specified profile of applied force (or pressure or stress or thermal stimulus or radiation stimulus or electromagnetic stimulus); a predicted thermal profile (and/or stress profile) of an engine (or nuclear reactor) under operating conditions.

In some embodiments, the method may also include directing one or more numerically controlled machines to manufacture the object based on the boundary representation model (without any need for gap-remediation on the boundary representation model). The physical surfaces of the manufactured object meet in a continuous fashion. In some embodiments, the numerically controlled machines include one or more of the following: a numerically controlled mill, a numerically controlled lathe, a numerically controlled plasma cutter, a numerically controlled electric discharge machine, a numerically controlled fluid jet cutter, a numerically controlled drill, a numerically controlled router, a numerically controlled bending machine.

In some embodiments, the method may also include: (a) employing a 3D graphics rendering engine to generate a 3D graphical model of the object based on the boundary representation model (without any need for gap remediation on the boundary representation model); and (b) storing and/or displaying the 3D graphical model of the object (e.g., as part of a 3D animation or movie).

In some embodiments, the method may also include: (a) performing 3D scan on the boundary representation model to convert the boundary representation model into a data file for output to a 3D printer (without any need for gap remediation on the boundary representation model); and (b) transferring the data file to a 3D printer in order to print a 3D physical realization of the object. Due to the continuity of meeting between surfaces of the boundary representation, the printed physical realization will have structural integrity (and not be subject to falling apart at surface-surface interfaces).

In some embodiments, the method may also include manufacturing a portion of a body (e.g., a hood or side panel or roof section) of an automobile based on the boundary representation model of the object. Surfaces of the body portion meet in a continuous fashion.

In some embodiments, the method may also include manufacturing a portion of a body of a boat (or submarine) based on the boundary representation model of the object. Surfaces of the body portion meet in a continuous fashion.

In some embodiments, the method may also include: (a) downloading each of the output surfaces to a corresponding robotic manufacturing device; and (b) directing the robotic manufacturing devices to manufacture the respective output surfaces. Furthermore, the method may also include assembling the manufactured output surfaces to form a composite physical object.

In some embodiments, the boundary representation model represents a hydrocarbon reservoir in the earth's subsurface. In these embodiments, the method may include performing a geophysics simulation based on the boundary representation model in order to predict physical behavior (e.g., a flow field or a pressure field or a temperature-pressure field) of one or more hydrocarbons in the hydrocarbon reservoir. The method may also include determining one or more geographic locations for drilling of one or more exploration and/or production wells in the hydrocarbon reservoir. The method may also include determining a time profile for production of the one or more hydrocarbons via one or more wells based on the predicted physical behavior.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

Embodiments of the invention will now be described with reference to the attached drawings in which:

FIG. 19 is a table identifying $C_{PSi}$ types based on bounding significant point pair types, according to some embodiments;

FIG. 39 is a table indicating segment type classification based on bounding significant point pair types, according to some embodiments;

Figure 1A:
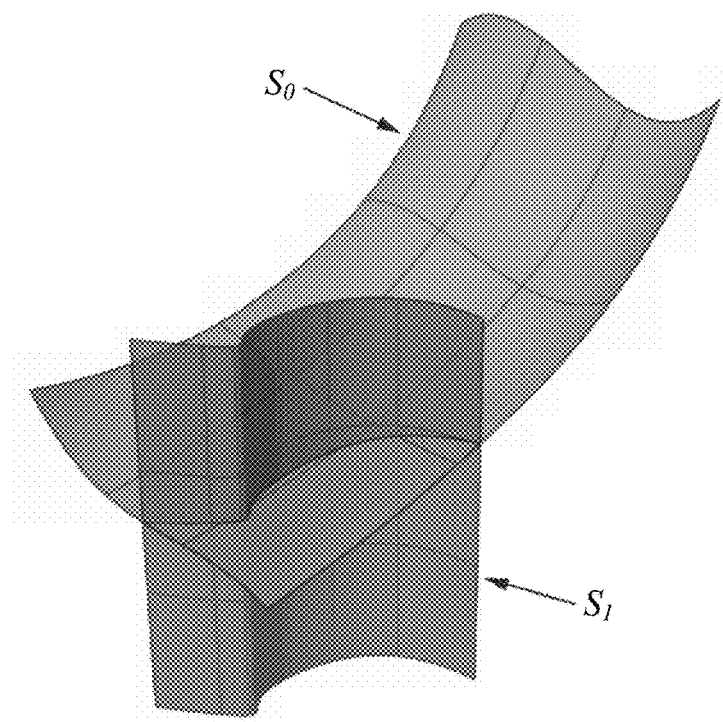
FIG. 1A is an illustration of intersecting first and second spline surfaces, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardwarefor example, circuits, memory storing program instructions executable to implement the operation, etc. Reciting that a unit/circuit/component is "configured to" perform one or more tasks is expressly intended not to invoke interpretation under 35 U.S.C. § 112(f) for that unit/circuit/component.

DETAILED DESCRIPTION OF THE EMBODIMENTS

Acronyms

Various acronyms are used throughout the present application. Definitions of the most prominently used acronyms that may appear throughout the present application are provided below:

BREP: Boundary Representation
NURBS: Non-Uniform Rational B-Spline
SSI: Surface-Surface Intersection Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), tablet computer, smart phone, television system, grid computing system, or other device or combinations of devices. In general, the term "computer system" can be broadly defined to encompass any device (or combination of devices) having at least one processor that executes instructions from a memory medium.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

DETAILED DESCRIPTION

Computer-Aided Design (CAD) Systems

Modern computer-aided design (CAD) systems provide an environment in which users can create and edit curves and surfaces. The curves may include spline curves such as B-spline curves, or more generally, Non-Uniform Rational B-Spline (NURBS) curves. The surfaces may include tensor product spline surfaces such as B-spline surfaces, or more generally, NURBS surfaces, or even more generally, T-spline surfaces. T-Spline surfaces allow the freedom of having T-junctions in the control net of the surface. Tensor product spline surfaces have certain very desirable properties that make them popular as modeling tools, e.g., properties such as: localized domain of influence of each surface control point on surface geometry; controllable extent of continuity along knot lines; $C^\infty$ smoothness between knot lines; and the ability to represent complex freeform geometry in a discrete manner that is intuitive for the user.

Two significant paradigms within computer-aided design with regards to the geometric modeling of an object are surface modeling and solid modeling.

In surface modeling, an object is represented simply as a set of unconnected surfaces, without maintaining a model of the topological structure corresponding to the relationships between the geometric features of the object. Thus, while the user may design two trimmed surfaces within an object that apparently intersect along a given curve, the CAD system does not explicitly record the topological or geometric relationship between the trimmed surfaces. Thus, in surface modeling, surfaces are operated on as independent entities.

In solid modeling, the specification of an object requires the specification of both topology and geometry, which are captured in a data structure referred to as a boundary representation (Brep, B-rep, b-rep or brep). From the topological point of view, a boundary representation includes, at minimum, faces, edges and vertices, and information regarding their interconnectivity and orientation. (An object includes a set of faces. Each face is bounded by a set of edges. Each edge is bounded by a pair of vertices.) From the geometric point of view, the boundary representation includes surfaces, curves and points, which correspond respectively to the faces, edges and vertices of the topological point of view. Thus, a boundary representation provides a way to store and operate on a collection of surfaces, curves and points as a unified object. In addition to faces, edges and vertices, many solid modelers provide additional objects to this data structure, such as loops, shells, half-edges, etc.

Solid modeling may be used to create a 2-manifold or a non-manifold object. A set X is said to be 2-manifold (without boundary) whenever, for every point $x \in X$, there exists an open neighborhood in X that contains x and is homeomorphic to an open disk of the 2D Euclidean plane. The sphere $S^2$ and the torus $T^2$ are common examples of 2-manifolds. A set X is said to be a 2-manifold with boundary whenever, for every point $x \in X$, there exists an open neighborhood in X that contains x and is homeomorphic to either an open disk of the 2D Euclidean plane or the half open disk given by $\{(x,y): x^2+y^2<1, \text{ and } x \geq 0\}$. An example of a non-manifold object is the union of two planes. (This object fails the defining condition for a 2-manifold at each point along the intersection of the two planes.) Another example of a non-manifold object is the union of two spheres that touch each other at a single point of tangency.

Solid modeling may also be used to create a 3-manifold having a 2-manifold as its boundary. Common examples of such a 3-manifold include a solid cube, a solid ball and a solid torus.

Figure 1B:
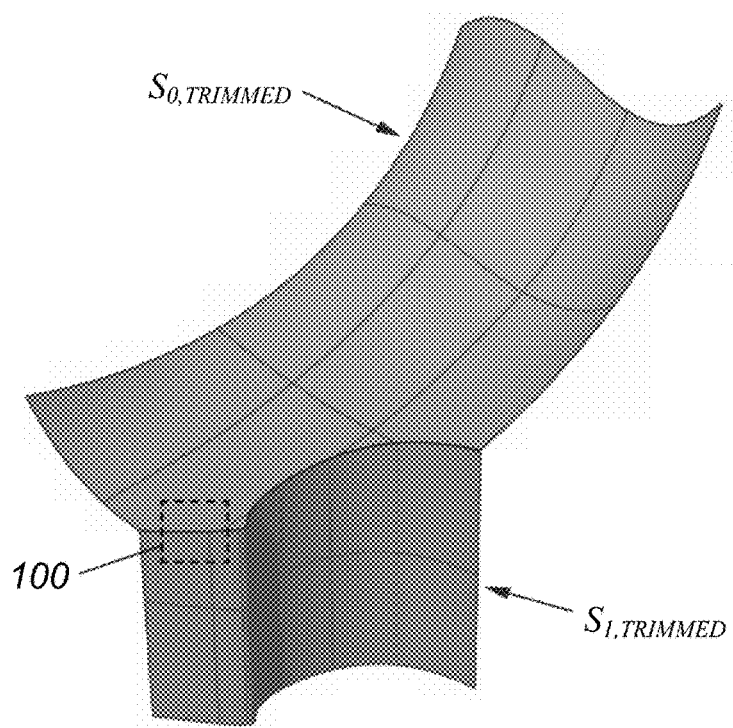
FIG. 1B is an illustration of the intersecting first and second spline surfaces of FIG. 1A that have been trimmed along their intersection, according to some embodiments.
Figure 1C:
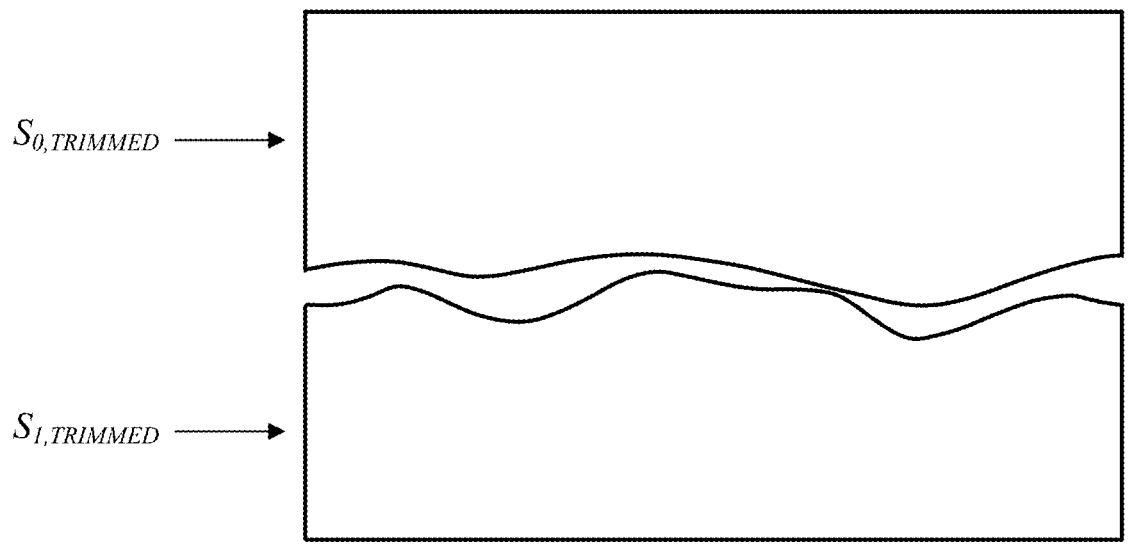
FIG. 1C is an illustration of the gaps that may occur along the trimmed intersection of FIG. 1B, according to some embodiments.

The process of designing a model for an object often involves the creation of tensor product spline surfaces in a model space, and the application of Boolean operations to the surfaces (or to 3D "solids" that are defined by a 2-manifold B-rep of surfaces, as per above). The Boolean operations require the calculation of intersections between surfaces in the B-rep. The resulting intersections are represented as trimmed surfaces. A fundamental problem with such Boolean operations is that the trimmed surfaces do not meet in a $C^0$ continuous fashion at the geometric intersection of the original surfaces. The process involved in determining the geometric location of intersection between two or more tensor product spline surfaces, as well as the creation of the resulting representational geometric objects, is referred to as "surface-surface intersection" (SSI). Using current SSI technology, each trimmed surface exhibits an independent profile of small scale deviations from the true geometric intersection. For example, a user of a CAD system may create spline surfaces $S_0$ and $S_1$ as shown in FIG. 1A, and apply one or more Boolean operations to create the trimmed surfaces $S_{0,TRIMMED}$ and $S_{1,TRIMMED}$ shown in FIG. 1B. In this case, the user has specified the one or more Boolean operations to approximately remove from the domain of evaluation of surface $S_0$ the portion of $S_0$ that resides in front of surface $S_1$, and to approximately remove from the domain of evaluation of surface $S_1$ the portion of $S_1$ that resides above surface S. FIG. 1C is a blowup of the area 100 at the intersection of the trimmed surfaces $S_{0,TRIMMED}$ and $S_{1,TRIMMED}$, exhibiting some of the gaps at the intersection. Thus, Boolean operations typically violate the intuitive expectation that the trimmed surfaces should have a $C^0$ continuous interface along the geometric intersection of $S_0$ and $S_1$. This is clearly demonstrated by the fact that the trim operations in surface modeling and Boolean operations in solid modeling do not alter the underlying surface representations. Instead, curves are altered and/or created so as to approximately update the domains of evaluation of the original surfaces.

The gaps are a consequence of a basic mathematical fact: the generic intersection of two low-degree polynomial surfaces is a 3D curve of very high degree. For example, the solution to the intersection of two arbitrary bicubic surfaces is a 3D curve of degree 324. While it is theoretically possible to compute the parameters of such a high degree intersection curve based on the parameters of the two polynomial surfaces, that computation would not be realizable within CAD environments given the computing limitations as well as the practicality of using the resulting high degree curve in practice. Thus, when implementing a Boolean operation, a conventional CAD system may:

(a) numerically compute a set of points $SOP_{MS}$ that reside on (or sufficiently near) the surface-surface intersection in the 3D model space (and are scattered across the surface-surface intersection), and/or, compute a set of intersection-related points $SOP_{PS0}$ in the parameter space of spline surface $S_0$, and/or, compute a set of intersection-related points $SOP_{PS1}$ in the parameter space of the spline surface $S_1$ (where the subscript "MS" is meant to suggest model space, and the subscript "PS" is meant to suggest parameter space);

(b) generate a curve $C_{MS}$ in the 3D model space, based on the set of points $SOP_{MS}$, where the curve $C_{MS}$ approximates the surface-surface intersection, e.g., by interpolating the set of points $SOP_{MS}$;

(c) generate a trim curve $C_{PS0}$ in the 2D parameter space of the spline surface $S_0$, based on the set of points $SOP_{PS0}$, where the trim curve $C_{PS0}$ approximates the preimage of the surface-surface intersection under the spline map $S_0$, e.g., by interpolating the set of points $SOP_{PS0}$;

(d) generate a trim curve $C_{PS1}$ in the 2D parameter domain of spline surface $S_1$, based on the set of points $SOP_{PS1}$, where the trim curve $C_{PS1}$ approximates the preimage of the surface-surface intersection under the spline map $S_1$, e.g., by interpolating the set of points $SOP_{PS1}$.

When the Boolean operation is performed in the context of solid modeling, the CAD system will update the boundary representation. The update of the boundary representation may be performed in a variety of ways, e.g., depending on the data structure format of the boundary representation, as well as the solid modeling algorithm applied, e.g., use of Euler operators or a variety of alternative operators. As an illustrative example in view of FIGS. 1A-1C, the boundary representation may be updated by:

adding a new topological edge E and associating the curve $C_{MS}$ with the new topological edge E;

splitting an existing topological face $F_0$ corresponding to the spline surface $S_0$ along a new topological coedge $E_0$ corresponding to the trim curve $C_{PS0}$, to obtain two subfaces $F_0^A$ and $F_0^B$;

associating the topological coedge $E_0$ with the edge E and with the trim curve $C_{PS0}$;

selecting one of the two subfaces $F_0^A$ and $F_0^B$ to be retained and the other to be discarded, e.g., depending on the identity of the Boolean operation (intersection, subtraction, or union), and/or, on user input;

replacing the face $F_0$ with its selected subface $F_0^{selected}$, and associating the spline surface $S_0$ with the selected subface $F_0^{selected}$;

splitting an existing topological face $F_1$ corresponding to the spline surface $S_1$ along a new topological coedge $E_1$ corresponding to the trim curve $C_{PS1}$, to obtain two subfaces $F_1^A$ and $F_a^B$;

associating the topological coedge $E_1$ with the edge E and with the trim curve $C_{PS1}$;

selecting one of the two subfaces $F_1^A$ and $F_1^B$ to be retained and the other to be discarded, e.g., depending on the identity of the Boolean operation (intersection, subtraction, or union), and/or, on user input;

replacing the face $F_1$ with its selected subface $F_1^{selected}$ and associating the spline surface $S_1$ with the selected subface $F_1^{selected}$.

Observe that there are three available approximations to the true surface-surface intersection: the trajectory of the model space curve $C_{MS}$; the image $S_0(C_{PS0})$ of the trim curve $C_{PS0}$ under the spline map $S_0$; and the image $S_1(C_{PS1})$ of the trim curve $C_{PS1}$ under the spline map $S_1$. Each of those approximations exhibits an independent profile of deviations from the true surface-surface intersection $SSI_{TRUE}$, and disagrees with the other approximations:

$$C_{MS} \neq SSI_{TRUE};$$

$$S_0(C_{PS0}) \neq SSI_{TRUE};$$

$$S_1(C_{PS1}) \neq SSI_{TRUE};$$

$$S_0(C_{PS0}) \neq C_{MS};$$

$$S_1(C_{PS1}) \neq C_{MS};$$

$$S_0(C_{PS0}) \neq S_1(C_{PS1}).$$

In the above list, the notation $X \neq Y$ may be interpreted as meaning that the Hausdorff distance between set X and set Y is greater than zero. The gaps between the trimmed surfaces may be due especially to the inequality $S_0(C_{PS0}) \neq S_1(C_{PS1})$.

In the environment of surface modeling, there may be a separate model space curve $CS_{MSk}$ for each surface $S_k$ participating in the intersection. For example, surface $S_0$ may be trimmed relative to surface $S_1$, and surface $S_1$ may be separately trimmed relative to surface $S_0$. Each trimming operation may generate a corresponding set of intersection points $SOP_{MSk}$ in model space, and thus, result in a separate model space curve $CS_{MSk}$. Thus, to the above multiplicity of set disagreements, we should add, for each k:

$$C_{MSk} \neq SSI_{TRUE};$$

$$C_{MSk} \neq S_0(C_{PS0});$$

$$C_{MSk} \neq S_1(C_{PS1}).$$

Therefore, a solid modeling Boolean operation on spline surfaces generally results in at least one model space curve and a set of parametric trim curves per spline surface.

Because these curves represent separate approximations to the geometric intersection, gaps and openings are introduced along the geometric intersection. Furthermore, the editable surface features of the tensor product spline surfaces (e.g. control points, degree, weights, etc.) are rendered un-editable and static.

The above described problem is known in computer-aided design as the trim problem (or the SSI problem). The trim problem is considered to be one of the top five problems in the field, and many consider it to be the most important problem. This problem affects all users of the resultant model, including the numerous downstream users and applications of the model. There has been no general solution for this problem to date. The scope and weight of the problem may be summarized with an excerpt from, by one of the industry's leading experts on the topic, Tom Sederberg [Sederberg 2008]:

"The existence of these gaps in trimmed NURBS models seems innocuous and easy to address, but in fact it is one of the most serious impediments to interoperability between CAD, CAM and CAE systems. Software for analyzing physical properties such as volume, stress and strain, heat transfer, or lift-to-drag ratio will not work properly if the model contains unresolved gaps. Since 3D modeling, manufacturing and analysis software does not tolerate gaps, humans often need to intervene to close the gaps. This painstaking process has been reported to require several days for a large 3D model such as an airplane and was once estimated to cost the US automotive industry over $600 million annually in lost productivity. At a workshop of academic researchers and CAD industry leaders, the existence of gaps in trimmed-NURBS models was singled out as the single most pressing unresolved problem in the field of CAD."

Furthermore, the difficulty and long persistence of the trim problem is evidenced by the following assertions made by Christoph M. Hoffmann, one the leading experts in the field of solid modeling, excerpted from [Hoffman 1989]:

"The difficulty of evaluating and representing the intersection of parametric surface patches has hindered the development of solid modelers that incorporate parametric surfaces. Roughly speaking, the topology of a surface patch becomes quite complicated when Boolean operations are performed. Finding a convenient representation for these topologies continues to be a major challenge."

Currently there is no direct solution to the trim problem. Instead, most industries have developed alternative surface descriptions that attempt to avoid the issues with SSI. The alternative surface descriptions approximate the originally supplied surface splines. Examples of alternative surface descriptions include subdivision surfaces and faceted remeshing with geometric healing. As another example, T-splines might be constructed to represent a multi-patch NURBS surface geometry, given an appropriate set of conditions. Unfortunately, these alternative surface descriptions introduce additional approximations, introduce many other problems that did not previously exist in the original model, and either do not allow for Boolean operations or provide for Boolean operations in a manner that is unreliable and very difficult to use.

As noted above, without correction, the gaps between the trimmed surfaces of object models would severely compromise downstream processes such as engineering analysis, manufacturing, graphics rendering and animation. For example, in a thermal analysis, the computed flow of heat between the trimmed surfaces would be disrupted by such gaps. In the context of 3D printing, the gaps would translate into locations where material would be not deposited, and the structural integrity of the resulting printed object would be undermined. In graphics, the rendered image would contain the appearance of cracks at the gaps. In animation, the objects and characters would separate when dynamically actuated.

As further noted above, the correction of such gaps between trimmed surfaces unfortunately involves the exertion of intensive human labor. For example, prior to engineering analysis, the boundary representation may be converted into a continuous mesh of triangles (or polygons). Tremendous human labor is typically required to heal the gaps by injecting a myriad of small polygons to fill the area left between surfaces. The gaps may be so numerous and of such small scale that it may be difficult to discover and correct all the gaps in a single pass of human gap correction. Repeated cycles of analysis, machining, rendering, animation, depending on process of interest, may be dedicated to nothing more than identifying locations of gaps not caught by previous iterations of human gap correction, substantially decreasing the time and budget available for meaningful analyses that would inform optimizations of the model design.

Existing solutions for preparing CAD models for analysis include healing software (CADdoctor, Acc-u-Trans CAD, 3D Evolution, etc.) and meshing software (Altair Hypermesh, CFX-Mesh, Ennova). These solutions fail to mitigate the workflow burden since they do not address the fundamental model differences between disciplines. While they claim to expedite the steps in the current CAD-CAE-CAM pipeline, the processes remain semi-automated and require substantial amounts of users' time and skill.

Therefore, there is a vital need for mechanisms capable of performing Boolean operations on surfaces (or solid objects) in a boundary representation so that the resulting surfaces meet in a $C^0$ continuous fashion at their geometric intersections. Furthermore, there exists a vital need for mechanisms capable of reconstructing the surfaces in a previously-created boundary representation so that the reconstructed surfaces meet at their geometric intersections in a $C^0$ continuous (i.e., conformal) fashion. These mechanisms may enable the benefits of technologies such as isogeometric analysis (IGA) to be more fully and systematically realized.

Figure 2:
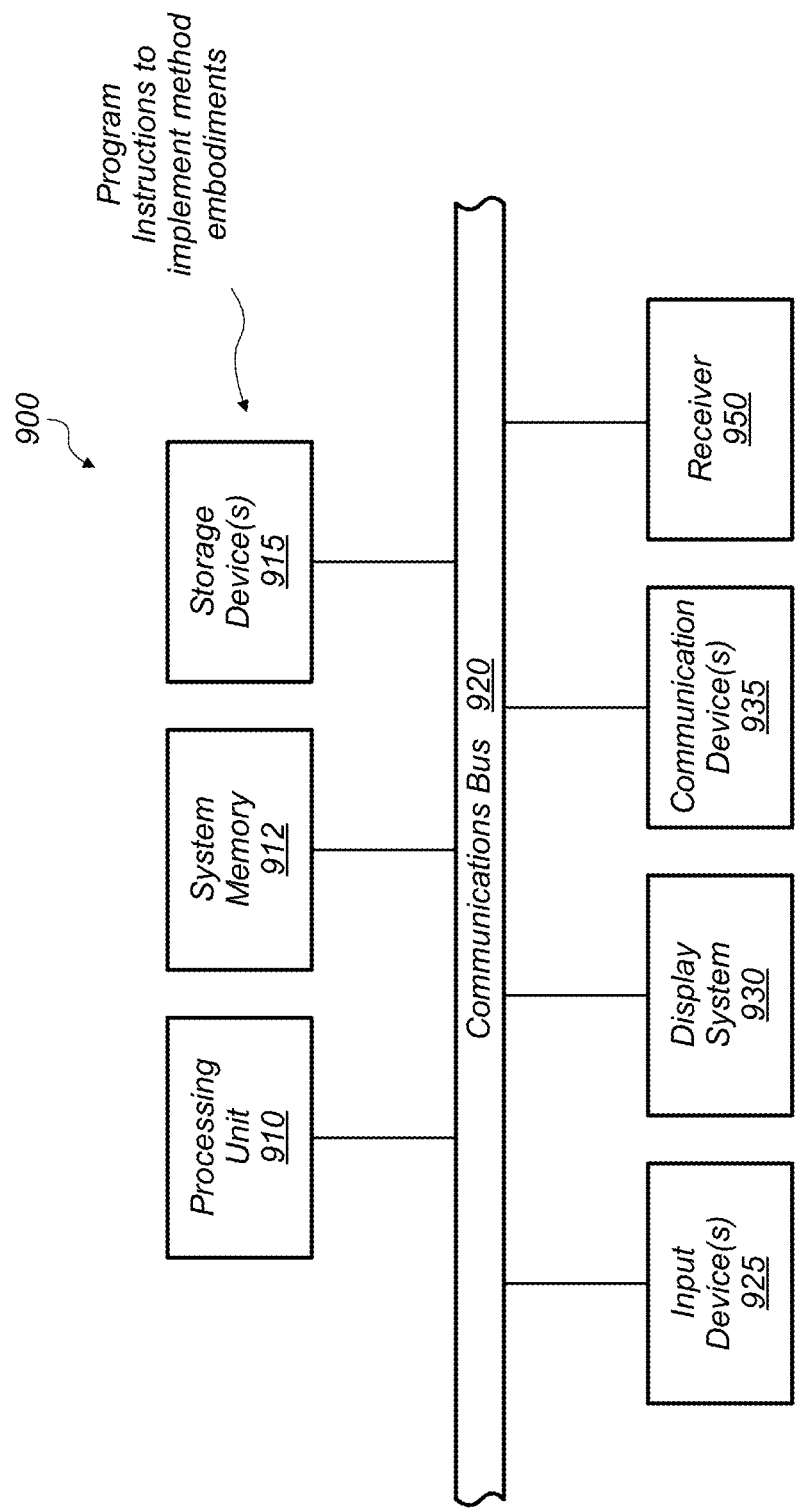
FIG. 2 is an illustration of an exemplary computer system that may be used to perform any of the method embodiments described herein, according to some embodiments.

FIG. 2: Computer System

FIG. 2 illustrates one embodiment of a computer system 900 that may be used to perform any of the method embodiments described herein, or, any combination of the method embodiments described herein, or any subset of any of the method embodiments described herein, or, any combination of such subsets.

In some embodiments, a hardware device (e.g., an integrated circuit, or a system of integrated circuits, or a programmable hardware element, or a system of programmable hardware elements, or a processor, or a system of interconnected processors or processor cores) may be configured based on FIG. 2 or portions thereof. Any hardware device according to FIG. 2 may also include memory as well as interface circuitry (enabling external processing agents to interface with the hardware device).

Computer system 900 may include a processing unit 910, a system memory 912, a set 915 of one or more storage devices, a communication bus 920, a set 925 of input devices, and a display system 930.

System memory 912 may include a set of semiconductor devices such as RAM devices (and perhaps also a set of ROM devices).

Storage devices 915 may include any of various storage devices such as one or more memory media and/or memory access devices. For example, storage devices 915 may include devices such as a CD/DVD-ROM drive, a hard disk, a magnetic disk drive, a magnetic tape drive, semiconductor-based memory, etc.

Processing unit 910 is configured to read and execute program instructions, e.g., program instructions stored in system memory 912 and/or on one or more of the storage devices 915. Processing unit 910 may couple to system memory 912 through communication bus 920 (or through a system of interconnected busses, or through a computer network). The program instructions configure the computer system 900 to implement a method, e.g., any of the method embodiments described herein, or, any combination of the method embodiments described herein, or, any subset of any of the method embodiments described herein, or any combination of such subsets.

Processing unit 910 may include one or more processors (e.g., microprocessors).

One or more users may supply input to the computer system 900 through the input devices 925. Input devices 925 may include devices such as a keyboard, a mouse, a touch-sensitive pad, a touch-sensitive screen, a drawing pad, a track ball, a light pen, a data glove, eye orientation and/or head orientation sensors, a microphone (or set of microphones), an accelerometer (or set of accelerometers), or any combination thereof.

The display system 930 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 900 may include other devices, e.g., devices such as one or more graphics devices (e.g., graphics accelerators), one or more speakers, a sound card, a video camera and a video card, a data acquisition system.

In some embodiments, computer system 900 may include one or more communication devices 935, e.g., a network interface card for interfacing with a computer network (e.g., the Internet). As another example, the communication device 935 may include one or more specialized interfaces for communication via any of a variety of established communication standards or protocols or physical transmission media.

The computer system 900 may be configured with a software infrastructure including an operating system, and perhaps also, one or more graphics APIs (such as OpenGL®, Direct3D, Java 3D™)

Any of the various embodiments described herein may be realized in any of various forms, e.g., as a computer-implemented method, as a computer-readable memory medium, as a computer system, etc. A system may be realized by one or more custom-designed hardware devices such as ASICs, by one or more programmable hardware elements such as FPGAs, by one or more processors executing stored program instructions, or by any combination of the foregoing.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a wearable computer, a computer embedded in a living organism, etc. Reconstruction of Spline Surfaces to Integrate Surface-Surface Intersection and Provide Inter-Surface Continuity Current technologies employ methods that only allow for one-way conversion of a CAD model, while also introducing additional complications, data structures, and approximations. Such methods include healing/translation applications, polytope meshing software (quadrilaterals, triangles, etc.), and conversions to alternative formats such as subdivision surfaces. Embodiments described herein may produce objects in the same format as the original model (i.e., as freeform surfaces, not polygonal approximations), making them available for editing in the user's native CAD software. Current technology used by existing CAD, meshing, and healing/translation software applications does not allow users to repair models that retain editable properties.

CAD may be applicable to an increasing number of industries, and it is expected that the CAD industry will continue to expand significantly in the coming years. This growth is anticipated due to the need for enhanced product visualization and increased design process efficiency.

The CAD industry may generally be categorized into four distinct market segments: design, engineering (analysis), manufacturing, and animation. These four segments are served by vertical CAD products, limiting horizontal interoperability between applications and making it difficult for engineers and designers to use a single model for the purposes of analysis, manufacturing, and graphics. Some companies exist solely to heal models and deliver models to customers with suitable formats that meet the constraints of current CAD representations and limitations throughout the modeling pipeline.

Figure 3:
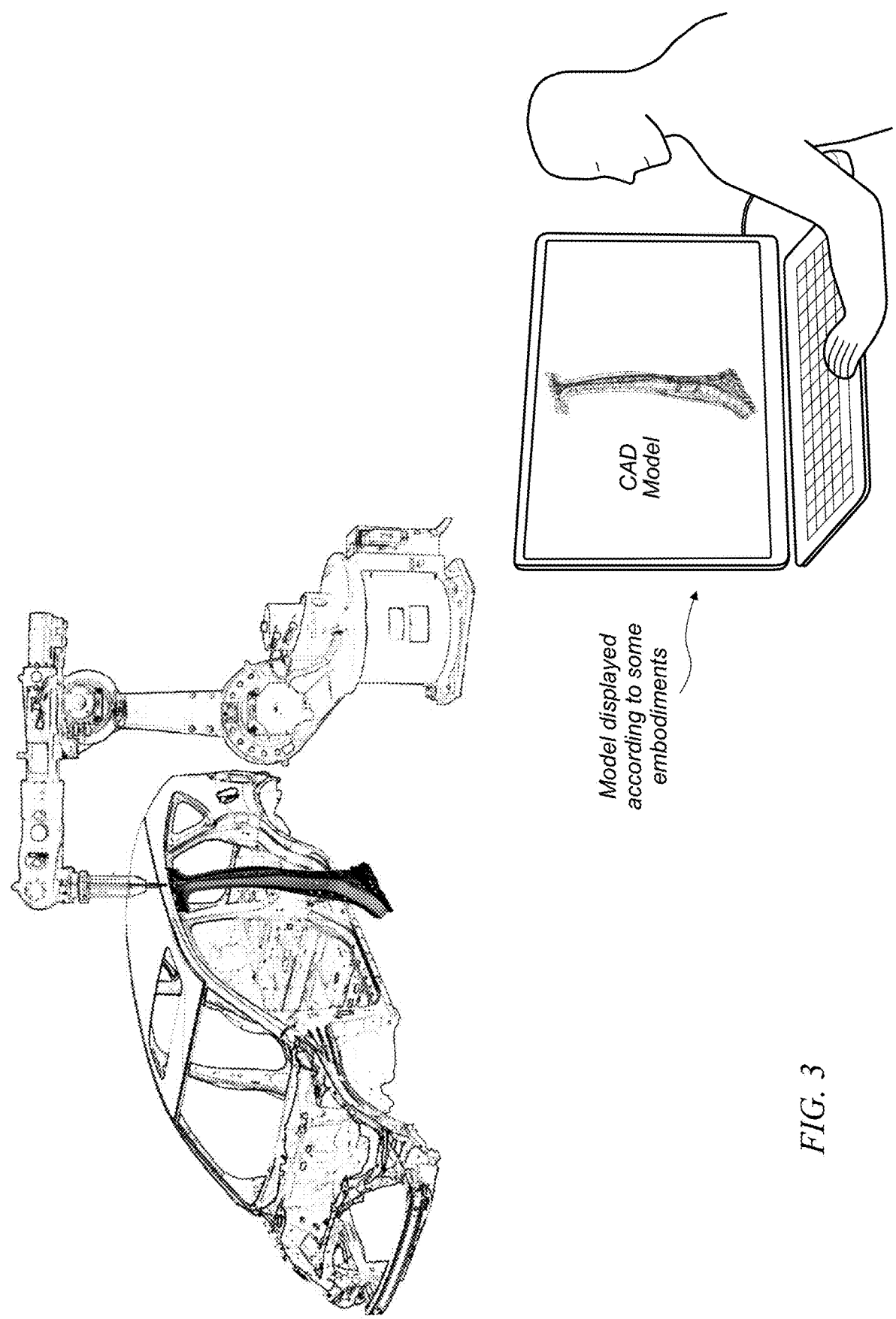
FIG. 3 is an illustration of a user creating a CAD model of an automobile part, according to some embodiments.

Modern engineering practice may rely on CAD systems to create geometric representations of components and assemblies. CAD geometry may become the input to CAE (FEA, CFD, etc.), CAM (CNC tool path generation, additive manufacturing, etc.), animation and graphics, inspection, etc. In a typical process, a designer may create a model of a component and/or system and then an engineer may use this CAD model as input for converting to an analysis-suitable model for use in a CAE program. The fabricator may also convert the CAD model independently to their requirements so as to analyze manufacturability with a CAM program. FIG. 3 illustrates a user creating a CAD model on a computer, which may then be used for construction of a corresponding vehicle part. The overall design process may require many iterations of redesign as results are fed back to modify the original CAD model, and each cycle may require a model translation in the design-analysis-manufacturing workflow with different, specialized users involved in arriving at a satisfactory final design.

To represent the highly freeform nature of complex objects, non-uniform rational B-spline (NURBS) surfaces are commonly used geometric representations in CAD systems. NURBS surfaces are mappings from basis functions in a UV-parameter space to the 3D model space, where the user sees their intended geometric design. The most natural and common method of building unique, multifaceted models in CAD systems is to perform Boolean operations, or unions, intersections and differences, on the freeform NURBS surfaces to build up the distinct details of each design. Numerical solutions of the surface-surface intersections (SSI) in 3D model space may be necessary as the exact intersections of these surfaces may be of a polynomial degree and complexity too large for CAD systems to realistically handle in software or to be of practical use by the user for further shaping. An auxiliary topological procedure may then be used to create an ancillary data structure, called a boundary representation (B-rep), providing an independent and non-geometric means of maintaining soundness and validity of the solid.

Figure 4:
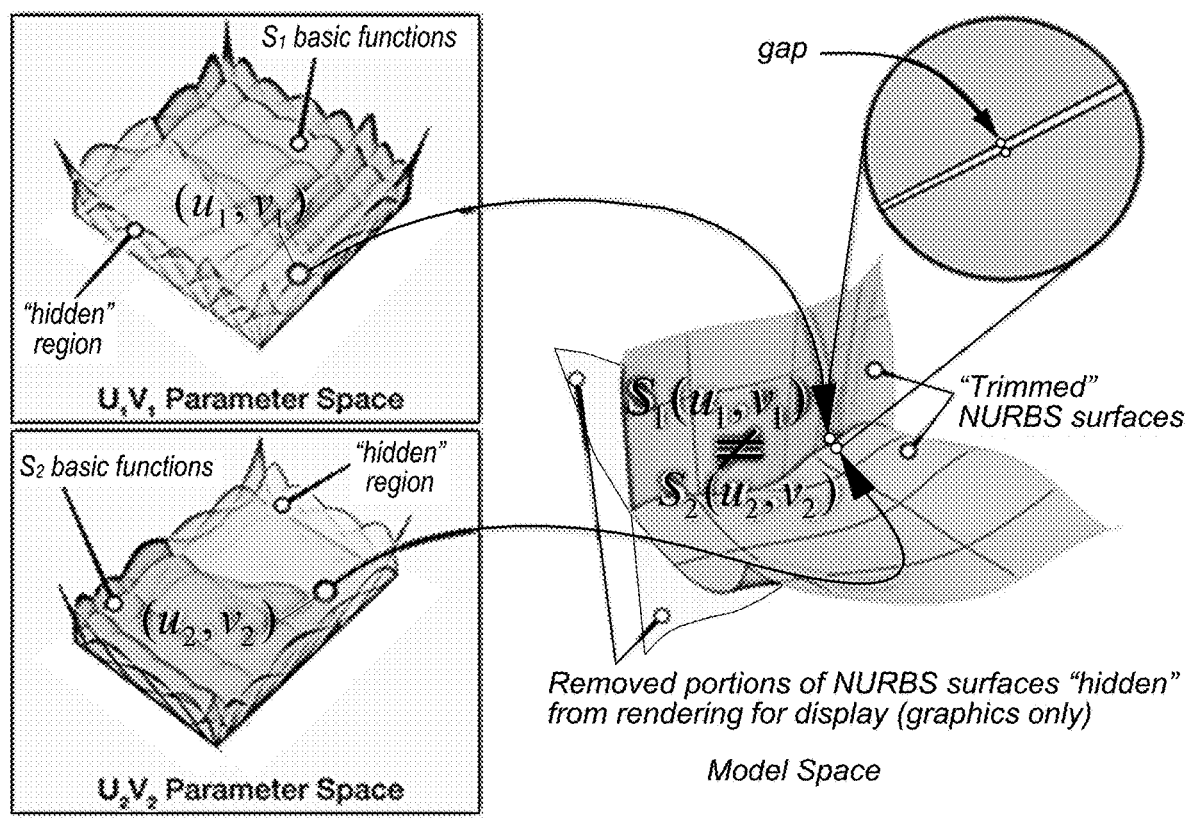
FIG. 4 is an illustration of a conventional method for performing solid modeling Boolean operations, according to some embodiments.

FIG. 4: Conventional Solid Modeling Technique

FIG. 4 is an illustration of a conventional method for performing solid modeling Boolean operation, which shows the approximation of the B-rep surface-surface intersection. In conventional methods, the underlying NURBS surfaces are typically not altered or updated to reflect the true surface intersections. Rather, an intersection curve may be associated with the surfaces where the SSI occurs by use of the B-rep data structure. Because the underlying surface geometry is not updated, these numerical intersection algorithms may introduce gaps and openings in the geometry at the intersections Further, because the B-rep data structure separates topology from the geometry, the resulting non-watertight surfaces may be rendered individually un-editable and static. The graphics card hides from the user the fact that the surface definitions are never updated, rather, simply removed from rendering by the graphics display in the CAD application.

Figure 5:
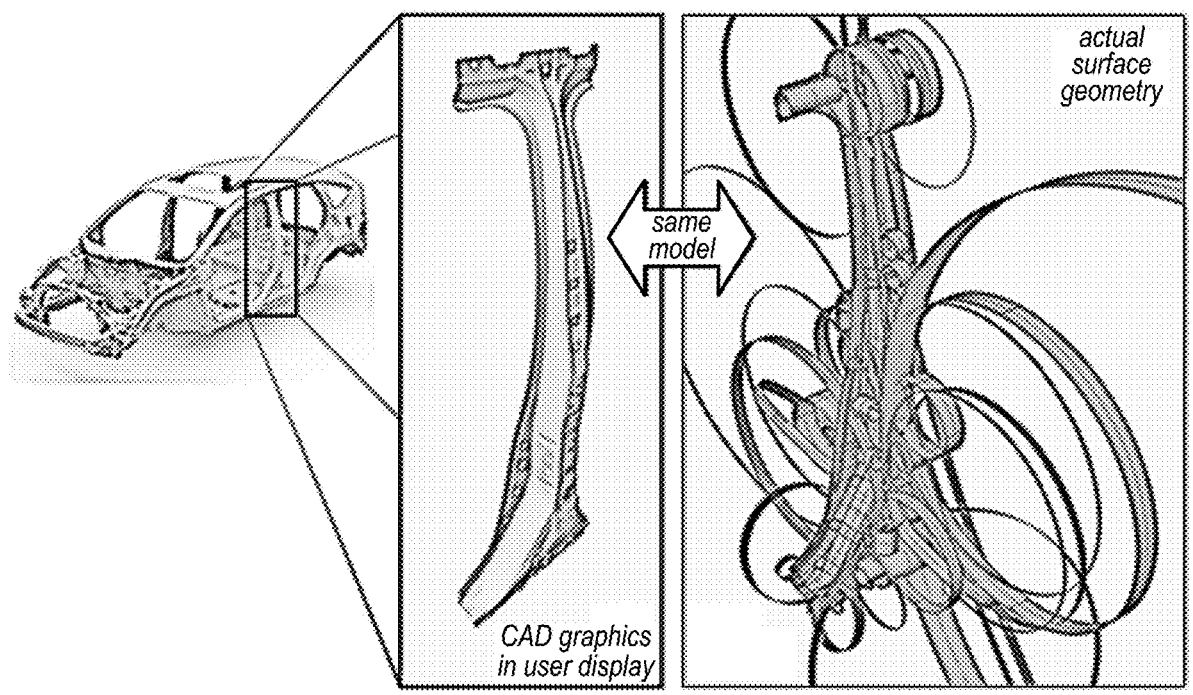
FIG. 5 is an illustration of a conventional B-rep solid model of an actual automotive part, according to some embodiments.

FIG. 5: Conventional B-Rep Solid Model of an Actual Automotive Part

FIG. 5 illustrates a conventional B-rep solid model of an actual automotive part (left and right images are of the exact same model). FIG. 5 shows (left) the graphic display within the CAD application rendered by the graphics card and (right) the 1200+ surface definitions contained in the data structure. Note the discontinuity and independent order of the surface geometry.

Figure 6:
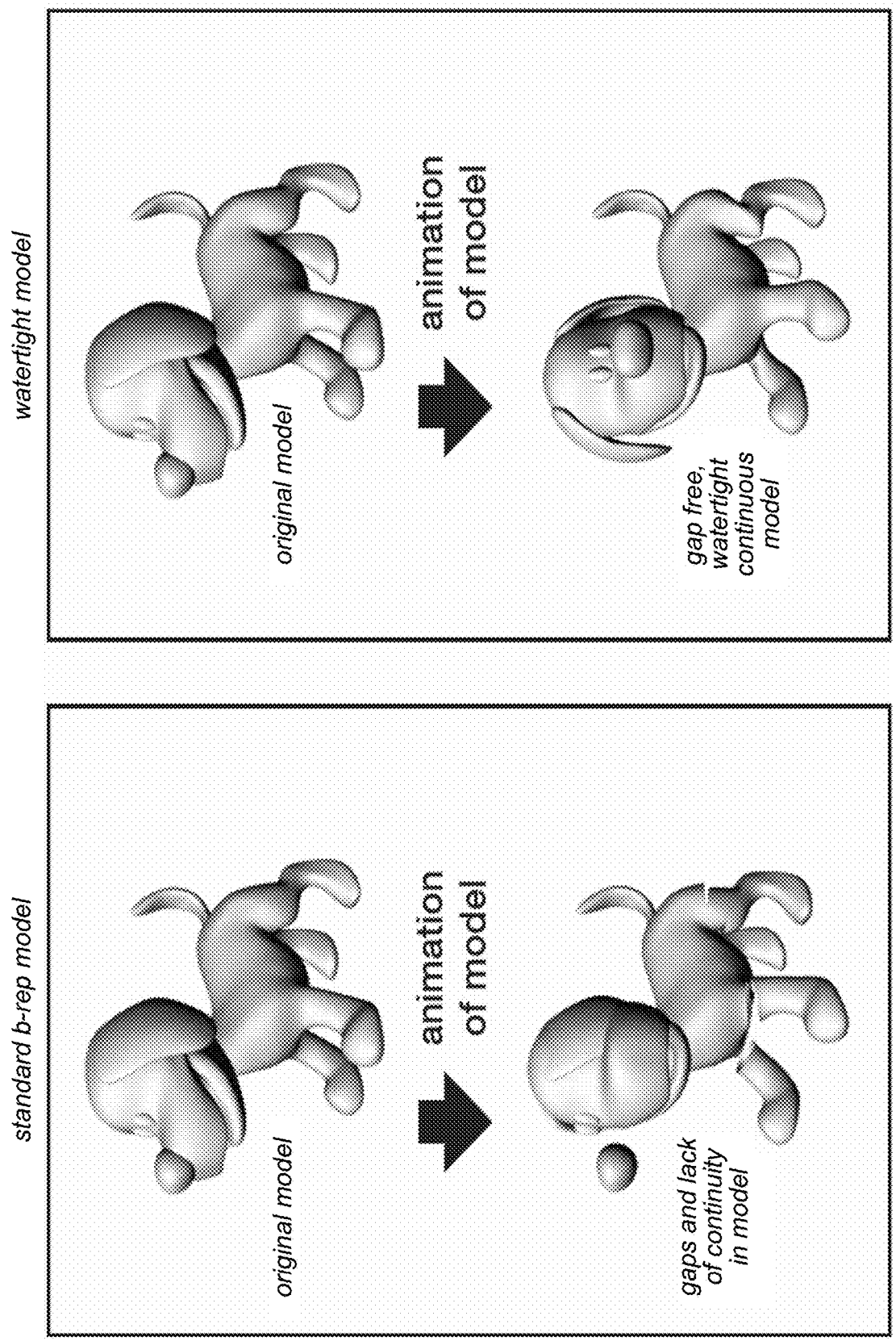
FIG. 6 is an illustration of how a conventional B-rep model may introduce gaps that may hinder animation of a model, according to some embodiments.

A significant weakness of the current intersection paradigm is that the underlying NURBS surfaces are not updated. As shown in FIGS. 4 and 5, the CAD user may see the intent of the operation performed, not because the object definition has been updated to represent the joined geometric configuration, but because the graphics card provides a means of not showing the unwanted portions of the trimmed surfaces (generally through a rasterized mesh). Although this process has worked for displaying CAD models while the user completes their design, this strategy does not work for those using the CAD model in CAE, CAM, animation, or inspection. For example, FIG. 6 illustrates how gaps and a lack of continuity in a standard B-rep model may hinder animation of a model. In contrast, a gap free, watertight continuous model may be more effectively animated. Users may desire watertight, gap-free models, making a standard CAD model unusable without further processing. As such, an immense effort may be required to heal the model to make it gap-free. This cleanup process may be costly, time consuming and frustrating for those inheriting the CAD model. Each iteration of the design process described above may require the engineer to repair gaps between the disparate surfaces introduced by Boolean operations and translate the geometric model from the native CAD B-rep representation to a valid analyzable form, typically a polygonal mesh. This operation may require repetitive, semi-automated and/or manual examination at fine levels of detail to identify and repair the flaws. This results in a one-way design process hindering design feedback, optimization, and information integrity. Dr. Thomas Sederberg, a seminal researcher and expert in CAD, described both the subtlety and gravity of the problem:

"The existence of these gaps in trimmed NURBS models seems innocuous and easy to address, but in fact it is one of the most serious impediments to interoperability between CAD, CAM and CAE systems . . . . Since 3D modeling, manufacturing and analysis software does not tolerate gaps, humans often need to intervene to close the gaps. This painstaking process has been reported to require several days for a large 3D model such as an airplane."

Figure 7:
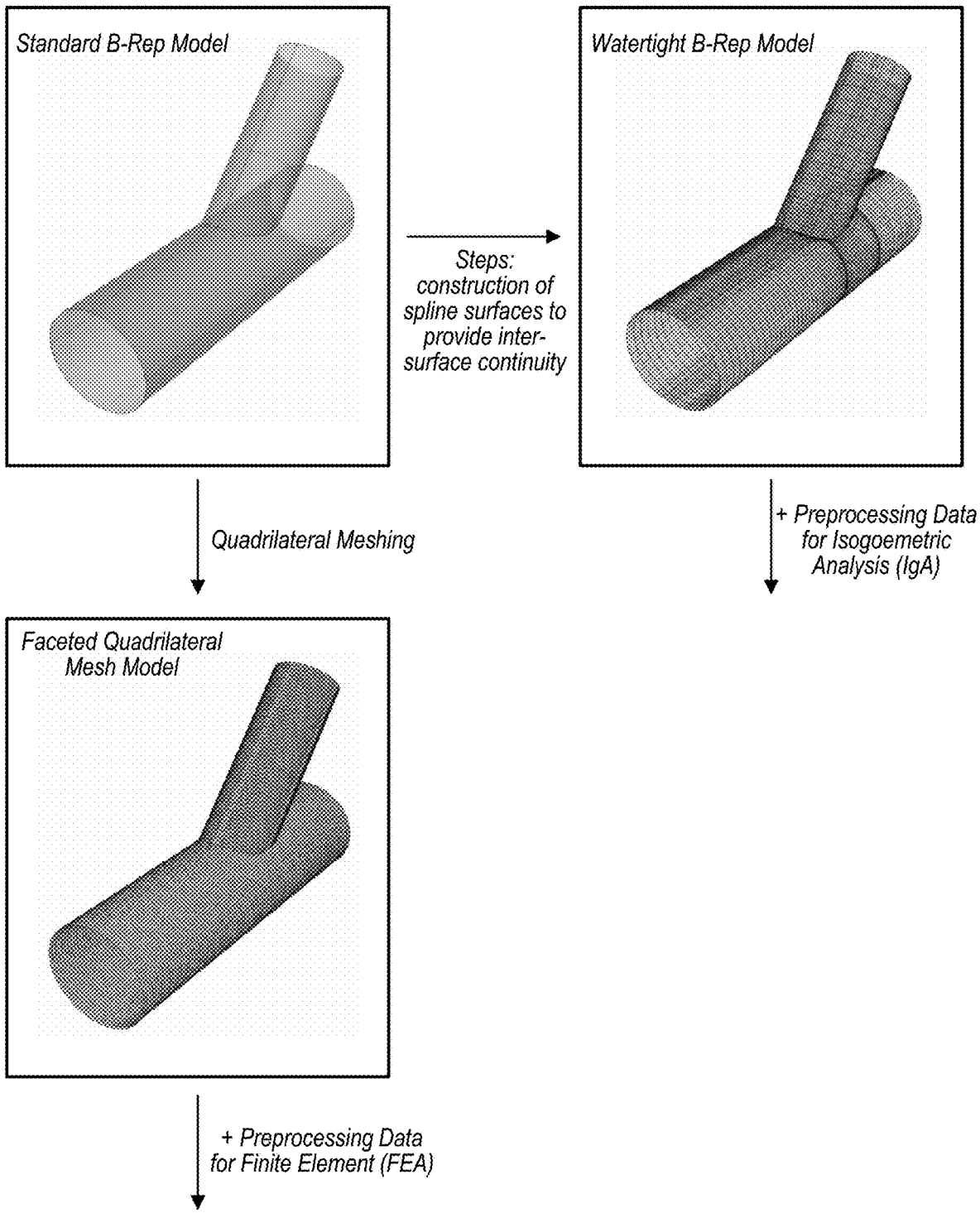
FIG. 7 is an illustration of a conventional faceted quadrilateral mesh model as compared to the watertight B-rep model, according to some embodiments.

FIG. 7—Modeling for Computational Analysis

Embodiments presented herein may address a core obstacle in the field that costs time and money in lost productivity due to repairing models built on B-rep Boolean operations. FIG. 7 illustrates a conventional faceted quadrilateral mesh model as compared to the watertight B-rep model according to embodiments presented herein. Non-watertight models may limit the abilities of, e.g., CAE, CAM, graphics technologies, additive manufacturing/3D printing, metrology and inspection, as they all may need to heal and rebuild, or mesh, the model to mitigate gaps in the CAD geometry. Entire branches of technology and industry have been set up to deal with this expensive and limiting problem, where differences in B-rep solid definitions across applications may break the models' solid integrity upon file translation. The problem is so pervasive that many companies specializing in healing CAD models have been created to serve the market. Studies have shown that engineers spend a significant portion of their time repairing CAD models, and the amount of time spent repairing CAD models continues to grow as the geometry of models become increasingly complex. This is one of the leading drivers in the development and popularity of isogeometric analysis (IGA) within engineering analysis, a method which seeks to make analysis more CAD friendly. By eliminating gaps in models, embodiments presented herein may remove a substantial roadblock and empower IGA as a commercial technology.

Embodiments herein present a watertightCAD methodology that provides geometric and topological reconstruction designed to enhance current B-rep modeling. In some embodiments, output surfaces are generated with surface edges (isocurves) that meet continuously along the SSI curve, creating a gap-free result. Furthermore, the B-rep data may be updated to furnish information about the geometric objects' parameter spaces, hence integrating the geometry and topology divide. This may allow the surfaces of the solid model to become editable in the CAD application, a huge advantage for modelers needing to make local updates to the geometry. The watertight models may be analysis-suitable within the IGA framework, with no additional healing or meshing required.

In some embodiments, subsequent to outputting a modified, watertightCAD model, the method may proceed by executing an engineering analysis on the modified model to obtain data predicting physical behavior of an object described by the model. In some embodiments, the engineering analysis may comprise an isogeometric analysis. In some embodiments, the method may proceed to direct a process of manufacturing an object described by the modified model. In some embodiments, the method may proceed to generate an image of an object based on the modified model. In some embodiments, e.g., in an animation application, the method may proceed to generate a sequence of animation images based on the modified model and display the sequence of animation images.

Figure 8:
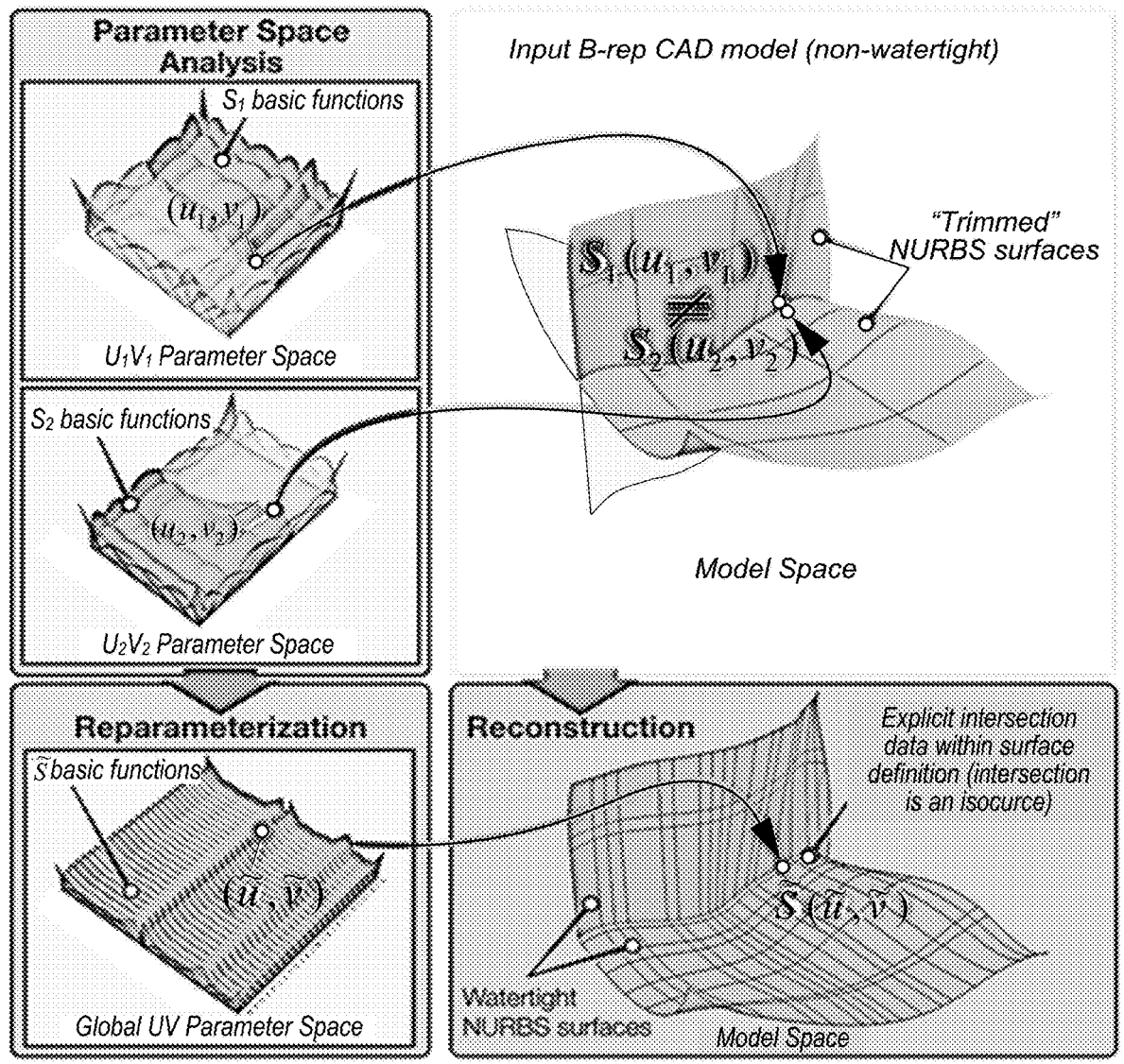
FIG. 8 is a graphical illustration of the watertightCAD method, according to some embodiments.
Figure 9:
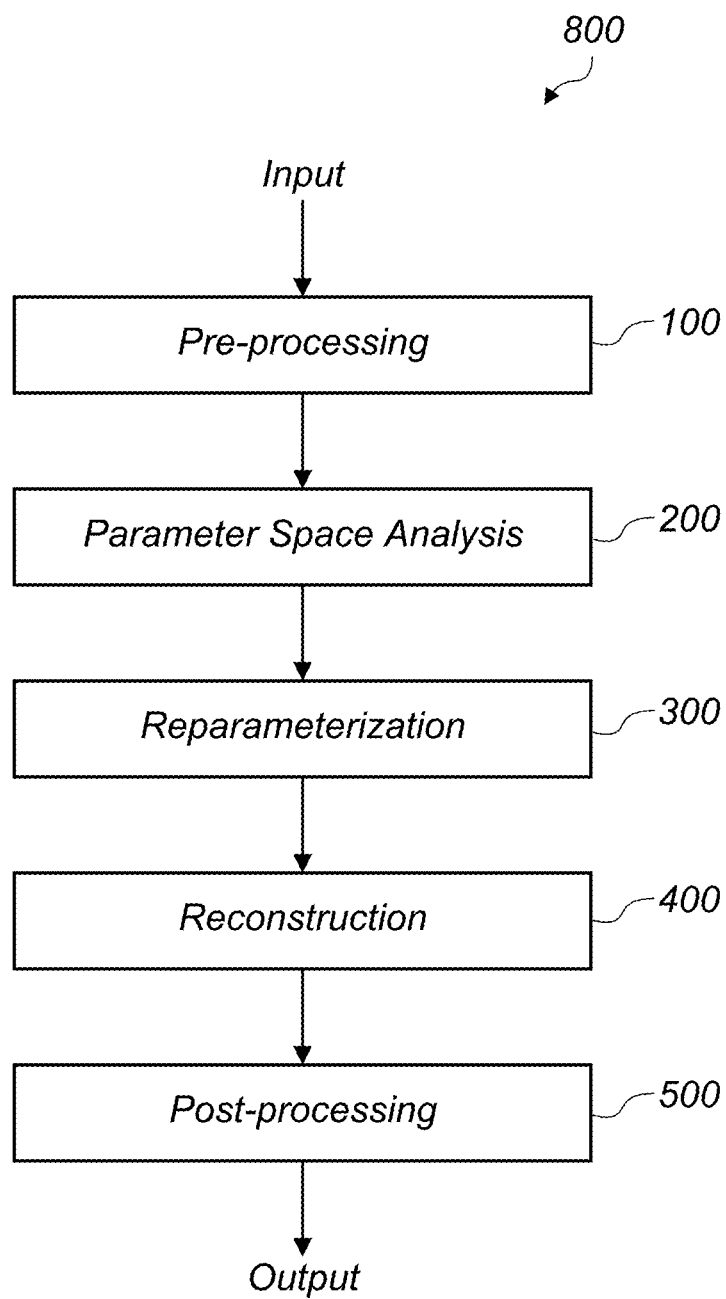
FIG. 9 is a flowchart of the watertightCAD method indicating five steps, including the three core technical steps, used to transform a traditional B-rep solid model into a watertight model, according to some embodiments.

FIG. 8-9—Watertight CAD Method and Flowchart

FIG. 8 is a graphical illustration of the watertightCAD method, according to some embodiments. As shown, some embodiments presented herein create new NURBS surfaces, based on the original surface geometry, that integrate the surface-surface intersection information completely within a simple NURBS surface description, thus producing a model that matches the geometric and topological design intent. The surface edges may meet at respective isoparametric boundaries (isocurves). In some embodiments, this solution may solve the trim problem natively, cleanly, and in a way that produces objects in the same form as that of the original, hence it may be a closed-form operation. This may make the technology employable in any current CAD system using standard software kernel functionality. As such, the NURBS surface objects that are output may retain editable properties (control points, weights, knots, etc.), which may be unavailable within the present B-rep solid modeling paradigm. In some embodiments, the retention of editable properties may be achieved without introducing any new data structures on the new NURBS surface. The result may not be a polygonal, mesh or STL approximation. Some embodiments may provide a long-awaited alternative to B-rep solid modeling Boolean operations, and may supply a solid model for the CAD user that may be accurate to model tolerance.

FIG. 9 is a flowchart of the watertightCAD method indicating five steps, including the three core technical steps, required to transform a traditional B-rep solid model into a watertight model, according to some embodiments. In some embodiments, the waterightCAD method may be performed as part of a Boolean operation in a computer-aided design (CAD) software system. These steps are illustrated graphically in FIG. 8, where the basis functions $S_1$ and $S_2$ are plotted in the (u,v) parameter space. Notice that initially, the $S_1$ and $S_2$ basis functions are each expressed in terms of their own unique parameters, $(u_1,v_1)$ and $(u_2,v_2)$, respectively. The reparameterization step then describes a new global set of basis functions $\tilde{S}$ that are expressed in terms of a new global parameter space $(\tilde{u}, \tilde{v})$.

The watertightCAD algorithm may begin by inputting a CAD file comprising a first and second input surface associated with the solid model. Each of the first and second input surfaces may be described in their own parameter space domains, and may be non-uniform rational basis splines (NURBS). For example, the first input surface may be described within a first parameter space domain and the second input surface may be described in a second parameter space domain. A parameter space domain may be understood to be distinct from a parameter space in that a parameter space domain is constrained by a knot vector. The first and second input surfaces may cross in space along at least one intersection curve, and methods herein may seamlessly connect the input surfaces along their intersection.

Subsequent to the input of a CAD file, and as explained in further detail below, preprocessing may be optionally performed on the CAD file at 100. Subsequently, three core technical steps, 200, 300, and 400 may be performed, which may be described as parameter space analysis, reparameterization, and reconstruction, respectively. 200, 300, and 400 may be vital functions in transforming a standard B-rep solid model to a watertight representation.

Parameter space analysis 200 may comprise identifying and storing a model space trim curve that approximates a geometric intersection of the first and second input surfaces. Characteristic points may be identified along the model space trim curve, to aid in the reparameterization process.

Reparameterization 300 may comprise reparametrizing the first and second parameter space domains into a single global parameter space domain. In other words, the first and second parameter space domains may be reparametrized into a common third parameter space domain. The third parameter space domain may be determined based on the model space trim curve. In other words, the third parameter space domain may be determined based on the geometric intersection of the first and second input surfaces. In some embodiments, reparametrizing may comprise constructing a series of isocurves based on the identified characteristic points of the model space trim curve. The constructed series of isocurves may be comprised within the third parameter space domain.

Reconstruction 400 may comprise constructing first and second output surfaces that are each described in the third parameter space domain. The first and second output surfaces may be constructed such that at least a portion of each of their boundaries coincides with the model space trim curve. In some embodiments, a portion of the boundary of each of the first and second output surfaces may be constructed to coincide with the constructed series of isocurves comprised within the third parameter space domain. The concatenation of the first and second output surfaces may therefore be watertight along this portion of each of their boundaries.

These steps may be required for either the pre-SSI or post-SSI algorithms, albeit the specific parameter space processing sub-steps may vary based on the particular algorithm. At 500, postprocessing may be optionally performed on the first and second output surfaces. Finally, the first and second output surfaces may be output as modified surfaces associated with the solid model.

Figure 10:
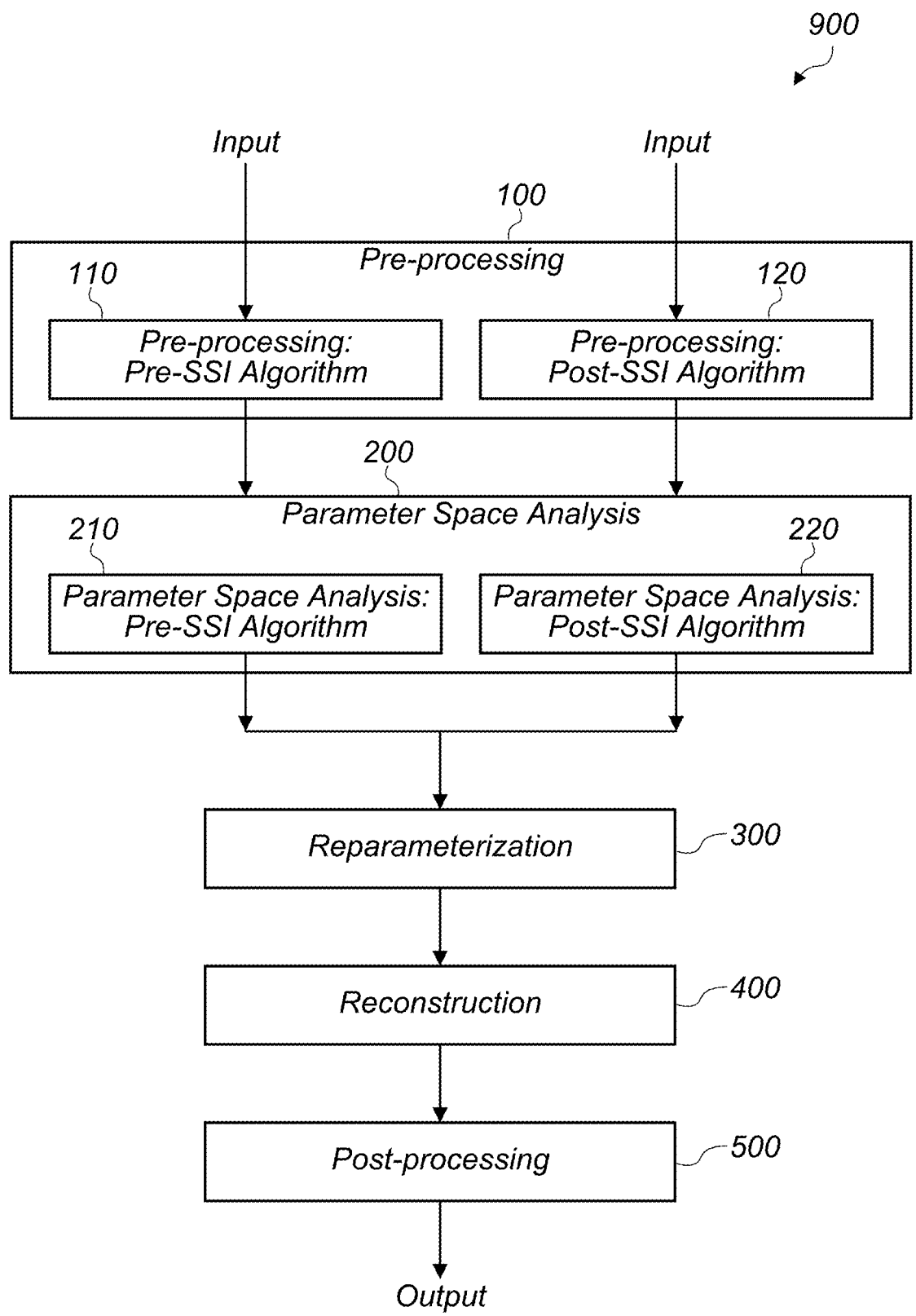
FIG. 10 is a flow chart illustrating the algorithmic steps involved in the watertightCAD methodology that may be performed depending on whether pre-SSI or post-SSI input data is received, according to some embodiments.

FIG. 10: Pre-SSI and Post-SSI Algorithms

FIG. 10 is a flow chart illustrating the algorithmic steps involved in the watertightCAD methodology that may be performed depending on whether pre-SSI or post-SSI input data is received. The pre-SSI algorithm may assume the user has two B-reps they wish to perform a solid modeling Boolean operation on. The post-SSI algorithm may assume the user has a valid B-rep model that contains the results of previously computed, standard CAD solid modeling Boolean operations. In other words, pre-SSI input data may comprise two B-reps upon which it is desired to perform solid modeling Boolean operations. Post-SSI input data may comprise a valid B-rep model that contains the results of previously computed, standard CAD solid modeling Boolean operations. For both the pre-SSI and post-SSI algorithms, geometric input data may be stored describing a first and second input surface associated with the model under consideration. Each of the first and second input surfaces may be described in a first and second respective parameter space domain.

The input for the Post-SSI algorithm may be a boundary representation created using one or more (typically many) solid modeling Boolean operations on spline surfaces. (The spline surfaces may include tensor product spline surfaces such as NURBS surfaces and/or T-Spline surfaces.) In one embodiment, the boundary representation may be provided in a computer-aided design (CAD) file. In another embodiment, the Post-SSI algorithm may operate as part of the kernel of a CAD system, in which case the boundary representation may have a specialized internal format.

There are many different ways to realize a boundary representation in terms of a data structure. (Different CAD packages have different data structure realizations.) Furthermore, there are many different file formats used to represent the brep data. For execution of the Post-SSI algorithm, the data structure type and/or data file format of the CAD file need not be of any specific standard, whether a product based type or interoperability standard. Some examples of data file formats include, but are not limited to, ACIS (*.sat, *.sab), STEP (*.stp, *.step), Rhino (*0.3 dm, *0.3 dmbak), etc.

The Post-SSI algorithm may operate on a boundary representation of an object, and not on alternative representations such as polytope meshes (structured or unstructured), constructive solid geometry (CSG) data, and implicit geometric representations.

Preprocessing

In some embodiments, to enable processing, necessary information may be parsed from the data structure in an optional preprocessing step 100. For the pre-SSI algorithm, at 110, this specifically consists of identifying the intended surfaces involved in the intersection, along with associated topological elements. For the post-SSI algorithm, at 120, this specifically consists of parsing the topological data structure to determine the surfaces involved in the intersection, the trim curves stored in the B-rep, and the topological elements indicating these relationships. For example, for both pre-SSI and post-SSI algorithms, preprocessing may comprise storing a model space trim curve associated with the first and second input surfaces, wherein the model space trim curve approximates a geometric intersection of the first and second input surfaces. In some embodiments, the model space trim curve may comprise sequential segments of isocurves in a common third parameter space domain, as discussed in greater detail below.

Figure 11:
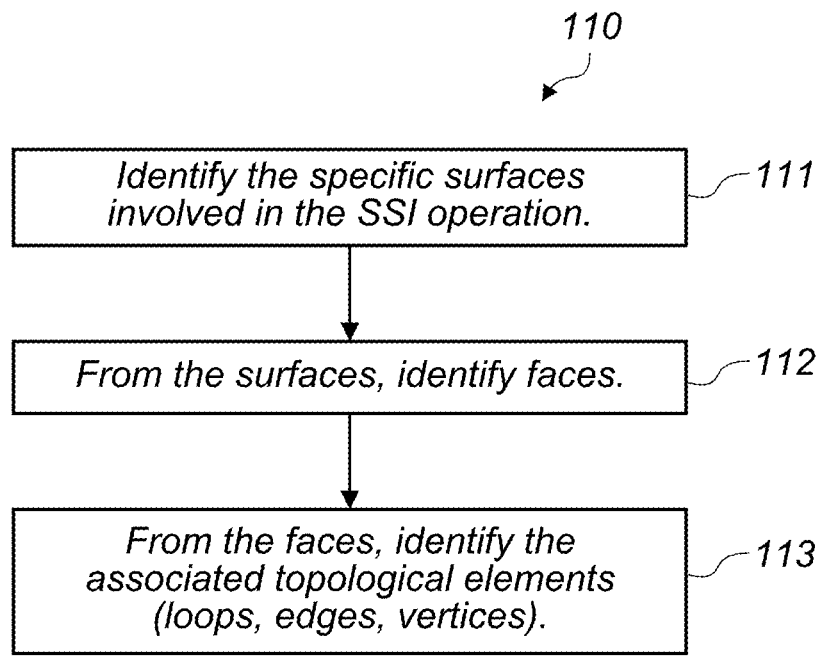
FIG. 11 is a flow chart illustrating the steps of the preprocessing algorithm when pre-SSI input data is received, according to some embodiments.

FIG. 11: Preprocessing for the Pre-SSI Algorithm

For embodiments wherein pre-SSI input data is received, the preprocessing algorithm may begin at 111, wherein the specific topological elements (faces, loops, edges, vertices) involved in the SSI operation may be identified.

Subsequently, at 112, faces may be identified from the identified surfaces of 111.

At 113, the faces may be used to identify associated topological elements. For example, loops, edges and vertices may be identified from the identified faces of 112.

Figure 12:
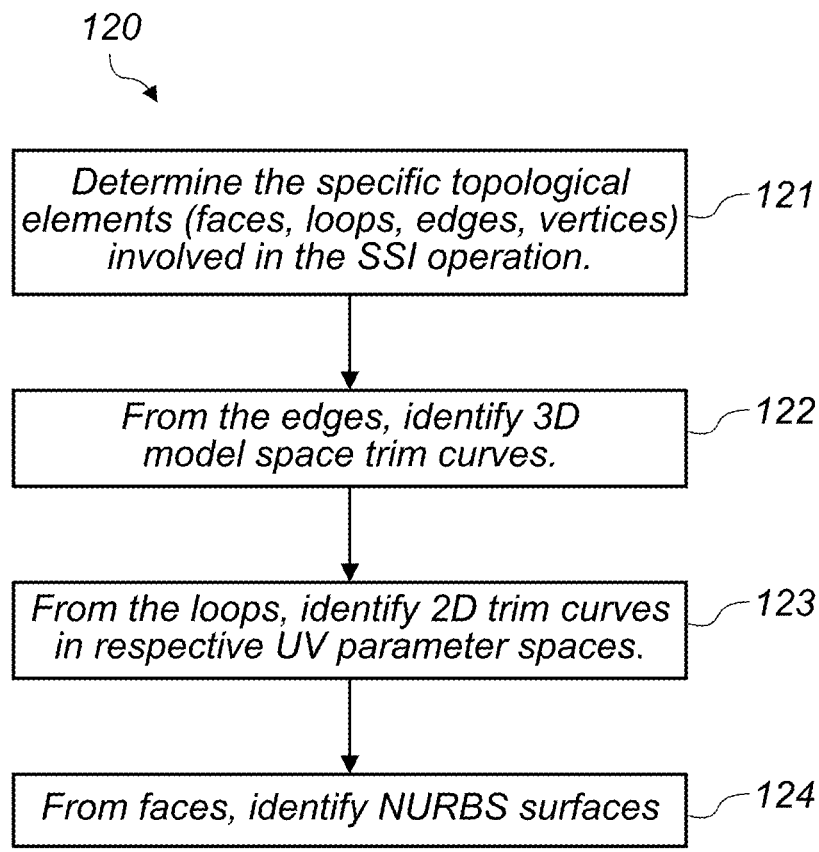
FIG. 12 is a flow chart illustrating the steps of the preprocessing algorithm when post-SSI input data is received, according to some embodiments.

FIG. 12: Preprocessing for the Post-SSI Algorithm

For embodiments wherein post-SSI input data is received, the preprocessing algorithm may proceed differently from when pre-SSI input data is received. In particular, at 121, specific topological elements (faces, loops, edges, vertices) involved in the SSI operation may be determined.

At 122, from the determined edges of 121, 3D model space trim curves may be identified. For example, the model space trim curves may approximate geometric intersections of the input surfaces. In some embodiments, the model space trim curve may be constructed based on the characteristic points of the first and second input surfaces and the geometric intersection of the first and second input surfaces. In some embodiments, the model space trim curve may be received as an output from a previous CAD Boolean operation on the first and second input surfaces.

At 123, 2D trim curves in respective UV parameter spaces may be identified from the determined loops of 121.

Finally, at 124, NURBS surfaces may be identified from the determined faces of 121.

In some embodiments, these tasks may be accomplished with suitable calls to a native CAD application programming interface (API). The preprocessing steps described in 110 and 120 are standard tasks in any CAD solid modeler, and are well known in the art.

Parameter Space Analysis

After performing a proper topological analysis of the B-rep model to isolate critical elements, in some embodiments, a subsequent step may be to analyze the trim curve data in the individual parameter spaces in order to provide the requisite data to define a global UV parameter space. This data may comprise classified trim curve segments reorganized in the B-rep structure. As illustrated in FIG. 10, the parameter space analysis step 200 may proceed differently depending on whether pre-SSI (210) or post-SSI (220) input data is received.

The output from either algorithm's (pre-SSI or post-SSSI) parameter space analysis is a model space trim curve yielding the knot vector and isocurve sampling points that are desirable for completion of the watertight surface operations. In some embodiments, the model space trim curve comprises sequential segments of isocurves in a global parameter space domain.

Figure 13:
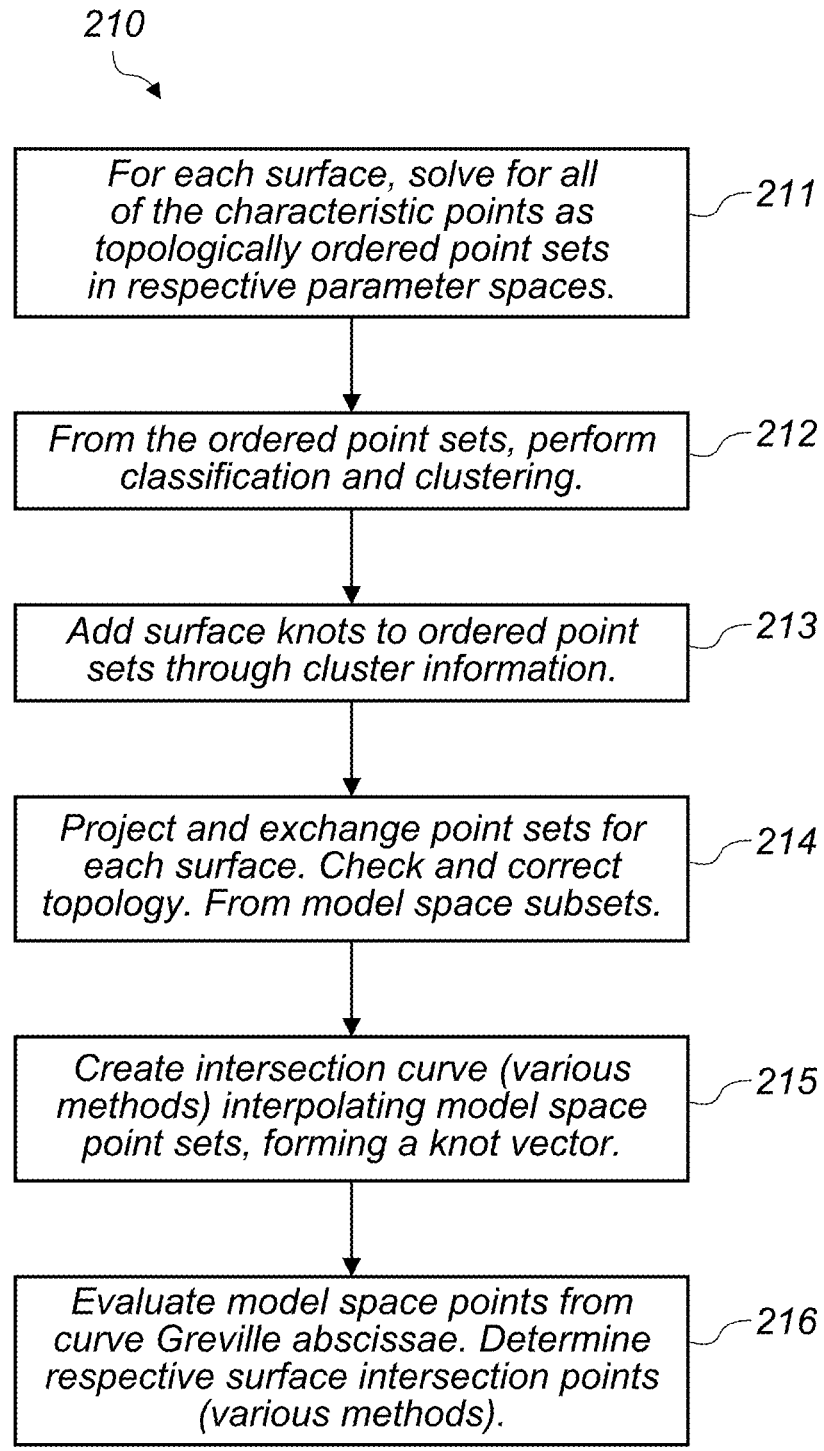
FIG. 13 is a flowchart diagram illustrating the steps involved to accomplish parameter space analysis for the pre-SSI algorithm, according to some embodiments.

FIG. 13—Parameter Space Analysis for the Pre-SSI Algorithm

FIG. 13 is a flowchart diagram illustrating the steps involved to accomplish parameter space analysis for the pre-SSI algorithm, according to some embodiments. In the pre-SSI algorithm, the intersecting surfaces may be used to create a model space trim curve optimized for the operations in the downstream reparameterization and reconstruction steps.

At 211, for each surface, all of the characteristic points may be solved for as topologically ordered point sets in respective parameter spaces. Characteristic points may be common in any robust SSI operation, identified by root solving.

At 212, from the ordered point sets, classification and clustering operations may be performed. Segments may be classified based on the characteristic point type (derivatives with respect to dominant parametric direction) and may indicate whether they produce u-type or v-type edges, by use of a lookup table.

At 213, surface knots may be added to ordered point sets through cluster information.

At 214, point sets may be projected and exchanged for each surface. The topology may be checked and corrected. Model space subsets may be formed.

At 215, an intersection curve may be created by various conventional methods. The intersection curve may interpolate the model space point set, forming a knot vector.

At 216, the model space points may be evaluated from curve Greville abscissae. Respective surface intersection points may be determined through various conventional methods.

Figure 14:
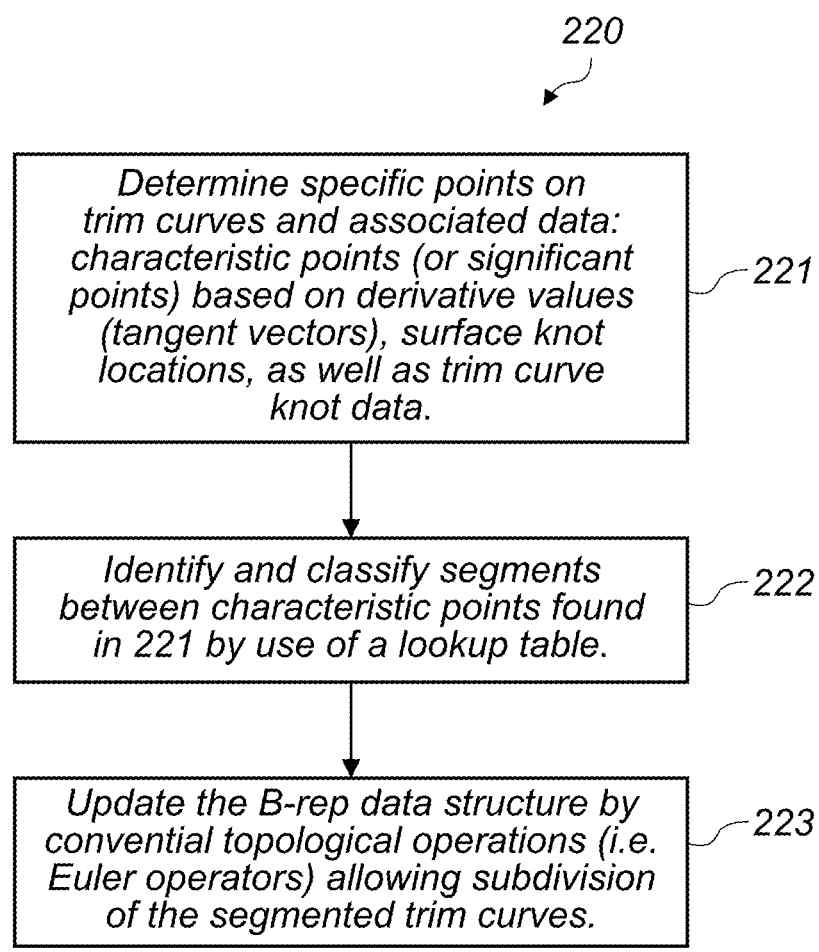
FIG. 14 is a flowchart diagram illustrating the steps involved to accomplish parameter space analysis for the post-SSI algorithm, according to some embodiments.

FIG. 14: Parameter Space Analysis for the Post-SSI Algorithm

FIG. 14 is a flowchart diagram illustrating the steps involved to accomplish parameter space analysis for the post-SSI algorithm, according to some embodiments. In the post-SSI algorithm, the parameter space and model space trim curves supplied by the conventional SSI operation performed prior to input may be used for the operations in the downstream reparameterization and reconstruction steps.

In the post-SSI algorithm, since the Boolean operation has been conventionally performed already by a CAD application, there exists trim curve data to analyze, both in parameter space as well as in model space. Because of this, a first step may be to analyze the trim curve data in the individual parameter spaces in order to provide the requisite data to define a global UV parameter space. This data may comprise classified trim curve segments reorganized in the B-rep structure.

Parameter space analysis for the post-SSI algorithm begins at 221, wherein specific points on trim curves and associated data are determined. In some embodiments, this may comprise developing a root solver for computing trim curve derivatives. The determined specific points on trim curves may include: characteristic points (or significant points) based on derivative values (tangent vectors), surface knot locations, as well as trim curve knot data. Characteristic points may be common in any robust SSI operation, solved by root solving, while the surface and curve knots may be particular to embodiments described herein.

At 222, segments between characteristic points found in 2.1 may be identified and classified. Segments of the model space trim curve may be identified and classified based on the characteristic points, wherein each identified segment comprises an isocurve in the third parameter space domain, wherein said classification determines a parameter in the third parameter space domain that has a constant value along the isocurve. Segments may be classified based on the characteristic point type (derivatives with respect to dominant parametric direction) and may indicate whether they produce u-type or v-type edges. This functionality may be missing from current CAD applications and may be enabled by use of a lookup table.

Finally, at 223, the B-rep data structure may be updated by conventional topological operations (i.e. Euler operators) allowing subdivision of the segmented trim curves.

Reparameterization

During reparameterization, a new parameter space may be defined to reproduce the original surface geometry within model tolerance while maintaining surface continuity and explicitly integrating SSI data. For example, reparameterization may comprise reparametrizing the first and second parametric into a common third parameter space domain based on the previously determined model space trim curve. This procedure may utilize isocurves sampled in sets from the source surfaces (e.g., the first and second input surfaces) which may be then collectively reparametrized to define a newly constructed (third) global parameter space. In other words, reparametrizing may comprise, for each of a set of isocurve sampling points, sampling an isocurve, wherein each sampled isocurve intersects another perpendicular isocurve at the isocurve sampling point. Additionally, the reparameterization function may have many degrees of freedom that may require definition as a nonlinear mapping between parameter spaces in order to produce an operation that is smooth, continuous, and of minimal complexity.

In some cases, transforming UV parameter space coordinates from a group of independent, trimmed surfaces in a B-rep solid model to a single watertight definition may be challenging because there is no unique solution. Based on surface reconstruction methodology leveraging isocurve data, embodiments presented herein employ reparameterization operations established for individual NURBS curves. A more direct mathematical formulation may use a composite function. The resulting isocurves of this composition may become complicated, arbitrary functions of an unpredictable form that cannot be guaranteed to be representable in a CAD system. Alternatively, reparameterization functions may be utilized that are themselves B-splines, along with a procedure to create a NURBS representation of the resulting isocurves. Such concepts are well documented and procedures for creating these representations may be found in references on NURBS. Embodiments presented herein introduce a novel approach by applying these methods to repair gaps in trim curves.

It may be difficult in some cases to develop functions for reparametrizing full sets of isocurves. For example, reparameterization may not be simply extending current theory by means of a batch process, but involve techniques replete with their own unique constraints and degrees of freedom. An essential feature of embodiments presented herein is to correctly map the parameter space of a family of isocurves to a new domain of a specified knot vector while maintaining the exact geometric trace in model space. The parametric conversion may require defining reparameterization functions whose construction are central to the success of the watertight method.

In prior implementations, the possibility of error and incompatibility is introduced if independent isocurve reparameterizations are not monitored and regulated. Embodiments presented herein may constrain the reparameterization task to maintain a valid output. In some embodiments, a reparameterization surface function may be defined as a bivariate tensor product spline surface, fully mapping the source to target UV parameter spaces. This function may be strictly monotonic in the direction of the reparametrized variable, may interpolate the points defined from pairs of source and target knot values for each isocurve, and the reparameterization function itself may be built from the knot vectors of the target parameterization (e.g., the Greville criteria). Although the reparameterization function may be linear or piecewise linear, a nonlinear description may be desirable. However, a nonlinear description may be harder to construct as there are an infinite number of candidates that fulfill the above criteria. The method of construction determined may ultimately contribute attributes to the corresponding isocurves used for reconstruction, so correctly defining the reparameterization function may be very important.

Tasks associated with reparameterization may be comprised of two main steps: parameterization change handling, followed by isocurve reparameterization and global parameter space reconstruction. Prior to the actual reparameterization step, it may be desirable to handle changes in parameterization. Specifying extraordinary points (E.P.s) in unstructured meshes may be identified in this manner. E.P.s may be introduced by use of an intermediate trim curve for the purposes of modifying the local topology.

Figure 15:
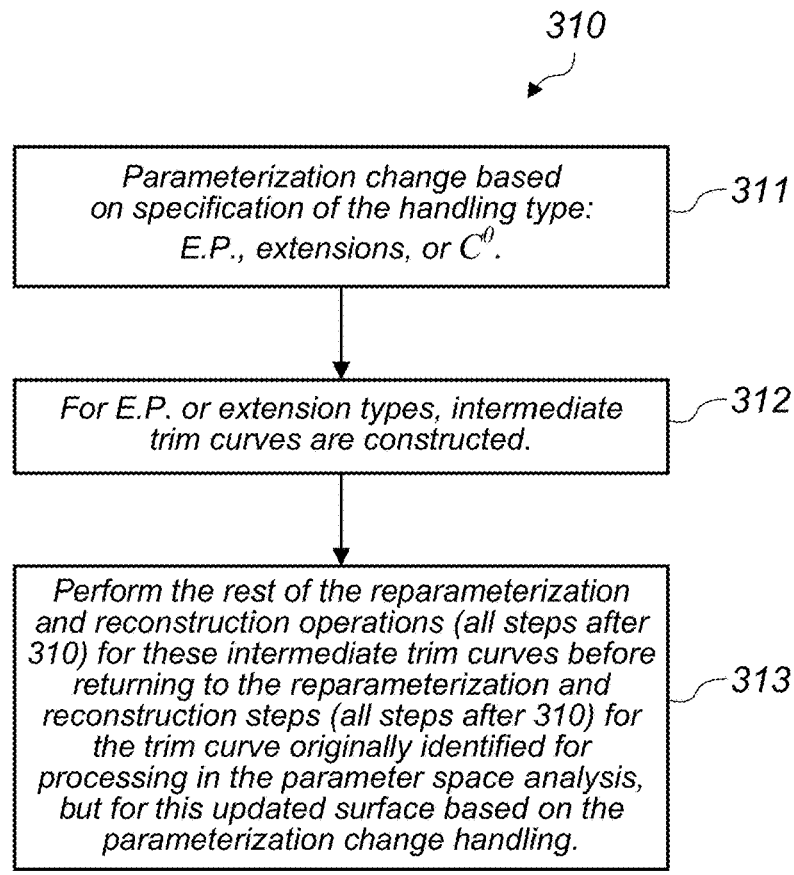
FIG. 15 is a flowchart illustrating the steps involved in handling the parametrization change, according to some embodiments.

FIG. 15: Parameterization Change Handling

FIG. 15 is a flowchart illustrating the steps involved in handling the parametrization change, according to some embodiments. At 311, parameterization change handling is performed based on specification of the handling type: E.P., embedded extensions, or $C^0$. Parameterization change handling may also be performed based on a null algorithm, which may be a pass-through algorithm that does nothing.

At 312, for E.P. or embedded extension handling types, intermediate trim curves are constructed. The intermediate trim curves may be comprised within at least one of the first and second input surfaces. The extraordinary point insertion algorithm may introduce an intermediate trim curve that intersects the model space trim curve and is orthogonal to the model space trim curve at the intersection. The embedded extensions algorithm may perform tangent extension without introducing extraordinary points.

At 313, the rest of the reparameterization and reconstruction operations (e.g., steps 320 and 400) may be performed based on these intermediate trim curves before they are performed for the trim curve originally identified for processing in the parameter space analysis, but for this updated surface based on the parameterization change handling.

Figure 16:
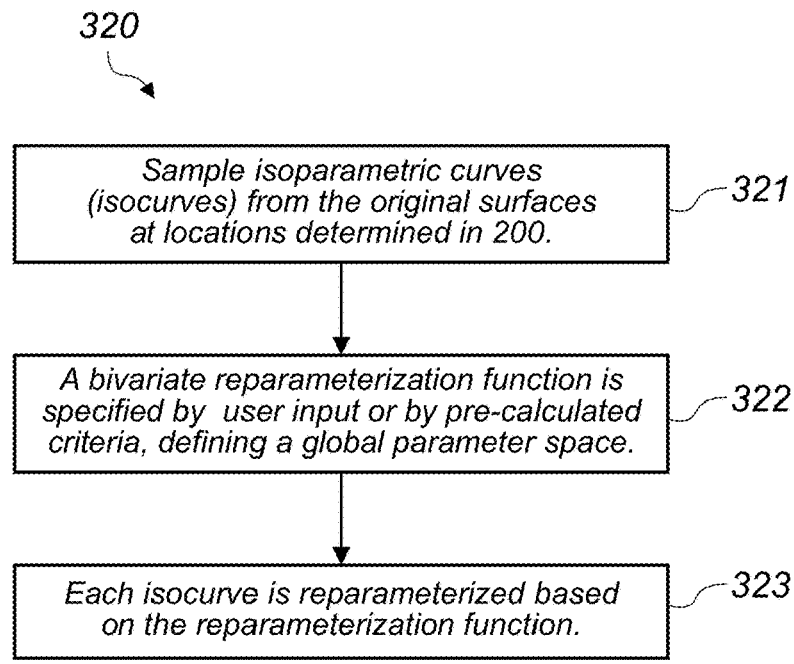
FIG. 16 is a flowchart illustrating the steps involved in performing reparameterization, according to some embodiments.

FIG. 16: Reparameterization:

FIG. 16 is a flowchart illustrating the steps involved in performing reparameterization, according to some embodiments. Subsequent to the parameterization change handling steps of 311-313, the following may be performed.

At 321, isoparametric curves (isocurves) may be sampled from the original surfaces at locations determined in 200.

At 322, a bivariate reparameterization function may be specified by user input or by pre-calculated criteria, defining a global parameter space. The bivariate reparameterization function may be based on an interpolation strategy, and the interpolation points may be defined from pairs of isocurve source and target knot values. In some embodiments, it optimization characteristics of the tensor-product reparameterization surface function (curvature, continuity, knot complexity) may be determined. These criteria may serve as critical metrics in evaluating performance.

At 323, each isocurve may be reparametrized based on the reparameterization function. In some embodiments, the reparameterization function may be a basis spline function that maps each of the first and second parameter spaces into the common third parameter space.

In some cases, an additional important aspect of the reparameterization step may be the need to handle extraordinary points (E.P.s) in unstructured meshes. Embodiments herein may allow for specifying E.P.s by use of an intermediate trim curve for the purposes of modifying the local topology. This has traditionally been shown to be effective in standard tests (e.g., hole-in-the-plate), yet may require intervention to specify the bounds of the operation for general modeling. In order to avoid such manual specifications, we may identify a natural and repeatable transition in parameterization for arbitrary models that can easily be implemented in our programming framework. To accomplish this objective the following tasks may be completed:

3.2.1. Inspect and record E.P. reparameterization bounds through focused analysis of models furnished by industrial partners. The bounds may present themselves at characteristic points identified near E.P.s that spread to the surrounding parameterization.

3.2.2. Formalize and validate the measured criteria from task 3.2.1 with respect to theory. The criteria may be aligned to the current research field on E.P.s.

3.2.3 Improve theory from 3.2.2 by application to models in 3.2.1.

Figure 17:
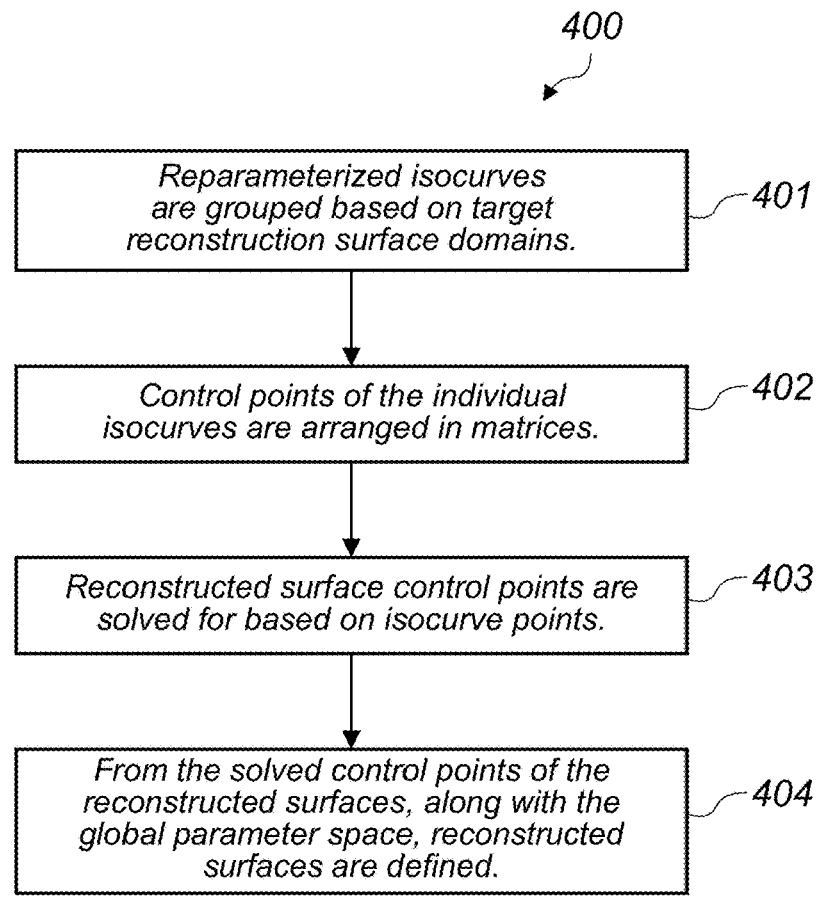
FIG. 17 is a flowchart illustrating the steps involved in performing reconstruction, according to some embodiments.

FIG. 17: Reconstruction

FIG. 17 is a flowchart illustrating the steps involved in performing reconstruction, according to some embodiments. With a global parameter space created from the input B-rep SSI information, the model space geometry may be reconstructed to correctly represent the intersection requirements. In implementations of the present invention, it may be desirable for the surfaces to meet in a $C^0$ continuous fashion across their geometric intersections, and for the original surface geometry to be maintained to model tolerance. In other words, the algorithm may proceed to construct first and second output surfaces, wherein the first and second output surfaces are described in the third parameter space domain. The first and second output surface may be constructed such that at least a portion of the boundary of each of the first and second output surfaces coincides with the model space trim curve. In some embodiments, the first and second output surfaces may be constructed within a predetermined error tolerances of the first and second input surfaces, respectively. In some embodiments, the predetermined error tolerance may be user-defined.

In some embodiments, reconstruction may begin at 401, wherein reparametrized isocurves may be grouped based on target reconstruction surface domains.

At 402, control points of the individual isocurves may be arranged in matrices.

At 403, reconstructed surface control points may be solved for based on isocurve control points.

At 404, from the solved control points of the reconstructed surfaces, along with the global parameter space, reconstructed surfaces may be defined.

Figure 18:
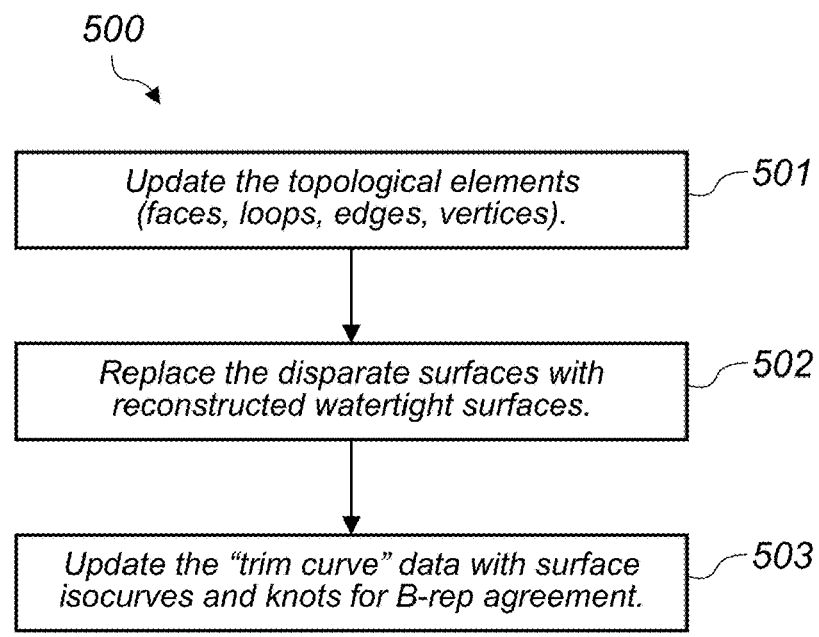
FIG. 18 is a flowchart illustrating the optional steps involved in performing postprocessing on the reconstructed watertight surfaces, according to some embodiments.

FIG. 18: Postprocessing

FIG. 18 is a flowchart illustrating the optional steps involved in performing postprocessing on the reconstructed watertight surfaces, according to some embodiments. In some embodiments, to complete the closed operation, it may be desirable for the model components to be reorganized within the standard B-rep data structure and returned to the native CAD application. In some embodiments, repopulating the B-rep data structure may proceed with the following tasks:

At 501, the topological elements (faces, loops, edges, vertices) may be updated.

At 502, the disparate surfaces may be replaced with reconstructed watertight surfaces.

At 503, the "trim curves" may be updated with isocurves and knots for B-rep agreement.

Subsequent to completion of the postprocessing steps, a watertightCAD file comprising the postprocessed output surfaces may be output from the algorithm.

Further Technical Algorithmic Detail

The following paragraphs present a more detailed and technical explanation of the steps involved in the watertightCAD method, according to some embodiments.

Traverse the Topology of the Boundary Representation to Access SSI-Related Data

Detailed herein is further exposition on the preprocessing method for the Post-SSI algorithm, 120, according to some embodiments.

In some embodiments, the Post-SSI algorithm may traverse the boundary representation to identify a set of topological entities associated with a surface-surface intersection, e.g., a pair of topological faces $F_0$ and $F_1$ that share a topological edge E. This identification may be performed in any of a variety of ways, e.g., depending on the data structure format of the boundary representation. The face $F_0$ is associated with a spline surface $S_0$ and one or more parameter space trim curves whose images reside in the 2D parametric domain of the spline surface $S_0$. (The boundary representation may store spline curves and spline surfaces in terms of geometry data sets. For example, a geometry data set for a curve may include its knot vector and its curve control points. The geometry data set for a surface may include its knot vector pair and its surface control points.) One of those parameter space trim curves, which we denote as $C_{PS0}$, is associated with the edge E. Likewise, the face $F_1$ is associated with a spline surface $S_1$ and one or more parameter space trim curves whose images reside in the 2D parametric domain of the spline surface $S_1$. One of those parameter space trim curves, which we denote as $C_{PS1}$, is associated with the edge E. Furthermore, the edge E is associated with a curve $C_{MS}$ in model space.

As described below, the Post-SSI algorithm may operate on the surface splines $S_0$ and $S_1$ to respectively create a first set of one or more output surface patches and a second set of one or more output surface patches, where a boundary of a union of images of the first set of output surface patches and a boundary of a union of the images of the second set of output surface patches meet in a $C^0$ continuous fashion along the model space curve $C_{MS}$. Thus, the gaps in the original surface-surface intersection will have been repaired.

The spline surfaces $\{S_i\}$ may be tensor product spline surfaces of degree combination $p_i \times q_i$, where $p_i$ and $q_i$ are integers greater than zero, where $p_i$ denotes the degree in one parametric dimension, and $q_i$ denotes the degree in the other parametric dimension. For example, in some embodiments $p_i = q_i = 3$, i.e., the surfaces are bicubic surfaces. In other embodiments, the surfaces may be biquartic or biquintic surfaces, or have mixed degrees. In some embodiments, the surfaces may have different degree combinations. For example, one surface might be bicubic while another surface is biquartic.

The object modeled by the boundary representation may include a plurality of topological face pairs that correspond to surface-surface intersections. For each such face pair, the steps detailed below may be performed to construct sets of output surface patches that meet in a $C^0$ continuous fashion along their respective model space SSI curves. Thus, the Post-SSI algorithm may reconstruct all the original spline surfaces along the surface-surface intersections in the model, making the model ready for any of various applications, without the need for human intervention for gap repair.

The spline surface $S_i = S_i(s^i, t^i)$ is defined on a domain $$\Omega^i = [s_{min}{}^i, s_{max}{}^i] \times [t_{min}{}^i, t_{max}{}^i] \subset \mathbb{R}^2,$$

and has knot vectors $S^i$ and $\mathcal{T}^i$.

Segmentation and Classification

The following paragraphs provide additional detail regarding the parameter space analysis steps for the Post-SSI algorithm, 220.

For each spline surface $S_i$ involved in the surface-surface intersection, the corresponding parameter space trim curve $C_{PSi}$ (i.e., the trim curve in the 2D parametric domain of the spline surface $S_i$) may be segmented. The segmentation process may partition the parameter space trim curve $C_{PSi}$ into one or more segments so that each segment can easily be classified as being either, "more conveniently viewed as a function of the first surface parameter $s^i$", or, "more conveniently viewed as a function of the second surface parameter $t^i$". The segmentation process may be carried out using criteria that identify specific points on the parameter space trim curve $C_{PSi}$. When operating on a neighborhood of a given segment, the surface reconstruction process may replace the segment with either an $\tilde{s}^i$ isocurve or a $\tilde{t}^i$ isocurve within a new parametric surface domain, depending on the classification of the segment.

Along with segmenting and classifying the parameter space trim curve $C_{PSi}$, a check is made to identify points on the parameter space trim curve known as extraordinary points (also known as singular points or degenerate points of a tensor product surface patch edge).

Find Significant Points for the Parameter Space Trim Curve Corresponding to Spline Surface The following paragraphs provide additional detail regarding the parameter space analysis steps for the Post-SSI algorithm, 220.

Given the parameter space SSI curve $C_{PSi}(u^i) = [s^i(u^i), t^i(u^i)]^T$ corresponding to the spline surface $S_i(s^i, t^i)$, identify significant points of a number of different types. (The superscript i in the parameter $u^i$ of the parameter space SSI curve $C_{PSi}$ is a reminder that the trajectory of $C_{PSi}$ resides in the domain $\Omega^i$ of the spline surface $S_i$.)

In some embodiments, there are four types of significant points, as follows.

Type 0: The significant points of type 0 include the end points and internal kinks and cusps of the curve $C_{PSi}$. In other words, a significant point of type 0 corresponds to a knot of valence greater than or equal to the degree $p_u{}^i$ of the curve $C_{PSi}(u^i)$.

Type 1: The significant points of type 1 include the inflection points of the curve $C_{PSi}$, where an inflection point is a point $C_{PSi}(u^i)$ such that the slope relative to surface parameter $s^i$ is equal to one or minus one:

$$\left| \frac{(t^i)'(u^i)}{(s^i)'(u^i)} \right| = |dt^i / ds^i| = 1,$$

where $(t^i)'(u^i)$ denotes differentiation of $t^i$ with respect to $u^i$, and similarly, $(s^i)'(u^i)$ denotes differentiation of $s^i$ with respect to $u^i$.

Type 2: The significant points of type 2 include the stationary critical points of the curve $C_{PSi}$, i.e., points $C_{PSi}(u^i)$ such that $$\frac{dt^i}{du^i} = 0.$$

In other words, a stationary critical point is a point where the curve $C_{PSi}$ has zero slope, when viewed as a function of $s^i$.

Type 3: The significant points of type 3 include the non-stationary critical points of the curve $C_{PSi}$, i.e., points $C_{PSi}(u^i)$ such that $$\frac{ds^i}{du^i} = 0.$$

In other words, a non-stationary critical point is a point where the curve $C_{PSi}$ has infinite slope, when viewed as a function of $s^i$.

Special Cases in Significant Point Analysis

It should be observed that it is possible for the parameter space trim curve $C_{PSi}$ to have one or more line segments as part of its trajectory. If the slope of such a line segment is a member of the set $\{0, 1, -1, \infty\}$, that line segment would result in an infinite number of significant points. Thus, such segments of special slope should be removed from the curve $C_{PSi}$ prior to the identification of significant points. Methods to accomplish this identification and removal of line segments from the trajectory of a curve are well known in the art of curve processing.

Classification of Sections of Parameter Space Trim Curve $C_{PSi}$

The following paragraphs provide additional detail on 222 from FIG. 14, wherein segments between characteristic points found in 221 are identified and classified.

Each significant point of the curve $C_{PSi}=C_{PSi}(u^i)$ corresponds to a respective value of the curve parameter $u^i$. The significant points of the curve $C_{PSi}$ may be ordered according to the curve parameter $u^i$. This ordering partitions the curve $C_{PSi}$ into segments. We use the index a to identify the significant points according to this ordering. Each segment is bounded in $u^i$ by a successive pair $(u_\alpha^i, u_{\alpha+1}^i)$ of the significant points.

Each segment may be classified as being of type $s^i$ or type $t^i$ based on the types of its endpoints, e.g., as shown in FIG. 19. If the segment is bounded by significant points $C_{PSi}(u_\alpha^i)$ and $C_{PSi}(u_{\alpha+1}^i)$, there are sixteen possible cases for the ordered pair (Type $C_{PSi}(u_\alpha^i)$, Type $C_{PSi}(u_{\alpha+i}^i)$), where Type $C_{PSi}(u_\alpha^i)$ denotes the type of the significant point $C_{PSi}(u_\alpha^i)$, and Type $C_{PSi}(u_{\alpha+1}^i)$ denotes the type of the significant point $C_{PSi}(u_{\alpha+1}^i)$. As shown in FIG. 19, the type of the segment is immediately resolved in certain cases of those sixteen cases, which are labeled with $s^i$ or $t^i$. In other cases, the type of the segment must be checked as follows. Calculate the velocity vector $$\frac{dC_{PSi}}{du^i} = \left[\frac{ds^i}{du^i}, \frac{dt^i}{du^i}\right]^T$$

at any point in the interior of the segment (i.e., excluding the end points), and classify the segment based on:

$$\text{Segment Type} = \begin{cases} \text{type } s^i, & \text{if } |dt^i/ds^i| \leq 1 \\ \text{type } t^i, & \text{if } |dt^i/ds^i| > 1 \end{cases}.$$

Note that the choice of assigning the boundary case $|dt^i/ds^i|=1$ to type $s^i$ is arbitrary. It could equally well have been assigned to type $t^i$.

Furthermore, observe that the segment type classification is invariant under exchange of the endpoint types. For example, the segment type of pair (2,1) is the same as the segment type of pair (1,2). Finally, note that the type pairs (3,2) and (2,3) are not possible if the segmentation has been performed properly. (Each represents a transition between zero slope and infinite slope, which will not occur on a continuous curve segment without an intermediate significant point of type 1.) Thus, an error warning may be issued if either of these type pairs is encountered.

Clustering Segments of Same Type into Intervals

Figure 20:
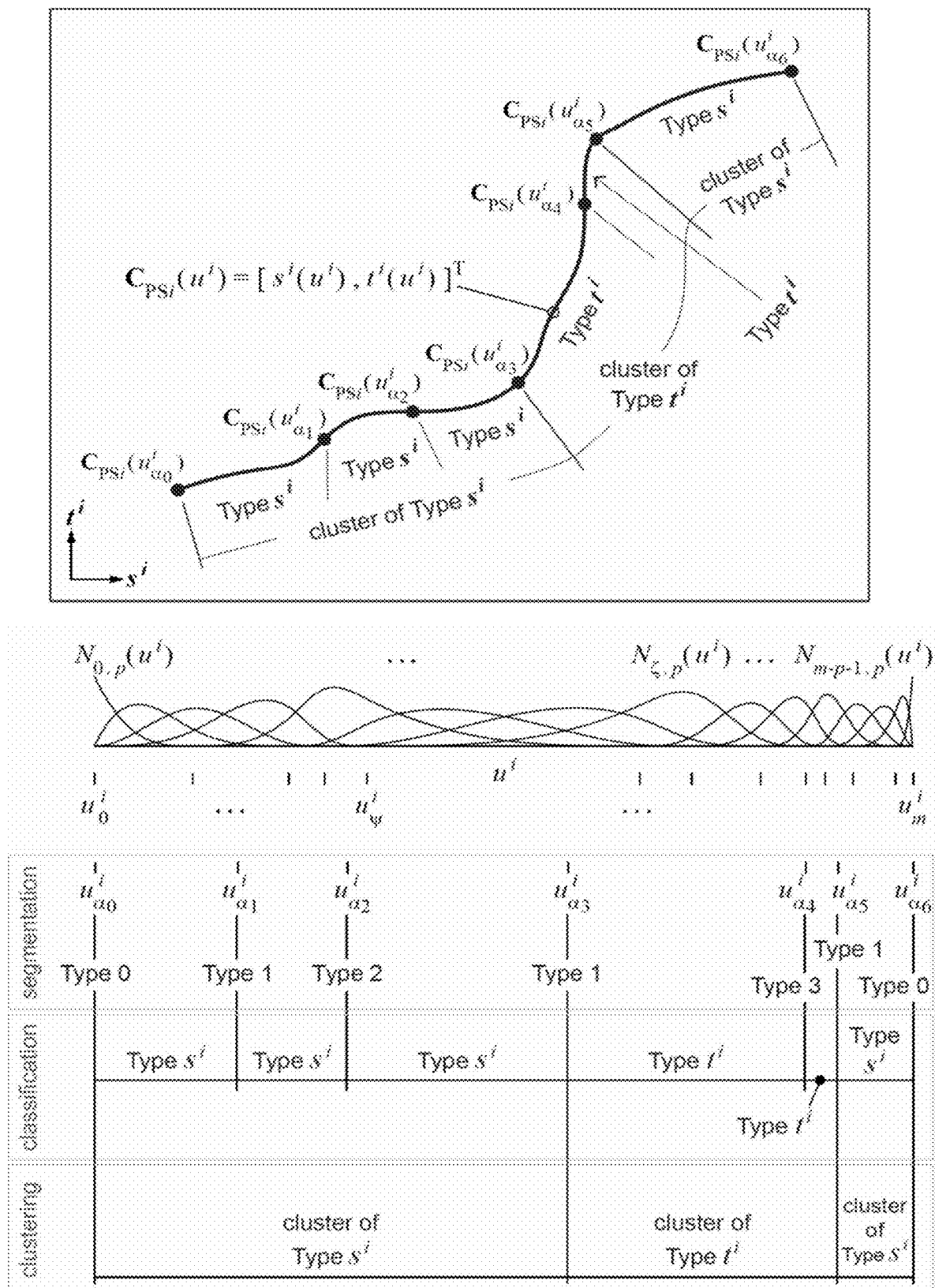
FIG. 20 is an illustration of how each maximal contiguous group of segments of the same type may be combined to form a cluster (i.e., interval) of the same type, according to some embodiments.

In some embodiments, each maximal contiguous group of segments of the same type may be combined to form a cluster (i.e., interval) of the same type, e.g., as shown in FIG. 20. As another example, given a sequence of six segments having the corresponding sequence of types $\{s^i, s^i, s^i, t^i, t^i, s^i\}$, then the first three segments may be combined to form a cluster of type $s^i$; the next two segments may be combined to form a cluster of type $t^i$; and the last segment would constitute a singleton cluster of type $s^i$.

In some embodiments, certain aspects of the processing to be described below may be performed on the basis of a cluster.

Check for Extraordinary Point Locations at Ends of Loop Component Curves and at Kinks/Cusps of the Parameter Space Curve As part of the traversal of the boundary representation, the Post-SSI algorithm may identify a loop or loops associated with each face corresponding to spline surface $S_i$ involved in the intersection. The loop may be directed and include component curve(s), among which is the parameter space curve $C_{PSi}$. Each of the component curve(s) maps from a corresponding 1D domain to the 2D parametric domain of the spline surface $S_i$. The loop partitions the 2D parametric domain into regions. The orientation of the loop is typically used by the boundary representation as a mechanism to indicate which region(s) is to be retained. The other region(s) is discarded (i.e., counted as not being part of the modeled object).

For each successive pair of component curves $(C_{LC(n)}, C_{Lc(n+1)})$ in the loop, the point where the two component curves (of the pair) meet may be tested for degeneracy as follows. (The notation LC(n) is meant to suggest the n-th component curve of the loop. When the index value n points to the last component curve of the loop, the index value n+1 is interpreted as pointing to the first component curve of the loop.) Let vector $vel_a$ denote the velocity vector of component curve $C_{LC(n)}$ at its end, and let vector $vel_b$ denote the velocity vector of component curve $C_{LC(n+1)}$ at its start. In other words, if we denote the parameter of loop component $C_{LC(n)}$ as $r^n$, $C_{LC(n)}=C_{LC(n)}(r^n)$ then $$vel_a = C_{LC(n)}^{(1)}(r_{end}^n) = \frac{dC_{LC(n)}}{dr^n}(r_{end}^n),$$

$$vel_b = C_{LC(n+1)}^{(1)}(r_{start}^{n+1}) = \frac{dC_{LC(n+1)}}{dr^{n+1}}(r_{start}^{n+1}).$$

Then the meeting point, $C_{LC(n)}(r_{end}^n)=C_{LC(n+1)}(r_{start}^{n+1})$, is declared to be an extraordinary point if $$135° \leq \cos^{-1}\left(\frac{vel_a \cdot vel_b}{\|vel_a\|\|vel_b\|}\right) \leq 225°$$

where $vel_a \cdot vel_b$ denotes the dot product of vectors $vel_a$ and $vel_b$, and $\|vel_a\|$ and $\|vel_b\|$ denote the Euclidean norm of vectors $vel_a$ and $vel_b$, respectively.

If the loop arises as part of a non-manifold object, the loop orientation may not be consistent with the above test criterion because of the particular definition employed for non-manifold curve orientations. The extraordinary point criterion may be realized in different ways, dependent on the specific implementation, but will not be unrealizable because of these variations.

Test for Extraordinary Points at Kinks/Cusps.

Each kink and cusp along the parameter space curve $C_{PSi}$ may be tested for degeneracy. Let $u_\psi^i$, be the parametric location of a kink or cusp in the parameter space curve $C_{PSi}$, and let vector $vel_a$ denote the derivative of the parameter space curve $C_{PSi}$ evaluated at location $u_\psi^i - \delta$, and let vector $vel_b$ denote the derivative of the parameter space curve $C_{PSi}$ at location $u_\psi^i + \delta$, where $\delta$ is a small positive real number.

$$vel_a = C_{PSi}^{(1)}(u_\psi^i - \delta) = \frac{dC_{PSi}}{du^i}(u_\psi^i - \delta),$$

$$vel_b = C_{PSi}^{(1)}(u_\psi^i + \delta) = \frac{dC_{PSi}}{du^i}(u_\psi^i + \delta).$$

Then, the point $C_{PSi}(u_\psi{}^i)$ may be identified as an extraordinary point if $vel_a$ and $vel_b$ satisfy the above stated angular condition.

Refinement Steps and Boundary Isocurve Reparameterization

In the following steps, the Post-SSI algorithm may refine the surfaces $\{S_i\}$ and the model space curve $C_{MS}$, i.e., apply knot refinement to these entities. Each of these entities may be refined based on both intrinsic location information and external location information. When refining an entity based on location information that naturally belongs to that entity, the location information is referred to as intrinsic location information. For example, when refining a surface (or curve) based on its original knot values, the knot values are interpreted as intrinsic location information. As another example, when refining a surface based on the significant points residing within the parametric domain of that surface, the significant points may be interpreted as intrinsic location information. Conversely, when refining an entity based on location information that naturally belongs to another entity, the location information is referred to as external location information. For example, when refining a surface based on the significant points residing in the parametric domain of another surface, the significant points are interpreted as external location information. As another example, when refining the model space curve $C_{MS}$ based on the knots of a surface, the knots are interpreted as external location information.

Furthermore, as part of the geometry reconstruction process to be described below, we may create two output tensor product surface patches such that (a) their boundaries meet continuously along a portion of the model space curve and (b) the union of the images of the two output surface patches approximates a neighborhood in the image of the spline surface $S_i$, i.e., a neighborhood that straddles the surface-surface intersection. It would be desirable if isocurves in the first output surface patch could meet the respective isocurves of like parametric value in the second output surface patch, and if the point of meeting were without parametric derivative discontinuity. (The component of the first derivative in the direction tangent to the model space curve is preferably without discontinuity at the point of meeting.) In order to enforce these continuity conditions on the isocurves, isoparametric boundary curves in the complementary parameter direction may be reparametrized to achieve parametric agreement with the model space curve. These isoparametric boundary curves may be reparametrized in a variety of ways, e.g., depending on a number of features desired by the user.

Refinement of Surfaces and Model Space Curve based on Intrinsic Location Information.

A) Refine the Model Space Curve by Knot Insertion at Knots of Model Space Curve.

The model space curve $C_{MS}(v)$ may be refined by performing knot insertion at each interior knot in the original knot vector V of model space curve $C_{MS}(v)$, to raise the multiplicity of the knot to the degree of the model space curve $C_{MS}$. (Hereinafter, unless stated otherwise, when we refer to "refining" a given curve at a given parametric location, we will mean the process of raising the knot multiplicity at that parametric location to the degree of the given curve. Hereinafter, unless stated otherwise, when we refer to "refining" a given surface at a given location in one of the surface's parametric variables, we will mean the process of raising the knot multiplicity at that location to the degree of the surface in that parametric variable.) As is well understood in the art of spline-based modeling, this operation causes the model space curve to be separated into intervals of simplified form (e.g., of Bézier form), without changing the trajectory of the curve in space.

B) Refine Surface $S_i$ by Knot Insertion at $s^i$ Knots or $t^i$ Knots of Surface $S_i$, Depending on Classification.

For a given segment (or cluster) of the parameter space curve $C_{PSi}$, the spline surface $S_i$ may be refined at certain interior surface knots of the spline surface $S_i$, depending on the classification of the segment. Suppose $x^i \in \{s^i, t^i\}$ denotes the type of the segment. The surface $S_i$ may then be refined at interior $x^i$ knots of $S_i$ that occur on the closed interval $[x^i(u_\alpha{}^i), x^i(u_{\alpha+1}{}^i)]$, where $u_\alpha{}^i$ and $u_{\alpha+1}{}^i$ denote the parameter values of $C_{PSi}(u^i)$ that bound the segment. (An $x^i$ knot of the surface $S_i$ is either an $s^i$ knot if the segment is of type $s^i$, or a $t^i$ knot if the segment is of type $t^i$. Furthermore, a $y^i$ knot of the surface $S_i$ is either a $t^i$ knot if the segment is of type $s^i$, or an $s^i$ knot if the segment is of type $t^i$.)

Recall that the parameter space curve $C_{PSi}(u^i)$ has coordinate functions $s^i(u^i)$ and $t^i(u^i)$ such that $$C_{PSi}(u^i)=[s^i(u^i),t^i(u^i)]^T.$$

Thus, if the segment is of type $x^i=s^i$, then $$[x^i(u_\alpha{}^i),x^i(u_{\alpha+1}{}^i)]=[s^i(u_\alpha{}^i),s^i(u_{\alpha+1}{}^i)].$$

Conversely, if the segment is type $x^i=t^i$, then $$[x^i(u_\alpha{}^i),x^i(u_{\alpha+1}{}^i)]=[t^i(u_\alpha{}^i),t^i(u_{\alpha+1}{}^i)].$$

C) Refine the Surface $S_i$ based on the Significant Points of Parameter Space Curve $C_{PSi}$.

Given a segment of type $x^i \in \{s^i, t^i\}$ from the parameter space curve $C_{PSi}$, the surface $S_i$ may be refined at the $x^i$-coordinate locations corresponding to the significant points that bound the segment. In other words, the surface $S_i$ may be refined at the locations $x^i(u_\alpha{}^i)$ and $x^i(u_{\alpha+1}{}^i)$, where $u_\alpha{}^i$ and $u_{\alpha+1}{}^i$ denote the parameter values of curve $C_{PSi}(u^i)$ that bound the segment.

Refinement of Surfaces and Model Space Curve based on External Location Information.

A) Refine the Model Space Curve $C_{MS}$ based on Surface Knots of Each Surface $S_i$.

For a given segment (or cluster) of type $x^i \in \{s^i, t^i\}$ from the parameter space curve $C_{PSi}$, the Post-SSI algorithm may refine the model space curve $C_{MS}(v)$ at locations corresponding to the interior $x^i$ knots of surface $S_i$ that occur on the closed interval $[x^i(u_\alpha{}^i), x^i(u_{\alpha+1}{}^i)]$. Furthermore, in some embodiments, any $y^i$ knot of the surface $S_i$ whose corresponding knot line intersects the given segment (or cluster) of the parameter space curve $C_{PSi}$ may be transferred to the model space curve $C_{MS}$, and used to refine the model space curve $C_{MS}$.

The above described refinements of the model space curve may be performed for each segment of the parameter space curve $C_{PSi}$ and/or for each surface $S_i$ involved in the surface-surface intersection.

An $x^i$ knot of $S_i$ may be mapped to the one-dimensional parametric domain of the model space curve $C_{MS}(v)$ in a variety of ways. For example, one may map a surface knot $s_E{}^i$ onto the domain of $C_{MS}(v)$ via a minimization of distance between the $t^i$ isocurve $S_i(s_E{}^i, t^i)$ and the model space curve $C_{MS}(v)$). Similarly, one may map a surface knot $t_\eta{}^i$ onto the domain of $C_{MS}(v)$ via a minimization of distance between the $s^i$ isocurve $S_i(s^i, t_\eta{}^i)$ and the model space curve $C_{MS}(v)$).

B) Refinement of the Model Space Curve based on Significant Points of Each Parameter Space Curve $C_{PSi}$.

For all values of the surface index i, the Post-SSI algorithm may refine the model space curve $C_{MS}(v)$ at locations $\{v_\alpha\}$ corresponding to the significant points $\{(s_\alpha{}^i, t_\alpha{}^i)\}$ of the parameter space curve $C_{PSi}$ ($u_\alpha{}^i$). There are a variety of ways to determine the locations $\{v_\alpha\}$. For example, in one embodiment, one may map a significant point ($s_\alpha{}^i$, $t_\alpha{}^i$) of the parameter space curve $C_{PSi}$ onto the 1D parametric domain of $C_{MS}$(v) via a minimization of distance between $S_i$($s_\alpha{}^i$, $t_\alpha{}^i$) and $C_{MS}$(v), and then point inversion.

C) Refine Each Surface $S_i$ based on the Knots of the Model Space Curve.

Each surface $S_i$ may be refined based on the interior knots of the model space curve $C_{MS}$. Given a knot $v_\psi$ of the model space curve $C_{MS}$, the knot $v_\psi$ may be mapped to a point ($s_\psi{}^i$, $t_\psi{}^i$) in the 2D parametric domain of the surface $S_i$. The point ($s_\psi{}^i$, $t_\psi{}^i$) may then be mapped to a closest segment of the parameter space curve $C_{PSi}$. If the closest segment is of type $x^i \in \{s^i, t^i\}$, the surface $S_i$ may be refined at $x_\psi{}^i$. In other words, if the segment type $x^i = s^i$, the surface $S_i$ is refined at $s^i = s_\psi{}^i$; conversely, if the segment type $x^i = t^i$, the surface $S_i$ is refined at $t^i = t_\psi{}^i$.

As noted above, a knot value $v_k$ of the model space curve $C_{MS}$ may be mapped to a point ($s_\psi{}^i$, $t_\psi{}^i$) in the 2D parametric domain of the surface $S_i$. There are a variety of ways to perform this mapping. In one embodiment, the knot value $v_\psi$ may be mapped by minimizing the distance between $C_{MS}$ ($v_\psi$) and $S_i$($s^i$, $t^i$), and then point inversion.

D) Refine the Surface $S_i$ based on External Significant Points.

The Post-SSI algorithm may refine the surface $S_i$ based on external significant points, i.e., significant points occurring in the 2D parametric domain(s) of the other participating surface(s). For each significant point ($s_\alpha{}^j$, $t_\alpha{}^j$) of each other participating surface $S_j$, $j \neq i$, a corresponding point ($s_{MAP}{}^i$, $t_{MAP}{}^i$) in the ($s^i$, $t^i$) domain of the surface $S_i$ may be computed. The point ($s_{MAP}{}^i$, $t_{MAP}{}^i$) may be mapped to a closest segment of the parameter space curve $C_{PSi}$. If the closest segment is of type $x^i \in \{s^i, t^i\}$, the surface $S_i$ may be refined at $x^i = x_{MAP}{}^i$. In other words, if the segment type $x^i = s^i$, the surface $S_i$ may be refined at $s^i = s_{MAP}{}^i$; conversely, if the segment type $x^i = t^i$, the surface $S_i$ may be refined at $t^i = t_{MAP}{}^i$.

As noted above, a significant point ($s_\alpha{}^j$, $t_\alpha{}^j$) of a different participating surface $S_j$ may be mapped to a point ($s_{MAP}{}^i$, $t_{MAP}{}^i$) in the ($s^i$, $t^i$) domain of the surface $S_i$. This mapping may be performed in a variety of ways. For example, in one embodiment, if the significant point ($s_\alpha{}^j$, $t_\alpha{}^j$) has already been transferred to a value $v_\alpha$ in the domain of the model space curve $C_{MS}$, the point ($s_{MAP}{}^i$, $t_{MAP}{}^i$) may be determined by minimizing the distance between the point $C_{MS}$ ($v_\alpha$) and the surface $S_i$ ($s^i$, $t^i$), and then point inversion. In another embodiment, the significant point ($s_\alpha{}^j$, $t_\alpha{}^j$) may be mapped more directly to the domain of the surface $S_i$ by minimizing the distance between the point $S_j$($s_\alpha{}^j$, $t_\alpha{}^j$) and the surface $S_i$($s^i$, $t^i$), and then point inversion. This minimization may be interpreted as a projection from the surface $S_j$ to the surface $S_i$, or from the 2D parametric domain of surface $S_j$ to the 2D parametric domain of surface $S_i$.

For the modeling of a 2-manifold, the trim boundaries of at most two trimmed surfaces can meet along any given curve in model space. However, the principles of the present invention are not limited to the context of 2-manifolds. A non-manifold structure may be created where the trim boundaries of more than two surfaces meet along the model space curve. Thus, in some embodiments, it is possible that there are more than two participating surfaces $\{S_i\}$.

Selection of Domain for Surface Patch Extraction and Isocurve Extraction

The Post-SSI algorithm may organize the construction output geometry relative to surface $S_i$ based on successive segments (or clusters) of the parameter space curve $C_{PSi}$.

Within each segment (or cluster), the Post-SSI algorithm may organize the construction of output geometry based on successive portions of the segment (or cluster). In particular, for each portion of the segment (or cluster), a corresponding domain for surface patch reconstruction may be selected, herein referred to as the extraction domain. The extraction domain is a subdomain in the 2D parametric domain $\Omega^1$ of the spline surface $S_i$, and is so named because a set of isocurves may be extracted from the restriction of spline surface $S_i$ to the extraction domain. The control points of these isocurves may be used to the construct output surface patch(es) corresponding to the portion of the parameter space curve $C_{PSi}$. The boundary of the extraction domain may be referred to as the extraction boundary.

For each surface $S_i$, the extraction domains that correspond respectively to the portions of the parameter space curve $C_{PSi}$ may form a partition of the 2D parametric domain of the surface $S_i$, i.e., the extraction domains may be non-overlapping regions and their union may be equal to the 2D parametric domain of the surface $S_i$. Here the term "non-overlapping" means that the intersection of different extraction domains has zero area. It should be understood, however, that adjacent extraction domains may meet along their boundaries. For example, the right boundary of one extraction domain may be the left boundary of another extraction domain. Given a segment (or cluster) of type $x^i \in \{s^i, t^i\}$ from the parameter space curve $C_{PSi}$, the segment (or cluster) may be partitioned into portions based on a set of division points comprising:

the interior $x^i$ knots of surface $S_i$;
the $x^i$ knots of surface $S_i$ that have been derived from the intrinsic and external significant points;
the $x^i$ knots of surface $S_i$ that have been derived from the knots of the model space curve $C_{MS}$.

The distinct division points may be ordered, and denoted as $\{x_\beta{}^i\}$, where $\beta$ an index according to the ordering. (The superscript i is a reminder that the division points are related to surface $S_i$. However, we may drop the superscript when there is no need for that reminder.) Each interval of the form $[x_\beta{}^i, x_{\beta+1}{}^i]$ defines a corresponding portion $CP_{PSi,\beta}$ of the segment (or cluster), and gives rise to a corresponding extraction domain $\Omega_\beta{}^i$. The portion $CP_{PSi,\beta}$ is the restriction of the parameter space curve $CP_{PSi}$ to the interval $[x_\beta{}^i, x_{\beta+1}{}^i]$. (The notation "CP" is meant to suggest "Curve Portion".) In some embodiments, the union of the extraction domains $\{\Omega_\beta{}^i\}$ over the index $\beta$ may be equal to the 2D parameteric domain $\Omega^i$ of the surface $S_i$: $\Omega^i = \cup_\beta \Omega_\beta{}^i$.

Given a portion $CP_{PSi,\beta}$, we may define a corresponding rectangular extraction domain $\Omega_\beta{}^i$ as follows. The $x^i$ extent of the extraction domain $\Omega_\beta{}^i$ may be set equal to the closed interval $[x_\beta{}^i, x_{\beta+1}{}^i]$. (Note that we may refer to a portion with the more simple notation $CP_{PSi}$ when the dependency on $\beta$ is not necessary for the discussion at hand.) The extent of the extraction domain $\Omega_\beta{}^i$ in the complementary parameter $y^i \in \{s^i, t^i\}$, $y^i \neq x^i$, may be selected in various ways. If we denote the $y^i$ extent of the extraction domain $\Omega_\beta{}^i$ by the closed interval $[y_{LB}{}^i, y_{UB}{}^i]$, we have $$\Omega_\beta{}^i = [x_\beta{}^i, x_{\beta+1}{}^i] \times [y_{LB}{}^i, y_{UB}{}^i].$$

(The notation "LB" and "UB" are meant to be suggestive of "lower bound" and "upper bound".)

It may be desirable for the extraction domain $\Omega_\beta{}^i$ to bound the selected portion $CP_{PSi,\beta}$. The value $y_{LB}{}^i$ may be selected as a value of parameter $y^i$ that is strictly less than the minimum value of the parameter $y^i$ achieved by the portion $CP_{PSi,\beta}$, and the value $y_{UB}{}^i$ may be selected as a value of parameter $y^i$ that is strictly greater than the maximum value of the parameter $y^i$ achieved by the portion $CP_{PSi,\beta}$. For example, the value $y_{LB}{}^i$ may be selected to be a $y^i$ knot of the surface $S_i$ that is strictly less than said minimum, and the value $y_{UB}{}^i$ may be selected to be a $y^i$ knot of the surface $S_i$ that is strictly greater than said maximum. As another example, the values $y_{LB}{}^i$ and $y_{UB}{}^i$ may be selected so that the extraction domain $\Omega_\beta{}^i$ spans the entire $y^i$ extent of the domain $\Omega^i$ of the surface $S_i$, i.e., $y_{LB}{}^i$ is set equal to the first $y^i$ knot of the surface $S_i$ and $y_{UB}{}^i$ is set equal to the last $y^i$ knot of the surface $S_i$. As yet another example, the values $y_{LB}{}^i$ and $y_{UB}{}^i$ may be selected based on user input.

The Post-SSI algorithm may extract a surface patch $S_{i,\beta}$ from the spline surface $S_i$, i.e., a surface patch corresponding to the extraction domain $\Omega_\beta{}^i$. (The extraction may involve knot insertion at $y_{LB}{}^i$ and $y_{UB}{}^i$, if such insertion has not already been performed.) The image of the surface patch $S_{i,\beta}$ in model space is coincident with the image of the extraction domain $\Omega_\beta{}^i$ under the spline map $S_i$.

In some embodiments, previous steps in the Post-SSI algorithm will have systematically exchanged refinement location information such as knot values and significant points between exchange participants (i.e., the model space curve and surfaces). Thus, the above-described distinct division points $\{x_\beta{}^i\}$ along the $x^i$ axis of the surface $S_i$ will exist in one-to-one correspondence with division points $\{v_\beta\}$ in the 1D domain of the model space curve, and in one-to-one correspondence with division points $\{x_\beta{}^j\}$ in each other surface $S_j$, $j \neq i$. Thus, the $x^i$ extent of the extraction domain $\Omega_\beta{}^i$ may correspond not only to the portion $CP_{PSi,\beta}$ of the parameter space curve $CP_{PSi}$, but also to a portion $CP_{MS,\beta}$ of the model space curve $C_{MS}$ and a portion $CP_{PSj,\beta}$ of parameter space curve $CP_{PSj}$ for all $j \neq i$. One may interpret the above described process of exchange and refinement as a common reduction to mutually correlated portions of simplified form.

Reparameterization of Isocurves on the Extraction Boundary.

The following paragraphs present additional detail regarding the reparameterization algorithm, 300.

The Post-SSI algorithm may reparametrize the $x^i$ isoparametric boundary curves of the surface patch $S_{i,\beta}$, e.g., to avoid the shearing of $y^i$ isocurves of the reconstructed output patch(s) near the model space curve $C_{MS}$. (In general, $x^i$ isoparametric curves may be referred to herein as "transverse isoparametric curves". Furthermore, $y^i$ isoparametric curves may be referred to herein as "longitudinal isoparametric curves".) In particular, the Post-SSI algorithm may reparametrize the two $x^i$ isocurves of the surface patch $S_{i,\beta}$ corresponding respectively to the boundary values $y_{LB}{}^i$ and $y_{UB}{}^i$. We refer to these boundary isocurves as $ISO_{y_{LB}{}^i}(x^i)$ and $ISO_{y_{UB}{}^i}(x^i)$. Each of these boundary isocurves may be reparametrized to achieve parametric agreement with the model space curve. This parametric agreement may be described in terms of a map $T_i$ and a projection $P_{x^j}$ defined as follows.

The map $T_i$ maps from the generic point $C_{MS}(v)$ on the model space curve $C_{MS}$ to the $(s^i, t^i)$ parametric domain of the surface $S_i$. The map $T_i$ may be realized, e.g., by distance minimization. The projection $P_{x^i}$ maps the point $(s^i, t^i)$ onto the parameter $x^i$. If the extraction domain $\Omega_\beta{}^i$ is based on a portion $CP_{PSi,\beta}$ of type $x^i = s^i$, then $P_{x^i}(s^i, t^i) = s^i$, i.e., the evaluation of $P_{x^i}$ on the coordinate pair $(s^i, t^i)$ gives the value $s^i$. Conversely, if the extraction domain $\Omega_\beta{}^i$ is based on a portion $CP_{PSi,\beta}$ of type $x^i = t^i$, then $P_{x^i}(s^i, t^i) = t^i$, i.e., the evaluation of $P_{x^i}$ on the coordinate pair $(s^i, t^i)$ gives the value $t^i$.

We seek a reparameterization function $x^i = f_{x^i}(v)$ that maps from the closed interval $I_\beta = [v_\beta, v_{\beta+1}]$ (or any other convenient interval) onto the interval $[x_\beta{}^i, x_{\beta+1}{}^i]$ such that, for all $v$ in $I_\beta$, the following condition is obeyed (or approximated):

$$P_{x^i} T_i(C_{MS}(v)) = f_{x^i}(v).$$

(The expression "$x^i = f_{x^i}(v)$" is interpreted to mean that the evaluation of function $f_{x^i}$ on the value $v$ gives the value $x^i$.) The reparameterization function $f_{x^i}$ may be linear, piecewise linear or non-linear, and may be computed in any of various ways.

The two boundary isocurves $ISO_{y_{LB}{}^i}(x^i)$ and $ISO_{y_{UB}{}^i}(x^i)$ are reparametrized using the function $f_{x^i}$ to obtain reparametrized isocurves $ISO_{y_{LB}{}^i}(v)$ and $ISO_{y_{UB}{}^i}(v)$, respectively. For convenience, in the following steps we may continue to refer to the parameter $x^i$, with the understanding that, in at least some embodiments, $x^i$ agrees with parameter $v$, due to the present reparameterization.

Construction of Output Patch Geometry

The following paragraphs give additional algorithmic detail on the reconstruction steps 400 of the WatertightCAD method.

For each value of the surface index i, geometric data $G_i$ derived from the surface patch $S_{i,\beta}$ along with geometric data from the portion $CP_{MS,\beta}$ of the model space curve $C_{MS}$ may be used to construct up to two output patches. The two output patches would correspond to opposite sides of the model space curve. In some embodiments, the output patches are Bézier output patches, i.e., of Bézier form in both parametric directions. In other embodiments, the output patches are of Bézier form at least in the $x^i$ direction, but may be of B-Spline or NURBS form in the $y^i$ direction. In yet other embodiments, the output patches may be of B-Spline, NURBS, or T-spline form in both the $x^i$ and $y^i$ directions, in which case, the model space curve need not be refined to the level of Bézier portions.

The two output patches, denoted $\tilde{S}_{iA,\beta}$ and $\tilde{S}_{iB,\beta}$, may be defined respectively on rectangular domains $\tilde{\Omega}_\beta{}^{iA}$ and $\tilde{\Omega}_\beta{}^{iB}$. However, the output patches $\tilde{S}_{iA,\beta}$ and $\tilde{S}_{iB,\beta}$ may be associated with two respective sub-domains of the extraction domain $\Omega_\beta{}^i$ as follows. We may consider the extraction domain $\Omega_\beta{}^i$ as being partitioned into two sub-domains $\Omega_\beta{}^{iA}$ and $\Omega_\beta{}^{iB}$ that meet along the distance-minimized pullback of the model space curve $C_{MS}$ into the 2D parametric domain $\Omega_i$ of the surface $S_i$. (The generic point $C_{MS}(v)$ on the model space curve $C_{MS}$ could be mapped to a point in the 2D parametric domain of the surface $S_i$ by minimizing the distance between $S_i(s^i, t^i)$ and the point $C_{MS}(v)$. This mapping may be referred to as a distance-minimized pullback.) As described below, we may extract geometric data $G_{iA}$ corresponding to the surface patch $S_{i,\beta}$ and the sub-domain $\Omega_\beta{}^{iA}$, and extract geometric data $G_{iB}$ corresponding to the surface patch $S_{i,\beta}$ and the sub-domain $\Omega_\beta{}^{iB}$. The output patch $\tilde{S}_{iA,\beta}$ may be computed based on the geometric data $G_{iA}$ and the geometric data from the portion $CP_{MS,\beta}$ of the model space curve $C_{MS}$. The output patch $\tilde{S}_{iB,\beta}$ may be computed based on the geometric data $G_{iB}$ and the geometric data from the portion $CP_{MS,\beta}$.

For each value of the surface index i and for each $k \in \{A, B\}$, the output patch $\tilde{S}_{ik,\beta}$ may have the desirable property that a boundary isocurve of that output patch $\tilde{S}_{ik,\beta}$ will map onto the portion $CP_{MS,\beta}$ of the model space curve $C_{MS}$. Thus, the output patches $\{\tilde{S}_{ik,\beta}: i \in \{0, 1\}; k \in \{A, B\}\}$ will all meet each other along the portion $CP_{MS,\beta}$ with $C^0$ continuity. (Here we assume there are two surfaces participating in the surface-surface intersection. However, the principles of the present invention naturally generalize to any number of participating surfaces.)

Furthermore, if the above-described reparameterization step is performed for each value of the surface index i, then for all $v \in I_\beta$, $i \in \{0,1\}$ and $k \in \{A, B\}$, the $y^i$ isocurve of $\tilde{S}_{ik,\beta}$ corresponding to the value $\tilde{x}^i = v$ will either start or end at the point $C_{MS}(v)$ on the model space curve. Thus, longitudinal isocurves in different output patches will meet at the same point on the model space curve if they correspond to the same coordinate value v. Because this property holds for each portion $CP_{MS,\beta}$ of the model space curve (i.e., each value of portion index β in the index set Φ), the parameter spaces of the output patches $$\{\tilde{S}_{ik,\beta}: i \in \{0,1\}, k \in \{A,B\}, \beta \in \Phi\}$$

are unified into a global parameter space.

(Here we again assume there are two surfaces participating in the surface-surface intersection. However, the principles of the present invention naturally generalize to any number of participating surfaces.)

Yet further, the boundary isocurve of $\tilde{S}_{ik,\beta}$ for the boundary remote from the portion $CP_{MS,\beta}$ may have the same trajectory in model space as the corresponding boundary isocurve of the surface patch $S_{i,\beta}$.

The construction of each output patch $\tilde{S}_{iA,\beta}$ and $\tilde{S}_{iB,\beta}$ may involve the solution of a corresponding linear system of equations (or a corresponding collection of linear systems). In some embodiments, the coefficients of the linear system are known in advance, and thus, the inverse matrix for this linear system may be precomputed and hardcoded as part of a software and/or hardware implementation of the Post-SSI algorithm, for more efficient solution of the linear system.

In cases where the boundary representation is modeling a 2-manifold object, the Post-SSI algorithm may construct only one of the output patches $\tilde{S}_{iA,\beta}$ and $\tilde{S}_{iB,\beta}$ for each value of the surface index i.

In cases where the boundary representation is modeling a non-manifold object, the Post-SSI algorithm may construct two or more output patches that meet along the model space curve with at least $C^0$ continuity. For example, the Post-SSI algorithm may construct both the output patches $\tilde{S}_{iA,\beta}$ and $\tilde{S}_{iB,\beta}$.

In some embodiments, the two output patches $\tilde{S}_{iA,\beta}$ and $\tilde{S}_{iB,\beta}$ may be combined (by knot removal) along the respective boundaries that map to the model space curve, in order to form a single output patch $\tilde{S}_{i,\beta}$, in which case the two identified boundaries become an interior isoparametric trim curve for the single output patch $\tilde{S}_{i,\beta}$.

In some embodiments, the above mentioned geometric data $G_i$ derived from the surface patch $S_{i,\beta}$ may include:
  the control points of one or both of the above-described reparametrized transverse boundary isocurves;
  the control points of boundary isocurves that extend in the $y^i$ direction; and
  the control points of one or more non-boundary isocurves that extend in the $y^i$ direction.

The above mentioned geometric data from the portion $CP_{MS,\beta}$ of the model space curve $C_{MS}$ may include the control points of that portion.

Sampling Longitudinal Isoparametric Curves from the Surface Patch

The Post-SSI algorithm may compute curve control points for a number of $y^i$ isocurves based on the surface control points of the surface patch $S_{i,\beta}$. (By definition, a $y^i$ isocurve corresponds to a fixed value of $x^i$ and extends in the $y^i$ direction.) In particular, curve control points for two boundary isocurves may be computed, i.e., boundary isocurves corresponding respectively to the boundary values $x^i = x_\beta^i$ and $x^i = x_{\beta+1}^i$ of the extraction domain $\Omega_\beta^i$. Furthermore, curve control points for two or more non-boundary isocurves may be computed. The two or more non-boundary isocurves correspond respectively to two or more distinct values of $x^i$ in the interior of the closed interval $[x_\beta^i, x_{\beta+1}^i]$. In some embodiments, the number of the non-boundary isocurves may be equal to one less than the degree $p_{x^i}$ of the surface patch $S_{i,\beta}$ in the $x^i$ direction (or the degree of the surface $S_i$ in the $x^i$ direction). For example, if $p_{x^i} = 3$, there may be two non-boundary isocurves. If $p_{x^i} = 2$, there may be only one non-boundary isocurve. The Greville abscissae may be desirable values of $x^i$ or $v^i$ to use for computing the $p_{x^i} - 1$ non-boundary isocurves. Each of the non-boundary isocurves may correspond to a respective one of the Greville abscissae. The sampling of the non-boundary isocurves at the Greville abscissae can be shown to produce a solution to the ensuing linear system that is optimal in various metric norms.

More generally, if we denote the surface control net of the surface patch $S_{i,\beta}$ by $$\{P_{\lambda,\rho}: 0 \leq \lambda \leq m_{m_i}, 0 \leq \rho \leq n_{y^i}\},$$

with the index λ being associated with the parameter $x^i$ and the index ρ being associated with the parameter $y^i$, the number of the non-boundary isocurves may be set equal to one less than $m_{x^i}$.

Let $ISO_{x_\lambda^i}(y^i)$ denote the $y^i$ isocurve of the surface patch $S_{i,\beta}$ at $x^i = x_\lambda^i$:

$$ISO_{x_\lambda^i}(y^i) = S_{i,\beta}(x_\lambda^i, y^i).$$

Techniques for computing the curve control points of isocurves given the surface control points of a surface patch are well understood in the art of spline-based modeling.

In at least some embodiments, there may be $m_{x^i} + 1$ longitudinal isocurves, corresponding respectively to the $m_{x^i} + 1$ locations $$x_0^i < x_1^i < \ldots < x_\lambda^i < \ldots < x_{m_{x^i}-1}^i < x_{m_{x^i}}^i,$$

with $x_0^i = x_\beta^i$ and $x_{m_{x^i}}^i = x_{\beta+1}^i$.

Restore Degree of Isoparametric Curves, as Needed

In some embodiments, the Post-SSI algorithm may employ a conventional software tool for computing the control points of an isocurve based on the control points of a spline surface and a fixed value of a given surface parameter. For some conventional tools, the isocurve returned by the tool may be of lower degree than the degree of the surface in the relevant direction when the trajectory of the isocurve is simple enough to admit an exact representation with a lower degree curve. (For example, imagine a bicubic spline surface generating by lofting, in which case the isocurves along one parametric direction may be line segments.) This property of conventional tools, while useful in many contexts, is not so useful in the present context. For the sake of the surface reconstruction to be described below, we may require that the above-mentioned $y^i$ isocurves to be of degree equal to the degree $p_{y^i}$ of the surface patch $S_{i,\beta}$ in the $y^i$ direction. To the extent that a software tool returns an isocurve of lower degree, the Post-SSI algorithm may elevate the degree of the isocurve to $p_{y^i}$. Techniques for degree elevation are well known in the art of spline-based modeling.

Divide the $y^i$ Isoparametric Curves based on Model Space Curve

Each of the above described $y^i$ isocurves of the surface patch $S_{i,\beta}$ may be divided into two sub-isocurves based on the model space curve. In some embodiments, for each $\lambda \in \{0, 1, 2, \ldots, m_{x^i}\}$, the isocurve $ISO_{x_\lambda^i}(y^i)$ may be divided into two sub-isocurves at a location $y^i = y_{SSI,\lambda}^i$ determined based on the model space curve (or the portion $CP_{MS,\beta}$ of the model space curve). In particular, the Post-SSI algorithm may compute $y_{SSI,\lambda}^i$ as the value of the $v_\lambda$ parameter that achieves the closest approach of the isocurve $ISO_{x_\lambda^i}(y^i)$ to the model space curve $C_{MS}(v)$. In other words, the Post-SSI algorithm may minimize the distance between $ISO_{x_\lambda^i}(y^i)$ and $C_{MS}(v)$ over the space $\{(v, y^i)\}$. (The value $v^k$ that achieves the minimum distance may be used in the optional constraint-based point repositioning described below.) The isocurve $ISO_{x_\lambda^i}(y^i)$ may be refined at $y^i = y_{SSI,\lambda}^i$, to divide the isocurve into two sub-isocurves, denoted $ISO_{x_\lambda}^{i,A}(y^i)$ and $ISO_{x_\lambda}^{i,B}(y^i)$.

Figure 21A:
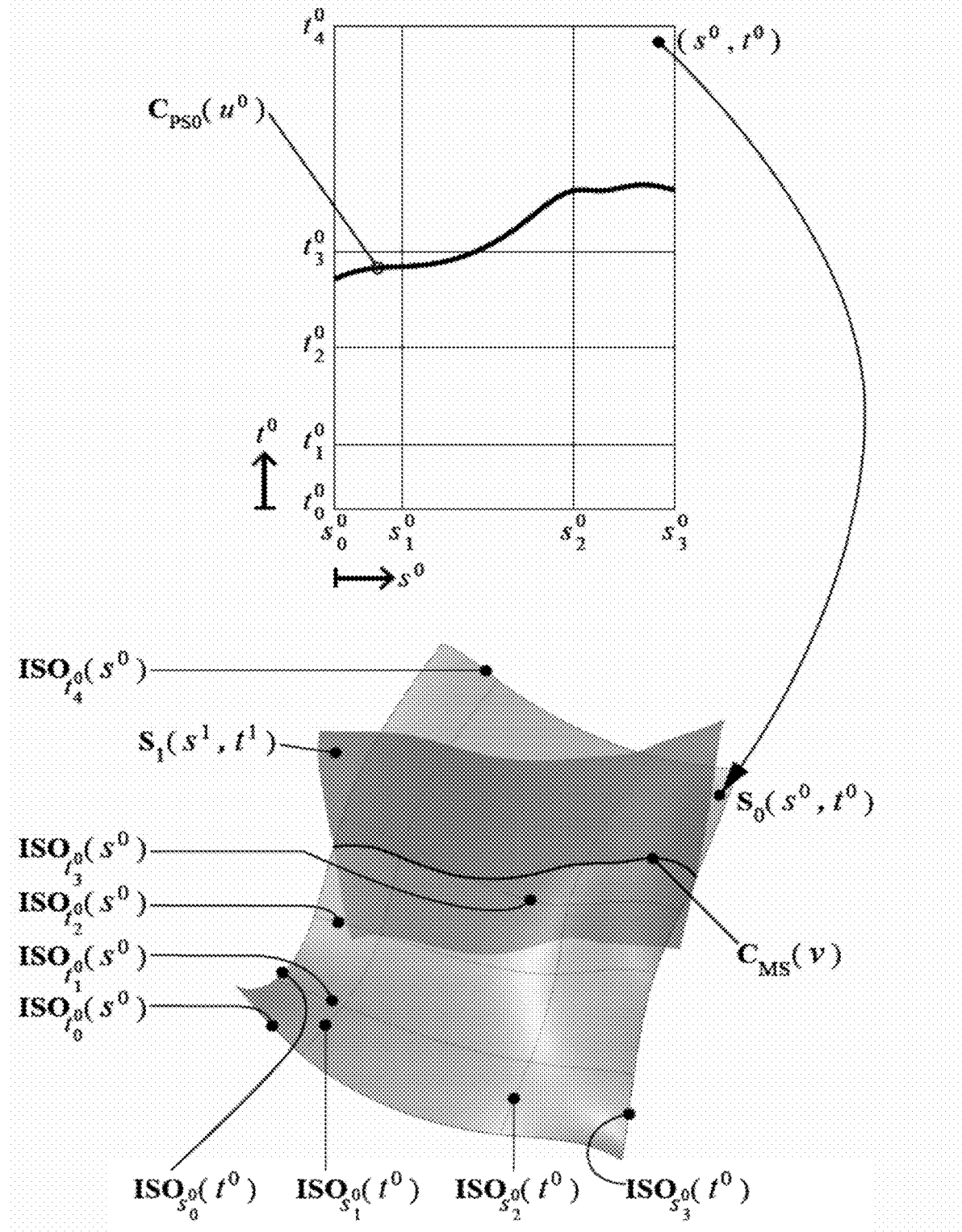
FIGS. 21A-21C are illustrations of isoparametric curve sampling and division based on the model space curve, according to some embodiments.
Figure 21B:
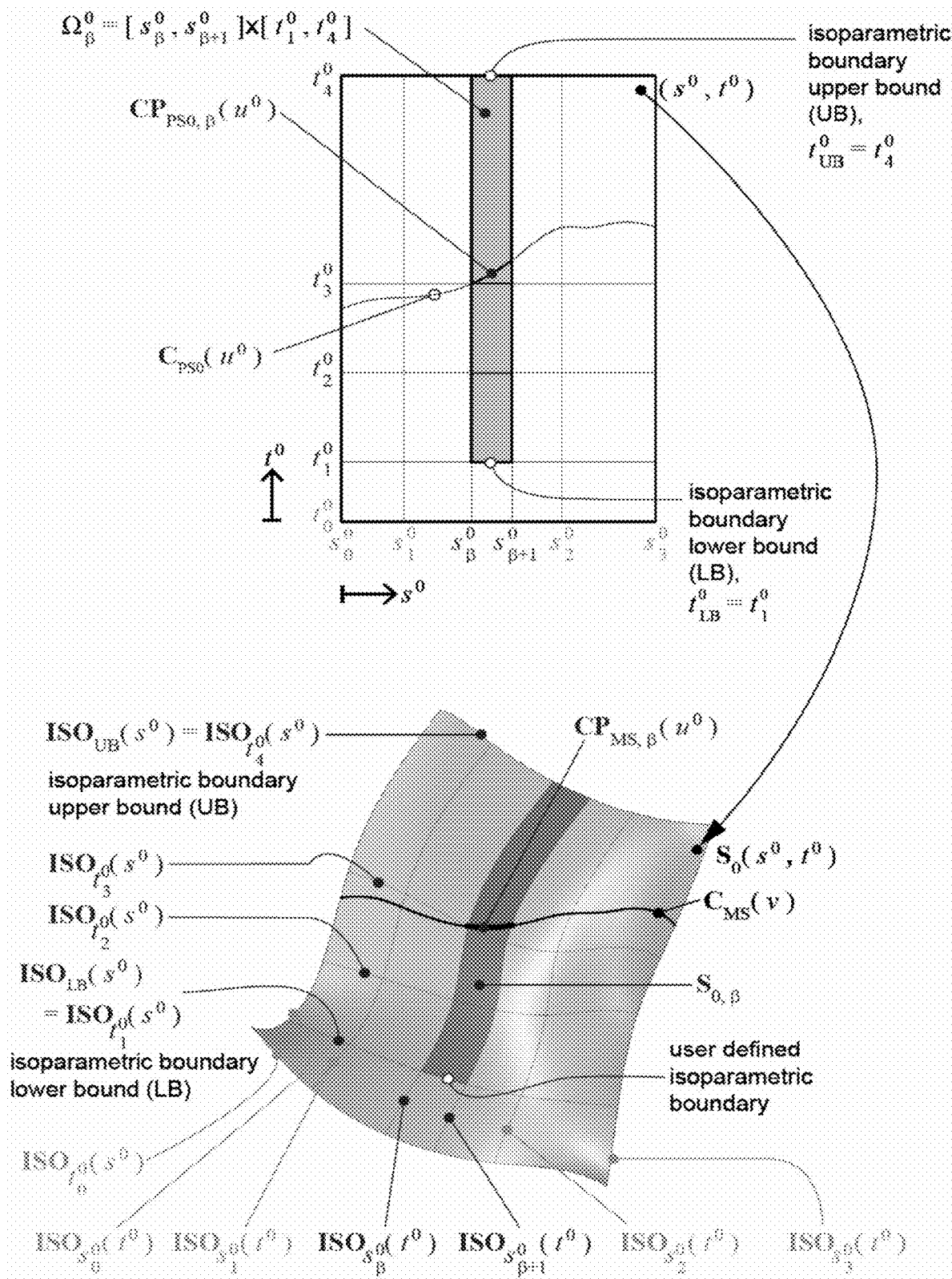
Figure 21C:
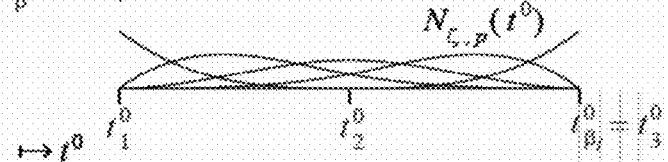
Figure 21C:
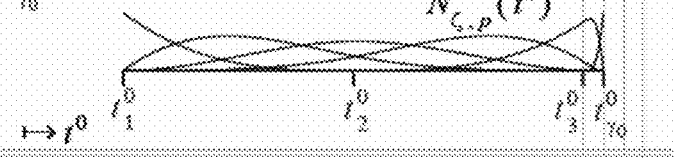
Figure 21C:
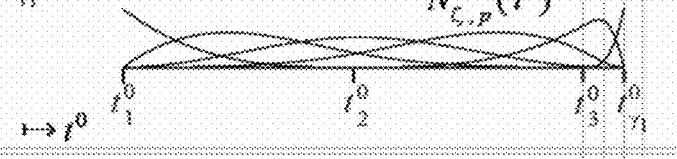
Figure 21C:
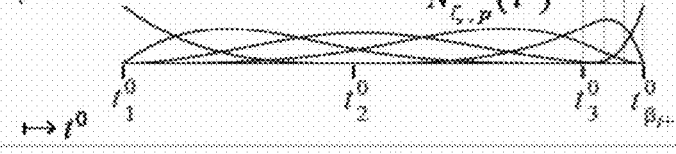

FIGS. 21A-21C show an example of the above-described isoparametric curves sampling and division based on the model space curve. FIG. 21A shows a spline surface $S_0 = S_0(s^0, t^0)$ intersected by spline surface $S_1 = S_1(s^1, t^1)$, a parameter space curve $C_{PS0}(u^0)$ corresponding to spline surface $S_0$, and a model space curve $C_{MS}(v)$. FIG. 21B shows an example of a reconstruction domain (in dark grey) corresponding to a portion of the parameter space curve $C_{PS0}(u^0)$ of type $s^0$. (The reconstruction domain is constrained from above by the distance-minimized pullback of the model space curve, $C_{MS}(v)$.) FIG. 21C shows the corresponding sub-isoparametric curves $$\{ISO_{x_\lambda}^{i,A}(y^i=t^0): x_\lambda^i = s_{\beta_0}^0, s_{\gamma_0}^0, s_{\gamma_1}^0, s_{\beta_1}^0\}$$

generated from the above-described sampling and curve division procedures.

Reparameterization of $y^i$ Isoparametric Subcurves to a Common Knot Vector

A) Linear Reparameterization and Knot Cross-Seeding of the $y^i$ Isoparametric Subcurves.

In some embodiments, it is possible that different sub-isocurves of the set $\{ISO_{x_\lambda}^{i,A}(y^i): \lambda = 0, 1, 2, \ldots, m_{x^i}\}$ have different numbers of knots. (The sub-isocurves are typically of different lengths, and thus, a longer sub-isocurve might intercept a larger number of transverse knot lines of the surface patch $S_{i,\beta}$ than a shorter sub-isocurve.) The Post-SSI algorithm may address this issue as follows. Each sub-isocurve $ISO_{x_\lambda}^{i,A}(y^i)$, $\lambda \in \{0, 1, 2, \ldots, m_{x^i}\}$, may be linearly reparametrized to a common parametric interval $I_{y^i}^{iA} = [\tilde{y}_{min}^{iA}, \tilde{y}_{max}^{iA}]$ in the $y^i$ parameter, to obtain a corresponding linearly reparametrized sub-isocurve $LRISO_{\tilde{x}_\lambda}^{iA}(\tilde{y}^i)$. (There are a wide variety of ways to select $\tilde{y}_{min}^{iA}$ and $\tilde{y}_{max}^{iA}$. For example, in one embodiment, $I_{y^i}^{iA} = [0, 1]$. In another embodiment, $I_{y^i}^{iA} = [y_{LB}^i, \tilde{y}_{SSI}^i]$, where $\tilde{y}_{SSI}^i$ is strictly between $y_{LB}^i$ and $y_{UB}^i$, e.g., the midpoint of $y_{LB}^i$ and $y_{UB}^i$.) Furthermore, for each $\lambda \in \{0, 1, 2, \ldots, m_{x^i}\}$, the Post-SSI algorithm may identify any knots of the reparametrized sub-isocurve $LRISO_{\tilde{x}_\mu}^{iA}(\tilde{y}^i)$, $\mu \in \{0, 1, 2, \ldots, m_{x^i}\}$, $\mu \neq \lambda$, that are not present in the knot vector of the reparametrized sub-isocurve $LRISO_{\tilde{x}_\lambda}^{iA}(\tilde{y}^i)$ and add those identified knots to the knot vector of $LRISO_{\tilde{x}_\lambda}^{iA}(\tilde{y}^i)$. In other words, wherever one reparametrized sub-isocurve has a knot that is absent from the knot vector of a different reparametrized sub-isocurve, we may add that knot to the knot vector of the different reparametrized sub-isocurve. As a result, each of the reparametrized sub-isocurves will share a common knot vector.

Figure 21D:
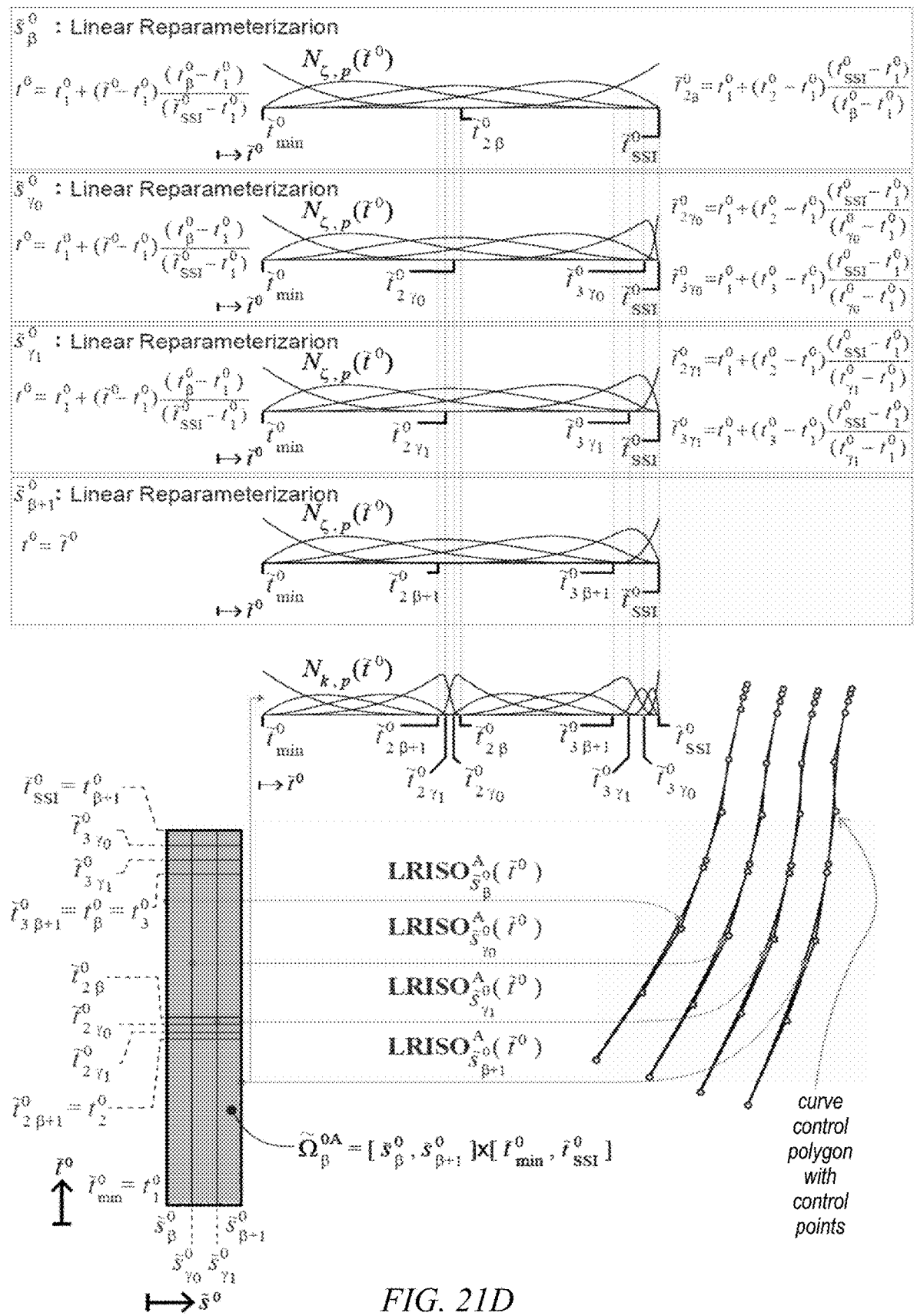
FIG. 21D is an illustration of the linear reparameterization based on the sub-isocurves shown in FIG. 21C, according to some embodiments.

FIG. 21D shows an example of the linear reparameterization based on the sub-isocurves shown in FIG. 21C.

B) Non-Linear Reparameterization of the $y^i$ Isoparametric Subcurves.

In some embodiments, each sub-isocurve $ISO_{x_\lambda}^{iA}(y^i)$, $\lambda \in \{0, 1, 2, \ldots, m_{x^i}\}$, may be non-linearly reparametrized with a corresponding reparameterization function $y^i = f_{x_\lambda}^{iA}(\tilde{y}^i)$, to obtain a corresponding reparametrized sub-isocurve $NLRISO_{\tilde{x}_\lambda}^{iA}(\tilde{y}^i)$, so that the reparametrized sub-isocurves $\{NLRISO_{\tilde{x}_\lambda}^{iA}(\tilde{y}^i)\}$ are defined on a common parametric interval $I_{\tilde{y}^i}^{iA} = [\tilde{y}_{min}^{iA}, \tilde{y}_{max}^{iA}]$ and have a common knot vector. For example, the functions $\{f_{x_\lambda}^{iA}\}$ may be 1D spline curves of degree $p_{Reparam}$, in which case the sub-isocurves $\{NLRISO_{\tilde{x}_\lambda}^{iA}(\tilde{y}^i)\}$ will be of degree $p_{y^i} p_{REPARAM}$, where $p_{y^i}$ is the degree of the sub-isocurves $\{ISO_{x_\lambda}^{iA}(y^i)\}$. (Non-linear reparameterization implies $p_{REPARAM}$ is greater than one.)

Figure 21E:
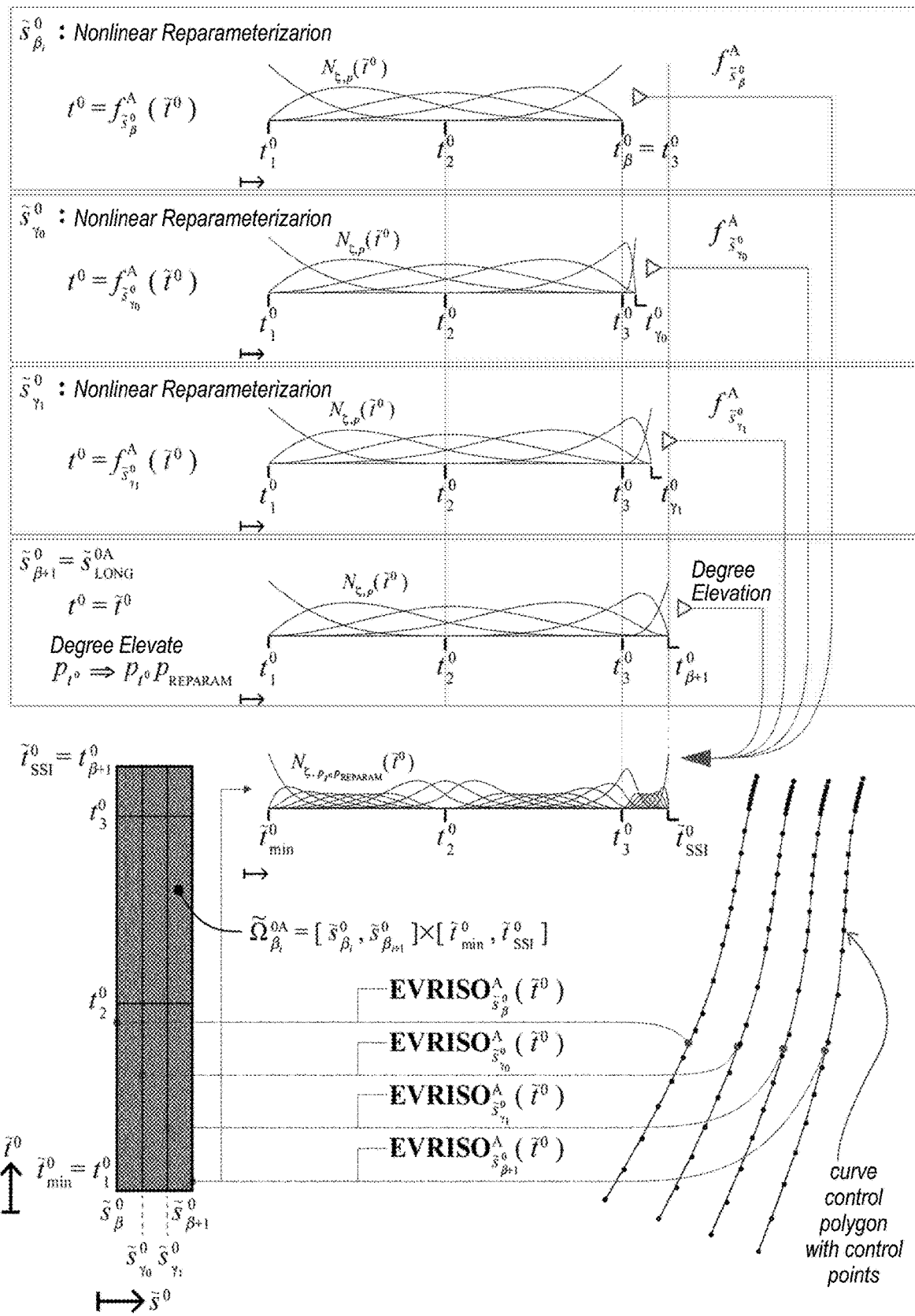
FIG. 21E is an illustration of a non-linear reparameterization scheme, using the sub-isocurves of FIG. 21C, according to some embodiments.
Figure 22A:
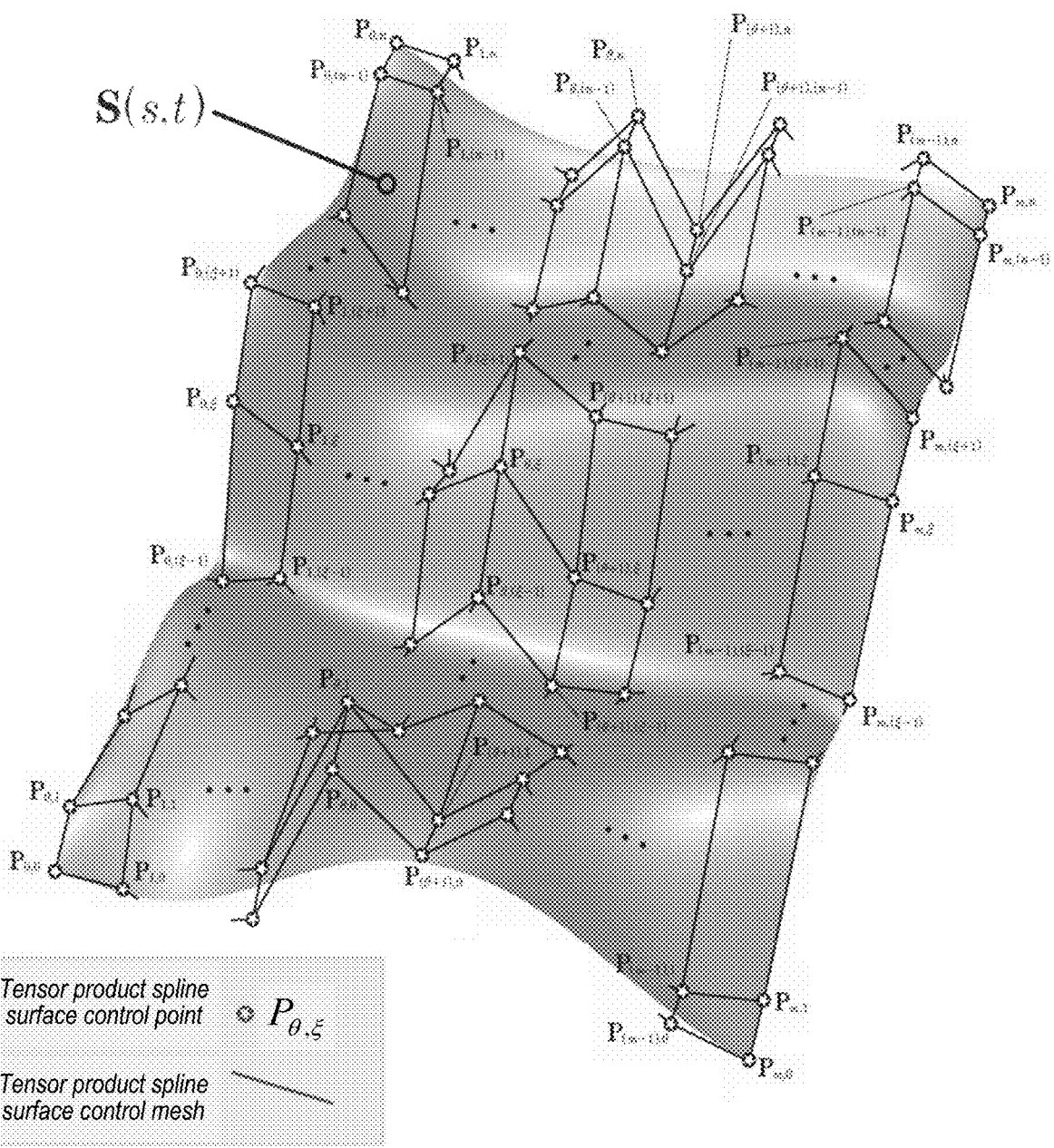
FIGS. 22A-22C illustrate the structural components of a reparametrized parametric surface, according to some embodiments.
Figure 22B:
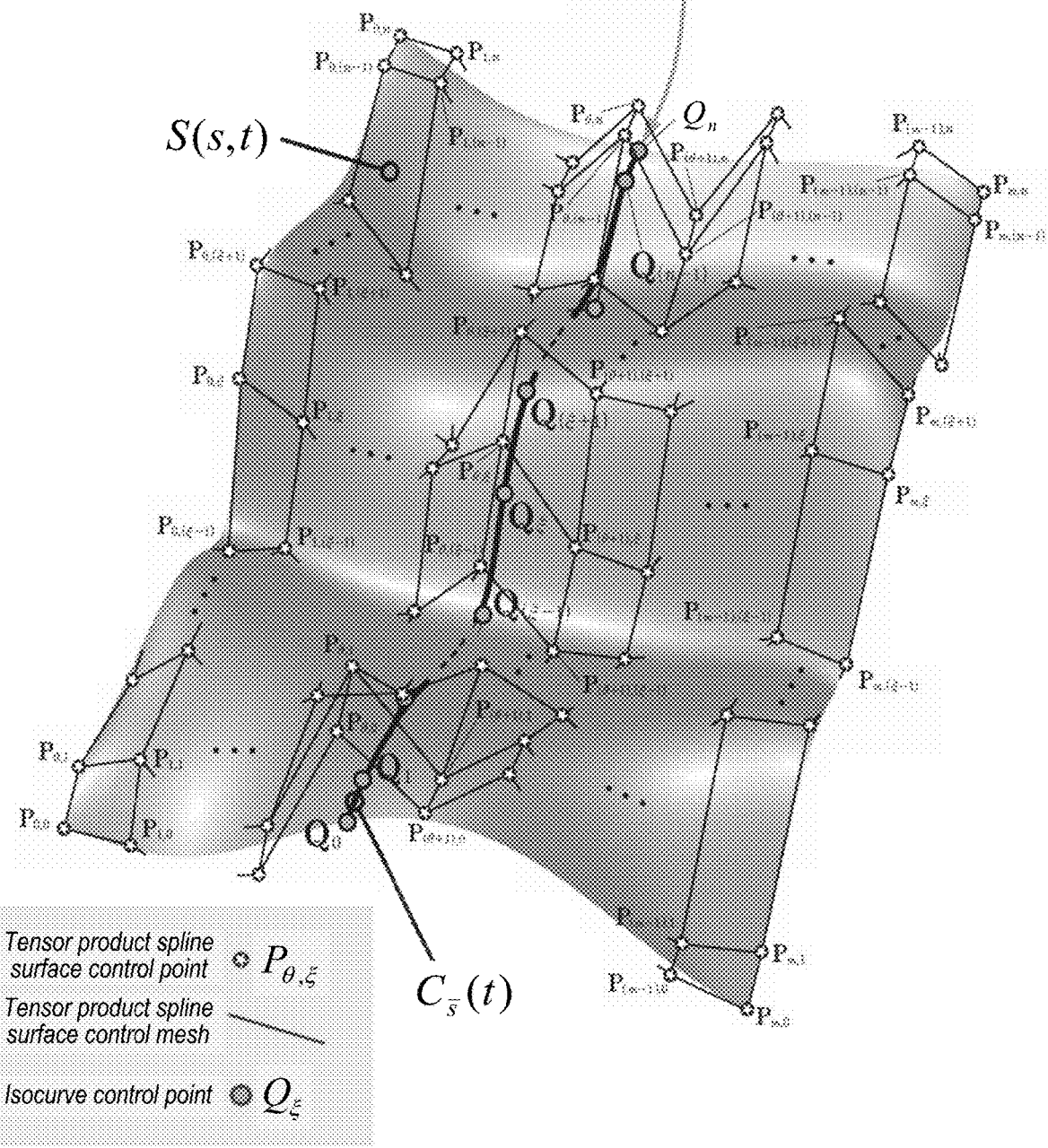
Figure 22C:
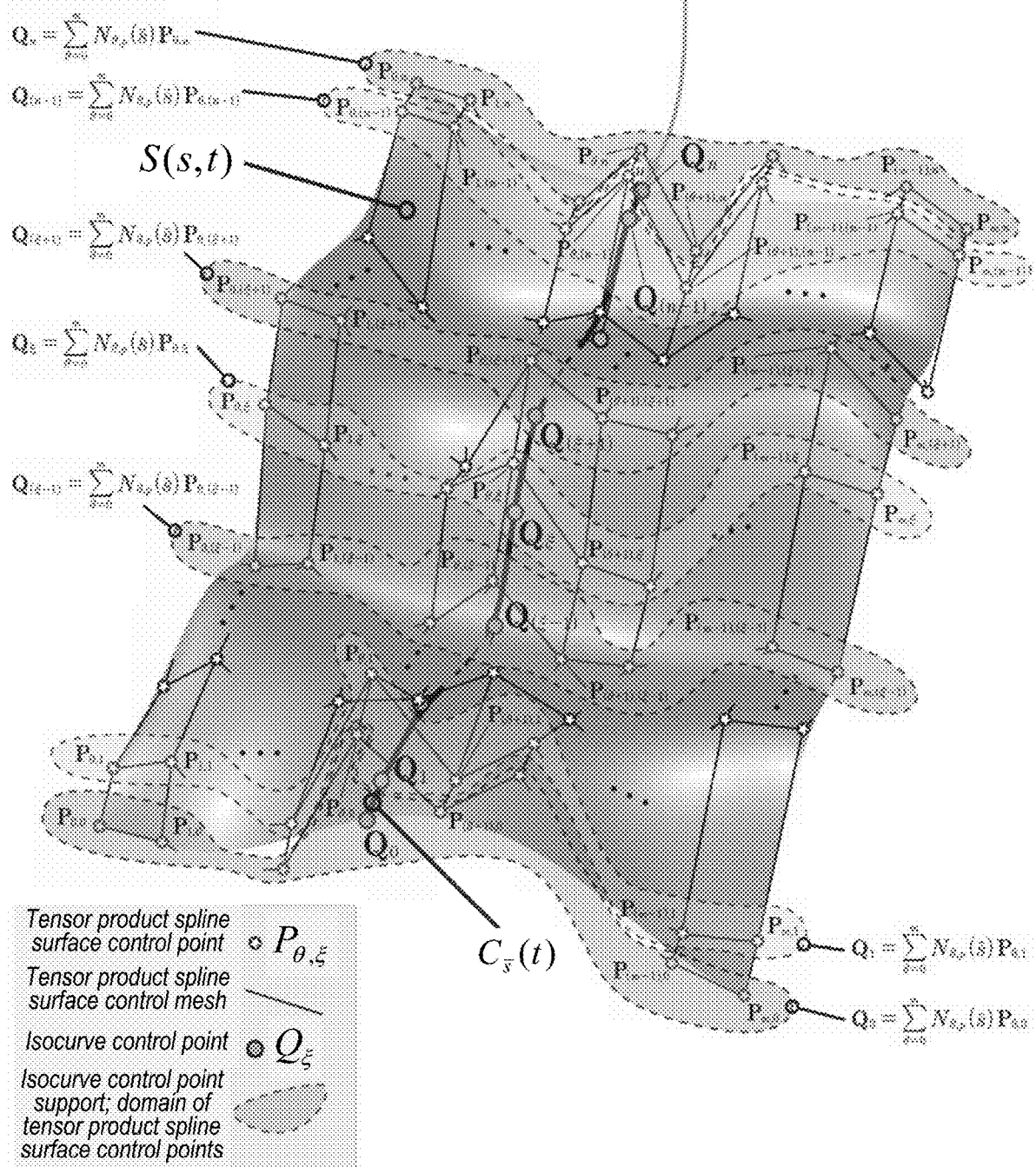
Figure 23A:
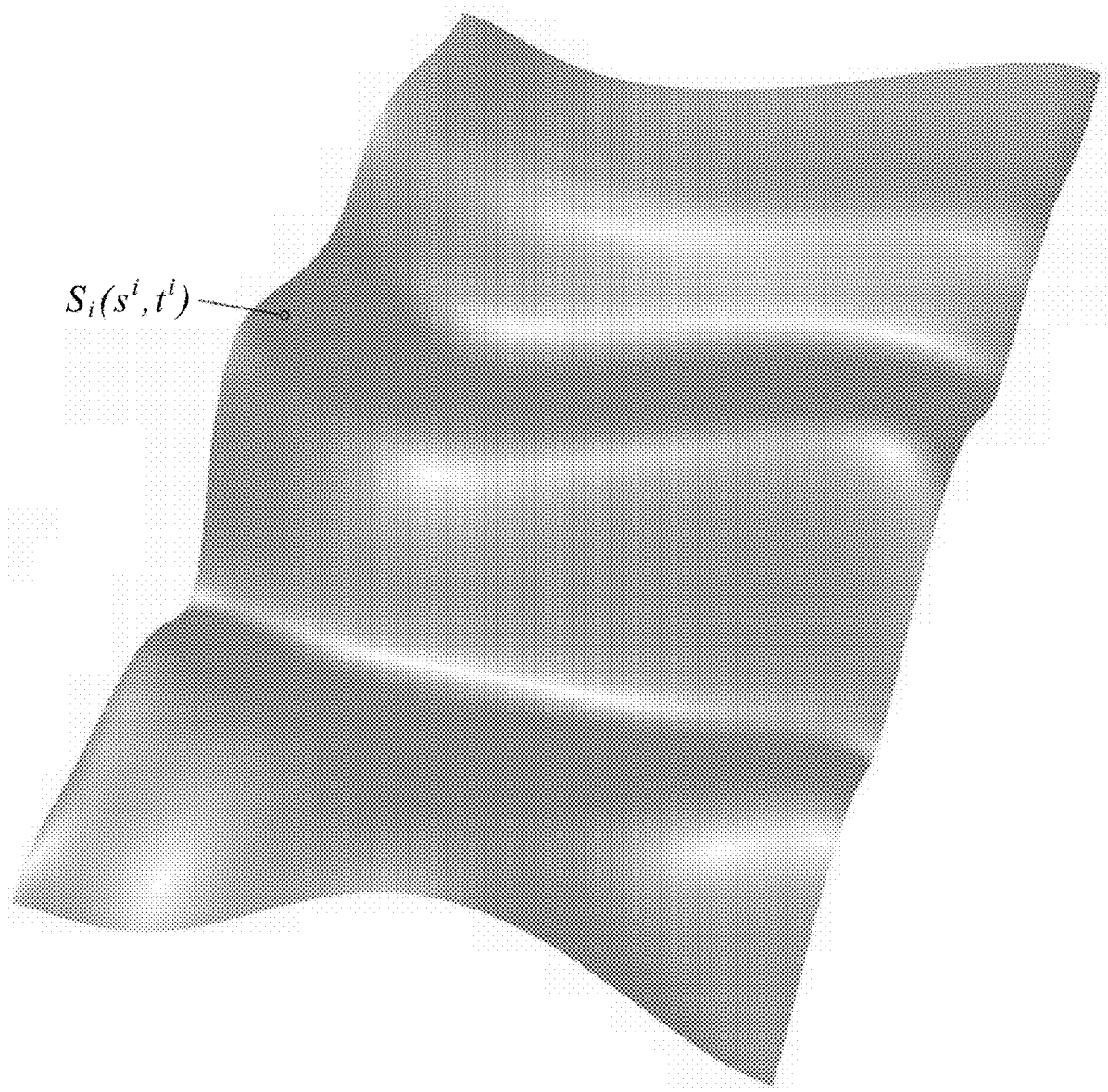
FIGS. 23A-23E further illustrate the structural components of a reparametrized parametric surface, according to some embodiments.
Figure 23B:
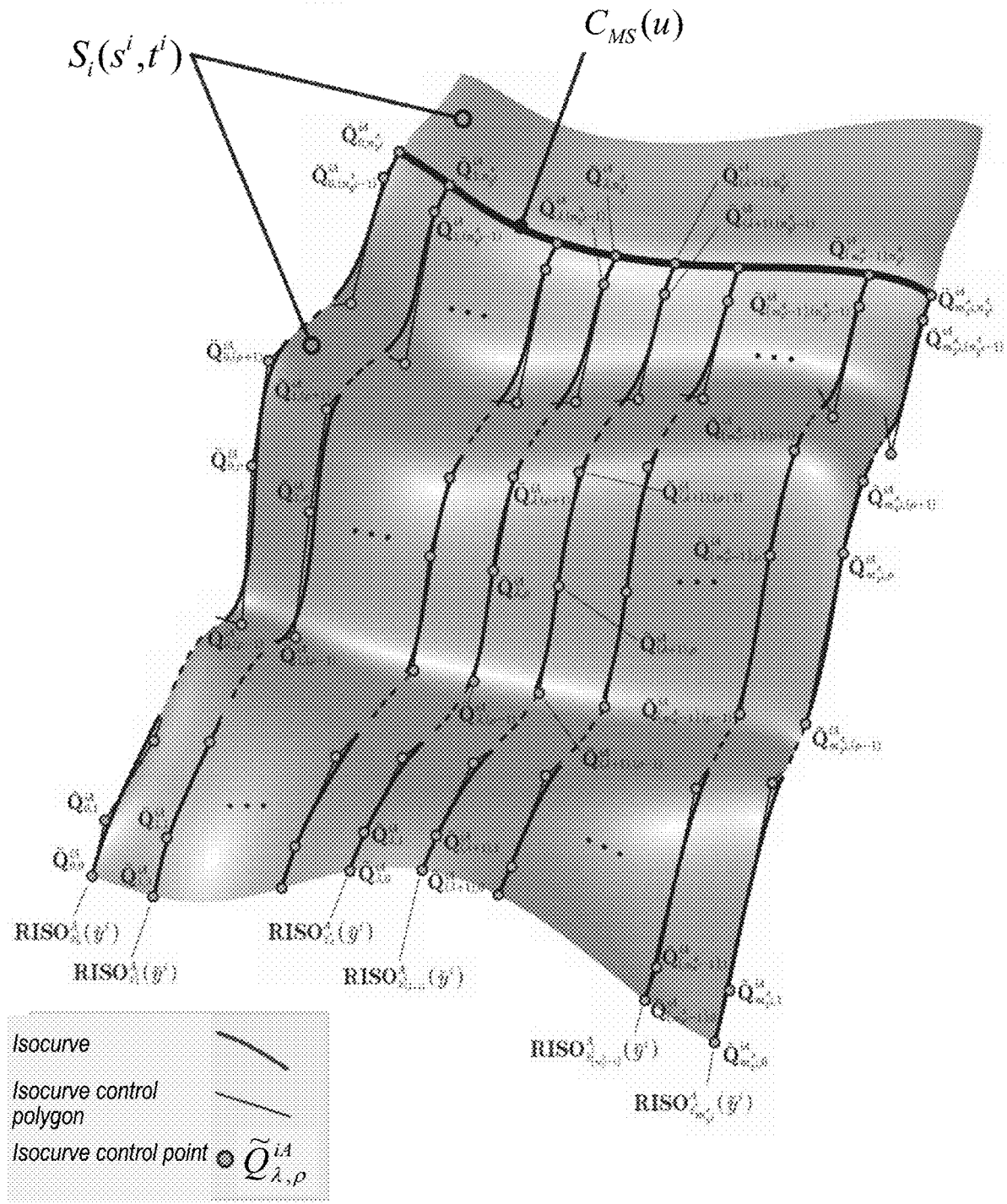
Figure 23C:
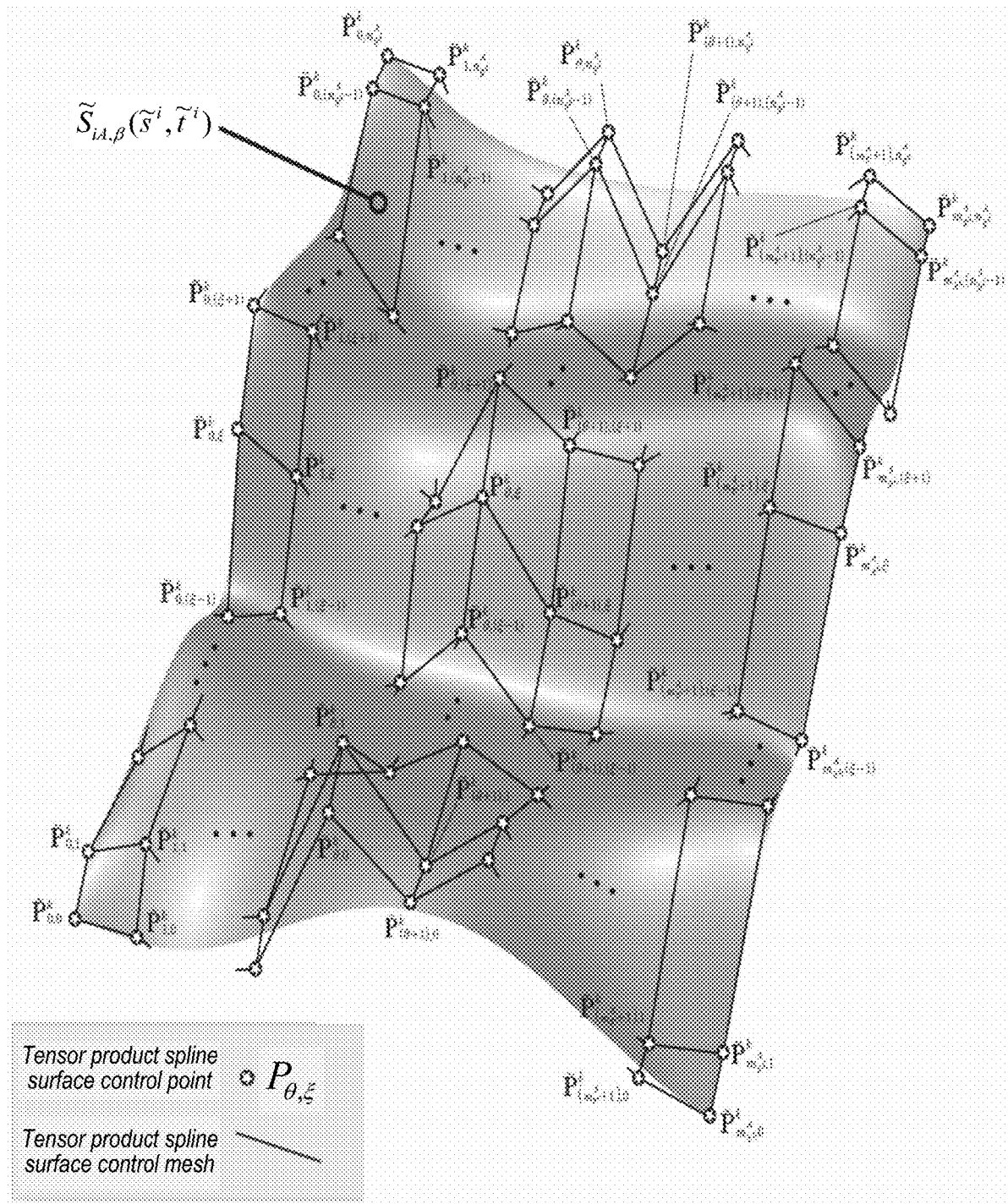
Figure 23D:
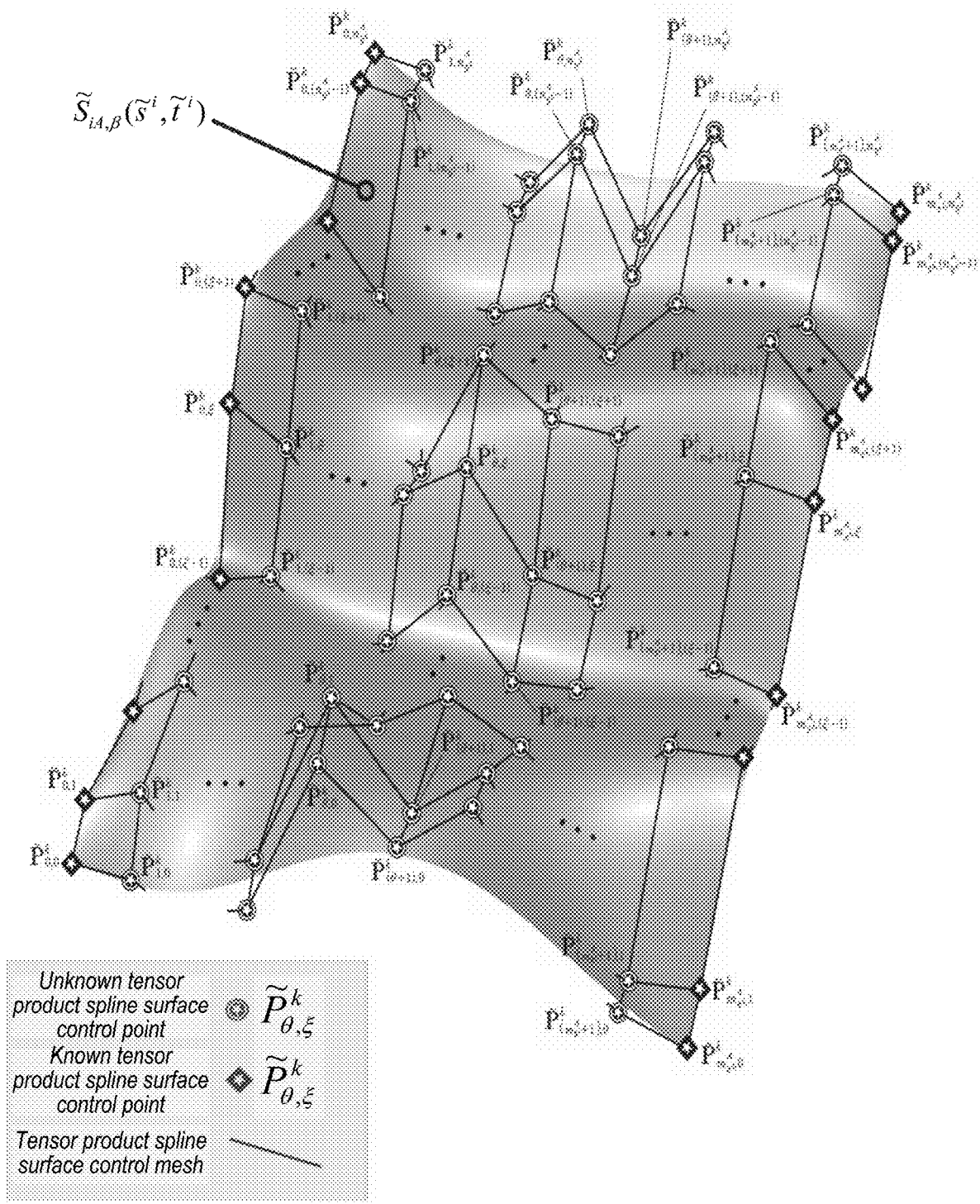
Figure 23E:
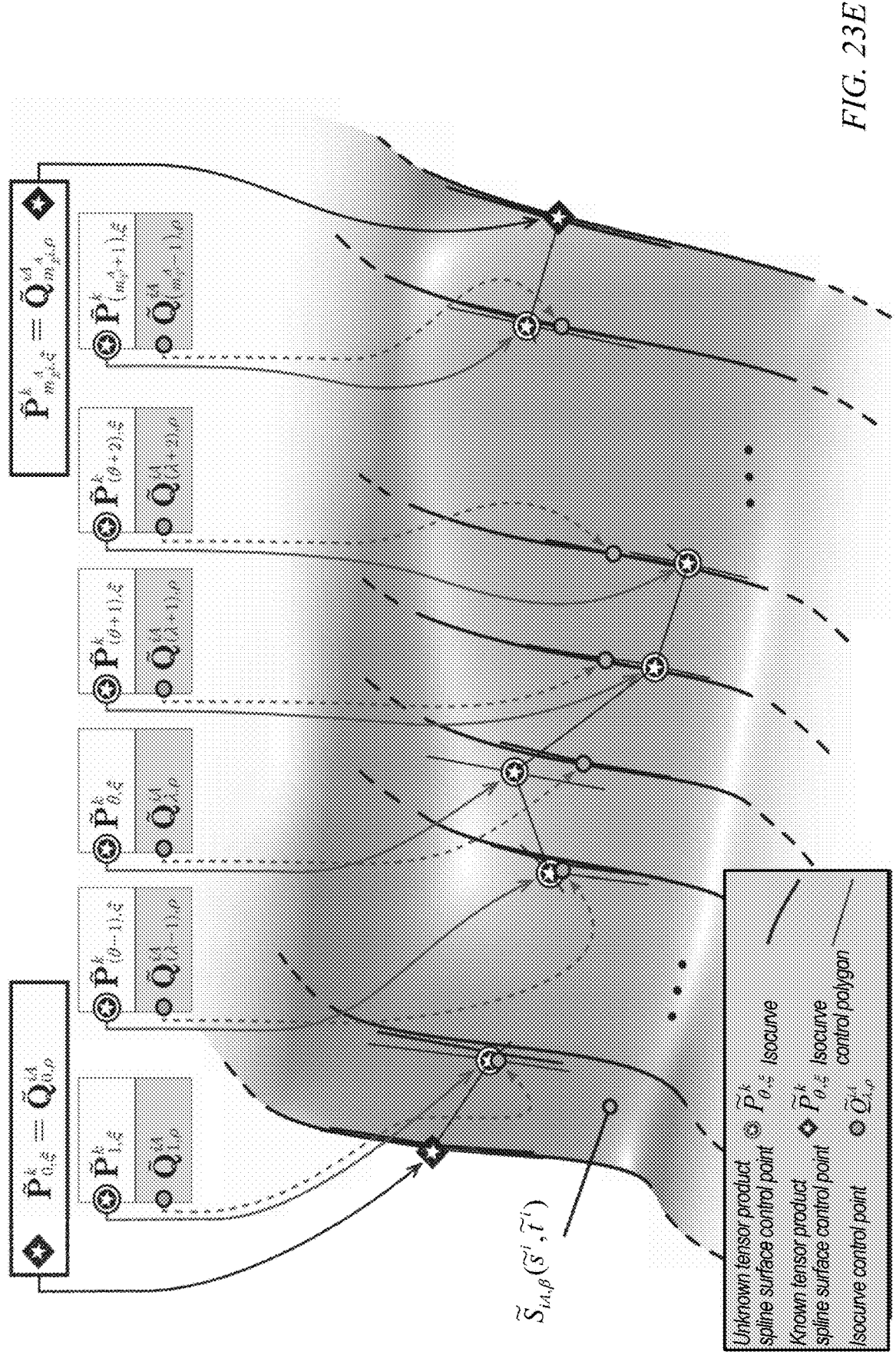

In an alternative embodiment, the longest of the sub-isocurves and the remaining sub-isocurves may be addressed differently, but with the same goal of obtaining sub-isocurves defined on a common knot vector. In particular, one may first identify the longest of the sub-isocurves. Let $x_{LONG}^{iA}$ denote the value of xi corresponding to the longest sub-isocurve. Each remaining sub-isocurve $ISO_{x_\lambda}^{iA}(y^i)$, $x_\lambda^u \neq x_{LONG}^{iA}$, may then be non-linearly reparametrized with a corresponding reparameterization function $y^i = f_{x_\lambda}^{iA}(\tilde{y}^i)$ of common degree $p_{REPARAM}$, to obtain a corresponding non-linearly reparametrized sub-isocurve, denoted $EVRISO_{\tilde{x}_\lambda}^{iA}(\tilde{y}^i)$, of degree $p_{y^i} p_{Reparam}$. The longest sub-isocurve may then be degree elevated to degree $p_{y^i} p_{Reparam}$, to obtain a degree-elevated sub-isocurve, denoted $EVRISO_{\tilde{x}_{LONG}}^{iA}(\tilde{y}^i)$. The nonlinear reparameterizations and the degree elevation are performed in such a fashion that the resulting set of $m_{x^i} + 1$ sub-isocurves $\{EVRISO_{\tilde{x}_\lambda}^{iA}(\tilde{y}^i): \lambda \in \{0, 1, 2, \ldots, m_{x^i}\}\}$ are of degree $p_{y^i} p_{Reparam}$ and share a common knot vector. (The prefix "EV" is meant as a reminder of the elevation of the longest sub-isocurve.) For example, if $p_{y^i} = 3$, $p_{Reparam} = 3$, and the sub-isocurve $$ISO_{x_{m_{x^i}}^i}^A(y^i) \text{ is}$$

the longest of the sub-isocurves, then each of the sub-isocurves $ISO_{x_\lambda}^{iA}(y^i)$, $\lambda \in \{1, 2, \ldots, m_{x^i}\}$ may be non-linearly reparametrized with a corresponding degree-3 reparameterization function $y^i = f_{x_\lambda}^{iA}(\tilde{y}^u)$, and the sub-isocurve $$ISO_{x_{m_{x^i}}^i}^A(y^i)$$

may be degree elevated to degree 9, to obtain a common knot vector. FIG. 21E shows an example of the above discussed non-linear reparameterization scheme, using the sub-isocurves of FIG. 21C.

In the following discussion of geometry reconstruction, it may not be significant how the sub-isocurves $\{ISO_{x_\lambda}^{iA}(y^i)\}$ have been reparametrized to a common knot vector. Thus, we may drop the prefix "L", "NL" and "EV", and refer simply to reparametrized sub-isocurves $\{RISO_{\tilde{x}_\lambda}^{iA}(\tilde{y}^i)\}$. This notation is meant to encompass any type of reparameterization being applied to the sub-isocurves to obtain reparametrized sub-isocurves that share a common knot vector.

C) Selection of Domain for Construction of Output Patch $\tilde{S}_{iA,\beta}$.

At this point, we may select the domain $\tilde{\Omega}_\beta^{iA}$ for the output patch $\tilde{S}_{iA,\beta}$. This domain may be interpreted as a reconstruction domain because the output patch $\tilde{S}_{iA,\beta}$ may be constructed so as to rebuild (or modify) the geometry of the surface patch $S_{i,\beta}$ on the extraction sub-domain $\Omega_\beta^{iA}$.

In some embodiments, the reconstruction domain $\tilde{\Omega}_\beta^{iA}$ may be a subregion of the extraction domain $\Omega_\beta^i$. In some embodiments, the reconstruction domain $\tilde{\Omega}_\beta^{iA}$ may be set equal to the rectangle $$[\tilde{x}_\beta^i, \tilde{x}_{\beta+1}^i] \times [\tilde{t}_{min}^{iA}, \tilde{y}_{max}^{iA}],$$

where $\tilde{y}_{min}{}^{iA}$ and $\tilde{y}_{max}{}^{iA}$ are respectively the first and last knot values of the common knot vector of the reparametrized sub-isocurves $\{RISO_{\tilde{x}_\lambda^i}{}^A(\tilde{y}^i)\}$, i.e., the minimum and maximum values of the common interval on which the reparametrized sub-isocurves are defined.

In other embodiments, the reconstruction domain $\tilde{\Omega}_\beta{}^{iA}$ may be set equal to the rectangle $$[\tilde{x}_\beta{}^i, \tilde{x}_{\beta+1}{}^i] \times [\tilde{y}_{LIK}{}^{iA}, \tilde{y}_{max}{}^{iA}],$$

where $\tilde{y}_{max}{}^{iA}$ is the last knot value of the common knot vector, and $\tilde{y}_{LIK}{}^{iA}$ is the last interior knot of the common knot vector. (An interior knot of a curve is a knot occurring in the interior of the domain of that curve.) Each reparametrized sub-isocurve $RISO_{\tilde{x}_\lambda^i}{}^A(\tilde{y}^i)$, $\lambda \in \{0, 1, 2, \ldots, m_{\tilde{x}^i}\}$, may be refined at $\tilde{y}^i = \tilde{y}_{LIK}{}^{iA}$ (to obtain a corresponding Bézier sub-isocurve $BISO_{\tilde{x}_\lambda^i}{}^A(\tilde{y}^i)$ on the domain $[\tilde{y}_{LIK}{}^{iA}, \tilde{y}_{max}{}^{iA}]$.

D) Counterpart Processing of Sub-isocurves on Other Side of Model Space Curve.

Note that similar processing operations may be applied to the sub-isocurves on the other side of the model space curve, i.e., on the sub-isocurves $\{ISO_{x_\lambda^i}{}^B(y^i): \lambda = 0, 1, 2, \ldots, m_{x^i}\}$.

In some embodiments, each sub-isocurve $ISO_{x_\lambda^i}{}^B(y^i)$, $\lambda \in \{0, 1, 2, \ldots, m_{x^i}\}$, may be linearly reparametrized to a common parametric interval $I_{\tilde{y}^i}{}^{iB} = [\tilde{y}_{min}{}^{iB}, \tilde{y}_{max}{}^{iB}]$ in the $y^i$ parameter, to obtain a corresponding reparametrized sub-isocurve $LRISO_{\tilde{x}_\lambda^i}{}^B(\tilde{y}^i)$. (There are a wide variety of ways to select $\tilde{y}_{min}{}^{iB}$ and $\tilde{y}_{max}{}^{iB}$. For example, in one embodiment, $I_{\tilde{y}^i}{}^{iB} = [0, 1]$. In another embodiment, $I_{\tilde{y}^i}{}^{iB} = [\tilde{y}_{SSI}{}^i, \tilde{y}_{UB}{}^i]$, where $\tilde{y}_{LB}{}^i < \tilde{y}_{SSI}{}^i < \tilde{y}_{UB}{}^i$.) Furthermore, for each $\lambda \in \{0, 1, 2, \ldots, m_{x^i}\}$, the Post-SSI algorithm may identify any knots of the reparametrized sub-isocurve $LRISO_{\tilde{x}_\mu^i}{}^B(\tilde{y}^i)$, $\mu \in \{0, 1, 2, \ldots, m_{x^i}\}$, $\mu \neq \lambda$, that are not present in the knot vector of the reparametrized sub-isocurve $LRISO_{\tilde{x}_\lambda^i}{}^B(\tilde{y}_i)$, and add those identified knots to the knot vector of $LRISO_{\tilde{x}_\lambda^i}{}^B(\tilde{y}^i)$. As a result, each of the reparametrized sub-isocurves will share a common knot vector.

In some embodiments, each sub-isocurve $ISO_{x_\lambda^i}{}^B(y^i)$, $\lambda \in \{0, 1, 2, \ldots, m_{x^i}\}$, may be non-linearly reparametrized with a corresponding reparameterization function $y^i = f_{x_\lambda^i}{}^B(\tilde{y}^i)$, to obtain a corresponding reparametrized sub-isocurve $NLRISO_{\tilde{x}_\lambda^i}{}^B(\tilde{y}^i)$, so that the reparametrized sub-isocurves $\{NLRISO_{\tilde{x}_\lambda^i}{}^B(\tilde{y}^i)\}$ are defined on a common parametric interval $I_{\tilde{y}^i}{}^{iB} = [\tilde{y}_{min}{}^{iB}, \tilde{y}_{max}{}^{iB}]$ and have a common knot vector. For example, the functions $\{f_{x_\lambda^i}{}^B\}$ may be 1D spline curves of degree $p_{Reparam}$, in which case the sub-isocurves $\{NLRISO_{\tilde{x}_\lambda^i}{}^B(\tilde{y}^i)\}$ will be of degree $p_{y^i} p_{REPRAM}$, where $p_{y^i}$ is the degree of the sub-isocurves $\{ISO_{x_\lambda^i}{}^B(y^i)\}$.

In an alternative embodiment, the longest of the sub-isocurves and the remaining sub-isocurves may be addressed differently, but with the same goal of obtaining sub-isocurves defined on a common knot vector. In particular, one may first identify the longest of the sub-isocurves Let $x_{LONG}{}^{iB}$ denote the value of $x_\lambda^i$ corresponding to the longest sub-isocurve. Each remaining sub-isocurve $ISO_{x_\lambda^i}{}^B(y^i)$, $x_\lambda^i \neq x_{LONG}{}^{iB}$, may then be non-linearly reparametrized with a corresponding reparameterization function $y^i = f_{x_\lambda^i}{}^B(\tilde{y}^i)$ of common degree $p_{Reparam}$, to obtain a corresponding non-linearly reparametrized sub-isocurve, denoted $EVRISO_{\tilde{x}_\lambda^i}{}^B(\tilde{y}^i)$ of degree $p_{y^i} p_{REPARAM}$. The longest sub-isocurve may then be degree elevated to degree $p_{y^i} p_{REPARAM}$, to obtain a degree-elevated sub-isocurve $EVRISO_{\tilde{x}_{LONG}^i}{}^B(\tilde{y}^i)$. The non-linear reparameterizations and the degree elevation are performed in such a fashion that the resulting set of $m_{\tilde{x}^i}+1$ sub-isocurves $\{EVRISO_{\tilde{x}_\lambda^i}{}^B(\tilde{y}^i): \lambda \in \{0, 1, 2, \ldots, m_{\tilde{x}^i}\}\}$ are of degree $p_{y^i} p_{REPARAM}$ and share a common knot vector.

In the following discussion of geometry reconstruction, it may not be significant how the sub-isocurves $\{ISO_{x_\lambda^i}{}^B(y^i)\}$ have been reparametrized to a common knot vector. Thus, we may drop the prefix "L", "NL" and "EV", and refer simply to reparametrized sub-isocurves $\{RISO_{\tilde{x}_\lambda^i}{}^B(\tilde{y}^i)\}$. This notation is meant to encompass any type of reparameterization being applied to the sub-isocurves to obtain reparametrized sub-isocurves that share a common knot vector.

At this point, we may select the domain $\tilde{\Omega}_\beta{}^{iB}$ for the output patch $\tilde{S}_{iB,\beta}$. This domain may be interpreted as a reconstruction domain because the output patch $\tilde{S}_{iB,\beta}$ may be constructed so as to rebuild (or modify) the geometry of the surface patch $S_{i,\beta}$ on the extraction sub-domain $\Omega_\beta{}^{iB}$.

In some embodiments, the reconstruction domain $\tilde{\Omega}_\beta{}^{iB}$ may be a subregion of the extraction domain $\Omega_\beta{}^i$. In some embodiments, the reconstruction domain $\tilde{\Omega}_\beta{}^{iB}$ may be set equal to the rectangle $$[\tilde{x}_\beta{}^i, \tilde{x}_{\beta+1}{}^i] \times [\tilde{y}_{min}{}^{iB}, \tilde{y}_{max}{}^{iB}],$$

where $\tilde{y}_{min}{}^{iB}$ and $\tilde{y}_{max}{}^{iB}$ are respectively the first and last knot values of the common knot vector of the reparametrized sub-isocurves $\{RISO_{\tilde{x}_\lambda^i}{}^{iB}(\tilde{y}^i)\}$, i.e., the minimum and maximum values of the common interval on which the reparametrized sub-isocurves are defined.

In other embodiments, the reconstruction domain $\tilde{\Omega}_\beta{}^{iB}$ may be set equal to the rectangle $$[\tilde{x}_\beta{}^i, \tilde{x}_{\beta+1}{}^i] \times [\tilde{y}_{min}{}^{iB}, \tilde{y}_{FIK}{}^{iB}],$$

where $\tilde{y}_{min}{}^{iB}$ is the first knot value of the common knot vector, and $\tilde{y}_{FIK}{}^{iB}$ is the first interior knot of the common knot vector. Each reparametrized sub-isocurve $RISO_{\tilde{x}_\lambda^i}{}^B(\tilde{y}^i)$, $\lambda \in \{0, 1, 2, \ldots, m_{\tilde{x}^i}\}$, may be refined at $\tilde{y}^i = \tilde{y}_{FIK}{}^{iB}$ to obtain a corresponding Bézier sub-isocurve $BISO_{\tilde{x}_\lambda^i}{}^B$ on the domain $[\tilde{y}_{min}{}^{iB}, \tilde{y}_{FIK}{}^{iB}]$.

Optional: Constraint-Based Repositioning of the Control Points of the Isoparametric Subcurves In some embodiments, for each $\lambda \in \{0, 1, 2, \ldots, m_{x^i}\}$, the Post-SSI algorithm may perform constraint-based point repositioning on the controls points of the sub-isocurve $RISO_{\tilde{x}_\lambda^i}{}^A(\tilde{y}^i)$ and the control points of the counterpart sub-isocurve $RISO_{\tilde{x}_\lambda^i}{}^B(\tilde{y}^i)$ so that those sub-isocurves meet on the model space curve $C_{MS}$ and achieve a specified degree of continuity at the meeting point on the model space curve $C_{MS}$. (The desired degree of continuity may be specified by a user.)

Let $\{\tilde{Q}_{\lambda, \rho}{}^A: 0 \leq \lambda \leq n_{\tilde{y}^i}{}^A\}$ denote the set of control points of the sub-isocurve $RISO_{\tilde{x}_\lambda^i}{}^A(\tilde{y}^i)$. (While this set of control points depends among other things on surface index i, we have not added that index to the control point notation, for simplicity of discussion.) Among the two end control points of the sub-isocurve $RISO_{\tilde{x}_\lambda^i}{}^A(\tilde{y}^i)$, i.e., $$\tilde{Q}_{\lambda,0}^A \text{ and } \tilde{Q}_{\lambda,n_{\tilde{y}^i}^A}^A,$$

note that $$\tilde{Q}_{\lambda,n_{\tilde{y}^i}^A}^A$$

is closest to the model space curve $C_{MS}$.

Let $\{\tilde{Q}_{\lambda, \rho}{}^B: 0 \leq \lambda \leq n_{\tilde{y}^i}{}^B\}$ denote the set of control points of the sub-isocurve $RISO_{\tilde{x}_\lambda^i}{}^B(\tilde{y}^i)$. (As above, we suppress the dependency on surface index, for ease of discussion.) Among the two end control points of the sub-isocurve $RISO_{\tilde{x}_\lambda^i}{}^B(\tilde{y}^i)$, i.e. $\tilde{Q}_{\lambda,0}{}^B$ and $$\tilde{Q}^B_{\lambda,n^B_{\tilde{y}^i}},$$

note that $\tilde{Q}_{\lambda,0}{}^B$ the model space curve $C_{MS}$. (Because the sub-isocurves are constructed from a surface patch of the original surface $S_i$, the sub-isocurves generically miss the model space curve.)

To guarantee that the sub-isocurves $\text{RISO}_{\tilde{x}_\lambda}{}^A(\tilde{y}^i)$ and $\text{RISO}_{\tilde{x}_\lambda}{}^B(\tilde{y}^i)$ meet on the model space curve $C_{MS}$, one need only set both $$\tilde{Q}^A_{\lambda,n^A_{\tilde{y}^i}} \text{ and } \tilde{Q}^B_{\lambda,0}$$

equal to a selected point on the model space curve, e.g., the point $C_{MS}(v^k)$ determined above:

$$\tilde{Q}^A_{\lambda,n^A_{\tilde{y}^i}} = \tilde{Q}^B_{\lambda,0} = C_{MS}(v^k).$$

To achieve $C^1$ continuity between the sub-isocurves $\text{RISO}_{\tilde{x}_\lambda}{}^A(\tilde{y}^i)$ and $\text{RISO}_{\tilde{x}_\lambda}{}^B(\tilde{y}^i)$, in addition to the constraint of meeting on the model space curve, one would reposition the control points $$\tilde{Q}^A_{\lambda,(n^A_{\tilde{y}^i}-1)} \text{ and } \tilde{Q}^B_{\lambda,1}$$

to match the derivatives $$\frac{d\text{RISO}^A_{\tilde{x}_\lambda}(\tilde{y}^i)}{dy} \text{ and } \frac{d\text{RISO}^B_{\tilde{x}_\lambda}(\tilde{y}^i)}{dy},$$

at the point of meeting. Furthermore, the repositioning of those points may be constrained so that the derivative vector at the point of meeting on the model space curve equals (within a specified tolerance) the derivative vector of the original sub-isocurves at their original point of meeting on surface $S_i$. (Because the original sub-isocurves are generated by dividing a larger isocurve, they have the same derivatives at their point of meeting on the surface $S_i$.)

To achieve $C^2$ continuity between the sub-isocurves $\text{RISO}_{\tilde{x}_\lambda}{}^A(\tilde{y}^i)$ and $\text{RISO}_{\tilde{x}_\lambda}{}^B(\tilde{y}^i)$, in addition to the constraint of meeting on the model space curve, one would reposition the control points $$\tilde{Q}^A_{\lambda,(n^A_{\tilde{y}^i}-2)}, \tilde{Q}^A_{\lambda,(n^A_{\tilde{y}^i}-1)},$$

$\tilde{Q}_{\lambda,1}{}^B$ and $\tilde{Q}_{\lambda,2}{}^B$. Furthermore, the repositioning of those points may be constrained so that the first and second derivatives at the point of meeting on the model space curve are equal (within a specified tolerance) to the respective derivatives of the original sub-isocurves at their original point of meeting on surface $S_i$.

More generally, to achieve $C^n$ continuity between the sub-isocurves $\text{RISO}_{\tilde{x}_\lambda}{}^A(\tilde{y}^i)$ and $\text{RISO}_{\tilde{x}_\lambda}{}^B(\tilde{y}^i)$, in addition to the constraint of meeting on the model space curve, one would reposition the control points $$\left\{\tilde{Q}^A_{\lambda,(n^A_{\tilde{y}^i}-n)}, \ldots, \tilde{Q}^A_{\lambda,(n^A_{\tilde{y}^i}-2)}, \tilde{Q}^A_{\lambda,(n^A_{\tilde{y}^i}-1)}, \tilde{Q}^B_{\lambda,1}, \tilde{Q}^B_{\lambda,2}, \ldots, \tilde{Q}^B_{\lambda,n}\right\}.$$

Furthermore, the repositioning of those points may be constrained so that the first L derivatives at the point of meeting on the model space curve are equal (within a specified tolerance) to the respective derivatives of the original sub-isocurves at their original point of meeting on surface $S_i$. Techniques for performing constraint-based repositioning of curve control points on general spline curves are well understood and need not be explained to those of ordinary skill in the art of spline theory.

In some embodiments, the above described constraint-based point repositioning may be performed on the Bézier sub-isocurves $\{\text{BISO}_{\tilde{x}_\lambda}{}^A(\tilde{y}^i)\}$ and/or the Bézier sub-isocurves $\{\text{BISO}_{\tilde{x}_\lambda}{}^B(\tilde{y}^i)\}$.

Construction of Output Patch and/or Output Patch $\tilde{S}_{iB,\beta}$.

The Post-SSI algorithm may construct the surface control points for the output patch $\tilde{S}_{iA,\beta}$ based on a set of isoparametric curve data including:

(a) the control points of the portion $CP_{MS,\beta}$ of the model space curve, which may be interpreted as the control points for a boundary isocurve of the output patch $\tilde{S}_{iA,\beta}$; and (b) the control points of the $y^i$ sub-isocurves $$\{\text{RISO}_{\tilde{x}_\lambda}{}^A: \lambda \in \{0,1,2,\ldots,m_{\tilde{x}^i}\}\},$$

or a subset of those control points.

See FIGS. 22A-22C and FIGS. 23A-23E to accompany the definitions below.

In some embodiments, the set of isoparametric curve data may also include the control points of the boundary isocurve $\text{ISO}_{y_{LB}}(x^i)$. In some embodiments, the set of isoparametric curve data may include the interior control points of the $y^i$ sub-isocurves $\{\text{RISO}_{\tilde{x}_\lambda}{}^A(\tilde{y}^i): k \in \{0, 1, 2, \ldots, m_{\tilde{x}^i}\}\}$, but exclude the end control points of those sub-isocurves. A control point of a spline curve is said to be an interior control point if it is not an end control point of that spline curve.

The output patch $\tilde{S}_{iA,\beta}$ may be defined on the above described reconstruction domain $\tilde{\Omega}_\beta{}^{iA}$. For specificity of discussion, suppose the reconstruction domain $\tilde{\Omega}_\beta{}^{iA}$ is given by:

$$[\tilde{x}_\beta{}^i, \tilde{x}_{\beta+1}{}^i] \times [\tilde{y}_{LB}{}^i, \tilde{y}_{SSI}{}^i],$$

where $\tilde{y}_{LB}{}^i < \tilde{y}_{SSI}{}^i < \tilde{y}_{UB}{}^i$, where $\tilde{y}_{LB}{}^i$ and $\tilde{y}_{UB}{}^i$ are respectively the lower and upper bounds of the extraction domain $\Omega_\beta{}^i$.

Let $\{\tilde{P}_{\theta,\xi}{}^A: 0 \leq \theta \leq m_{\tilde{x}^i}, 0 \leq \xi \leq n_{\tilde{y}^i}{}^A\}$ denote the surface control net of the output patch $\tilde{S}_{iA,\beta}$, where $n_{\tilde{y}^i}{}^A + 1$ is the number of curve control points in each sub-isocurve $\text{RISO}_{\tilde{x}_\lambda}{}^A(\tilde{y}^i)$. In the special case where the sub-isocurves are Bézier sub-isocurves, $n_{\tilde{y}^i}{}^a = p_{\tilde{y}^i}$, where $p_{\tilde{y}^i}$ is the degree of the Bézier sub-isocurves. Furthermore, in the special case where the surface patch $\tilde{S}_{i,\beta}$ is of Bézier form in the $\tilde{x}^i$ direction, $m_{\tilde{x}^i} = p_{\tilde{x}^i}$, where $p_{\tilde{x}^i}$ is the degree in the $\tilde{x}^i$ direction.

In the rest of this section, for ease of discussion, we will drop the surface index i from the parameters $\tilde{x}^i$ and $\tilde{y}^i$, the limit values $m_{\tilde{x}^i}$ and $n_{\tilde{y}^i}{}^A$, the sample location $\tilde{x}_\lambda{}^i$, and the degrees $p_{\tilde{x}^i}$ and $p_{\tilde{y}^i}$.

We want the surface control points of the output patch $\tilde{S}_{iA,\beta}$ to be computed so that the portion $CP_{MS,\beta}$ of the model space curve $C_{MS}$ is a boundary isocurve of the output patch $\tilde{S}_{iA,\beta}$, i.e., the boundary isocurve along the boundary corresponding to $\tilde{y}=\tilde{y}_{SST}$. This condition may be achieved by setting the boundary row $$\{\tilde{P}_{\theta,n_{\tilde{y}}^A}^A: 0 \le \theta \le m_{\tilde{x}}\}$$

of surface control points for the output patch equal to the control points of the portion $CP_{MS,\beta}$. (It is a mathematical fact that the curve control points of a boundary isocurve of a tensor product spline are respectively identical to the surface control points of the tensor product spline along the same boundary.)

Similarly, in some embodiments, we may want the surface control points of the output patch $\tilde{S}_{iA,\beta}$ to be computed so that the boundary isocurve $ISO_{y_{LB}}(x)$ of $S_{i,\beta}$ is a boundary isocurve of the output patch $\tilde{S}_{iA,\beta}$ along the boundary $\tilde{y}=\tilde{y}_{LB}$. This condition may be achieved by setting the boundary row $\{\tilde{P}_{\theta,0}^A: 0 \le \theta \le m_{\tilde{x}}\}$ of surface control points equal to the control points of the boundary isocurve $ISO_{y_{LB}}(x)$.

For the boundary column $\{\tilde{P}_{\theta,0}^A: 0 \le \theta \le n_{\tilde{y}}^A\}$ of surface control points of the output patch $\tilde{S}_{iA,\beta}$, we may set the interior members of that column equal to the corresponding interior control points of the boundary sub-isocurve $$RISO_{\tilde{x}_{m_{\tilde{x}}}}^A(\tilde{y}).$$

(Recall that $\tilde{x}_{m\tilde{x}}=\tilde{x}_{\beta+1}$.) The end members of this column are already addressed by the above described control point identifications.

For the boundary column $\{\tilde{P}_{m_{\tilde{x}},\xi}^A: 0 \le \xi \le n_{\tilde{y}}^A\}$ of surface control points of the output patch $\tilde{S}_{iA,\beta}$, we may set the interior members of that column equal to the corresponding interior control points of the boundary sub-isocurve $RISO_{\tilde{x}_o}^A(\tilde{y})$. (Recall that $\tilde{x}_{m_{\tilde{x}}}=\tilde{x}_{\beta+1}$.) The end members of this column are already addressed by the above described control point identifications.

Thus far we have accounted for all the boundary control points of the surface control net, leaving only the $(m_{\tilde{x}}-1)$ $(n_{\tilde{y}}^A-1)$ interior surface control points:

$$\{\tilde{P}_{\theta,86}^A: 0 \le \theta \le m_{\tilde{x}}, 0 \le \xi \le n_{\tilde{y}}^A\}$$

to be determined. The interior surface control points may be computed by solving a linear system based on the fundamental equation for computing the curve control points of an isocurve based on the surface control points of a tensor product spline. In the present context, note that the $\tilde{x}=\tilde{x}_\lambda$ isocurve of the output patch $\tilde{S}_{iA,\beta}$ is given by:

$$\tilde{S}_{iA,\beta}(\tilde{x}_\lambda, \tilde{y}) = \sum_{\theta=0}^{m_{\tilde{x}}} \sum_{\xi=0}^{n_{\tilde{y}}^A} N_{\theta,p_{\tilde{x}}}(\tilde{x}_\lambda) N_{\xi,p_{\tilde{y}}}(\tilde{y}) \tilde{P}_{\theta,\xi}^A$$

$$= \sum_{\xi=0}^{n_{\tilde{y}}^A} N_{\xi,p_{\tilde{y}}}(\tilde{y}) \left( \sum_{\theta=0}^{m_{\tilde{x}}} N_{\theta,p_{\tilde{x}}}(\tilde{x}_\lambda) \tilde{P}_{\theta,\xi}^A \right),$$

where $N_{\theta,p_{\tilde{x}}}$ denotes the $\theta$-th NURBS basis function of degree $p_{\tilde{x}}$, and $N_{\xi,p_{\tilde{y}}}$ denotes the $\xi$-th NURBS basis function of degree $p_{\tilde{y}}$. (In the special case where the curve portion $CP_{MS,\beta}$ of the model space curve is a Bézier portion, the NURBS function $N_{\theta,p_{\tilde{x}}}$ may specialize to the Bézier basis function $B_{\theta,p_{\tilde{x}}}$ of degree $p_{\tilde{x}}$.) Note, in some embodiments, we may interpret the control points $\tilde{P}_{\theta,\xi}^A$ as being points in 4D space, and recover 3D points by projection.)

Observe that the curve control points $\{\tilde{Q}_\xi^k: 0 \le \xi \le n_{\tilde{y}}^A\}$ for this isocurve $\tilde{S}_{iA,\beta}$ are given by:

$$\tilde{Q}_\xi^k = \sum_{\theta=0}^{m_{\tilde{x}}} N_{\theta,p_{\tilde{x}}}(\tilde{x}_\lambda) \tilde{P}_{\theta,\xi}^A.$$

For each $\xi \in \{1, 2, \ldots, n_{\tilde{y}}^A-1\}$ and each $\lambda \in \{1, 2, \ldots, m_{\tilde{x}}-1\}$, we can set $\tilde{Q}_\xi^k$ equal to $Q_{\lambda,\rho}^A$, i.e., the $\rho^{th}$ control point of the sub-isocurve $RISO_{\tilde{x}_\lambda}^A(\tilde{y})$:

$$\tilde{Q}_{\lambda,\rho}^A = \sum_{\theta=0}^{m_{\tilde{x}}} N_{\theta,p_{\tilde{x}}}(\tilde{x}_\lambda) \tilde{P}_{\theta,\xi}^A.$$

This strategy is reasonable since both the sub-isocurve $RISO_{\tilde{x}_\lambda}^A(\tilde{y})$ and the isocurve $\tilde{S}_{iA,\beta}(x_k, y)$ are evaluated at $\tilde{x}=\tilde{x}_\lambda$.

In the above summation, we can separate out the terms ($\theta=0$ and $\theta=m_{\tilde{x}}$) containing known surface control points $\tilde{P}_{0,\xi}^A$ and $\tilde{P}_{m_{\tilde{x}},\xi}^A$ from the terms ($\theta=1, 2, \ldots, m_{\tilde{x}}-1$) containing unknown surface control points, and obtain:

$$\tilde{Q}_{\lambda,\rho}^A - N_{0,p_{\tilde{x}}}(\tilde{x}_\lambda) \tilde{P}_{0,\xi}^A - N_{m_{\tilde{x}},p_{\tilde{x}}}(\tilde{x}_\lambda) \tilde{P}_{m_{\tilde{x}},\xi}^A = \sum_{\theta=0}^{m_{\tilde{x}}-1} N_{\theta,p_{\tilde{x}}}(\tilde{x}_\lambda) \tilde{P}_{\theta,\xi}^A$$

Thus, for each $\rho \in \{1, 2, \ldots, n_{\tilde{y}}^A-1\}$ we have a corresponding determinate system of $(m_{\tilde{x}}-1)$ linear vector equations in $(m_{\tilde{x}}-1)$ vector unknowns, which may be solved, e.g., using any standard technique from numerical linear algebra, to determine the interior surface control points in the $\xi$-th row of the surface control net $\{\tilde{P}_{\theta,\xi}^A\}$, i.e., the surface control points $$\{\tilde{P}_{\theta,\xi}^A: 0<\theta<m_{\tilde{x}}\}.$$

In other words, each interior row of the surface control net corresponds to a separate linear system, which may easily be solved to determine the interior members of that row. Thus, the entire set of interior surface control points of the output patch $\tilde{S}_{iA,\beta}$ are readily obtained.

To our knowledge, this technique of solving for surface control points based on isocurve control points is a new contribution to the theory of tensor product splines.

In some embodiments, the above described constraint-based point repositioning is applied to the control points of the sub-isocurves $\{RISO_{\tilde{x}_\lambda}^A(\tilde{y})\}$ before they are used to compute the surface control net of the output patch.

In some embodiments, we assume that at least the end control points $$\{\tilde{Q}_{\lambda,n_{\tilde{y}^i}^A}: 0 \le \lambda \le n_{\tilde{y}^i}^A\}$$

of the sub-isocurves $\{RISO_{\tilde{x}_\lambda}^A(\tilde{y}): 0<\lambda \le n_{\tilde{y}^i}^A\}$ have been repositioned so as to reside on the model space curve prior to computation of the surface control net of the output patch. In these embodiments, the $\lambda=n_{\tilde{y}^i}^A$ row of the surface control net may be addressed by linear system solution, just like the arbitrary interior row of the surface control net. Similarly, the $\lambda=0$ row of the surface control net may be addressed by linear system solution, just like the arbitrary interior row of the surface control net. In some embodiments, all rows of the surface control net are addressed by linear system solution.

In some embodiments, the Post-SSI algorithm may similarly construct the surface control points for the output patch $\tilde{S}_{iB,\beta}$ based on a set of isoparametric curve data including:
(a) the control points of the portion $CP_{MS,\beta}$ of the model space curve;
(b) the control points of the $y^i$ sub-isocurves $$\{RISO_{\tilde{x}_\lambda}{}^B(\tilde{y}^i): \lambda \in \{0,1,2,\ldots,m_{\tilde{x}^i}\}\},$$

or a subset of those control points.
In some embodiments, the set of isoparametric curve data may also include the control points of the boundary isocurve $ISO_{y_{LB}}{}^i(x^i)$. In some embodiments, the set of isoparametric curve data may include the interior control points of the $y^i$ sub-isocurves $\{RISO_{\tilde{x}_\lambda}{}^B(\tilde{y}^i): \lambda \in \{0, 1, 2, \ldots, m_{\tilde{x}^i}\}\}$, but exclude the end control points of those sub-isocurves.

By employing the techniques disclosed above, the Post-SSI algorithm may obtain a complete description of an output patch (e.g., the output patch $\tilde{S}_{iA,\beta}$, or the output patch $\tilde{S}_{iB,\beta}$, or the combination of $\tilde{S}_{iA,\beta}$ and $\tilde{S}_{iB,\beta}$) comprising a surface control net, a pair of knot vectors, a set of weights, and the degrees of the output patch. This output patch may be interpreted as a portion (or the entirety of) a reconstructed output surface, e.g., a B-Spline surface, or a NURBS surface or a T-Spline surface.

Combining the Constructed Output Patch Together with Longitudinally Superior and/or Inferior Patches of the Original Surface Geometry Recall that the domain $\tilde{\Omega}_\beta{}^{iA}$ of the output patch $\tilde{S}_{iA,\beta}$ may be equal to the rectangle $[\tilde{x}_\beta{}^i, \tilde{x}_{\beta+1}{}^i] \times [\tilde{y}_{min}{}^{iA}, \tilde{y}_{max}{}^{iA}]$. In some embodiments, it is possible that $\tilde{y}_{min}{}^{iA}$ is greater than $y_{min}{}^i$, i.e., the minimum value of parameter $y^i$ in the domain $\Omega^i$ of the surface $S_i$. (To avoid possible confusion with $\tilde{y}_{min}{}^{iA}$, we will here refer to $y_{min}{}^i$ as $y_{floor}{}^i$.) Thus, it may be desirable to combine the output patch $\tilde{S}_{iA,\beta}$ with the restriction of surface $S_i$ to the longitudinally inferior domain $$\Omega_{\beta,Linf}{}^{iA} = [\tilde{x}_\beta{}^i, \tilde{x}_{\beta+1}{}^i] \times [y_{floor}{}^i, \tilde{y}_{min}{}^{iA}],$$

to obtain an extended output patch $\tilde{S}_{iA,\beta}{}^{ext}$ on the longitudinally extended domain $$\tilde{\Omega}_{\beta,LEXT}{}^{iA} = [\tilde{x}_\beta{}^u, \tilde{x}_{\beta+1}{}^i] \times [y_{floor}{}^i, \tilde{y}_{max}{}^{iA}],$$

This combination may be achieved by removing an appropriate number of knots at $\tilde{y}^i = \tilde{y}_{min}{}^{iA}$. This combination is easily achievable because the output surface patch $\tilde{S}_{iA,\beta}$ has in at least some embodiments been designed to respect the geometry of surface $S_i$ along its $y^i = y_{min}{}^{iA}$ boundary.

Furthermore, recall that the domain $\tilde{\Omega}_\beta{}^{iB}$ of the output patch $\tilde{S}_{iB,\beta}$ may be equal to the rectangle $[\tilde{x}_\beta{}^i, \tilde{x}_{\beta+1}{}^i] \times [\tilde{y}_{min}{}^{iB}, \tilde{y}_{max}{}^{iB}]$. In some embodiments, it is possible that $\tilde{y}_{max}{}^{iB}$ is less than $y_{max}{}^i$, i.e., the maximum value of parameter $y^i$ in the domain $\Omega^i$ of the surface $S_i$. (To avoid possible confusion with $\tilde{y}_{max}{}^{iA}$, we will here refer to $y_{max}{}^a$ as $y_{ceiling}{}^i$.) Thus, it may be desirable to combine the output patch $\tilde{S}_{iB,\beta}$ with the restriction of surface $S_i$ to the longitudinally superior domain $$\Omega_{\beta,Lsup}{}^{iB} = [\tilde{x}_\beta{}^i, \tilde{x}_{\beta+1}{}^i] \times [\tilde{y}_{max}{}^{iB}, y_{ceiling}{}^i],$$

to obtain an extended output patch $\tilde{S}_{iB}{}^{ext}$ on the longitudinally extended domain $$\tilde{\Omega}_{\beta,LEXT}{}^{iB} = [\tilde{x}_\beta{}^i, \tilde{x}_{\beta+1}{}^i] \times [\tilde{y}_{min}{}^{iB}, y_{ceiling}{}^i].$$

This combination may be achieved by removing an appropriate number of knots at $\tilde{y}^i = \tilde{y}_{max}{}^{iB}$. This combination is easily achievable because the output surface patch $\tilde{S}_{iB,\beta}$ has been designed to agree with the geometry of surface $S_i$ along its $\tilde{y}^i = \tilde{y}_{max}{}^{iB}$ boundary.

5.8 Combining Output Patches for Successive Values of Portion Index $\beta$.

As noted above, a given segment (or cluster) of type $x^i$ from the parameter space curve $C_{PSi}$ may include a plurality of portions $CP_{MS,\beta}$ corresponding to respective values of the portion index $\beta$. An output patch $\tilde{S}_{iA,\beta}$ and/or an output patch $\tilde{S}_{iB,\beta}$ may be constructed for each of the portions, as variously described above. It should be understood that successive output patches $\tilde{S}_{iA,\beta}$ and $\tilde{S}_{iA,\beta+1}$ (or, successive output patches $\tilde{S}_{iB,\beta}$ and $\tilde{S}_{iB,\beta+1}$) associated with a given segment (or cluster) may be combined by applying knot removal along their shared boundary. Thus, a single output patch may be formed for each cluster (or segment).

Topology Reconstruction

The points, curves, and surfaces resulting from the above described geometry construction process are used to update the topology of the b-rep data structure. As described previously, this data structure will be specific to the CAD package or exchange file type, yet the update is not limited to any specific data structure and is amenable to any valid b-rep data structure commonly used in CAD systems and CAD data exchange standards.

In some embodiments, the boundary representation may be updated after having constructed the output surface patch $\tilde{S}_{iA,\beta}$ and/or the output surface patch $\tilde{S}_{iB,\beta}$.

In some embodiments, the update may be performed as follows. The edge E may be divided into two or more subedges $\{\overline{SE}\}$. One of those subedges, say $\overline{SE}_0$, points to the portion $CP_{MS,\beta}$ of the model space curve, and the remaining subedge(s) point to remaining portion(s) of the model space curve. The original topological face $F_i$ (associated with surface $S_i$ and the original trim loop containing the parameter space trim curve $C_{PSi}$) may be edited by adding an additional trim loop for the 2D domain of surface $S_i$, where the additional trim loop includes portion $CP_{PSi,\beta}$ of the parameter space curve $C_{PSi}$, and encloses a region corresponding to the domain of the output surface patch $\tilde{S}_{iA,\beta}$ (or the domain of the output surface patch $\tilde{S}_{iB,\beta}$). The orientation of the additional loop is selected to indicate that the said region no longer belongs to the face $F_i$. A new topological face $\tilde{F}_i$ may be created and assigned the output surface patch $\tilde{S}_{iA,\beta}$ (or the output surface patch $\tilde{S}_{iB,\beta}$) as its underlying surface spline object. The new topological face $\tilde{F}_i$ may have four coedges:

$\overline{CE}_{i,0}{}^0$, which corresponds to the $\tilde{x} = \tilde{x}_\beta$ boundary of the output surface patch;

$\overline{CE}_{i,1}{}^0$, which corresponds to the $\tilde{x} = \tilde{x}_{\beta+1}$ boundary of the output surface patch;

$\overline{CE}_{i,2}{}^0$, which corresponds to the $\tilde{y} = \tilde{y}_{min}{}^{iA}$ boundary of the output surface patch;

$\overline{CE}_{i,3}{}^0$, which corresponds to the $\tilde{y} = \tilde{y}_{max}{}^{iA}$ boundary of the output surface patch, i.e., the boundary that meets the portion $CP_{MS,\beta}$ of the model space curve.

The coedge $\overline{CE}_{i,3}{}^0$ may be identified with the subedge $\overline{SE}_0$. The remainder of the original surface patch will require an update to provide appropriate topological adjacency information with the new surfaces patches, $\tilde{S}_{iA,\beta}$ and $\tilde{S}_{iB,\beta}$, and their respective topological entities.

Output: B-rep CAD File

The new B-rep model is written out to the specified standard of the data structure type of the CAD package and/or data format of the CAD file.

Figure 24A:
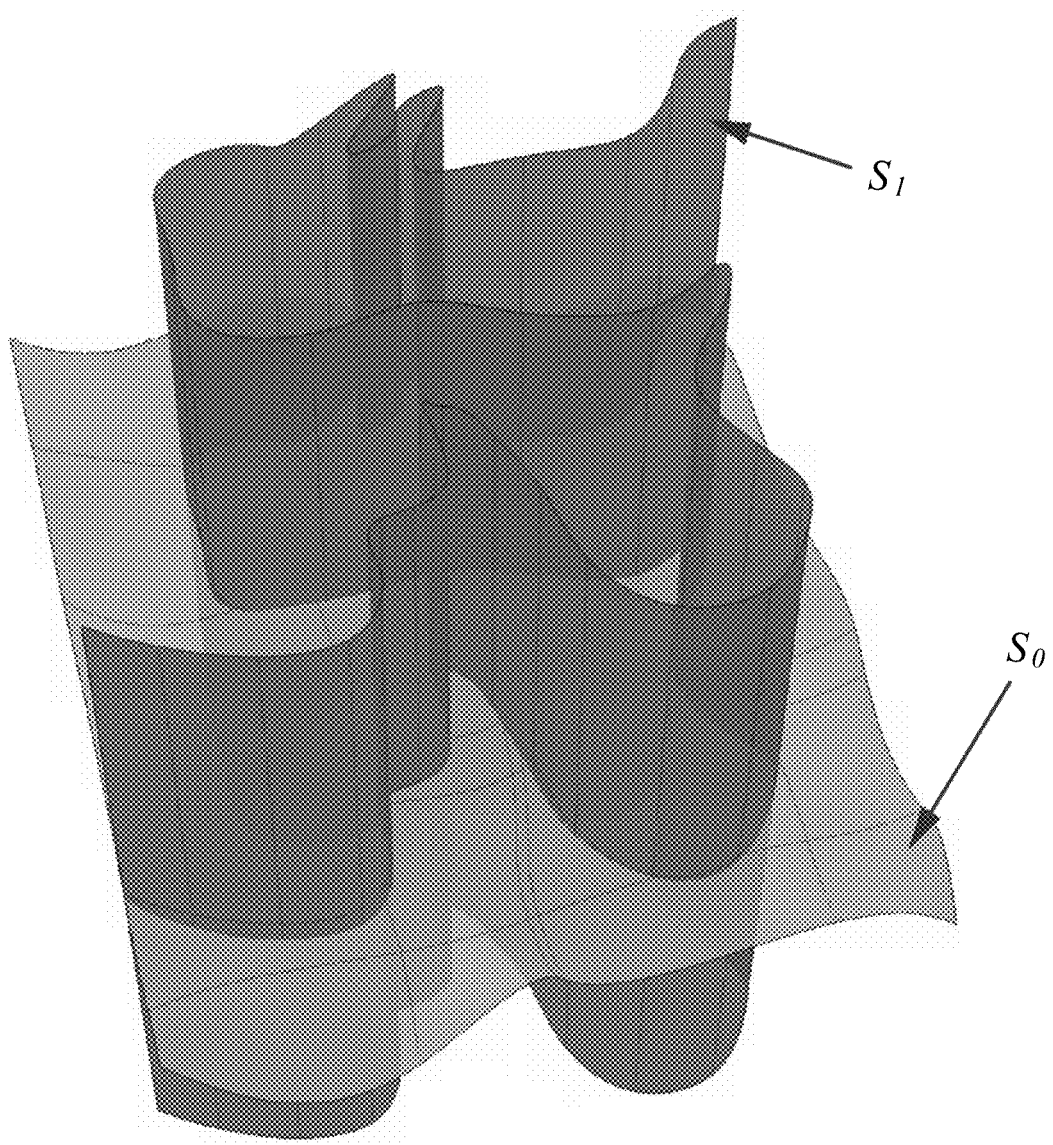
FIGS. 24A-B is an illustration of two spline surfaces $S_0$ and $S_1$ that intersect in model space, according to some embodiments.
Figure 24B:
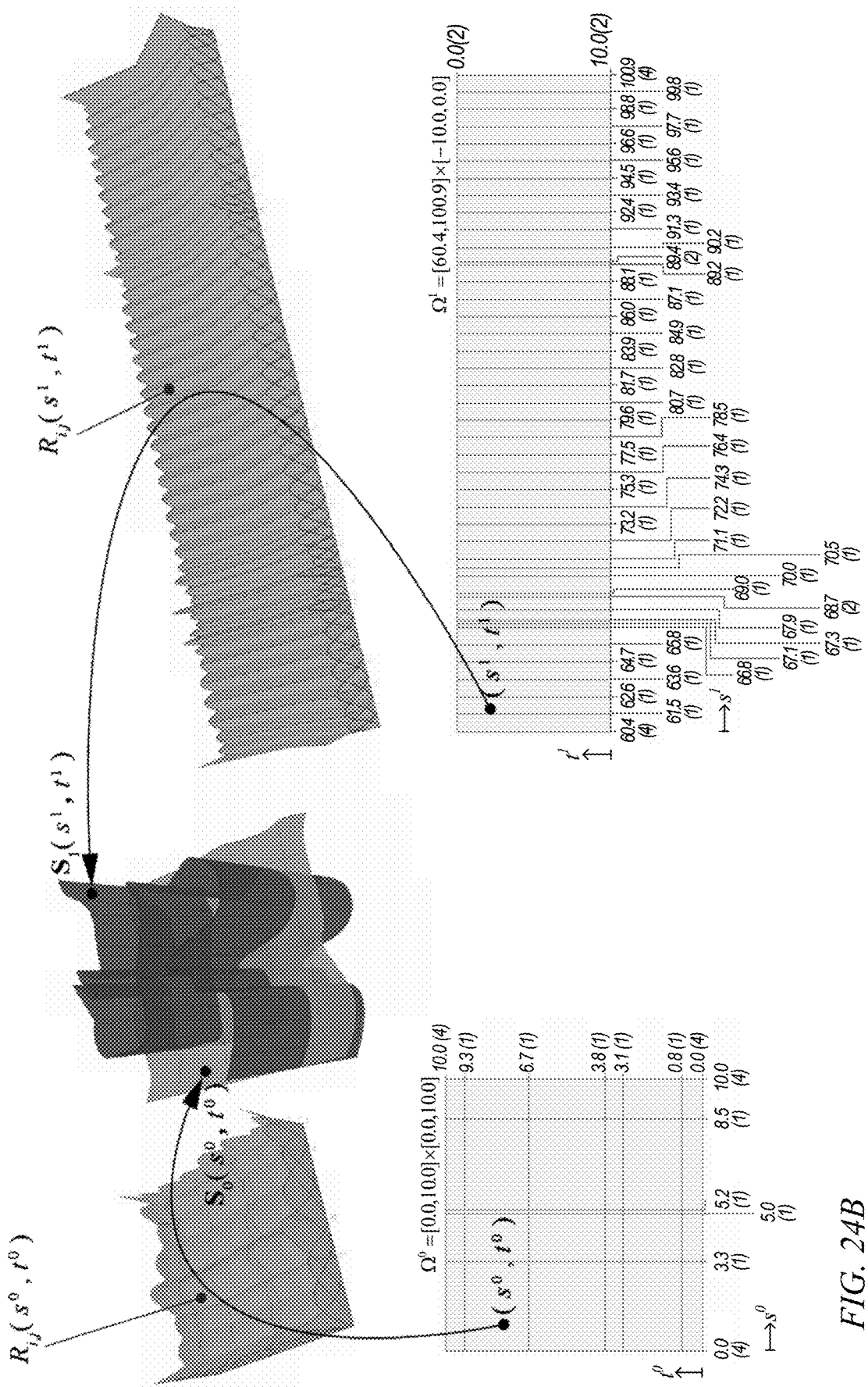

FIGS. 24A-B show two spline surfaces $S_0$ and $S_1$ that intersect in model space. The surface $S_0$ is a bicubic B-spline surface with internal knots in both directions. The surface $S_1$ is a linearly lofted B-spline surface, generated from a highly dynamic cubic curve with internal knots.

Figure 25A:
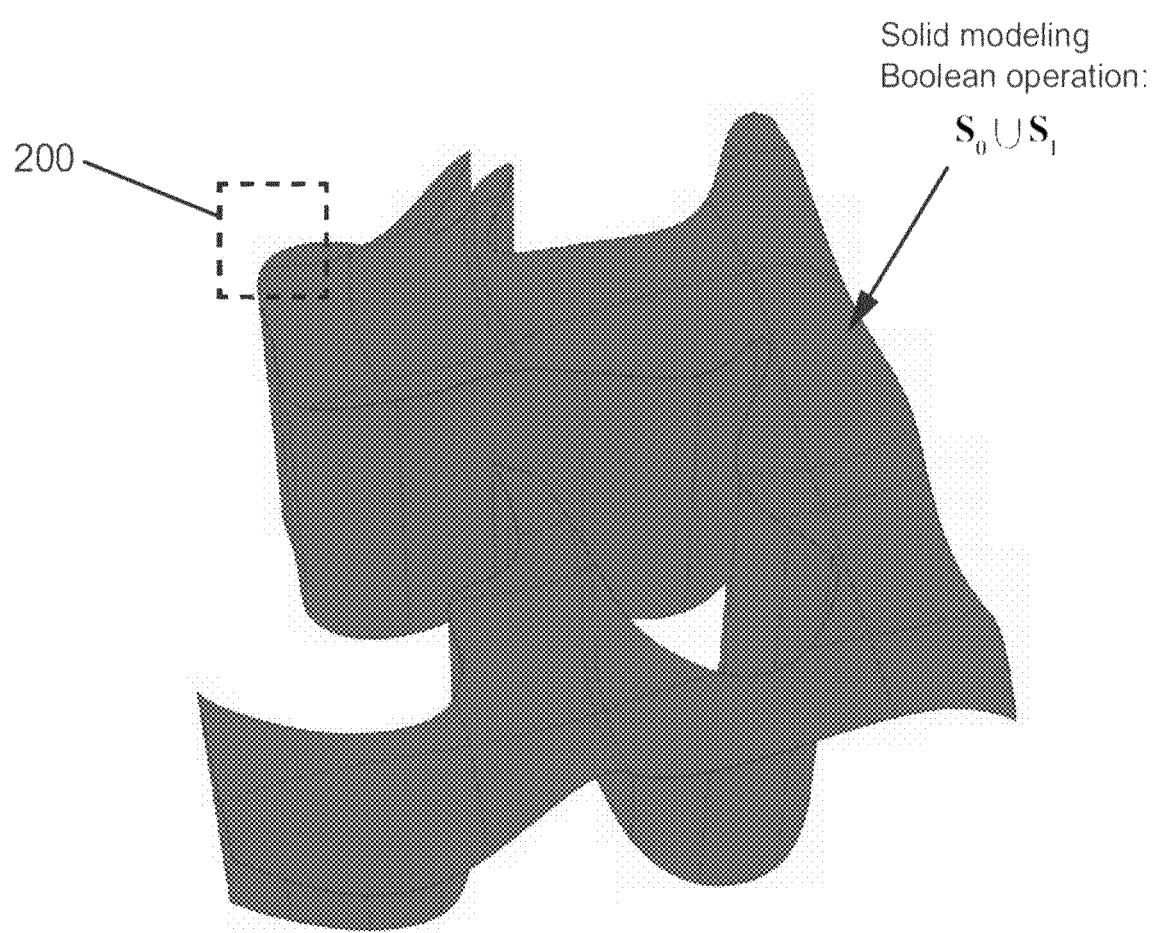
FIG. 25A illustrates an example of the result of a solid modeling Boolean operation with an SSI operation on spline surfaces $S_0$ and $S_1$ shown in FIGS. 24A-B, according to some embodiments.
Figure 25B:
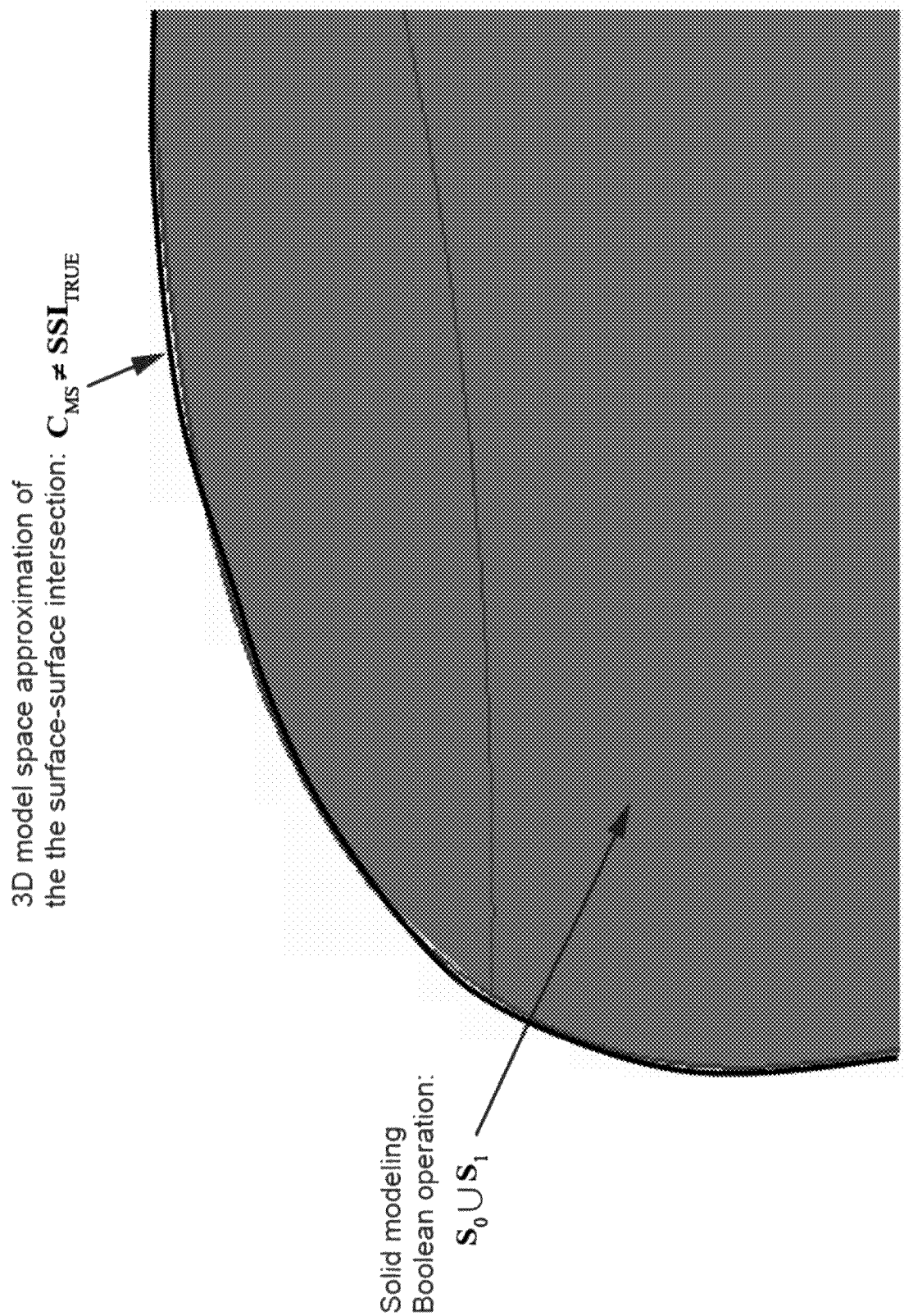
FIG. 25B is a blowup illustration of area 200 detailing the discontinuous gap-replete fashion of the Boolean operation performed as shown in FIG. 25A, according to some embodiments.

FIG. 25A illustrates an example of the result of a solid modeling Boolean operation with an SSI operation on spline surfaces $S_0$ and $S_1$ shown in FIGS. 24A-B. FIG. 25B is a blowup of area 200 detailing the discontinuous gap-replete fashion of the Boolean operation performed as shown in FIG. 25A.

Figure 26A:
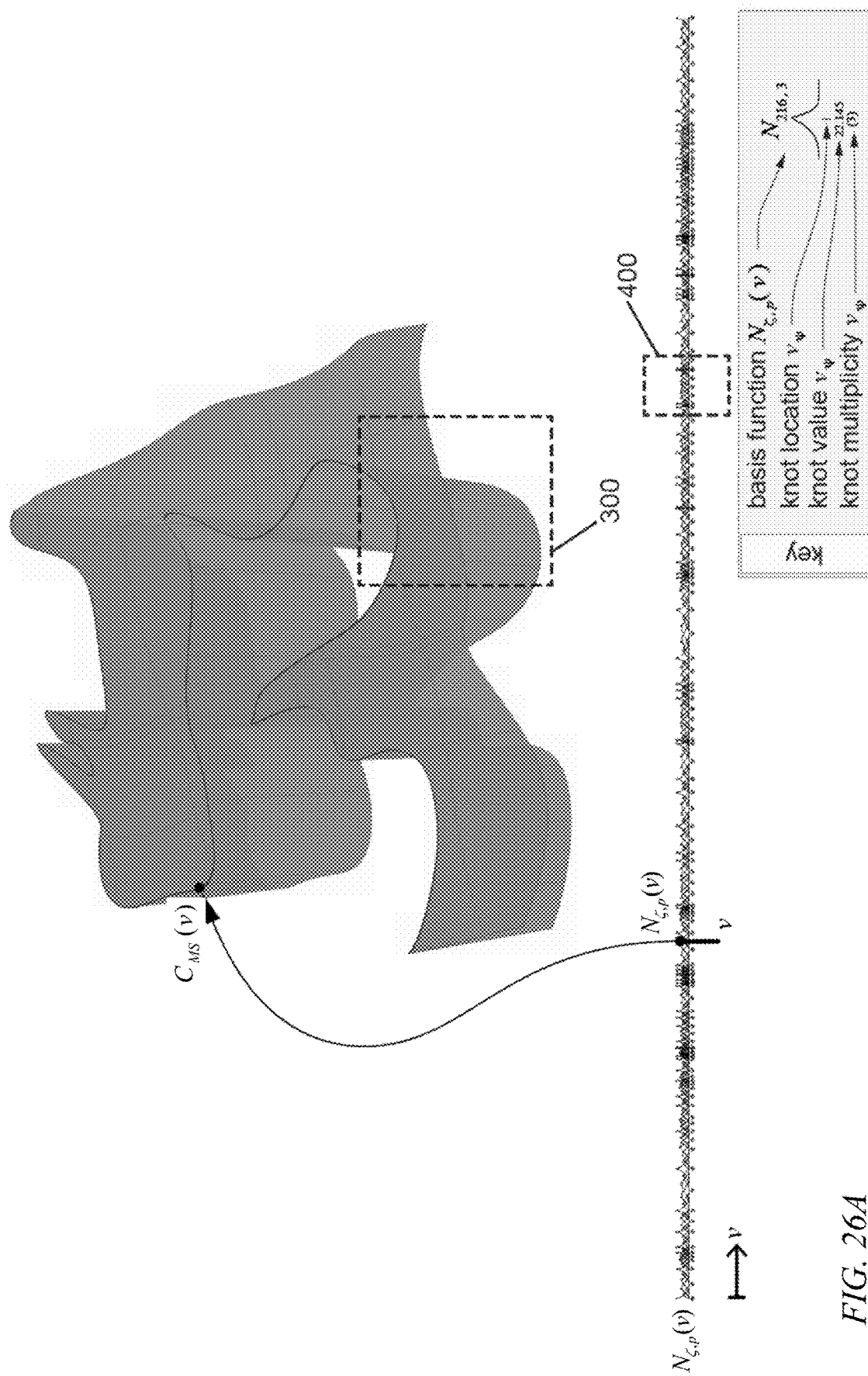
FIGS. 26A-C illustrate the details of the result of the SSI operation shown in FIG. 25A in model space and the various parameter spaces, according to some embodiments.
Figure 26B:
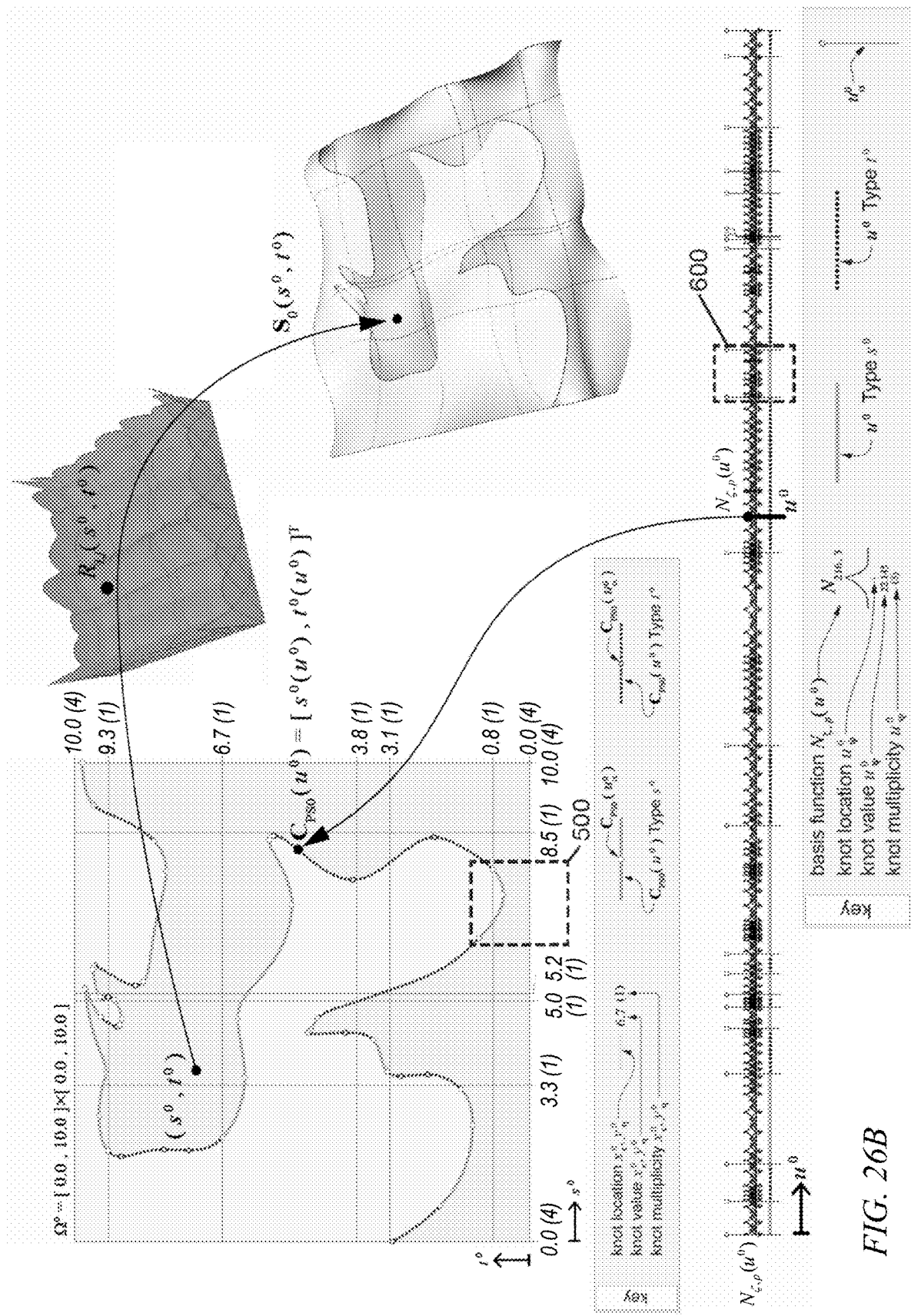
Figure 26C:
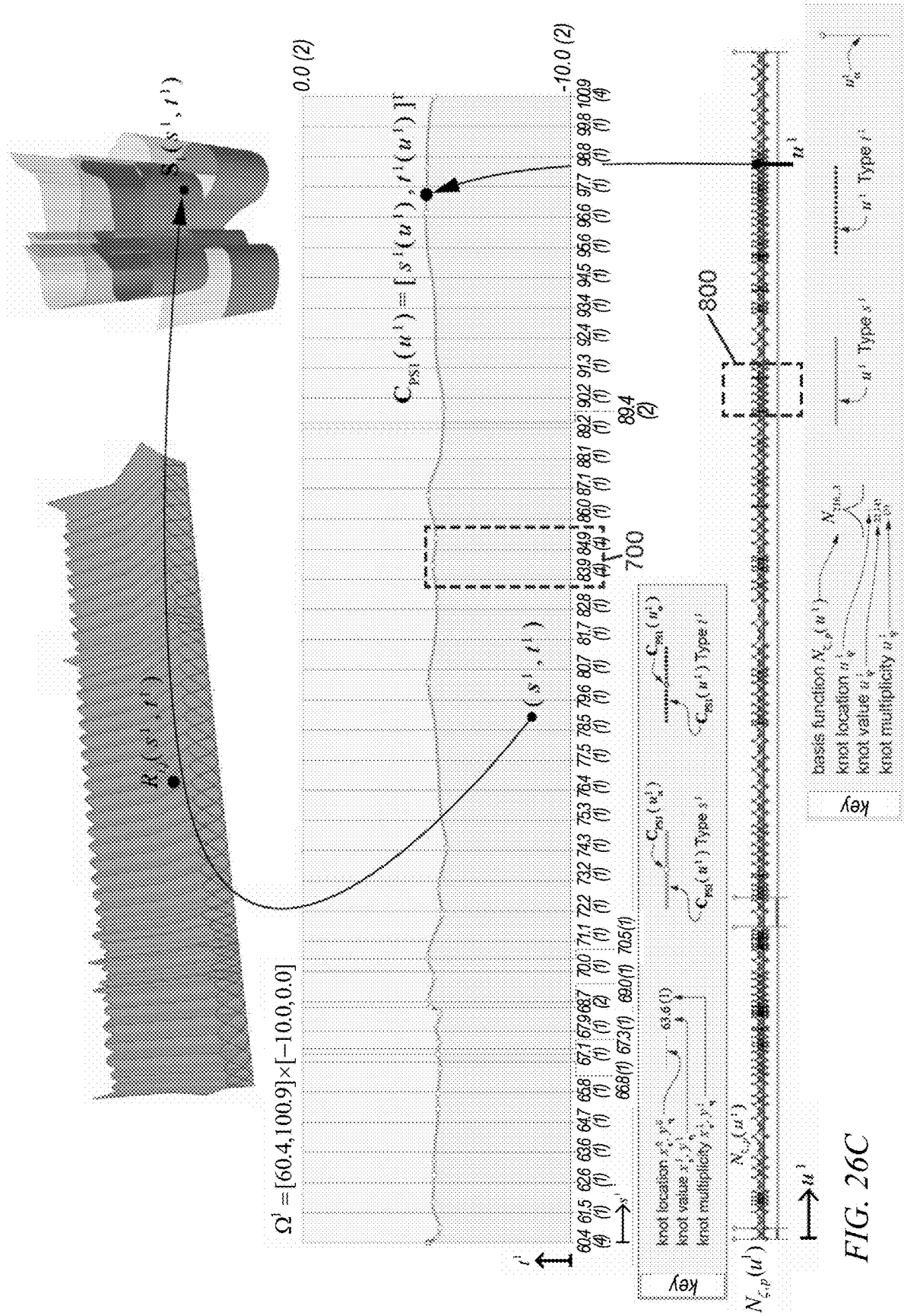

FIGS. 26A-C illustrate the details of the result of the SSI operation shown in FIG. 25A in model space and the various parameter spaces.

Figure 27A:
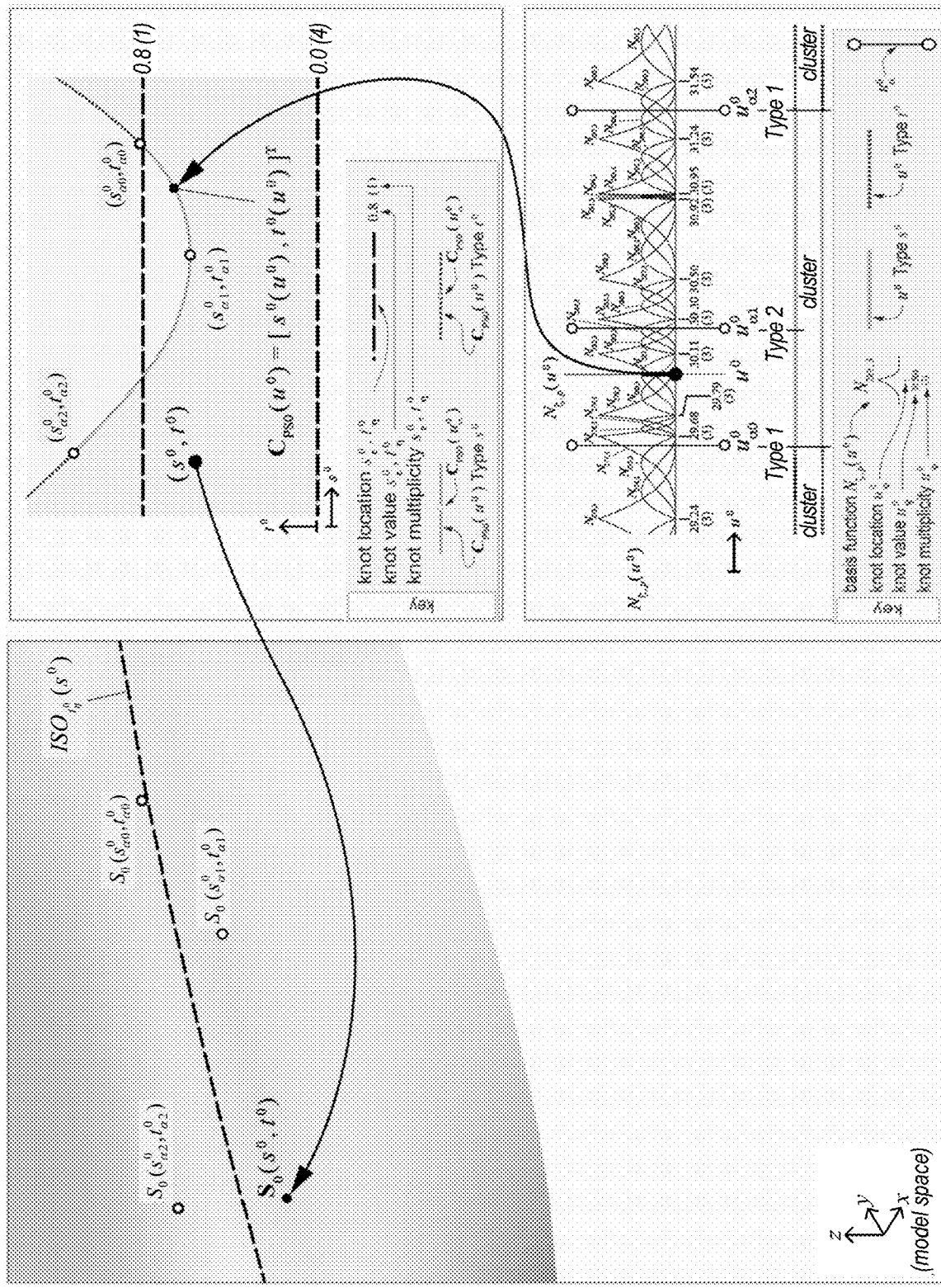
FIG. 27A is an illustration of blowups of areas 300, 500, and 600 for spline surface $S_0$, with details, according to some embodiments.
Figure 27B:
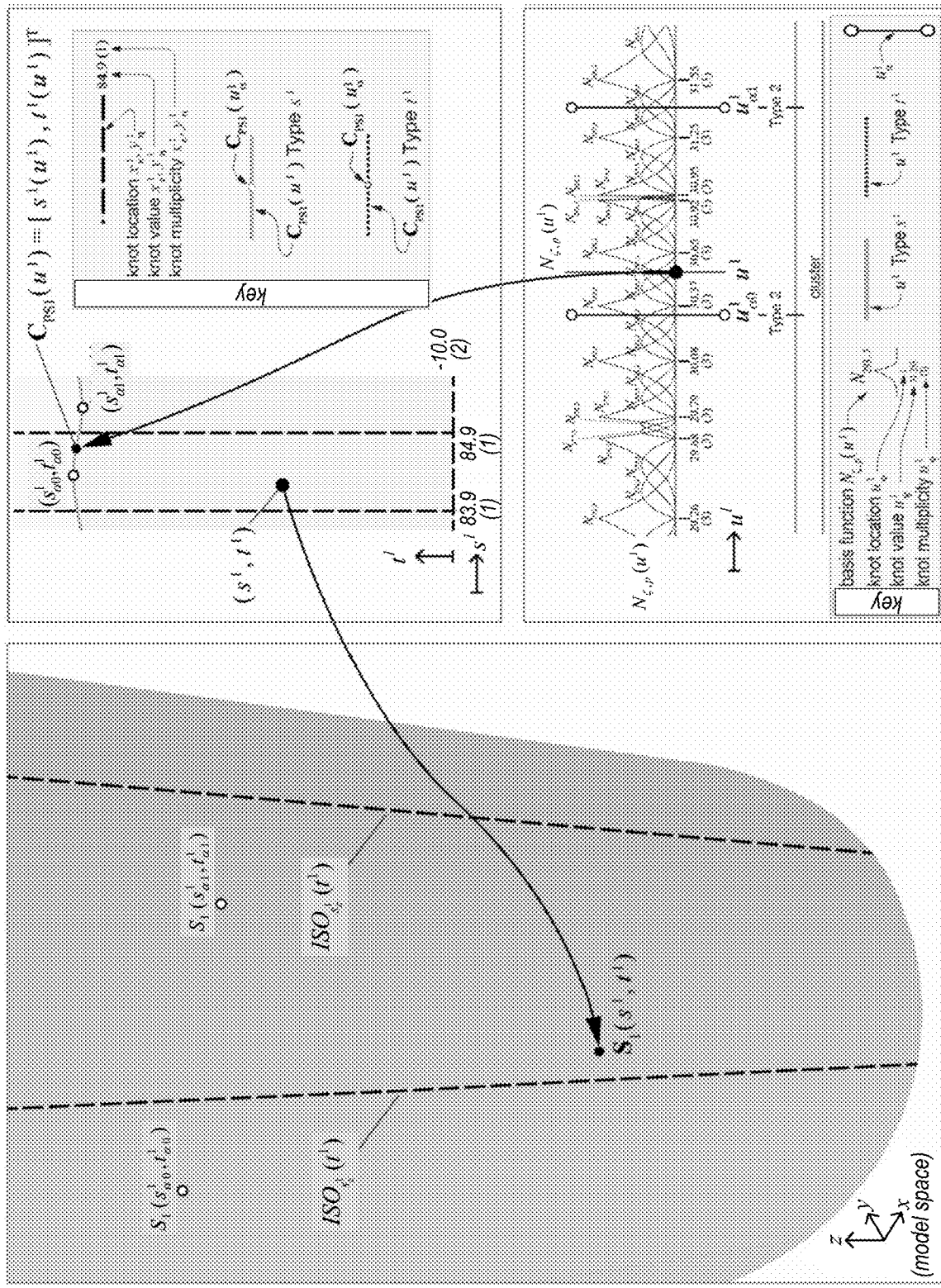
FIG. 27B is an illustration of blowups of areas 300, 700, and 800 for spline surface $S_1$, with details, according to some embodiments.
Figure 27C:
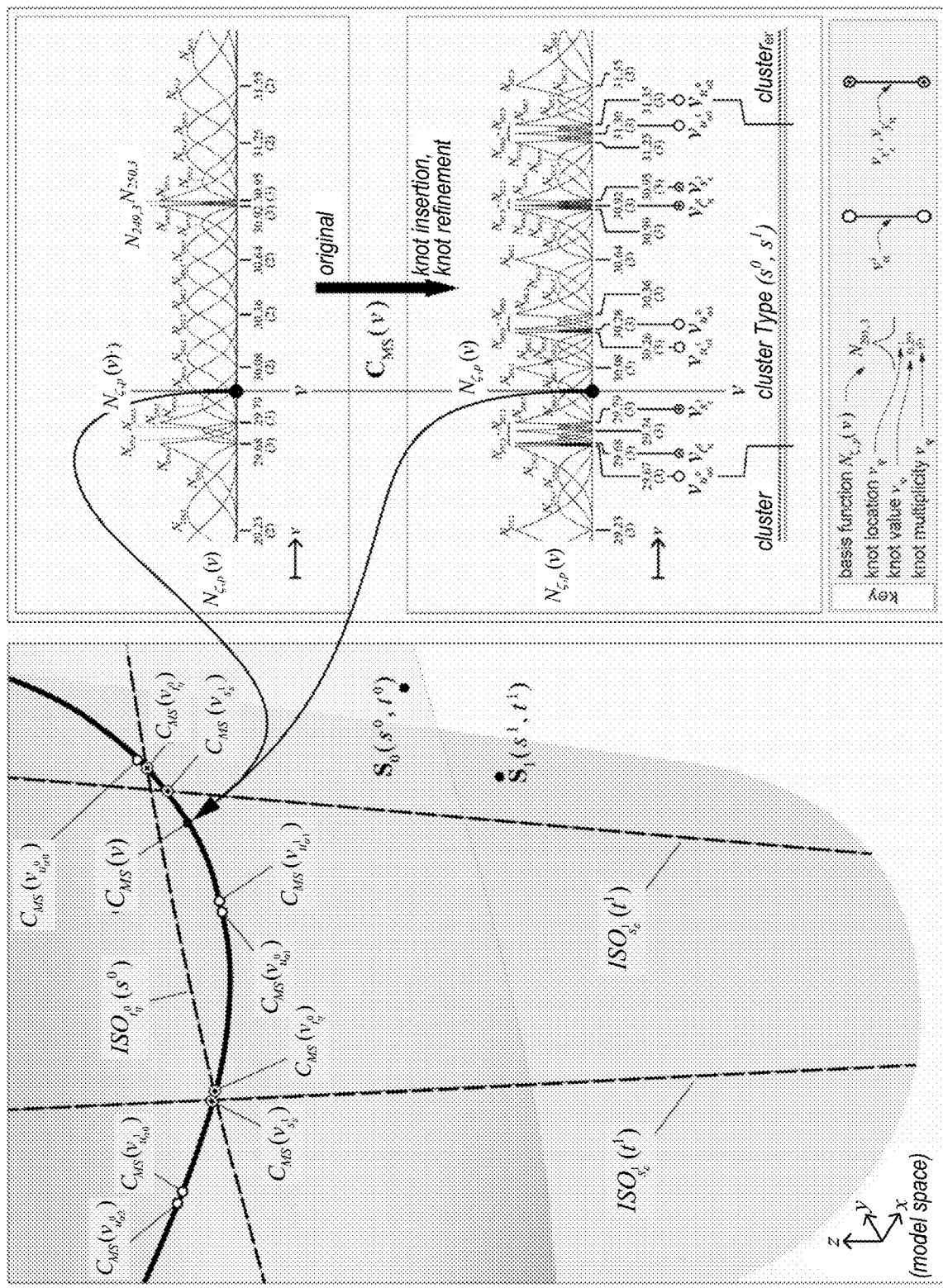
FIG. 27C is an illustration of blowups of areas 300 and 400, with details, along with a detail of the knot refined curve $C_{MS}$, according to some embodiments.

FIG. 27A shows blowups of areas 300, 500, and 600 for spline surface $S_0$, with details. FIG. 27B shows blowups of areas 300, 700, and 800 for spline surface $S_1$, with details. FIG. 27C shows blowups of areas 300 and 400, with details, along with a detail of the knot refined curve $C_{MS}$.

Figure 28:
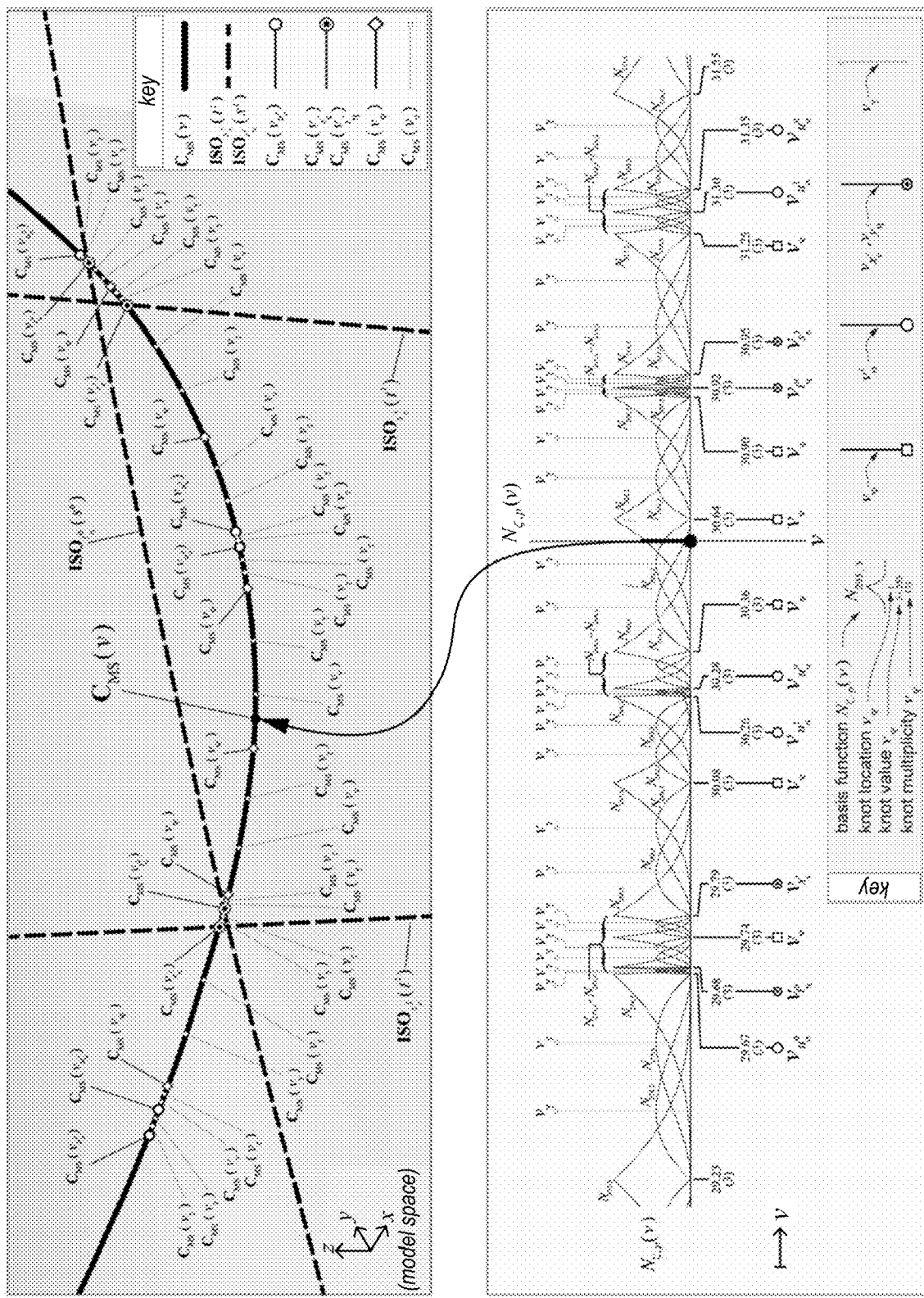
FIG. 28 is an illustration of a detail of the knot refined curve $C_{MS}$ with sample points shown, according to some embodiments.
Figure 29A:
FIGS. 29A-D is an illustration of isocurve sampling of surfaces $S_0$ and $S_1$, with both versions of untrimmed and trimmed isocurves at $C_{MS}$, according to some embodiments.
Figure 29B:
Figure 29C:
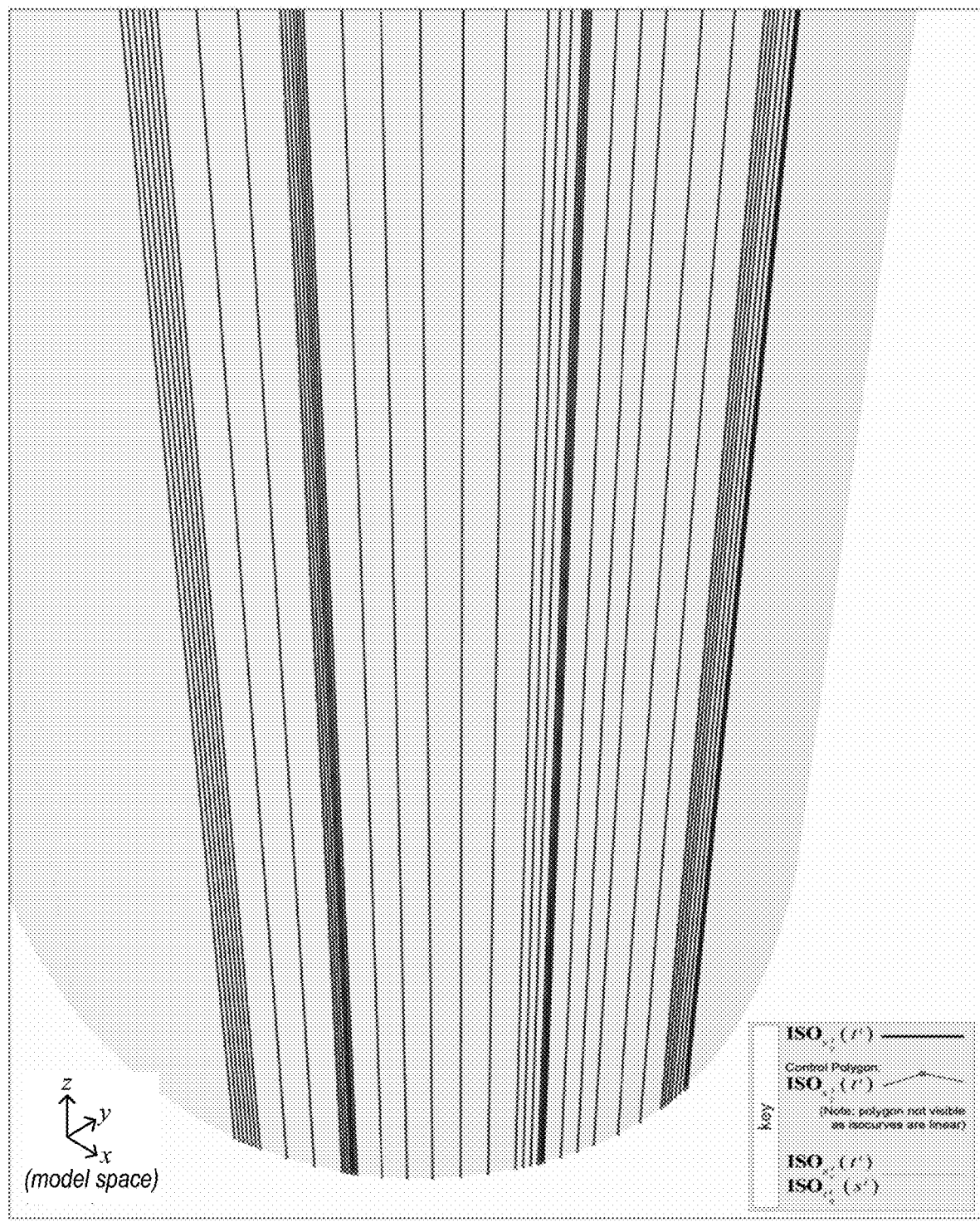
Figure 29D:
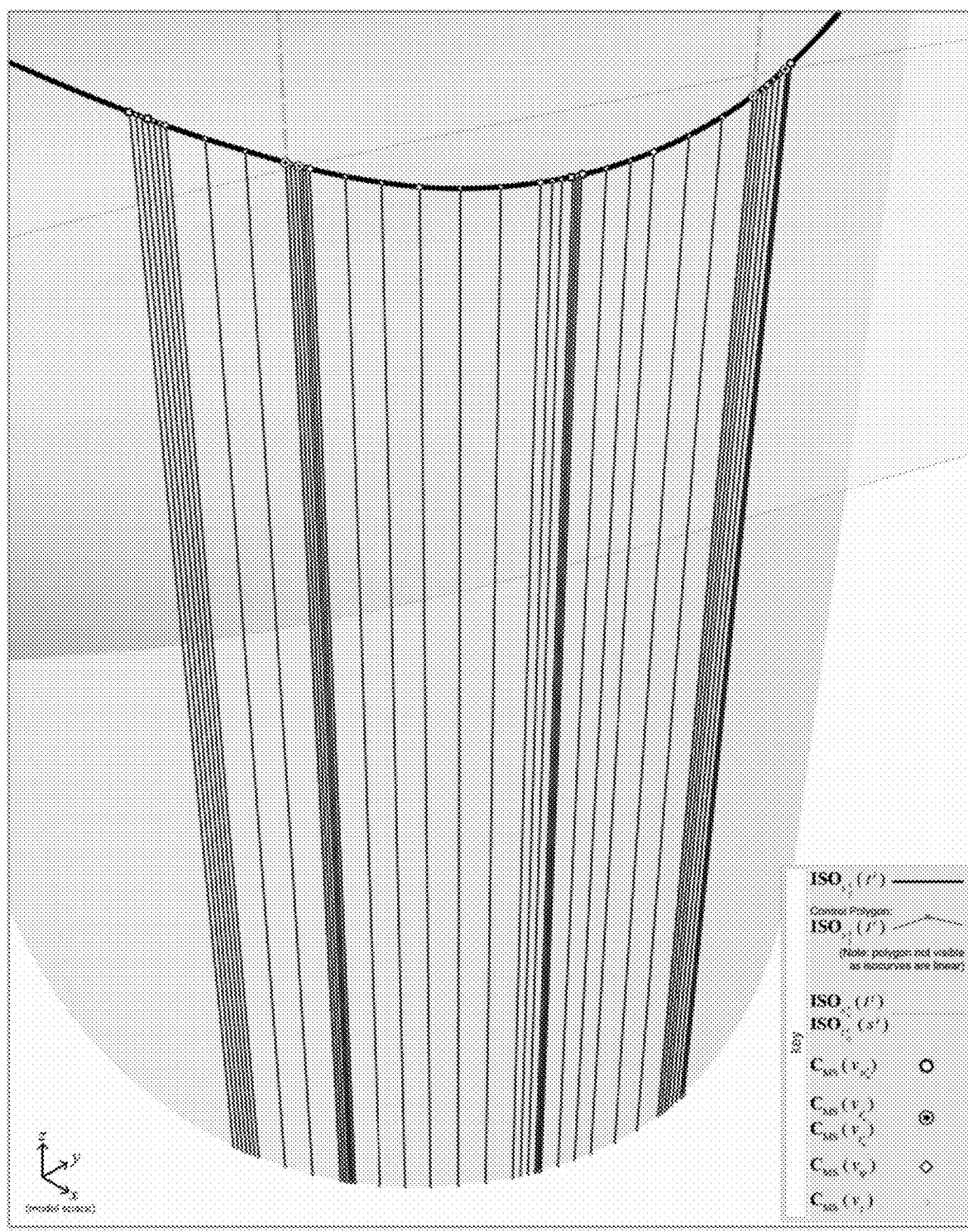
Figure 30A:
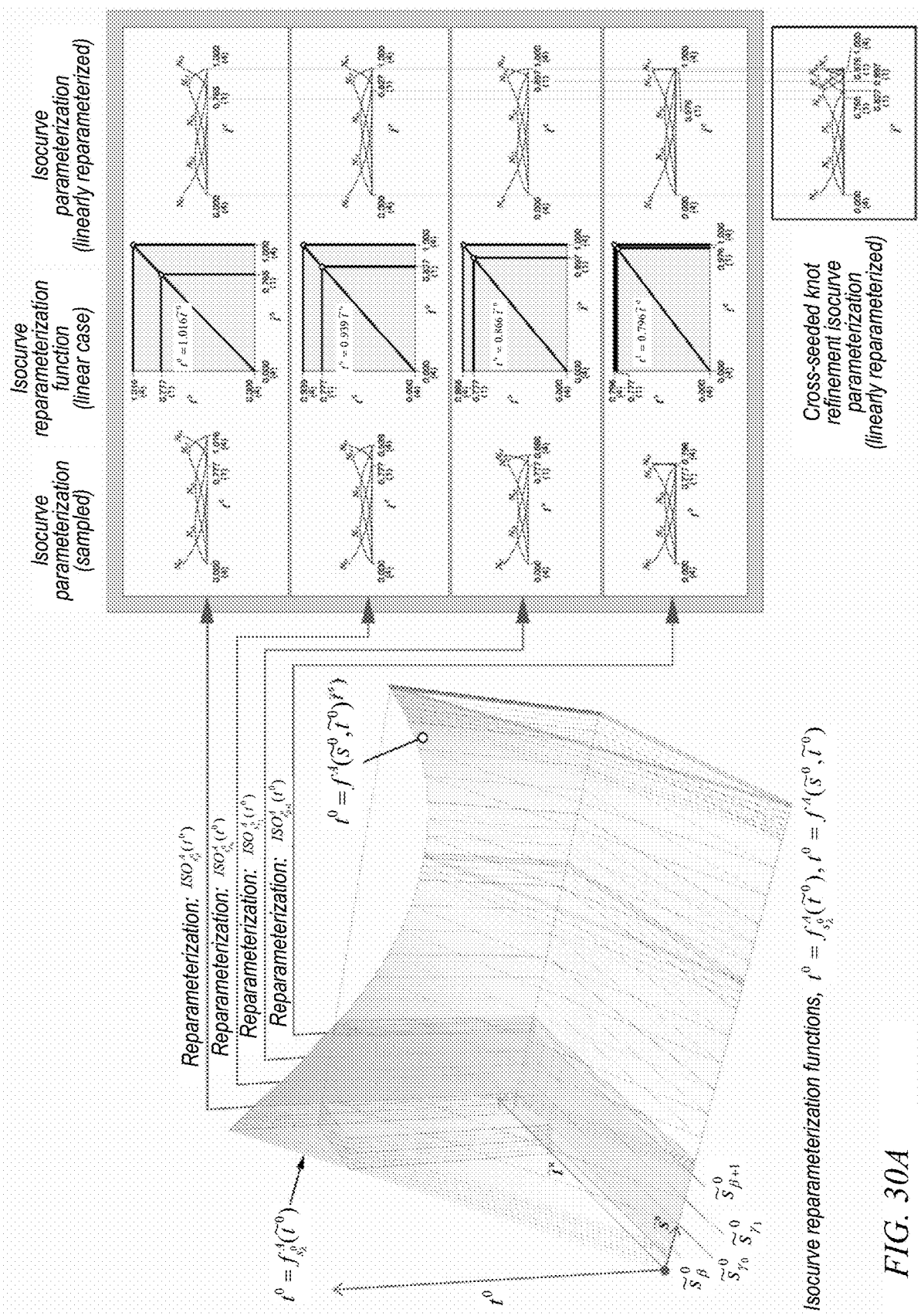
FIGS. 30A-D is an illustration of an example of linear isocurve reparameterization for isocurve sampling of surfaces $S_0$ and $S_1$, according to some embodiments.
Figure 30B:
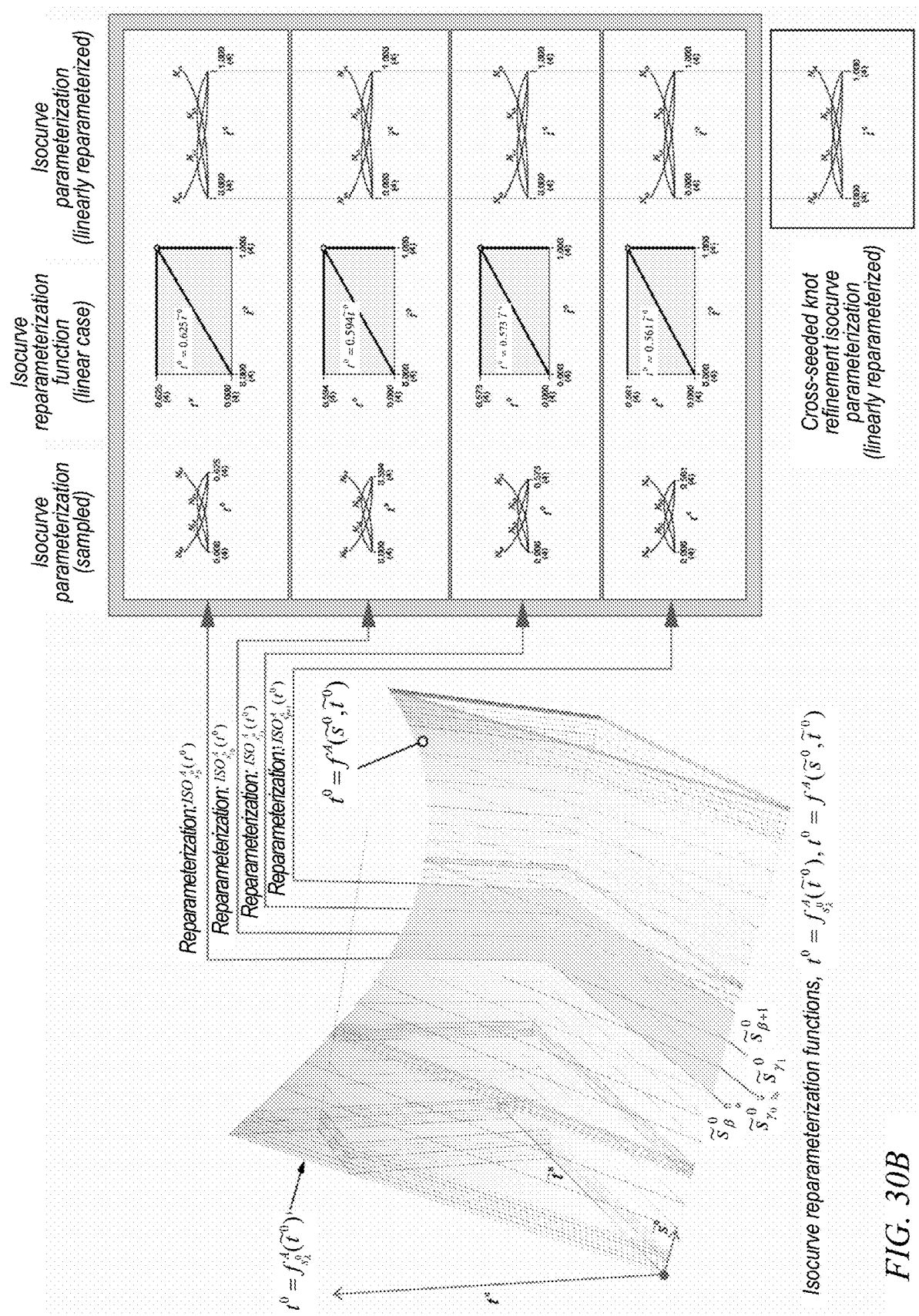
Figure 30C:
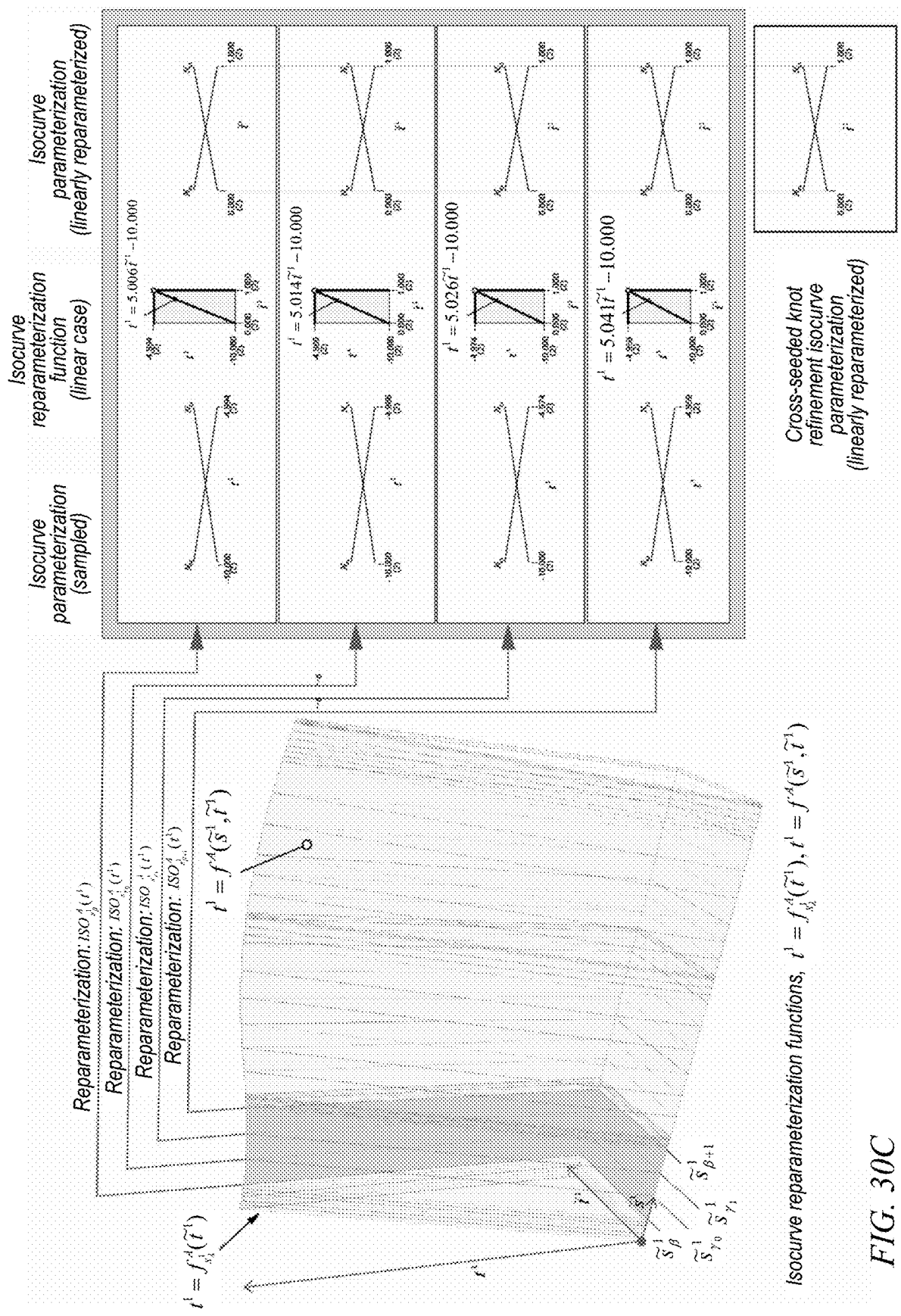
Figure 30D:
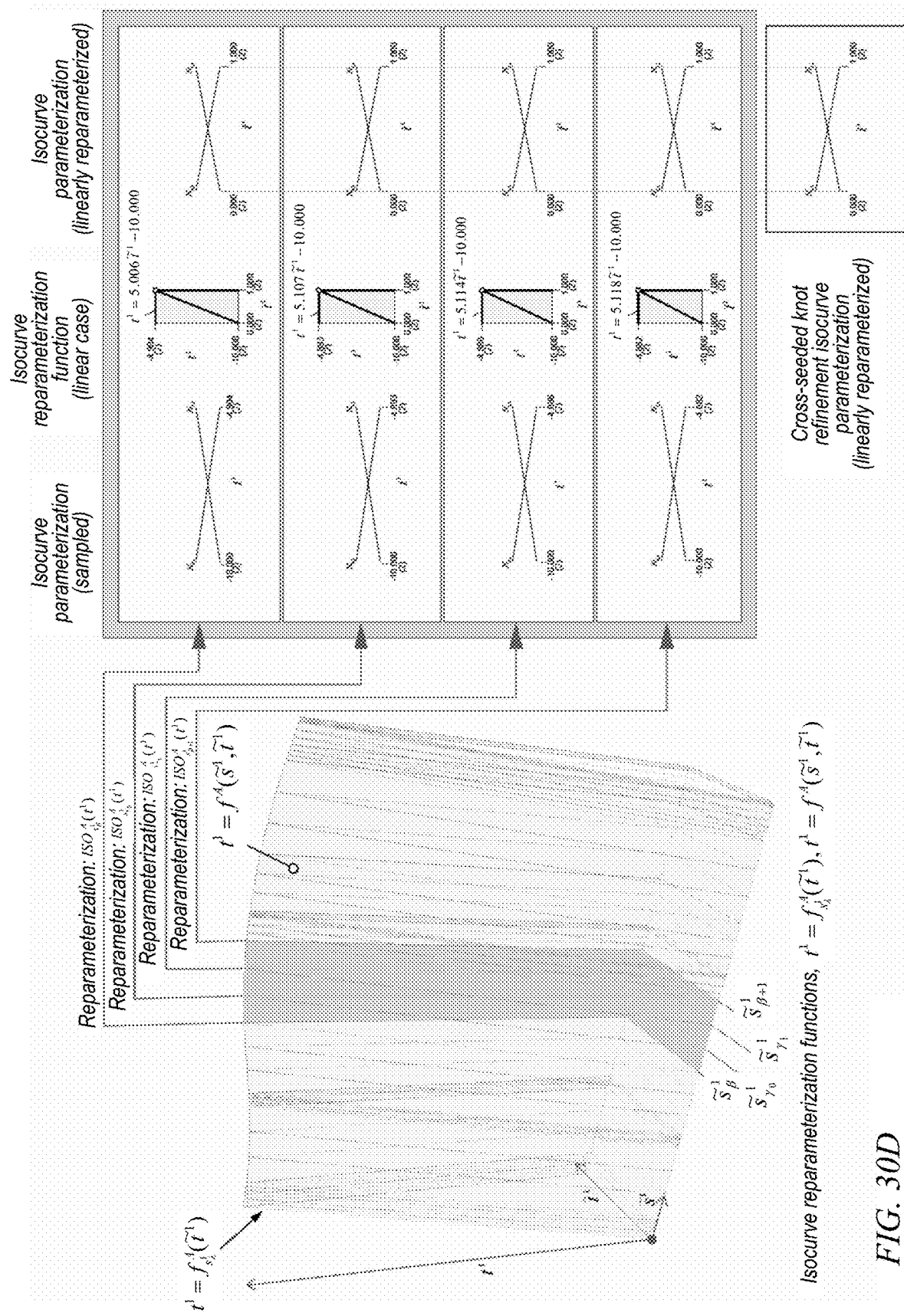

FIG. 28 shows a detail of the knot refined curve $C_{MS}$ with sample points shown. In this example the sample points are Greville points of $C_{MS}$.

FIGS. 29A-D shows isocurve sampling of surfaces $S_0$ and $S_1$, with both versions of untrimmed and trimmed isocurves at $C_{MS}$.

FIGS. 30A-D shows an example of linear isocurve reparameterization for isocurve sampling of surfaces $S_0$ and $S_1$.

Figure 31A:
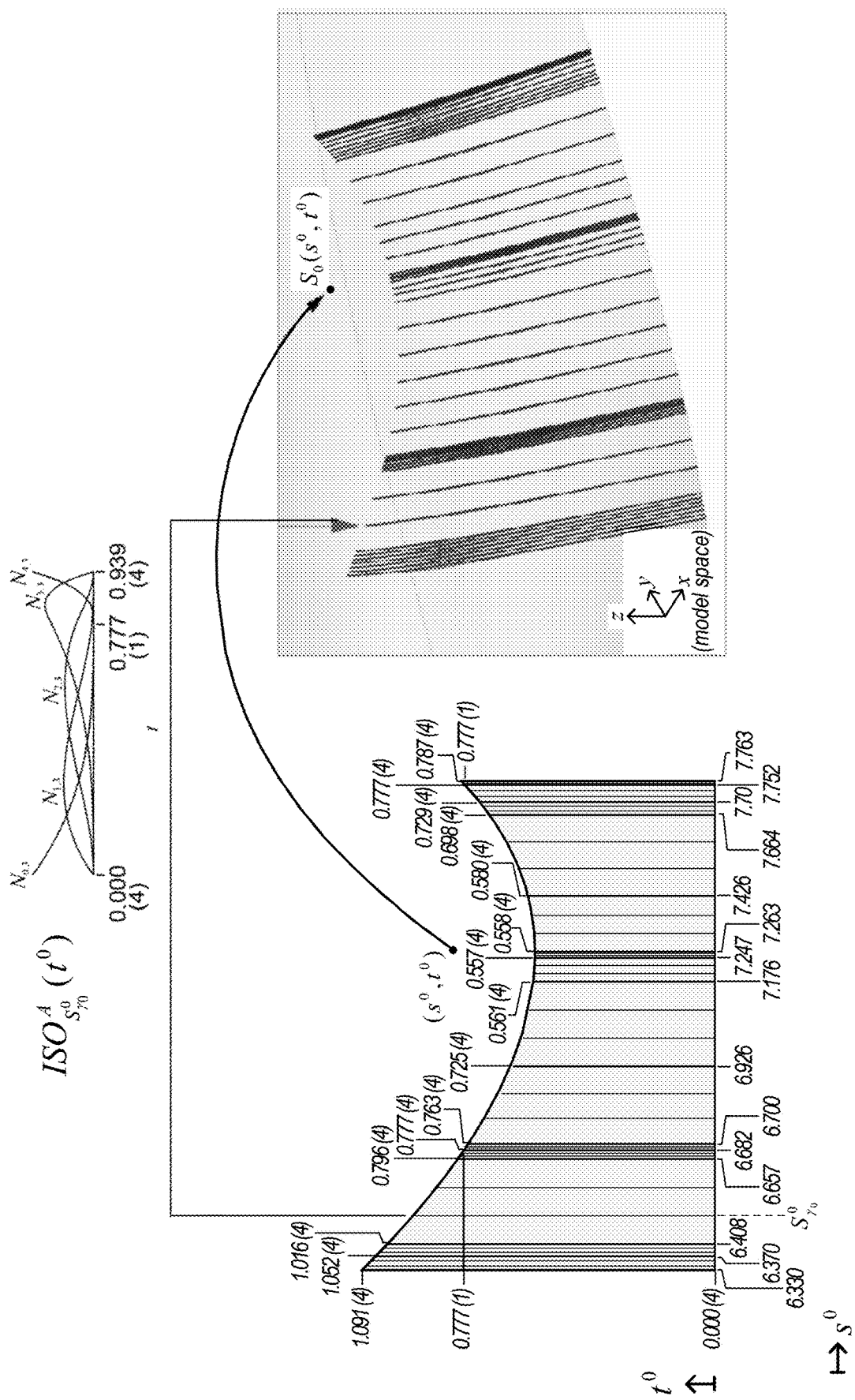
FIG. 31A is an illustration of isocurve sampling of surface $S_0$ with its parameter space, according to some embodiments.
Figure 31B:
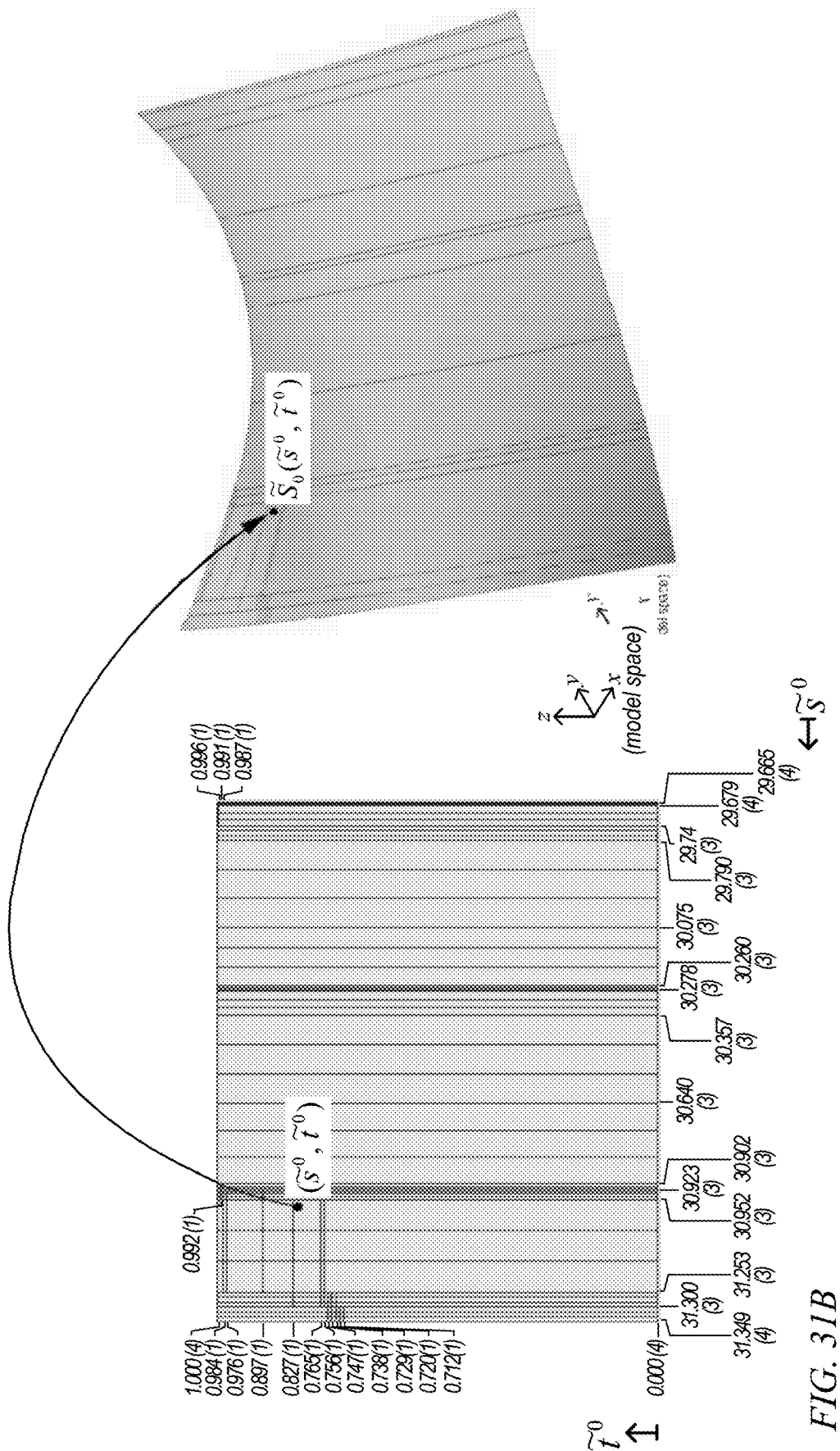
FIG. 31B is an illustration of a reconstructed T-spline surface $\tilde{S}_0$ with its respective parameter space, according to some embodiments.
Figure 31C:
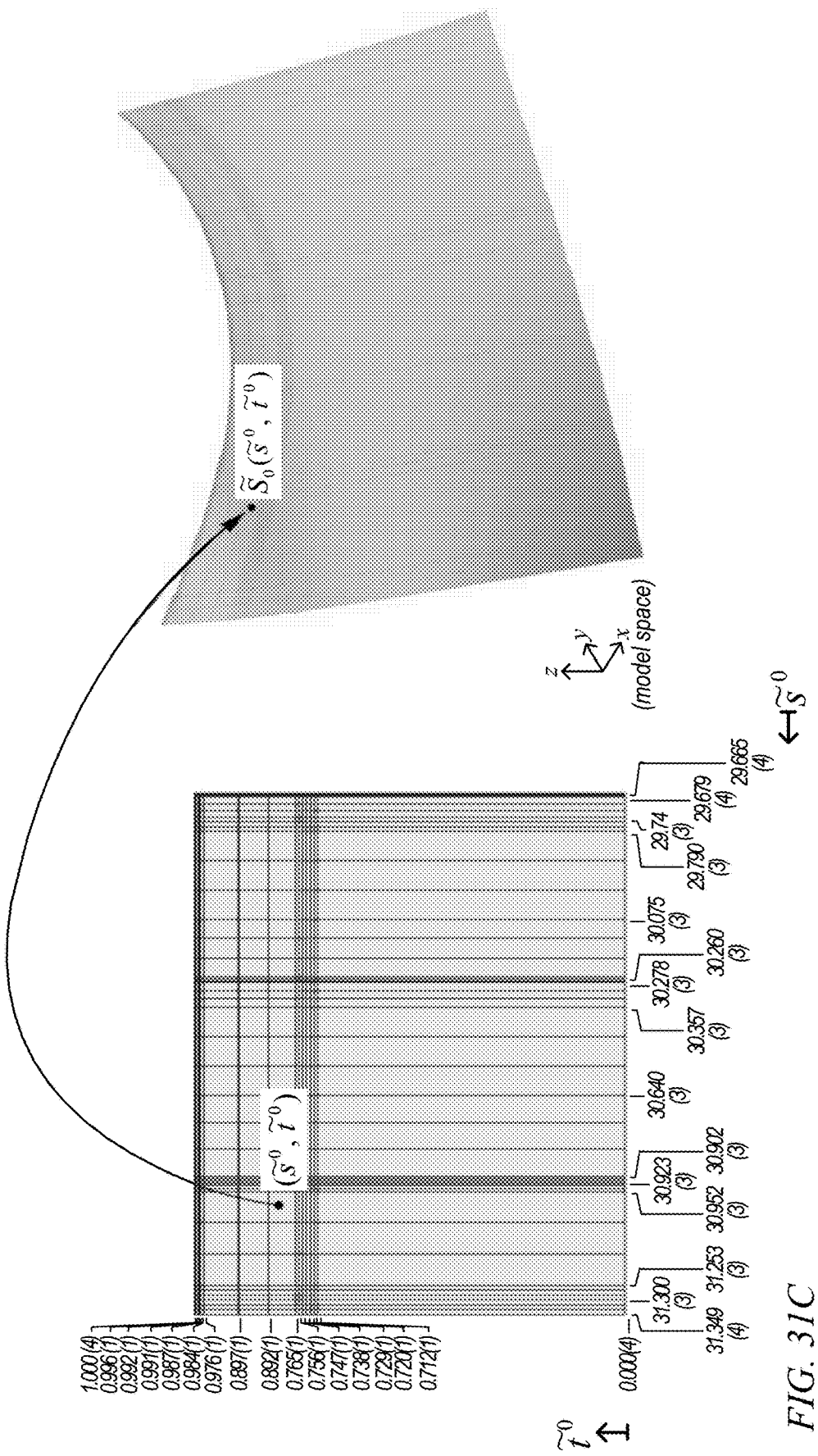
FIG. 31C is an illustration of a reconstructed B-spline surface $\tilde{S}_0$ with its respective parameter space, according to some embodiments.
Figure 31D:
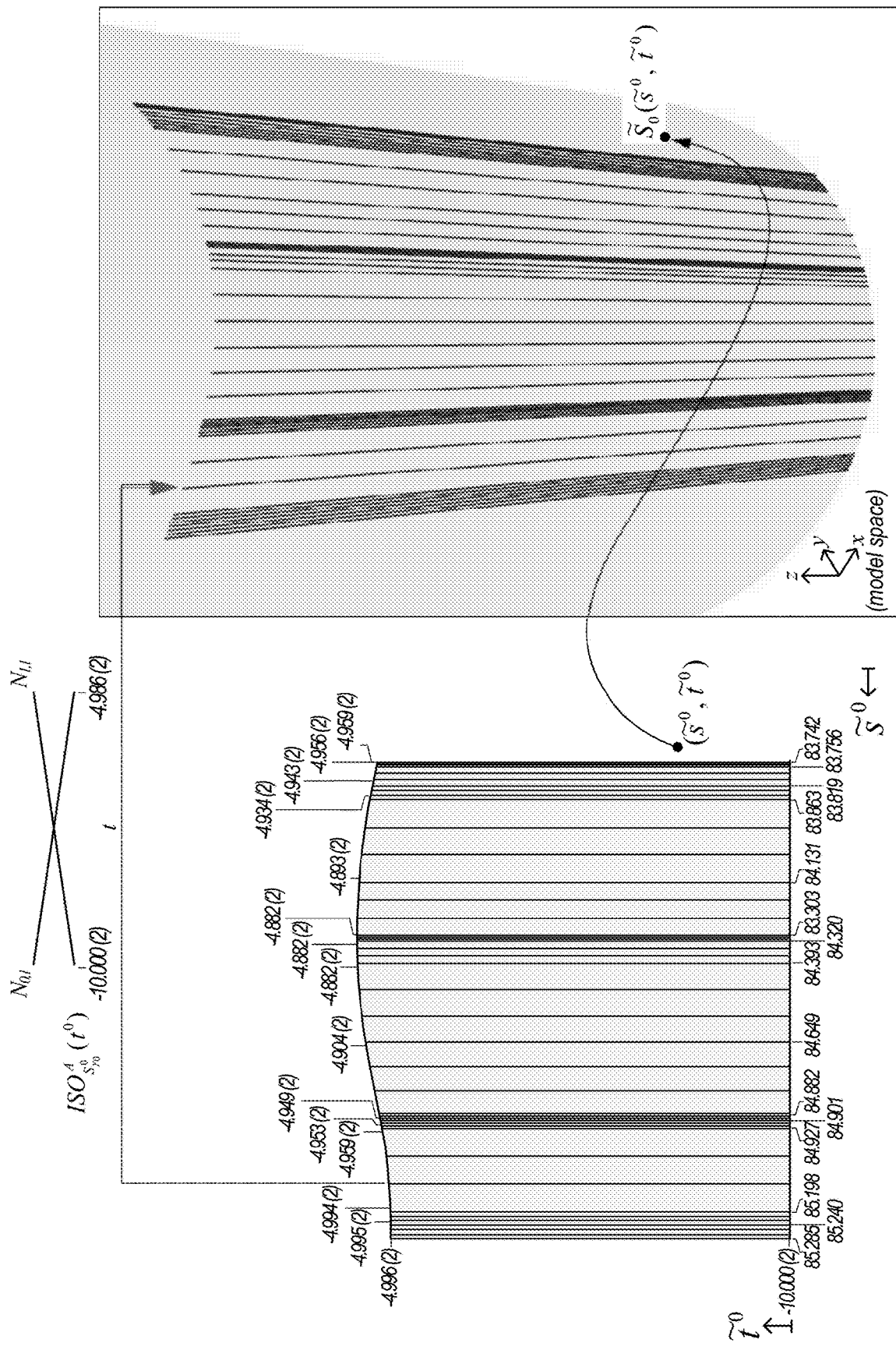
FIG. 31D is an illustration of isocurve sampling of surface $S_1$ with its parameter space, according to some embodiments.
Figure 31E:
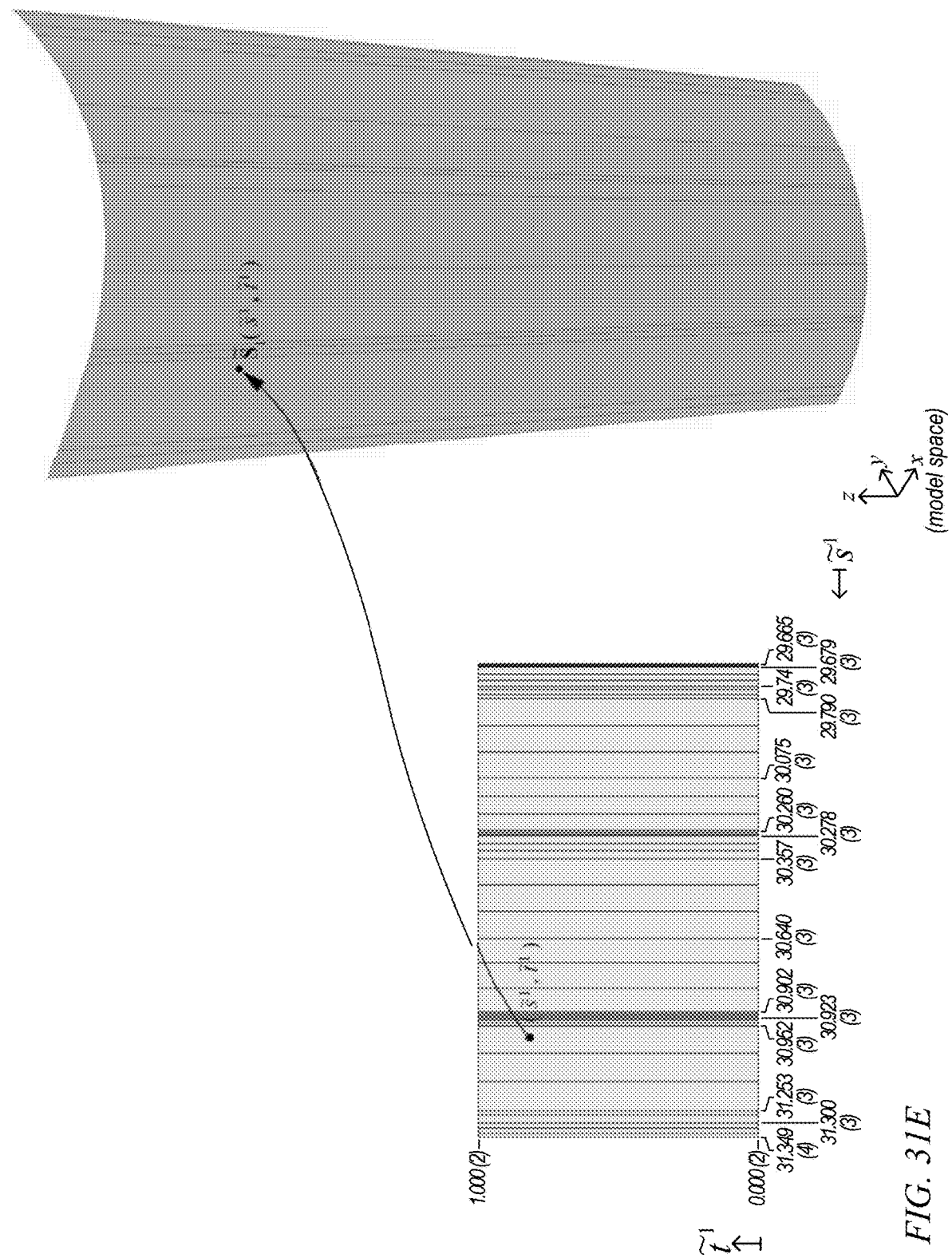
FIG. 31E is an illustration of a reconstructed B-spline surface $\tilde{S}_1$ with its respective parameter space, according to some embodiments.

FIG. 31A shows isocurve sampling of surface $S_0$ with its parameter space. FIG. 31B shows reconstructed T-spline surface $\tilde{S}_0$ with its respective parameter space. FIG. 31C shows reconstructed B-spline surface $\tilde{S}_0$ with its respective parameter space. FIG. 31D shows isocurve sampling of surface $S_1$ with its parameter space. FIG. 31E shows reconstructed B-spline surface $\tilde{S}_1$ with its respective parameter space.

Figure 32A:
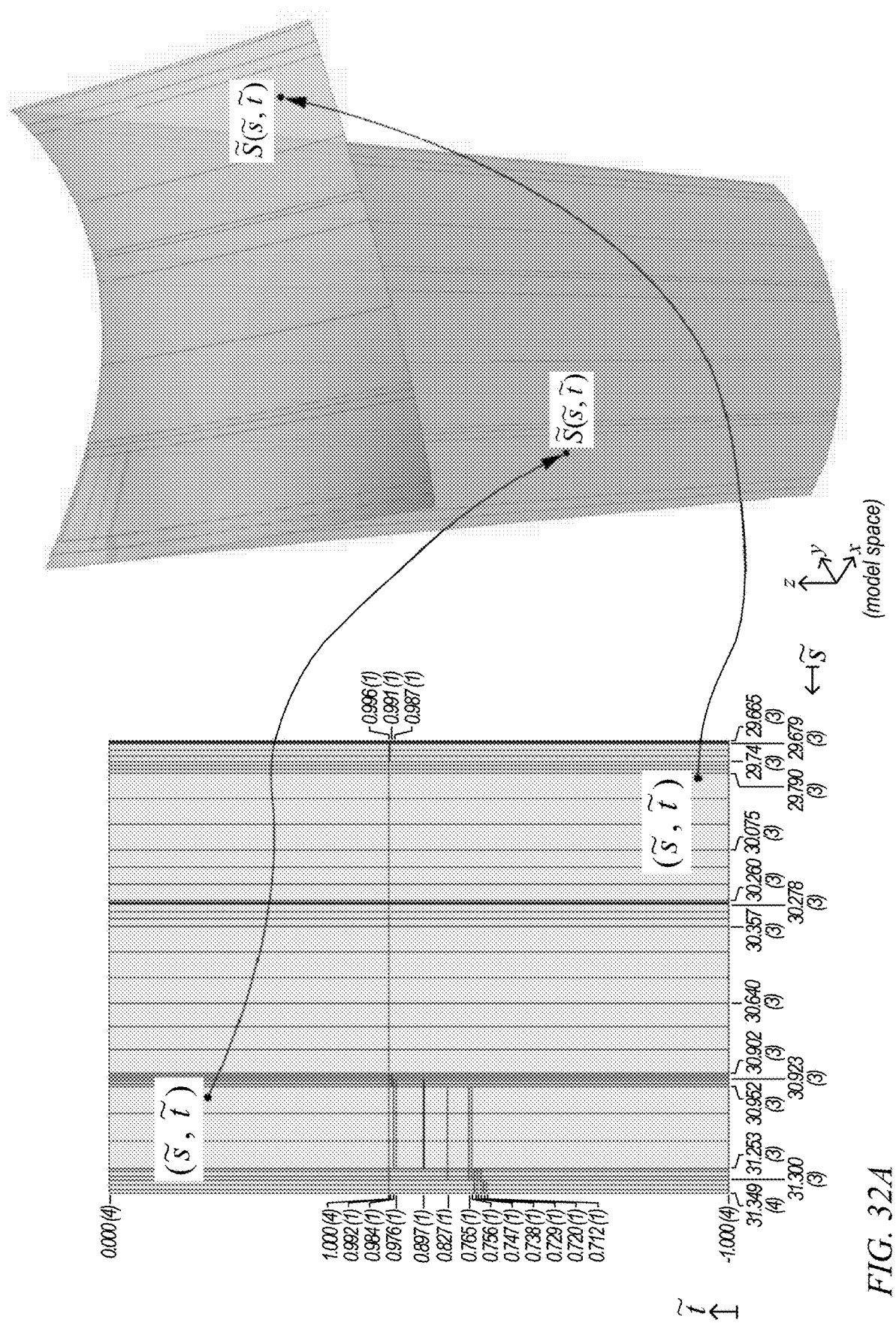
FIG. 32A is an illustration of a T-spline surface $\tilde{S}$ as a union of $\tilde{S}_0$ and $\tilde{S}_1$ with its global parameter space, according to some embodiments.
Figure 32B:
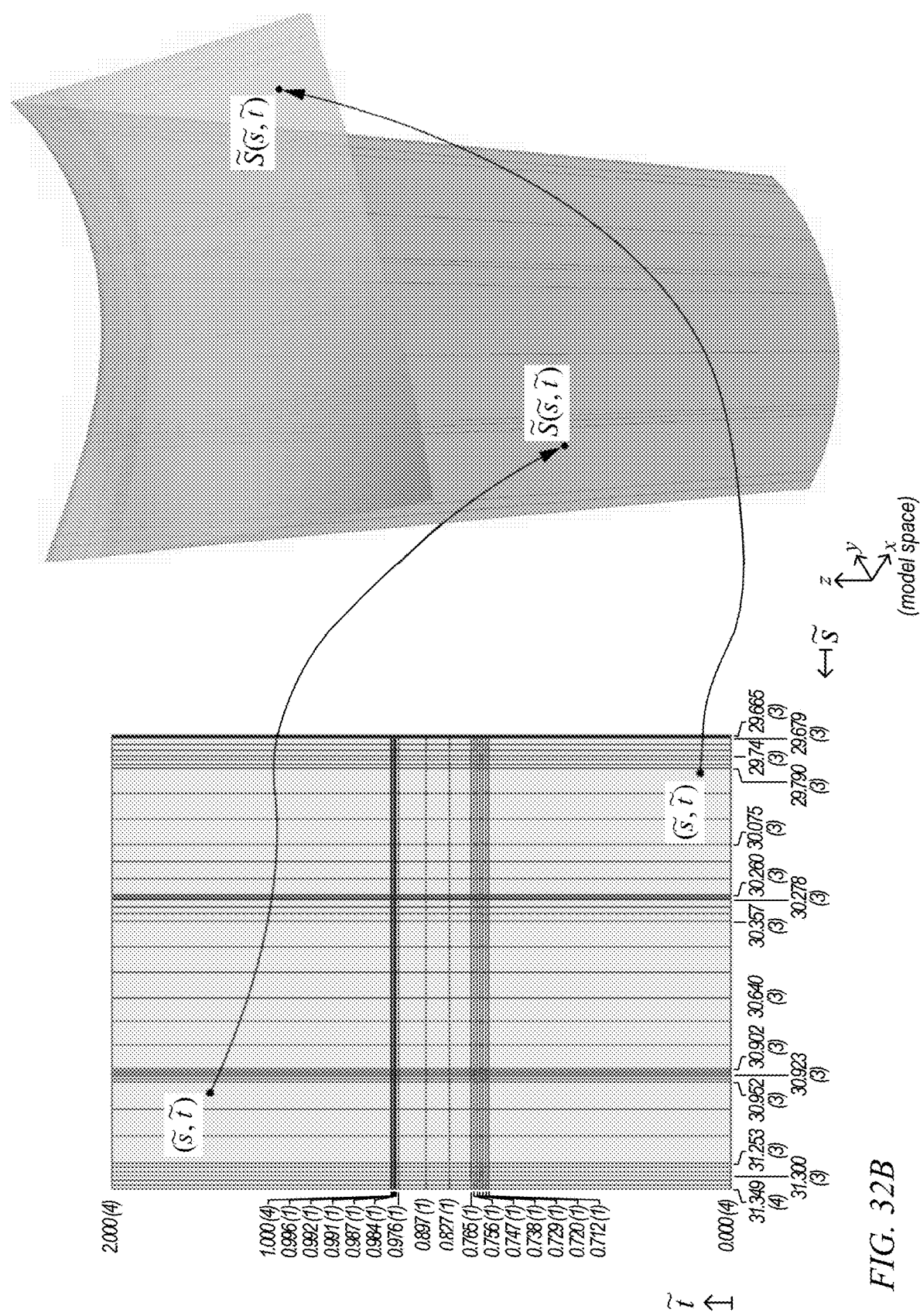
FIG. 32B is an illustration of a B-spline surface $\tilde{S}$ as a union of $\tilde{S}_0$ and $\tilde{S}_1$ with its global parameter space, according to some embodiments.

FIG. 32A shows T-spline surface $\tilde{S}$ as a union of $\tilde{S}_0$ and $\tilde{S}_1$ with its global parameter space. FIG. 32B shows B-spline surface $\tilde{S}$ as a union of $\tilde{S}_0$ and $\tilde{S}_1$ with its global parameter space.

Cad Kernel Implementation

In one set of embodiments, we contemplate a dynamic method for operating on spline surfaces to create corresponding output surfaces (of corresponding sets of output surfaces) so that: the boundary of each output surface includes a model space curve that approximates the geometric intersection of the spline surfaces; and each output surface geometrically approximates a trimmed version of the corresponding spline surface. Thus, the output surfaces meet in a $C^0$ continuous fashion along the model space curve. The dynamic method may operate in the kernel of a CAD software system, e.g., as part of a Boolean operation, and may include many of the features described above in connection with the Post-SSI algorithm. However, the dynamic method may create the model space curve $C_{MS}$ and the parameter space trim curves $\{C_{PSi}\}$ instead of receiving those curves as input data.

In some embodiments, the dynamic method may control the process of calculating the set of intersection points $SOP_{MS}$, the sets of points $SOP_{PS0}$ and $SOP_{PS1}$. In particular, the dynamic method may arrange to calculate these sets of points so as to furnish the requisite surface reconstruction data in the most minimal and precise way possible.

Additional Procedures for the Construction of Spline Surfaces to Provide Inter-Surface Continuity Global Parameter Space Reconstruction of Tensor Product Spline Surfaces by Nonlinear Reparameterization Surface Functions of Isoparametric Curves Tensor product spline surfaces have come to dominate the geometric databases of modern Computer-Aided Design (CAD) applications. Used to describe complicated real world models, intersecting spline surfaces are known to create complex nonlinear exact solutions of a very high degree when Boolean operations are performed. Referred to as the surface-surface intersection (SSI) issue, or the trim problem, CAD applications have addressed this matter by approximating these intersections, thus introducing gaps between the discrete surfaces. Methods to reconstruct spline surfaces at trim edges resulting in watertight models seek to represent the users' design intent, as well as making the model suitable for downstream processing in computational analysis and manufacturing. This process should reconstruct the representation in both geometric and parametric terms, although often only the geometric portion is considered. Alternatively, herein we describe an admissible global parameter space created from the original tensor product splines in order to build such watertight representations. The continuity afforded from this achieves both parametric and geometric considerations when coupled with a proper geometric surface reconstruction algorithm.

Tensor product spline surface reconstruction is a process aimed at rebuilding gap-ridden boundary representation (b-rep) solid models such that they result in watertight representations at the trim and intersection edges. Because of the surface-surface intersection (SSI) algorithms used in approximating the interface between the surface junctions, a massive effort is required to make this connection conformal for downstream processing in fields such as computational analysis, computer-aided manufacturing (CAM), animation, metrology or computer-aided inspection (CAI), etc. Steps to achieve automated surface healing, as well as Boolean operations that are initially watertight, may require a means of mapping parameter spaces from the originally disconnected domains to that of a globally coupled form.

The mappings between distinct parameterizations sampled from b-reps may employ well documented reparameterization schemes on individual isoparametric curves to achieve the goal of global parameter reconstruction. If not handled correctly, these mappings have the potential of introducing artifacts between adjacent reconstructed segments. Herein we describe a novel approach that seeks the nonlinear reparameterization functions for entire sets of isoparametric curves. These reparameterization functions are themselves isoparametric curves, sampled from a nonlinear global reparameterization surface function. In this way, given the requisite input for the system, optimal mappings for the system of isoparametric curves can be performed by manipulating the degrees of freedom of the reparameterization surface. The description and use of this reparameterization surface defined below is a new and unpublished concept in the field of Computer-Aided Geometric Design (CAGD).

The processes below relate to transforming parameter spaces from a group of independent surface definitions from a b-rep solid model to a single watertight definition. We take the isoparametric curve element as the centerpiece of this operation in order to relate this conversion of information in a complete and reliable fashion. Using well-known reparameterization operations established for spline curves, we describe how these operations are extended for the purpose of reparametrizing sets of isoparametric curves. This is shown to not simply be an extension of this procedure as a batch process, but a concept and technique replete with its own unique constraints and degrees of freedom.

Solving the systems of linear equations that arise from this framework is a computationally interesting challenge itself and below we demonstrate one of many possible means by utilizing a very common interpolation strategy shown to be appropriate for the task. While other interpolation strategies may work just as well, we focus on cubic curves given their ubiquity in CAD systems, although this does not limit the ability to handle curves of other degrees, nor the ability to implement other interpolation strategies for any degree. The method may be fully integrated within a CAD application making execution streamlined.

Isoparametric Curves, Surface Extraction, and Reparameterization Techniques

The concept of an isoparametric curve, or isocurve, is a ubiquitous element in Computer-Aided Geometric Design (CAGD) utilized frequently in the art of surface and solid modeling [Piegl 1997]. Isoparametric curves can be derived from any standard tensor product surface definition, such as Bézier, B-spline, NURBS or T-spline surfaces, and are abundantly documented in CAGD references. Without loss of generality, assume an arbitrary B-spline surface $S=S(s, t)$ defined on a domain $\Omega=[s_0, s_{m+p+1}] \times [t_0, t_{n+q+1}] \subset \mathbb{R}^2$, with knot vectors $\mathcal{S}$ and $\mathcal{T}$, of degrees p in s and q in t, respectively, $$S(s, t) = \sum_{\lambda=0}^{m} \sum_{\rho=0}^{n} N_{\lambda,p}(s) N_{\rho,q}(t) P_{\lambda,\rho}.$$

Here, $P_{\lambda,\rho}$ are the surface control points specified at arbitrarily user-defined locations. An isocurve is a spline based curve extracted from a surface along one of its parametric values. It is created by setting the other parametric value of the surface to a constant, i.e., $s=\bar{s}$, at the value where the intended isocurve is to be created, $$ISO_{\bar{s}}(t) = S(\bar{s}, t) = \sum_{\lambda=0}^{m} \sum_{\rho=0}^{n} N_{\lambda,p}(\bar{s}) N_{\rho,q}(t) P_{\lambda,\rho}.$$

Because $s=\bar{s}$, a known input value, the basis functions $N_{\lambda,p}(\bar{s})$ can be fully evaluated, with no mathematical approximation (as opposed to the inevitable issues of numerical precision in computing). Grouping all of the known values of the expression together we find $$ISO_{\bar{s}}(t) = \sum_{\rho=0}^{n} N_{\rho,q}(t) \left( \sum_{\lambda=0}^{m} N_{\lambda,p}(\bar{s}) P_{\lambda,\rho} \right).$$

Let us define the sum of evaluated basis functions with control points to be, $$Q_\rho = Q_\rho(\bar{s}) = \sum_{\lambda=0}^{m} N_{\lambda,p}(\bar{s}) P_{\lambda,\rho},$$

where the values $Q_\rho$ represent point values. Thus, $$ISO_{\bar{s}}(t) = \sum_{\rho=0}^{n} N_{\rho,q}(t) Q_\rho,$$

which is comparable to the standard B-spline curve equation, $$C(u) = \sum_{\zeta=0}^{n} N_{\zeta,p}(u) P_\zeta.$$

Figure 33:
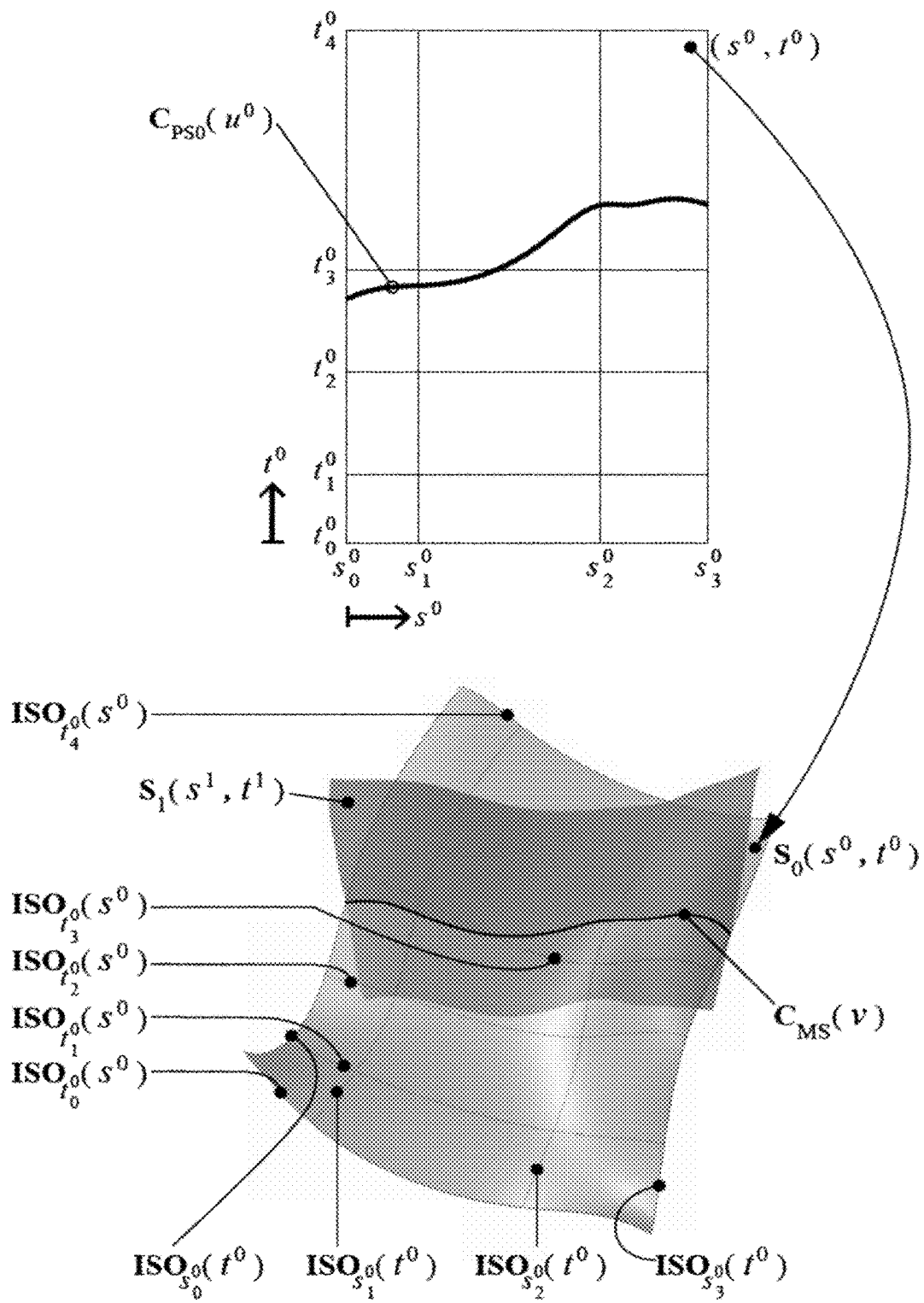
FIG. 33 is an illustration of all the isocurves evaluated for the internal knots of an arbitrarily defined surface, according to some embodiments.

The above equation is that of an isoparametric spline curve (isocurve) embedded within the surface that traces out an image along a constant surface parameter value of the surface from which it is extracted. This is not an approximation; rather, this is mathematically an exact representation by reformulation. Note that the curve control points, $Q_\rho$, are distinct from the surface control points, $P_{\lambda,\rho}$. Also note that the isocurves above were evaluated in the t spanning direction, yet similar equations may be derived for the s spanning direction by choosing $t=\bar{t}$. FIG. 33 shows all the isocurves evaluated for the internal knots of an arbitrarily defined surface $S_0(s^0, t^0)$, for the valid b-rep solid model of intersecting surfaces $S_0(s^0, t^0)$ and $S_1(s^1, t^1)$.

For the purposes of surface reconstruction in making watertight models, we seek to employ a method using isocurves on surfaces at the points of the model space trim curve $C_{MS}(v_\beta)$ that correspond to the parameter values $v_\beta$ of the curve. This trim curve has been Bézier refined such that $v_\beta$ represents the projections of all internal surface knots, critical points of the parameter space trim curves from each surface, and all other knots indicative of trim feature data. These isocurves correspond to the surface parameter boundary values $s_\beta{}^i$ and $s_{\beta+1}{}^i$ of each curve portion of these refined segments $CP_{MS,\beta}(v_\beta)$ and, along with user defined lower and upper bound parameters, $t_{LB}{}^i$ and $t_{UB}{}^i$, respectively, define an extraction domain $\Omega_\beta{}^i$ for each surface, as shown with the example in FIG. 34.

Furthermore, isocurves are sought on each surface at the respective Greville abscissae of the refined segments, $CP_{MS,\beta}(v_\gamma)$, indicated by $s_\gamma{}^i$. Each extraction domain $\Omega_\beta{}^i$ will include a superset of isocurve parameter values at the curve boundaries and Greville abscissae, with the most common case of an interpolating cubic trim curve yielding surface parameters $s_\lambda{}^i = \{s_{\beta_0}{}^i, s_{\gamma_0}{}^i, s_{\gamma_1}{}^i, s_{\beta_1}{}^i\}$.

Figure 34:
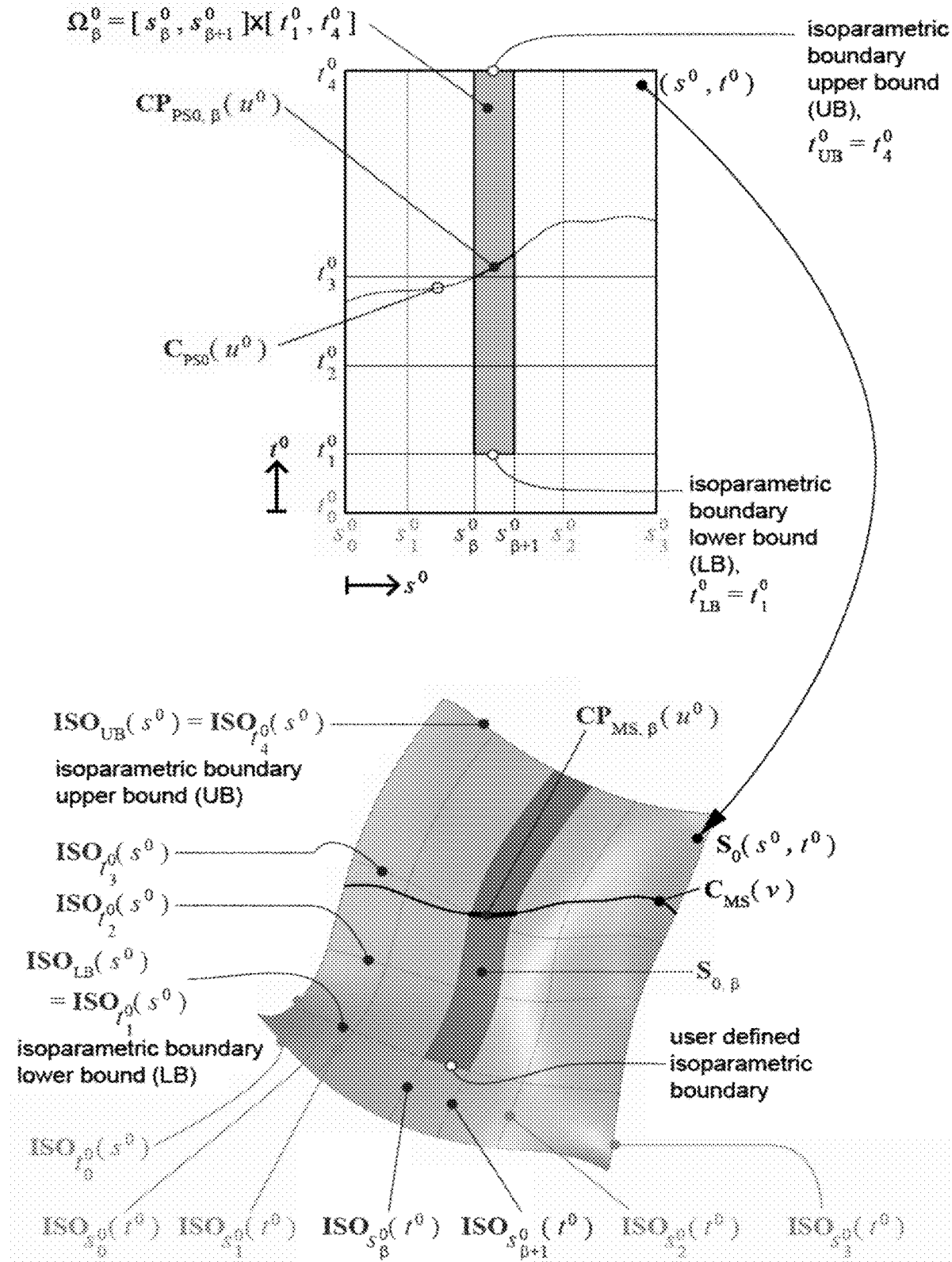
FIG. 34 is an illustration of an extraction domain of an isocurve, and the relationship between the isocurve's parametric and geometric representations, according to some embodiments.
Figure 35:
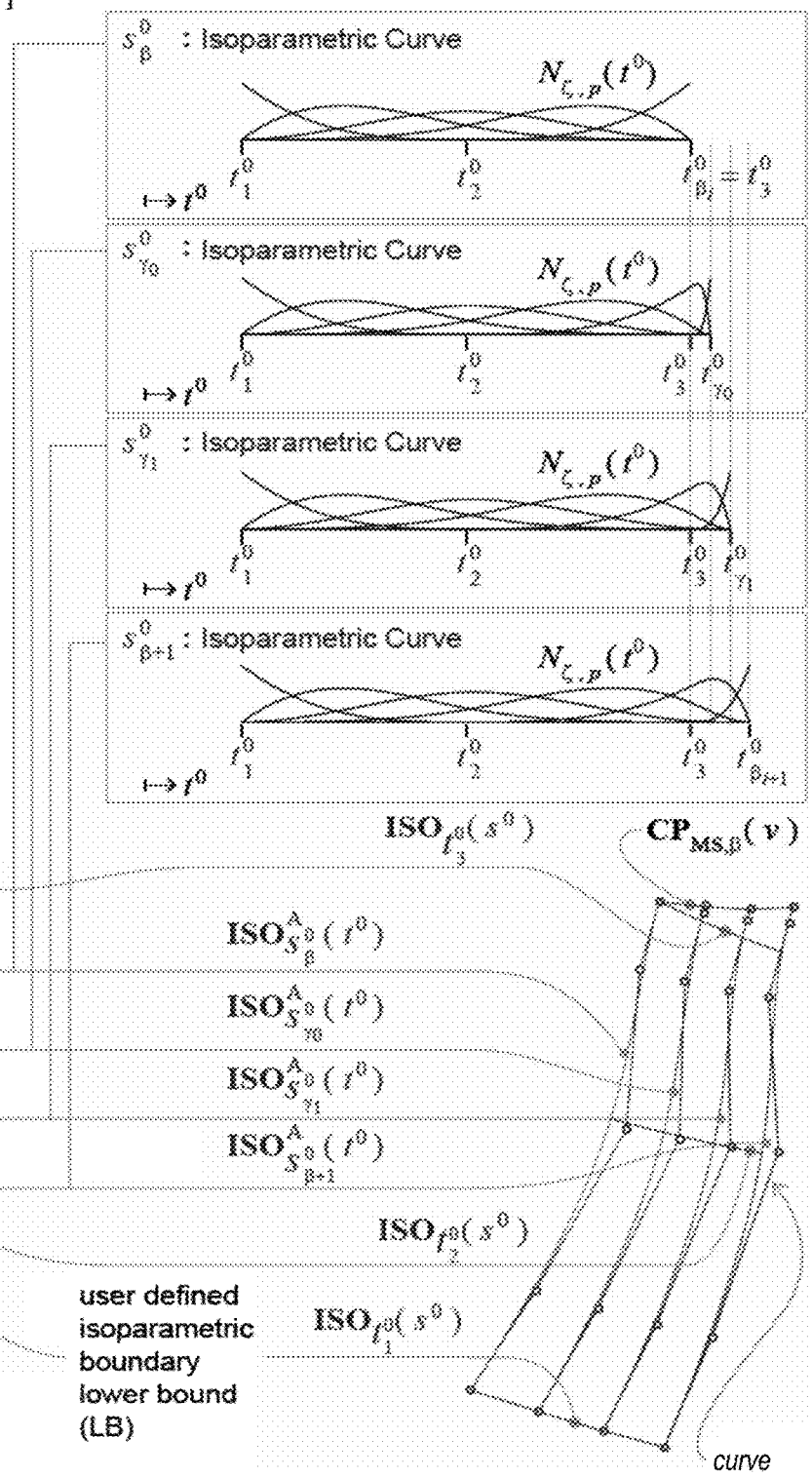
FIG. 35 is an illustration of isocurves split at the trim curve for the extraction domain depicted in FIG. 34, according to some embodiments.

For the extraction domain $\Omega_\beta{}^i$ shown in the example depicted in FIG. 34, the isocurves at these points are shown in FIG. 35, split at the trim curve. As detailed in this diagram, having sampled the isocurves, we modify the isocurves to reflect the trim boundary. Each isocurve $ISO_{s_\lambda}{}^i$ ($t^i$) is knot refined at the location $t^i = t_{SSI,\lambda}{}^i$ as determined based on the model space curve (or the portion $CP_{MS,\beta}$ of the model space curve). Specifically, $t_{SSI,\lambda}{}^i$ is computed as the value of the $v_\lambda$ parameter that achieves the closest approach of the isocurve $ISO_{s_\lambda}{}^i(t^i)$ to the model space curve $C_{MS}(v)$. In other words, the distance between $ISO_{s_\lambda}{}^i(t^i)$ and $C_{MS}(v)$ is minimized over the space $\{(v, t^i)\}$. $ISO_{s_\lambda}{}^i(t^i)$, refined to the knot multiplicity of the isocurve at $t^i = t_{SSI,\lambda}{}^i$, divides the isocurve into two isocurves, denoted $ISO_{s_\lambda}{}^A(t^i)$ and $ISO_{s_\lambda}{}^B(t^i)$.

Having defined an extraction domain and then sampled and divided isocurves from the extraction domain, the isocurves need to be reparametrized such that they are defined on a single knot vector domain that defines the watertight reconstruction surface. Having extracted a collection of isocurves from the above procedures, it is typically the case that different isocurves of the set $\{ISO_{s_\lambda}{}^A(t^i): \lambda=0,1,2,\ldots,m_{s^i}\}$ have different numbers of knots, in both value and multiplicity. The most obvious source of differences in the knots of such isocurve sets is that the isocurves are typically of different lengths, and thus, a longer isocurve may have a longer span as well as intercept a larger number of transverse knot lines of the surface patch $S_{i,\beta}$ than a shorter isocurve. Such is the case in FIG. 35, as we note that not only do the knots of the isocurves vary in multiplicity, but also the shared knot values exist at the same locations for different knot span intervals. The result is that, when normalized, none of these knot values will agree within the collection of isocurves when each of their domains is uniquely scaled. This is a very important detail with regards to the continuity of the reconstructed surface patches. Forming a shared surface domain from this assemblage of non-matching knot vectors is an extremely difficult, non-trivial task. We resolve the situation by using the common procedure of reparameterization with a unique and innovative technique.

We seek to reparametrize the isocurves $ISO_{s_\lambda}{}^{iA}(t^i)$ on the surface patch $S_{i,\beta}{}^A$. The reparameterization operation is concerned with mapping the parameter space of a curve to a new domain with its own knot vector while maintaining the exact geometric trace in model space. The parametric conversion requires a reparameterization function whose construction and mapping will concern us herein. The reparameterization function may be linear, piecewise linear, or non-linear, and may be computed in a multitude of ways, which will distinctively contribute attributes of the corresponding isocurve after being reparametrized.

We state the reparameterization operation precisely by seeking a function $t^i = f_{s_\lambda}{}^{iA}(\tilde{t}^i)$ that maps from the closed interval $I_\beta = [t_\beta, t_{\beta+1}]$ onto the interval $\tilde{I}_\beta = [\tilde{t}_\beta, \tilde{t}_{\beta+1}]$ such that, for all t in $I_\beta$, there exists a $\tilde{t}$ in $\tilde{I}_\beta$ that produces the same set of points in $\mathbb{R}^3$ when evaluated as a model space curve, $ISO_{s_\lambda}{}^{iA}(\tilde{t}^i)$. Another way of stating this is that the Hausdorff distance is zero between the sets of points $ISO_{s_\lambda}{}^{iA}(t^i)$ and the set of points $ISO_{s_\lambda}{}^{iA}(\tilde{t}^i)$. In order for the reparameterization function to ensure that the new parameter interval $\tilde{I}_\beta$ is mapped in a one-to-one fashion from $I_\beta$, $t^i = f_{s_\lambda}{}^{iA}(\tilde{t}^i)$ must be strictly monotonic.

The most direct mathematical formulation of this condition is a composite function $ISO_{s_\lambda}{}^{iA}(t^i) = ISO_{\tilde{s}_\lambda}{}^{iA}(f_{s_\lambda}{}^{iA}(\tilde{t}^i))$. The resulting isocurve of this composition would then be a complicated, arbitrary function of an unpredictable form that could not be guaranteed as representable in a conventional CAD system. As an alternative, we seek reparameterization functions that are themselves B-splines, and form a procedure to create a B-spline representation of the resulting isocurve, $ISO_{\tilde{s}_\lambda}{}^{iA}(\tilde{t}^i)$.

Isocurve Linear Reparameterization

Figure 36:
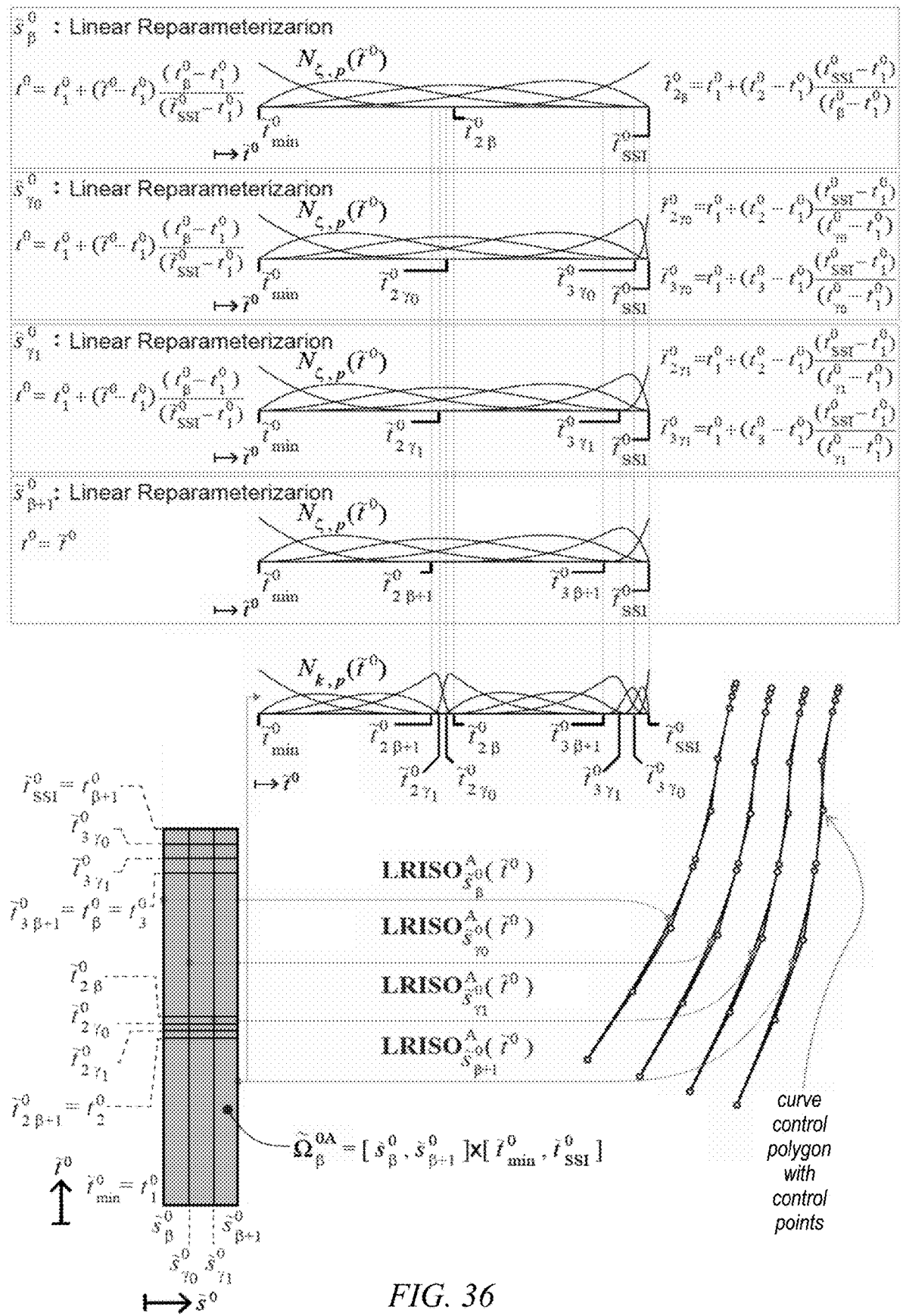
FIG. 36 is an illustration of the construction of a linear reparametrized set of isocurves using isocurve linear reparameterization, according to some embodiments.

The first method of defining the reparameterization function $t^i = f_{s_\lambda}{}^{iA}(\tilde{t}^i)$ is computationally the easiest, linear reparameterization. While trivial to compute, it results in a large number of knot insertions when applied to B-spline reconstruction. FIG. 36 illustrates the discussion that follows.

We noted above that if we simply normalized each isocurve $ISO_{s_\lambda}{}^{iA}(y^i)$, $\lambda \in \{0, 1, 2, \ldots, m_{s^i}\}$ to a common parametric interval $I_{\tilde{s}}{}^{iA} = [\tilde{t}_{min}{}^{iA}, \tilde{t}_{max}{}^{iA}]$ in the $t^i$ parameter, we could potentially have a collection of isocurves whose knot vectors contain wildly divergent sets of knots. Let us go ahead and perform this operation to obtain a corresponding linearly reparametrized set of isocurves $LRISO_{\tilde{s}_\lambda}{}^{iA}(\tilde{t}^i)$. Here, "LR" distinguishes the reparameterization method as linear.) Note that there are a wide variety of ways to select $\tilde{t}_{min}{}^{iA}$ and $\tilde{t}_{max}{}^{iA}$. For example, we may choose $I_{\tilde{s}}{}^{iA} = [0,1]$. In another version, $I_{\tilde{s}}{}^{iA} = [t_{LB}{}^i, \tilde{t}_{SSI}{}^u]$, where $\tilde{t}_{SSI}{}^i$ is strictly between $t_{LB}{}^i$ and $t_{UB}{}^i$, e.g., the midpoint of $t_{LB}{}^i$ and $t_{UB}{}^i$.

Having linearly reparametrized the isocurves for each $\lambda \in \{0, 1, 2, \ldots, m_s{}^i\}$, we will then identify any knots of the reparametrized isocurve $LRISO_{\tilde{s}_\mu}{}^{iA}(\tilde{y}^i)$, $\mu \in \{0, 1, 2, \ldots, m_s{}^i\}$, $\mu \neq \lambda$, that are not present in the knot vector of the reparametrized isocurve $LRISO_{\tilde{s}_\lambda}{}^{iA}(\tilde{t}^i)$, and add those identified knots to the knot vector of $LRISO_{\tilde{s}_\lambda}{}^{iA}(\tilde{t}^i)$. In other words, wherever one reparametrized isocurve has a knot that is absent from the knot vector of a different reparametrized isocurve, we add that knot to the knot vector of the different reparametrized isocurve. As a result, each of the reparametrized isocurves will share a common knot vector and hence may be interpreted as an isocurve of the reconstructed B-spline surface.

Isocurve Nonlinear Reparameterization

In a nonlinear reparameterization scheme of the $t^i$ isocurves, each isocurve $ISO_{s_\lambda}{}^{iA}(t^i)$, $\lambda \in \{0, 1, 2, \ldots, m_{s^i}\}$, is reparametrized with a corresponding reparameterization function $t^i = f_{s_k}{}^{iA}(\tilde{t}^i)$, to obtain a corresponding reparametrized isocurve $NLRISO_{\tilde{s}_\lambda}{}^{iA}(\tilde{t}^i)$, so that the reparametrized isocurves $\{NLRISO_{\tilde{s}_\lambda}{}^{iA}(\tilde{t}^i)\}$ are defined on a common parametric interval $I_{\tilde{s}}{}^{iA}[\tilde{t}_{min}{}^{iA}, \tilde{t}_{max}{}^{iA}]$ and have a common knot vector $\tilde{T}^i$. The functions $\{f_{s_\lambda}{}^{iA}\}$ are 1D splines of degree $p_{REPARAM}$ (nonlinear reparameterization implies $p_{REPARAM}$ is greater than one), in which case the isocurves $\{NLRISO_{\tilde{s}_\lambda}{}^{iA}(\tilde{t}^i)\}$ will be of degree $p_{i}p_{REPARAM}$, where $p_i$ is the degree of the isocurves $\{ISO_{s_\lambda}{}^{iA}(t^i)\}$.

Figure 37:
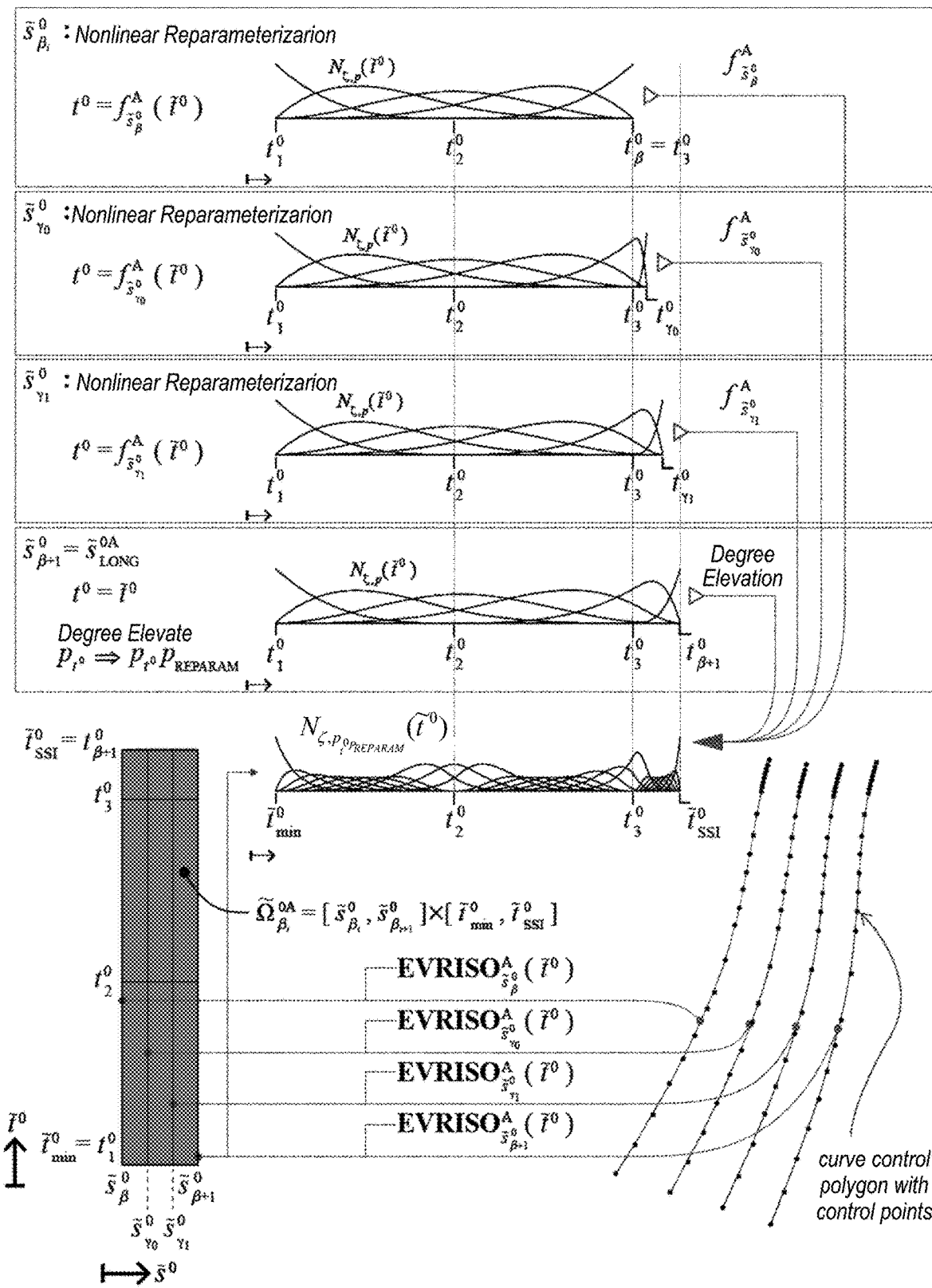
FIG. 37 is an illustration of a method for using a longest isocurve as the model for the final form of the reparametrized knot vector, according to some embodiments.

One method of simplifying this process is to use the longest of the isocurves as the model for the final form of the reparametrized knot vector with the goal of obtaining isocurves defined on a common knot vector. FIG. 37 details an example of this procedure. Let $s_{LONG}{}^{iA}$ denote the value of $s_\lambda{}^i$ corresponding to the longest isocurve. Each remaining isocurve $ISO_{s_\lambda}{}^{iA}(t^i)$, $s_\lambda{}^i \neq s_{LONG}{}^{iA}$, can then be nonlinearly reparametrized with a corresponding reparameterization function $t^i = f_{\tilde{s}_\lambda}{}^{iA}(\tilde{t}^i)$ of common degree $p_{REPARAM}$, to obtain a corresponding nonlinearly reparametrized isocurve, denoted $EVRISO_{\tilde{s}_\lambda}{}^{iA}(\tilde{t}^i)$, of degree $p_i p_{Reparam}$ (the prefix "EV" is meant as a reminder of the elevation of the longest isocurve). The longest isocurve can then be degree elevated to degree $p_i p_{Reparam}$, to obtain a degree-elevated isocurve, denoted $EVRISO_{\tilde{s}_{LONG}}{}^{iA}(\tilde{t}^i)$. The nonlinear reparameterizations and the degree elevation are performed in such a fashion that the resulting set of $m_{s^i}+1$ isocurves $\{EVRISO_{\tilde{s}_\lambda}{}^{iA}(\tilde{t}^i): \lambda \in \{0, 1, 2, \ldots, m_{s^i}\}\}$ are of degree $p_i p_{Reparam}$ and share a common knot vector. For example, if $p_i = 3$, $p_{Reparam} = 3$, and the isocurve $$ISO_{s_{m_{s^i}}}^{A}(t^i)$$

is the longest of the isocurves, then each of the isocurves $ISO_{s_\lambda}{}^{iA}(t^i)$, $\lambda \in \{1, 2, \ldots, m_{s^i}\}$ can be nonlinearly reparametrized with a corresponding degree 3 reparameterization spline function $t^i = f_{\tilde{s}_\lambda}{}^{iA}(\tilde{t}^i)$, and the isocurve $ISO_{s_{msi}}{}^{iA}(t^i)$ can be degree elevated to degree 9, to obtain a common knot vector. Here we do not have to deal with the exchange of differing knots between isocurves, as in the case of linear reparameterization, as the present non-linear mapping is constructed specifically to avoid this. The downside is that the curves are now of a higher degree, and in the case of the example go from degree 3 to degree 9.

Global Reparameterization Functions

We will now form the domain $\tilde{\Omega}_\beta{}^{iA}$ for the output patch $\tilde{S}_{iA,\beta}$. This domain may be interpreted as a reconstruction domain because the output patch $\tilde{S}_{iA,\beta}$ is constructed so as to rebuild (or modify) the geometry based on information extracted from the surface patch $S_{i,\beta}$ on the extraction subdomain $\Omega_\beta{}^{iA}$. The reconstruction subdomain $\tilde{\Omega}_\beta{}^{iA}$ becomes a subregion of the global parameter domain $\tilde{\Omega}^i$.

The reconstruction subdomain $\tilde{\Omega}_\beta^{iA}$ is defined to be $[\tilde{s}_\beta^i, \tilde{s}_{\beta+1}^i] \times [\tilde{t}_{min}^{iA}, \tilde{t}_{max}^{iA}]$, where $\tilde{t}_{min}^{iA}$ and $\tilde{t}_{max}^{iA}$ are respectively the first and last knot values of the common knot vector of the reparametrized isocurves.

Note that similar processing operations could be applied to the isocurves on the other side of the model space curve, i.e., on the isocurves $\{ISO_{s_\lambda^i}^B(t^i): \lambda=0,1,2,\ldots,m_{s^i}\}$. There are no fundamental differences based on which side of the model space trim curve the extraction domain is taken from, and so everything stated in this chapter applies for all $k \in \{A, B\}$.

In the following discussion of reparameterization, it is not significant how the isocurves $\{ISO_{s_\lambda}^{iA}(t^i)\}$ have been reparametrized to a common knot vector. Thus, we may drop the prefix "L", "NL" and "EV", and refer simply to reparametrized isocurves $\{RISO_{s_\lambda}^{iA}(t^i)\}$ to distinguish them from the original configuration $\{ISO_{s_\lambda}^{iA}(t^i)\}$. This notation is meant to encompass any type of reparameterization being applied to the isocurves to obtain reparametrized isocurves that share a common knot vector.

Piecewise Domain Reparameterization

The global parameter domain $\tilde{\Omega}^{iA}$ could be formed by collecting the individually formed subdomains $\tilde{\Omega}_\beta^{iA}$. The collection of reconstructed subdomains $\tilde{\Omega}_\beta^{iA}$ are difficult to create independently while maintaining an amenable parametric boundary. This is to say that forming subdomains $\tilde{\Omega}_\beta^{iA}$ and and $\tilde{\Omega}_{\beta+1}^{iA}$ separately does not guarantee a valid space $\tilde{\Omega}^{iA}$ when completed meeting either the definition of a B-spline or the desired continuity of global reparameterization construction. Each of the independent subdomains would have to be checked and modified at their boundaries, parametric and geometric, in order to ensure a conformal edge between discrete subdomains as well as continuity requirements between the individual patches. This is a tedious and unnecessary process as a more comprehensive process exists that is more appropriate.

Global Parameter Space Reparameterization and Reconstruction

Figure 38:
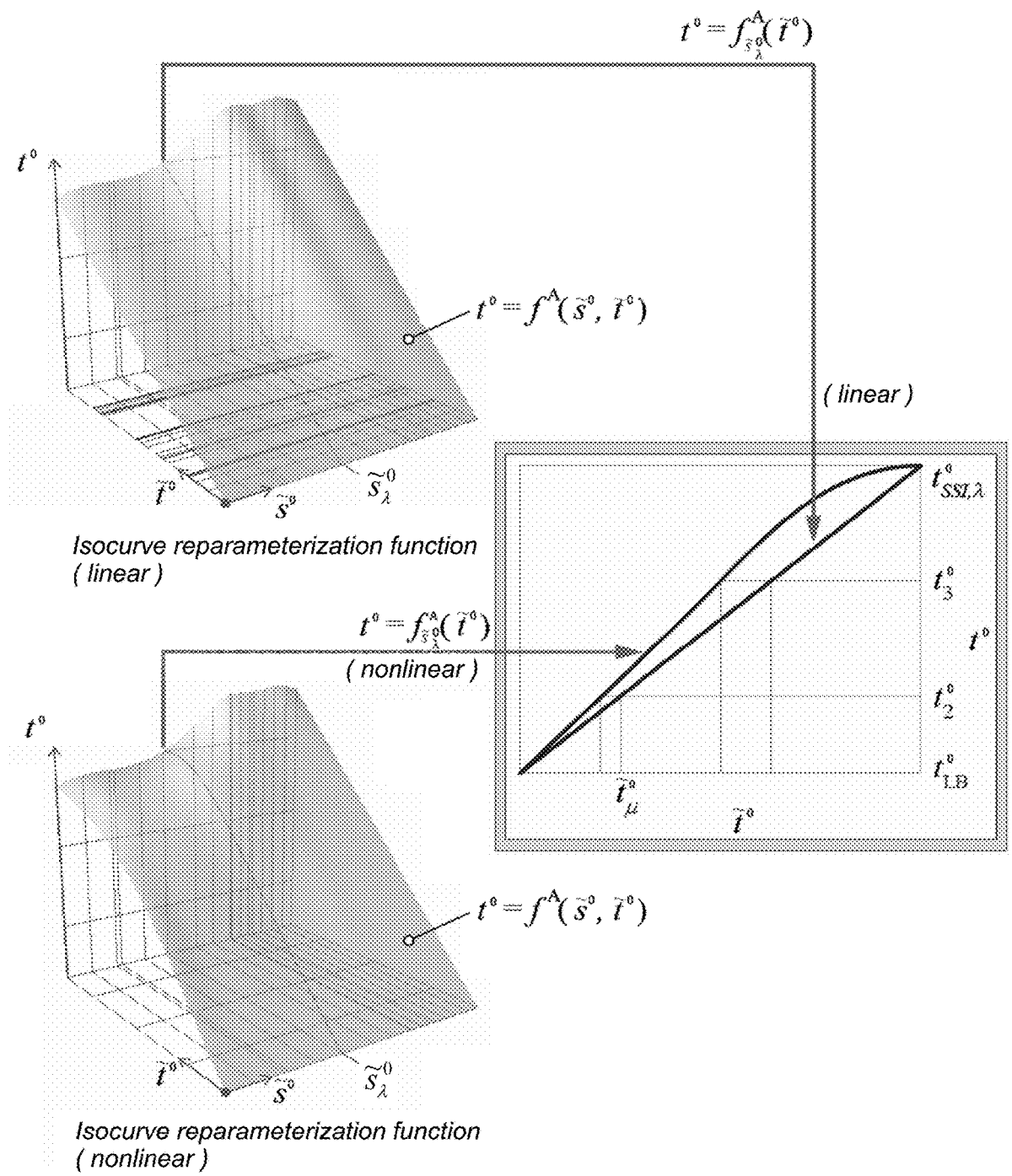
FIG. 38 is an illustration of global parameter space reconstruction and reparameterization, according to some embodiments.

The piecewise reparameterization and assembly operations above will now be combined into a novel synthesis. FIG. 38 depicts the global parameter space reconstruction and reparameterization as per the same example used in the previous figures. Instead of these operations taking place independently for each isocurve $s_\lambda^i$, introducing the possibility of error and incompatibility if not monitored and regulated, we can constrain the task to not only guarantee valid output, but also to facilitate the users' understanding of the non-unique solution space and the input information for which they are required to supply.

We previously stated that in a nonlinear reparameterization scheme of the $t^i$ isocurves, each isocurve $ISO_{s_\lambda}^{iA}(t^i)$, $\lambda \in \{0, 1, 2, \ldots, m_{s^i}\}$, is reparametrized with a corresponding reparameterization function $t^i = f_{s_k^i}^{iA}(\tilde{t}^i)$, to obtain a corresponding reparametrized isocurve $NLRISO_{s_\lambda}^{iA}(\tilde{t}^i)$, so that the reparametrized isocurves $\{NLRISO_{s_\lambda}^{iA}(\tilde{t}^i)\}$ are defined on a common parametric interval $I_{\tilde{s}^i}^{iA} = [\tilde{t}_{min}^{iA}, \tilde{t}_{max}^{iA}]$ and have a common knot vector $\tilde{\mathcal{T}}^i$. We state the trivial fact that the linear reparameterization scheme is the simplest of these functions so as to generalize all the reparameterization schemes by use of a reparameterization function, $t^i = f_{\tilde{s}^i}(\tilde{t}^i)$. As noted before, without loss of generality, that we prefer this function to be a 1-D spline function that maps one univariate parameter domain corresponding to an isocurve to another. With respect to the reparameterization function, we make a self-referential observation here, mirroring that of the observation of the isocurve extraction. If the unified isocurve collection originates from a single surface with a shared domain, and we wish to form a congruent collection of 1-D spline reparameterization functions, we can define a parent spline reparameterization surface from which these isocurves originate. In a symmetric operation (i.e. in reverse) to the isocurve extraction process, the definition of the reparameterization surface serves as the users' guide to the reparameterization process, constrained appropriately within the validity and continuity restrictions of the mapping.

Constraints and Degrees of Freedom

The reparameterization surface will be defined as a bivariate reparameterization function $t^i = f^k(\tilde{s}^i, \tilde{t}^i)$, where $f^k$ takes on the form of a tensor product spline surface itself for all $k \in \{A, B\}$. Here, the knot vectors of $t^i$ and $\tilde{t}^i$ must be defined to reflect the original surface domain $\Omega^i$ is well as the prescribed domain $\tilde{\Omega}^i$, respectively. Each subdomain, $\Omega_\beta^i$ and $\tilde{\Omega}_\beta^i$, is then satisfied locally, with the interface boundaries coincident as components of the continuous surface construction. Control point locations of the reparameterization surface may be user specified. Furthermore, the reparameterization function $f^k$ can take a linear form or any of an infinite number of nonlinear forms, under the following conditions:

1. $t^i = f^k(\tilde{s}^i, \tilde{t}^i)$ must be strictly monotonic in the $\tilde{t}^i$ direction so as to map the parameter interval without overlap;
2. $t^i = f^k(\tilde{s}^i, \tilde{t}^i)$ as a spline must be built using the same target knot vector, $\tilde{\mathcal{T}}^i$, of the reconstructed parameter space in the $\tilde{t}^i$ direction;
3. Each distinct knot value $t_o^i \in \mathcal{T}^i$ must be mapped to a distinct knot value in $\tilde{t}_\kappa^i \in \tilde{\mathcal{T}}^i$ such that the reparameterization function $t_o^i = f^k(\tilde{s}_\lambda^i, \tilde{t}_\kappa^i)$ interpolates the point made by these knot values at each value of $\tilde{s}_\lambda^i$.

FIG. 38 depicts an example showing the relationship between the reparameterization surface $t^i = f^k(\tilde{s}^i, \tilde{t}_\kappa^i)$ and the individual 1-D reparameterization functions $t^i = f_{\tilde{s}_\lambda^i}^k(\tilde{t}^i)$ for each isocurve of a subdomain $\tilde{\Omega}_\beta^i$. To understand the reparameterization surface as a tensor product spline, its degrees of freedom, and the isocurve reparameterization functions extracted, we state this as follows, $$S_r(\tilde{s}^i, \tilde{t}^i) = \begin{bmatrix} \tilde{s}^i \\ \tilde{t}^i \\ t^i \end{bmatrix} = \begin{bmatrix} \tilde{s}^i \\ \tilde{t}^i \\ f^k(\tilde{s}^i, \tilde{t}^i) \end{bmatrix},$$

$$S_r(\tilde{s}^i, \tilde{t}^i) = \sum_{\delta=0}^{m} \sum_{\mu=0}^{n} N_{\delta,p}(\tilde{s}^i) N_{\mu,q}(\tilde{t}^i) P_{\delta,\mu},$$

$$S_r(\tilde{s}^i, \tilde{t}^i) = \begin{bmatrix} \tilde{s}^i \\ \tilde{t}^i \\ t^i \end{bmatrix} = \begin{bmatrix} \sum_{\delta=0}^{m} \sum_{\mu=0}^{n} N_{\delta,p}(\tilde{s}^i) N_{\mu,q}(\tilde{t}^i) \gamma_{\delta,\tilde{s}}^i \\ \sum_{\delta=0}^{m} \sum_{\mu=0}^{n} N_{\delta,p}(\tilde{s}^i) N_{\mu,q}(\tilde{t}^i) \gamma_{\mu,\tilde{t}}^i \\ \sum_{\delta=0}^{m} \sum_{\mu=0}^{n} N_{\delta,p}(\tilde{s}^i) N_{\mu,q}(\tilde{t}^i) t_{\delta,\mu} \end{bmatrix},$$

where $\gamma_{\delta,\tilde{s}}^i$ and $\gamma_{\mu,\tilde{t}}^i$ are the Greville abscissae in the global reparameterization space and $t_{\delta,\mu}$ are specified from the sampled isocurve domain, the original parameter space. This reduces to, $$S_r(\tilde{s}^i, \tilde{t}^i) = \begin{bmatrix} \tilde{s}^i \\ \tilde{t}^i \\ t^i \end{bmatrix} = \begin{bmatrix} \tilde{s}^i_\lambda(\tilde{s}^i, \tilde{t}^i) \\ \tilde{t}^i_\lambda(\tilde{s}^i, \tilde{t}^i) \\ \sum_{\delta=0}^m \sum_{\mu=0}^n N_{\delta,p}(\tilde{s}^i) N_{\mu,q}(\tilde{t}^i) t_{\delta,\mu} \end{bmatrix}.$$

Note several details of these equations. First, that $\tilde{s}_\lambda^i(\tilde{s}^i, \tilde{t}^i)$ and $\tilde{t}_\lambda^i(\tilde{s}^i, \tilde{t}^i)$ are fixed functions as defined by the Greville points $\gamma_{\delta,\tilde{s}^i}$ and $\gamma_{\mu,\tilde{t}^i}$, respectively, and that no further information must be provided to evaluate them. Next, we find that specification of the reparameterization surface becomes the specification of spline attributes, i.e., degree, knot vector, etc., and a set of scalar values, $t_{\delta,\mu}$, that specify the height field of, $$f^k(\tilde{s}^i, \tilde{t}^i) = \sum_{\delta=0}^m \sum_{\mu=0}^n N_{\delta,p}(\tilde{s}^i) N_{\mu,q}(\tilde{t}^i) t_{\delta,\mu}.$$

For a specified value of $\tilde{s}_\lambda^i$ corresponding to the $\lambda$-th isocurve, the reparameterization surface function becomes a reparameterization isocurve function and the univariate reparameterization for the curve is defined as, $$C_r(\tilde{t}^i) = \begin{bmatrix} \tilde{s}^i \\ \tilde{t}^i \\ t^i \end{bmatrix} = \begin{bmatrix} \tilde{s}_\lambda^i \\ \tilde{t}^i \\ f_{\tilde{s}^i}^k(\tilde{t}^i) \end{bmatrix},$$

$$C_r(\tilde{t}^i) = \sum_{\zeta=0}^n N_{\zeta,p}(\tilde{t}^i) P_\zeta,$$

$$C_r(\tilde{t}^i) = \begin{bmatrix} \tilde{s}^i \\ \tilde{t}^i \\ t^i \end{bmatrix} = \begin{bmatrix} \tilde{s}_\lambda^i \\ \sum_{\delta=0}^m \sum_{\mu=0}^n N_{\delta,p}(\tilde{s}_\lambda^i) N_{\mu,q}(\tilde{t}^i) \gamma_{\mu,\tilde{t}^i} \\ \sum_{\delta=0}^m \sum_{\mu=0}^n N_{\delta,p}(\tilde{s}_\lambda^i) N_{\mu,q}(\tilde{t}^i) t_{\delta,\mu} \end{bmatrix},$$

$$C_r(\tilde{t}^i) = \begin{bmatrix} \tilde{s}^i \\ \tilde{t}^i \\ t^i \end{bmatrix} = \begin{bmatrix} \tilde{s}_\lambda^i \\ \tilde{t}_\lambda^i(\tilde{s}^i, \tilde{t}^i) \\ \sum_{\delta=0}^m \sum_{\mu=0}^n N_{\delta,p}(\tilde{s}_\lambda^i) N_{\mu,q}(\tilde{t}^i) t_{\delta,\mu} \end{bmatrix}.$$

Just like the definition of an isocurve from a surface, because $\tilde{s}_\lambda^i$ is known and $N_{\delta,p}(\tilde{s}_\lambda^i)$ can be evaluated, the resulting coefficients could be combined with the control points, $$C_r(\tilde{t}^i) = \begin{bmatrix} \tilde{s}^i \\ \tilde{t}^i \\ t^i \end{bmatrix} = \begin{bmatrix} \tilde{s}_\lambda^i \\ \sum_{\mu=0}^n N_{\mu,q}(\tilde{t}^i) \gamma_{\tilde{s}_\lambda^i,\mu}^i \\ \sum_{\mu=0}^n N_{\mu,q}(\tilde{t}^i) t_{\tilde{s}_\lambda^i,\mu} \end{bmatrix}.$$

Again, $\tilde{t}_\lambda^i(\tilde{s}_\lambda^i, \tilde{t}^i)$ is fixed from the Greville points $\gamma_{\tilde{s}\lambda,\mu}^i$ and that no further information must be provided to evaluate it. Next, we find that specification of the reparameterization curve becomes the specification of spline attributes and a set of scalar values, $t_{\tilde{s}_\lambda,\mu^i}$, that specify the height field of, $$f_{\tilde{s}^i}^k(\tilde{t}^i) = \sum_{\mu=0}^n N_{\mu,q}(\tilde{t}^i) t_{\tilde{s}_\lambda^i,\mu}.$$

This description and its utilization as such a resource has not been employed to date and represents an exciting new tool. Besides the prescription of the original domain data and the strict monotonicity of the surface function, the control point locations and the construction of the new domain are up to the user.

Cubic Spline Interpolation Approach

In the above equations, given that we constrain particular knots of the original domain to map to knot values of the target reconstruction domain, i.e., $t_\rho$ is mapped to $\tilde{t}_\rho$, we are then interested in finding an interpolating spline solution through points, $$S(\tilde{s}_\xi^i, \tilde{t}^i) = \begin{bmatrix} \tilde{s}_\xi^i \\ \tilde{t}_\rho^i \\ t_\rho \end{bmatrix}.$$

To find the unknown values of $t_{\delta,\mu}$ that will then define the reparameterization functions, we note that there already exists interpolation procedures for the given conditions described above. For cubic spline curves, one common interpolation strategy can be easily accomplished for curves where the knot values are coincident with the parameters used to evaluate the interpolation points. Because the reparameterization function must be built from the same knot vector $\tilde{T}^i$ in $\tilde{t}^i$ we seek the following solution:

$$\begin{bmatrix} S(\tilde{s}_\xi^i, \tilde{t}_1^i) - a_{1,\xi} P_{1,\xi} \\ S(\tilde{s}_\xi^i, \tilde{t}_2^i) \\ \vdots \\ S(\tilde{s}_\xi^i, \tilde{t}_{n-2}^i) \\ S(\tilde{s}_\xi^i, \tilde{t}_{n-1}^i) - c_{n-1,\xi} P_{n+1,\xi} \end{bmatrix} =$$

$$\begin{bmatrix} b_{1,\xi} & c_{1,\xi} & 0 & \dots & 0 & 0 & 0 \\ a_{2,\xi} & b_{2,\xi} & c_{2,\xi} & \dots & 0 & 0 & 0 \\ \vdots & \vdots & \vdots & \ddots & \vdots & \dots & \vdots \\ 0 & 0 & 0 & \dots & a_{n-2,\xi} & b_{n-2,\xi} & c_{n-2,\xi} \\ 0 & 0 & 0 & \dots & 0 & a_{n-1,\xi} & b_{n-1,\xi} \end{bmatrix} \begin{bmatrix} P_{2,\xi} \\ P_{3,\xi} \\ \vdots \\ P_{n-1,\xi} \\ P_{n,\xi} \end{bmatrix},$$

where, $$a_{k,\xi} = N_{k,3}(\tilde{t}_k^i), b_{k,\xi} = N_{k+1,3}(\tilde{t}_k^i), c_{k,\xi} = N_{k+2,3}(\tilde{t}_k^i).$$

Since all of the values of $\tilde{t}_k^i$ are known interpolation values, the values of the surface control points $P_{k,\xi}$ can be solved with an $(n-1) \times (n-1)$ linear system for each $\xi$ isoparametric curve.

The above solution strategy may require certain user inputs:

1. Input geometry to sample relevant data from;
2. The target knot vector definition;

3. Height values for interpolation from the target knot vector locations where an explicit value from the original knot vector is not specified.

These values can be made dynamic for user manipulation in real-time or set to be automatically optimized for particular target criteria. The cubic curve interpolation strategy adopted here for creating the reparameterization surface is reliable, and is not the only method available.

By switching from a B-spline form to a T-spline form, the choices for a knot vector become numerous, with another infinite set of admissible configurations. Certainly defining metrics to optimize would focus this search to a more reasonable and bounded process.

As there is one $(n-1) \times (n-1)$ linear system for each isocurve to be solved in creating the reparameterization surface, given the uncoupled nature of the individual systems of equations, the solution could be parallelized in any number of ways, in many different areas of the hardware. Having this speed is essential for users interested in realtime manipulation of the system variables. As shown, the benefit to this is that tight integration into existing CAD applications is possible such that many existing tools offered in such packages can be utilized.

Pre-SSI Algorithmic Detail

The following paragraphs give additional algorithmic detail specific to the Pre-SSI WatertightCAD methodology.

In one set of embodiments, an algorithm may operate on a pair of surfaces that have not undergone a conventional Boolean operation (i.e. not an existing boundary representation solid model of an object replete with gaps at surface-surface intersections as a result of a conventional solid modeling Boolean operation). This algorithm serves to provide the requisite information required for processes related to global parameter space formation and surface reconstruction to provide inter-surface continuity. Hereinafter, this algorithm may be referred to as the Pre-SSI WatertightCAD algorithm.

The input for the Pre-SSI WatertightCAD algorithm may be spline surfaces with the intention of performing a solid modeling Boolean operation. (The spline surfaces may include tensor product spline surfaces such as NURBS surfaces and/or T-Spline surfaces.) In one embodiment, the spline surfaces may be provided in a CAD file. In another embodiment, the Pre-SSI WatertightCAD algorithm may operate as part of the kernel of a CAD system, in which case the spline surfaces may have a specialized internal format.

There are many different ways to realize spline surfaces in terms of a data structure. (Different CAD packages have different data structure realizations.) Furthermore, there are many different file formats used to represent the spline surface data. For execution of the Pre-SSI WatertightCAD algorithm, the data structure type and/or data file format of the CAD file need not be of any specific standard, whether a product based type or interoperability standard. Some examples of data file formats include, but are not limited to, ACIS (*.sat, *.sab), STEP (*.stp, *.step), Rhino (*0.3 dm, *0.3 dmbak), etc.

The Pre-SSI WatertightCAD algorithm may operate on parametrically defined spline surfaces of an object, and not on alternative representations such as polytope meshes (structured or unstructured), constructive solid geometry (CSG) data, and implicit geometric representations.

The Pre-SSI WatertightCAD algorithm may operate on the surface splines $S_0$ and $S_1$ so as to produce the minimum data required for later processes that create a first set of one or more output surface patches and a second set of one or more output surface patches, where a boundary of a union of images of the first set of output surface patches and a boundary of a union of the images of the second set of output surface patches meet in a $C^0$ continuous fashion along the model space curve $C_{MS}$. Thus, the gaps in a conventional Boolean surface-surface intersection operation will neither have been created nor need to be repaired. Given the original surface data, output surface patches are constructed to meet in a $C^0$ continuous fashion at the design intent Boolean intersection.

The spline surfaces $\{S_i\}$ may be tensor product spline surfaces of degree combination $p_i \times q_i$, where $p_i$ and $q_i$ are integers greater than zero, where $p_i$ denotes the degree in one parametric dimension, and $q_i$ denotes the degree in the other parametric dimension. For example, in some embodiments $p_i = q_i = 3$, i.e., the surfaces are bicubic surfaces. In other embodiments, the surfaces may be biquartic or biquintic surfaces, or have mixed degrees. In some embodiments, the surfaces may have different degree combinations. For example, one surface might be bicubic while another surface is biquartic. The spline surface $S_i = S_i(s^i, t^i)$ is defined on a domain $$\Omega^i = [s_{min}^i, s_{max}^i] \times [t_{min}^i, t_{max}^i] \subset \mathbb{R}^2,$$

and has knot vectors $\mathcal{S}^i$ and $\mathcal{T}^i$.

$$S_0 = S_0(s^0, t^0)$$
$$= \begin{bmatrix} x^0(s^0, t^0) \\ y^0(s^0, t^0) \\ z^0(s^0, t^0) \\ w^0(s^0, t^0) \end{bmatrix}$$
$$= \sum_{i=0}^{m_0} \sum_{j=0}^{n_0} N_{i,p_0}(s^0) N_{j,q_0}(t^0) P_{ij}^0$$

where, $$P_{ij}^0 = [x_{ij}^0 \ y_{ij}^0 \ z_{ij}^0 \ w_{ij}^0]^T.$$

$$S_1 = S_1(s^1, t^1)$$
$$= \begin{bmatrix} x^1(s^1, t^1) \\ y^1(s^1, t^1) \\ z^1(s^1, t^1) \\ w^1(s^1, t^1) \end{bmatrix}$$
$$= \sum_{i=0}^{m_1} \sum_{j=0}^{n_1} N_{i,p_1}(s^1) N_{j,q_1}(t^1) P_{ij}^1$$

where $$P_{ij}^1 = [x_{ij}^1 \ y_{ij}^1 \ z_{ij}^1 \ w_{ij}^1]^T$$

Algorithm Description

The Pre-SSI WatertightCAD algorithm includes a sequence of operations that take spline surfaces as input and output the necessary data for global reparameterization and surface reconstruction, specifically, surface isocurves at specific locations and a knot vector V defining the surface-surface intersection.

Each surface $S_i$ may furnish specific points solved for in their respective parameter spaces, commonly referred to as significant points or characteristic points. These significant points $(s^i, t^i)_\alpha$ include border points (where the parameter space curve meets the domain boundaries), singular points and turning points (at which curve tangents are parallel to the parametric axes, also referred to as stationary and non-stationary critical points). The significant points $(s^i, t^i)_\alpha$ will produce model space points $S_i(s^i, t^i)_\alpha$ at the surface-surface intersection through evaluation of the surface mapping $S_i$.

Significant points may be solved by first implicitizing one of the bivariate parametric spline surfaces in the surface-surface intersection operation, $$H_0(x, y, z, w) = \sum_{i=0}^{2p_0q_0} \sum_{j=0}^{2p_0q_0-i} \sum_{k=0}^{2p_0q_0-i-j} D_{ijk}^0 x^i y^j z^k w^{deg-i-j-k} = 0$$

or, $$H_1(x, y, z, w) = \sum_{i=0}^{2p_1q_1} \sum_{j=0}^{2p_1q_1-i} \sum_{k=0}^{2p_1q_1-i-j} D_{ijk}^1 x^i y^j z^k w^{deg-i-j-k} = 0$$

Having made implicit one of the bivariate parametric spline surfaces, we seek the surface-surface intersection equation between a surface in parametric form and the other surface in implicit algebraic form: $(S_0 \cap H_1)$ or $(S_1 \cap H_0)$. As the parametric equation is a vector of equations in the model space coordinates (x, y, z), the surface-surface intersection merely becomes a substitution of these equations into the model space coordinate variables in the implicit algebraic equation, $$H_0(x^1(s^1,t^1), y^1(s^1,t^1), z^1(s^1,t^1), w^1(s^1,t^1)) = 0$$

or, $$H_1(x^0(s^0,t^0), y^0(s^0,t^0), z^0(s^0,t^0), w^0(s^0,t^0)) = 0$$

Significant points are determined using the above surface-surface intersection equation between a surface in parametric form and the other in implicit algebraic form. This is achieved through differentiation and then the solving of a simple system of equations:

Significant points:

$$\text{type } \alpha 2, \Omega^0 = \begin{cases} H_1 = H_1(s^0, t^0) = 0 \\ \dfrac{\partial H_1}{\partial s^0} = \dfrac{\partial H_1(s^0, t^0)}{\partial s^0} = 0 \end{cases}$$

Significant points:

$$\text{type } \alpha 2, \Omega^1 = \begin{cases} H_0 = H_0(s^1, t^1) = 0 \\ \dfrac{\partial H_0}{\partial s^1} = \dfrac{\partial H_0(s^1, t^1)}{\partial s^1} = 0 \end{cases}$$

Significant points:

$$\text{type } \alpha 3, \Omega^0 = \begin{cases} H_1 = H_1(s^0, t^0) = 0 \\ \dfrac{\partial H_1}{\partial t^0} = \dfrac{\partial H_1(s^0, t^0)}{\partial t^0} = 0 \end{cases}$$

Significant points:

$$\text{type } \alpha 3, \Omega^1 = \begin{cases} H_0 = H_0(s^1, t^1) = 0 \\ \dfrac{\partial H_0}{\partial t^1} = \dfrac{\partial H_0(s^1, t^1)}{\partial t^1} = 0 \end{cases}$$

Significant points:

$$\text{type } \alpha 0, \Omega^0 = \begin{cases} H_1 = H_1(s^0, t^0) = 0 \\ \dfrac{\partial H_1}{\partial s^0} = \dfrac{\partial H_1(s^0, t^0)}{\partial s^0} = 0 \\ \dfrac{\partial H_1}{\partial t^0} = \dfrac{\partial H_1(s^0, t^0)}{\partial t^0} = 0 \end{cases}$$

-continued

Significant points:

$$\text{type } \alpha 0, \Omega^1 = \begin{cases} H_0 = H_0(s^1, t^1) = 0 \\ \dfrac{\partial H_0}{\partial s^1} = \dfrac{\partial H_0(s^1, t^1)}{\partial s^1} = 0 \\ \dfrac{\partial H_0}{\partial t^1} = \dfrac{\partial H_0(s^1, t^1)}{\partial t^1} = 0 \end{cases}$$

Next, significant points of a new type are determined by similar methods using the above surface-surface intersection equation between a surface in parametric form and the other in implicit algebraic form. This is also achieved through differentiation and then the solving of a simple system of equations, yet has never been documented within literature of the field. These significant points are labeled as type 1, and referred to as inflection points of $H_i$, where an inflection point is a point on the locus $H_i=0$ such that the slope of $H_i$ relative to surface parameter $s^j$ ($j \neq i$) is equal in absolute value to the slope of $H_i$ relative to surface parameter $t^j$:

$$\left| \frac{\partial H_i(s^j, t^j)}{\partial s^j} \right| = \left| \frac{\partial H_i(s^j, t^j)}{\partial t^j} \right|$$

This definition of an intersection point on $H_i$ that is also a significant point of type 1 results in the following equations and subtypes, Significant points:

$$\text{type } \alpha 1.0, \Omega^0 = \begin{cases} H_1 = H_1(s^0, t^0) = 0 \\ \dfrac{\partial H_1}{\partial s^0} = \dfrac{\partial H_1(s^0, t^0)}{\partial s^0} = a \\ \dfrac{\partial H_1}{\partial t^0} = \dfrac{\partial H_1(s^0, t^0)}{\partial t^0} = a \end{cases}$$

$$= \begin{cases} H_1 = H_1(s^0, t^0) = 0 \\ \dfrac{\partial H_1}{\partial s^0} - \dfrac{\partial H_1}{\partial t^0} = 0 \end{cases}$$

Significant points:

$$\text{type } \alpha 1.0, \Omega^1 = \begin{cases} H_0 = H_0(s^1, t^1) = 0 \\ \dfrac{\partial H_0}{\partial s^1} = \dfrac{\partial H_0(s^1, t^1)}{\partial s^1} = a \\ \dfrac{\partial H_0}{\partial t^1} = \dfrac{\partial H_0(s^1, t^1)}{\partial t^1} = a \end{cases}$$

$$= \begin{cases} H_0 = H_0(s^1, t^1) = 0 \\ \dfrac{\partial H_0}{\partial s^1} - \dfrac{\partial H_0}{\partial t^1} = 0 \end{cases}$$

Significant points:

$$\text{type } \alpha 1.1, \Omega^0 = \begin{cases} H_1 = H_1(s^0, t^0) = 0 \\ \dfrac{\partial H_1}{\partial s^0} = \dfrac{\partial H_1(s^0, t^0)}{\partial s^0} = a \\ \dfrac{\partial H_1}{\partial t^0} = \dfrac{\partial H_1(s^0, t^0)}{\partial t^0} = -a \end{cases}$$

$$= \begin{cases} H_1 = H_1(s^0, t^0) = 0 \\ \dfrac{\partial H_1}{\partial s^0} + \dfrac{\partial H_1}{\partial t^0} = 0 \end{cases}$$

-continued

Significant points:

$$\text{type } \alpha 1.1, \Omega^1 = \begin{cases} H_0 = H_0(s^1, t^1) = 0 \\ \frac{\partial H_0}{\partial s^1} = \frac{\partial H_0(s^1, t^1)}{\partial s^1} = a \\ \frac{\partial H_0}{\partial t^1} = \frac{\partial H_0(s^1, t^1)}{\partial t^1} = -a \end{cases}$$

$$= \begin{cases} H_0 = H_0(s^1, t^1) = 0 \\ \frac{\partial H_0}{\partial s^1} + \frac{\partial H_0}{\partial t^1} = 0 \end{cases}$$

Alternatively, significant points of type 1 may be determined by making a simple change of parameters and then solving the resulting system in the same as that as significant points 2 and 3 above. The change of parameters is a simple 2-D rigid rotation in parameter space of the amount $$\frac{\pi}{4} \text{ radians} = 45 \text{ degrees:}$$

$$\bar{s}^0 = s^0 \cos\left(\frac{\pi}{4}\right) - t^0 \sin\left(\frac{\pi}{4}\right) = \left(\frac{\sqrt{2}}{2}\right)(s^0 - t^0)$$

$$\bar{t}^0 = s^0 \sin\left(\frac{\pi}{4}\right) + t^0 \cos\left(\frac{\pi}{4}\right) = \left(\frac{\sqrt{2}}{2}\right)(s^0 + t^0)$$

and therefore, $$s^0 = \bar{s}^0 \cos\left(\frac{\pi}{4}\right) + \bar{t}^0 \sin\left(\frac{\pi}{4}\right) = \left(\frac{\sqrt{2}}{2}\right)\left(\bar{s}^0 + \bar{t}^0\right)$$

$$\bar{t}^0 = -\bar{s}^0 \sin\left(\frac{\pi}{4}\right) + \bar{t}^0 \cos\left(\frac{\pi}{4}\right) = \left(\frac{\sqrt{2}}{2}\right)\left(-\bar{s}^0 + \bar{t}^0\right)$$

The implicit algebraic functions become, $$\overline{H}_0\left(\overline{S}_1\left(\bar{s}^1, \bar{t}^1\right)\right) = 0$$

$$\overline{H}_1\left(\overline{S}_0\left(\bar{s}^0, \bar{t}^0\right)\right) = 0$$

Significant points:

$$\text{type } \alpha 1.0, \Omega^0 = \begin{cases} \overline{H}_1 = \overline{H}_1(\bar{s}^0, \bar{t}^0) = 0 \\ \frac{\partial \overline{H}_1}{\partial \bar{s}^0} = \frac{\partial \overline{H}_1(\bar{s}^0, \bar{t}^0)}{\partial \bar{s}^0} = 0 \end{cases}$$

Significant points:

$$\text{type } \alpha 1.0, \Omega^1 = \begin{cases} \overline{H}_0 = \overline{H}_0(\bar{s}^1, \bar{t}^1) = 0 \\ \frac{\partial \overline{H}_0}{\partial \bar{s}^1} = \frac{\partial \overline{H}_0(\bar{s}^1, \bar{t}^1)}{\partial \bar{s}^1} = 0 \end{cases}$$

Significant points:

$$\text{type } \alpha 1.1, \Omega^0 = \begin{cases} \overline{H}_1 = \overline{H}_1(\bar{s}^0, \bar{t}^0) = 0 \\ \frac{\partial \overline{H}_1}{\partial \bar{t}^0} = \frac{\partial \overline{H}_1(\bar{s}^0, \bar{t}^0)}{\partial \bar{s}^0} = 0 \end{cases}$$

-continued

Significant points:

$$\text{type } \alpha 1.1, \Omega^1 = \begin{cases} \overline{H}_0 = \overline{H}_0(\bar{s}^1, \bar{t}^1) = 0 \\ \frac{\partial \overline{H}_0}{\partial \bar{t}^1} = \frac{\partial \overline{H}_0(\bar{s}^1, \bar{t}^1)}{\partial \bar{t}^1} = 0 \end{cases}$$

The choice of equations for determining significant points of type 1 depends on numerical techniques involved in root determination and computational methods for solving systems of equations. The above shows that multiple options exist, with variants, which are both simple and convenient within current CAD software implementations, the optimal being operational, system, and application specific.

The significant points above can be sequenced in a topologically correct ordered set giving the correct series of significant points along the surface-surface intersection. Techniques for ordering a given set of points along a surface-surface intersection are common within both CAGD literature as well as commercial applications. Based on existing point ordering methods, we form the following paired sets:

Parameter space $\Omega^0$:

$$\Psi^0 = \{(s^0, t^0)_{0\alpha}{}^0, \ldots, (s^0, t^0)_{j\alpha}{}^0, \ldots, (s^0, t^0)_{(N_0-1)\alpha}{}^0\};$$

$j = 0, \ldots, (N_0 - 1)$

Model space $S_0$:

$$\Gamma^0 = \{S_0(s^0, t^0)_{0\alpha}{}^0, \ldots, S_0(s^0, t^0)_{j\alpha}{}^0, \ldots, S_0(s^0, t^0)_{(N_0-1)\alpha}{}^0\};$$

$j = 0, \ldots, (N_0 - 1)$

Parameter space $\Omega^1$:

$$\Psi^1 = \{(s^1, t^1)_{0\alpha}{}^1, \ldots, (s^1, t^1)_{j\alpha}{}^1, \ldots, (s^1, t^1)_{(N_1-1)\alpha}{}^1\};$$

$j = 0, \ldots, (N_1 - 1)$

Model space $S_1$:

$$\Gamma^1 = \{S_1(s^1, t^1)_{0\alpha}{}^1, \ldots, S_1(s^1, t^1)_{j\alpha}{}^1, \ldots, S_1(s^1, t^0)_{(N_1-1)\alpha}{}^1\};$$

$j = 0, \ldots, (N_1 - 1)$

Here the superscript on each point indicates the domain in which the significant point was solved in, while the subscript a indicates the significant point type from those previously described above.

Classification of sections of $\Psi^i$ and $\Gamma^i$.

Each successive significant point in sets $\Psi^i$ and $\Gamma^i$ corresponds to a pair with its previous respective value in the set, this ordering partitioning the sets into segments based on each pair of points.

Each segment, whether in $\Psi^i$ or $\Gamma^i$, may be classified as being of type $s^i$ or type $t^i$ based on the types of its endpoints, e.g., as shown in FIG. 39. If the segment is bounded by significant points $(s^i, t^i)_{j\alpha}{}^i$ and $(s^i, t^i)_{(j+1)\alpha}{}^i$, there are sixteen possible cases for the ordered pair $$(\text{Type}(s^i, t^i)_{j\alpha}, \text{Type}(s^i, t^i)_{(j+1)\alpha}{}^i),$$

where $\text{Type}(s^i t^i)_{j\alpha}{}^i$ denotes the type of the significant point $(s^i, t^i)_{j\alpha}{}^i$, and $\text{Type}(s^i, t^i)_{(j+1)\alpha}{}^i$ denotes the type of the significant point $(s^i, t^i)_{(j+1)\alpha}{}^i$. As shown in FIG. 39, the type of the segment is immediately resolved in certain cases of those sixteen cases, which are labeled with $s^i$ or $t^i$. In other cases, the type of the segment must be checked as follows. Calculate the velocity vector $$\frac{dt^i}{ds^i} = \left[\frac{\partial H_k}{\partial s^i}, \frac{\partial H_k}{\partial t^i}\right]^T$$

for $k \neq i$, at any point in the interior of the segment (i.e., excluding the end points), and classify the segment based on:

$$\text{Segment Type} = \begin{cases} \text{type } s^i, \text{ if } |dt^i/ds^i| \leq 1 \\ \text{type } t^i, \text{ if } |dt^i/ds^i| > 1 \end{cases}.$$

Note that the choice of assigning the boundary case $|dt^i/ds^i|=1$ to type $s^i$ is arbitrary. It could equally well have been assigned to type $t^i$.

Furthermore, observe that the segment type classification is invariant under exchange of the endpoint types. For example, the segment type of pair (2,1) is the same as the segment type of pair (1,2). Finally, note that the type pairs (3,2) and (2,3) are not possible if the segmentation has been performed properly. (Each represents a transition between zero slope and infinite slope, which will not occur on a continuous curve segment without an intermediate significant point of type 1.) Thus, an error warning may be issued if either of these type pairs is encountered.

Clustering Segments of Same Type into Intervals

The following paragraphs provide additional detail regarding step 212 from FIG. 13, wherein segments are clustered in the Pre-SSI algorithm.

In some embodiments, each maximal contiguous group of segments of the same type may be combined to form a cluster (i.e., interval) of the same type. This creates ordered subsets within each of the ordered sets $\Psi^i$ and $\Gamma^i$.

As an example, given a sequence of six segments having the corresponding sequence of types $\{s^i, s^i, s^i, t^i, t^i, s^i\}$, then the first three segments may be combined to form a cluster of type $s^i$; the next two segments may be combined to form a cluster of type $t^i$; and the last segment would constitute a singleton cluster of type $s^i$. Assuming, arbitrarily, that this sequence of segments is on the domain $\Omega^0$, this results in the following sets of points:

$$\Psi^0 = \{\{(s^0,t^0)_{0\alpha}{}^0,(s^0,t^0)_{1\alpha}{}^0,(s^0,t^0)_{2\alpha}{}^0,(s^0,t^0)_{3\alpha}{}^0\}_0^{s^0},$$
$$\{(s^0,t^0)_{3\alpha}{}^0,(s^0,t^0)_{4\alpha}{}^0,(s^0,t^0)_{5\alpha}{}^0\}_1^{t^0}, \{(s^0,t^0)_{5\alpha}{}^0,$$
$$(s^0,t^0)_{6\alpha}{}^0\}_2^{s^0}\}$$

$$\Gamma^0 = \{\{S_0(s^0,t^0)_{0\alpha}{}^0, S_0(s^0,t^0)_{1\alpha}{}^0, S_0(s^0,t^0)_{2\alpha}{}^0,$$
$$S_0(s^0,t^0)_{3\alpha}{}^0\}_0^{s^0}, \{S_0(s^0,t^0)_{3\alpha}{}^0, S_0(s^0,t^0)_{4\alpha}{}^0,$$
$$S_0(s^0,t^0)_{5\alpha}{}^0\}_1^{t^0}, \{S_0(s^0,t^0)_{5\alpha}{}^0, S_0(s^0,t^0)_{6\alpha}{}^0\}_2^{s^0}\}$$

Note here that the subset superscript denotes the classification while the subscript denotes the cluster.

In some embodiments, certain aspects of the processing to be described below may be performed on the basis of a cluster.

Check for Extraordinary Point Locations at Singular Points

As part of the classification and clustering operation, the WatertightCAD algorithm may identify a point of degeneracy as follows. Let vector $vel_a$ denote the velocity vector of the surface-surface intersection curve in parameter space $H_k(s^i, t^i)$, $k \neq i$, at an identified point $(s^i \pm \delta, t^i \pm \delta)_{j\alpha 0 \to (j-1)\alpha}{}^i$, near a singular point $(s^i, t^i)_{j\alpha 0}{}^i$, in between $(s^i, t^i)_{j\alpha 0}{}^i$ and $(s^i, t^i)_{(j-1)\alpha}{}^i$. Let vector $vel_b$ denote the velocity vector of the surface-surface intersection curve in parameter space $H_k(s^i, t^i)$, $k \neq i$, at an identified point $(s^i \pm \delta, t^i \pm \delta)_{j\alpha 0 \to (j+1)\alpha}{}^i$, near a singular point $(s^i, t^i)_{j\alpha 0}{}^i$, in between $(s^i, t^i)_{j\alpha 0}{}^i$ and $(s^i, t^i)_{(j+1)\alpha}{}^i$.

$$vel_a = \frac{dt^i}{ds^i}(s^i \pm \delta, t^i \pm \delta)^i_{j\alpha 0 \to (j-1)\alpha},$$

$$vel_b = \frac{dt^i}{ds^i}(s^i \pm \delta, t^i \pm \delta)^i_{j\alpha 0 \to (j+1)\alpha}.$$

Then, the point $(s^i, t^i)$ may be identified as an extraordinary point if $vel_a$ and $vel_b$ satisfy the following angular condition:

$$135° \leq \cos^{-1}\left(\frac{vel_a \cdot vel_b}{\|vel_a\|\|vel_b\|}\right) \leq 225°,$$

where $vel_a \cdot vel_b$ denotes the dot product of vectors $vel_a$ and $vel_b$, and $\|vel_a\|$ and $\|vel_b\|$ denote the Euclidean norm of vectors $vel_a$ and $vel_b$, respectively.

Add points to subsets of $\Psi^i$ and $\Gamma^i$ to reflect the internal knots $s^i$ or $t^i$ of $S_i$, depending on classification subsets.

For a given subset cluster of $\Psi^i$ or $\Gamma^i$, the spline surface $S_i$ may contribute additional points to these sets from interior surface knots of the spline surface $S_i$, depending on the classification of the segment. Suppose $x^i \in \{s^i, t^i\}$ denotes the type of the cluster for a subset of $\Psi^i$ or $\Gamma^i$. Then all $x_{min\_a}{}^i \leq x^i \leq x_{max\_a}{}^i$ admit new points to the subset as $(x^i, y^i)^i$, where $[x_{min\_a}{}^i, x_{max\_a}{}^i]$ bound the values of the subset in the classified variable. (An $x^i$ knot of the surface $S_i$ is either an $s^i$ knot if the segment is classified as a cluster of type $s^i$, or a $t^i$ knot if the segment is classified as a cluster of type $t^i$.)

As an example, given a subset of the following points, $$\Psi_{subset\_j}{}^i = \{(1.1,0.5)_{0\alpha}{}^i,(2.7,3.1)_{1\alpha}{}^i,(3.4,0.9)_{2\alpha}{}^i,$$
$$(6.2,2.7)_{3\alpha}{}^i\}_j^{s^i},$$

for the knot vectors, $$\mathcal{S}^i = [-2.4,-0.2,0.5,1.2,3.5,5.6,7.6,8.4,9.3]$$

and $$\mathcal{T}^i = [-5.3,-2.1,-1.1,0.6,1.9,2.2,6.3,10.2,12.5]$$

as the subset is classified as $s^i$, additional knot values from $S^i$ of $1.1 \leq 1.2$, $3.5$, $5.6 \leq 6.2$ need to be added to $\Psi_{subset\_j}{}^i$ after their respective $t^i$ values have been solved for at the surface-surface intersection. This is accomplished by solving the determinate system of surface-surface intersection equation where $s^i = \bar{s}^i$ has been specified. This may also be interpreted as the intersection of the isocurve of surface at $S_i(\bar{s}^i, t^i)$ with $S_k(s^k, t^k)$, $k \neq i$, which is a directly solvable mathematical problem, commonly articulated and offered in current CAD applications. This not only furnishes $t^i = \bar{t}^i$ but also $s^k = \bar{s}^k$ and $t^k = \bar{t}^k$. In the example above, the updated subset becomes, $$\Psi_{subset\_j}{}^i = \{(1.1,0.5)_{0\alpha}{}^i,(1.2,\tilde{t}^i)_{s^i}{}^i,(2.7,3.1)_{1\alpha}{}^i,$$
$$(3.4,0.9)_{2\alpha}{}^i,(3.5,\tilde{t}^i)_{s^i}{}^i,(5.6,\tilde{t}^i)_{s^i}{}^i,(6.2,2.7)_{3\alpha}{}^i\}_j^{s^i}$$

with respective model space point set, $$\Gamma_{subset\_j}{}^i = \{S_i(1.1,0.5)_{0\alpha}{}^i, S_i(1.2,\tilde{t}^i)_{s^i}{}^i, S_i(2.7,3.1)_{1\alpha}{}^i,$$
$$S_i(3.4,0.9)_{2\alpha}{}^i, S_i(3.5,\tilde{t}^i)_{s^i}{}^i, S_i(5.6,\tilde{t}^i)_{s^i}{}^i,$$
$$S_i(6.2,2.7)_{3\alpha}{}^i\}_j^{s^i}$$

From the above methodology, points are to be added to all subsets of $\Psi^i$ and $\Gamma^i$ to reflect the internal knots $s^i$ or $t^i$ of $S_i$, depending on bounds and classification of $S^i$ and $T^i$, as specified based on classification subsets index.

Merging sets $\Gamma^0$ and $\Gamma^1$ to Create Model Space Point Set with which to Perform Curve Interpolation.

We now seek to merge $\Gamma^0$ and $\Gamma^1$ into a properly ordered set with the end goal of having a point set with which to perform curve interpolation, approximating the surface-surface intersection curve in model space.

For each point $S_i(s^i, t^i)_{ja\ or\ x^i}{}^i$ in $\Gamma^i$, we seek the "pull-back" or "projection" into the complementary parameter space, $\Omega^k$, k≠i. Procedures for doing so are numerical, as the requisite inverse functions are not solved for. These are common in procedures in CAGD literature as well as current CAD applications. We will represent the operation by its notational operation, $$\dot{\psi}^k = \{S_k^{-1}(S_i(s^i,t^i)_{ja\ or\ x^i}), k\neq i\}.$$

Having solved for $\dot{\psi}^0$ and $\dot{\psi}^1$ we now seek the following sets, $$\ddot{\psi}^k = \dot{\psi}^k \cup \Psi^k$$

where $\ddot{\psi}^k$ is a properly ordered set reflecting the merged order of $\dot{\psi}^k$ and $\Psi^k$. If the sets have been merged correctly, the topology indicated by the ordered points of $\ddot{\psi}^0$ and $\ddot{\psi}^1$ should be identical. This order shall be the order of the set of model space points $\ddot{\Gamma}^k = \Gamma^0 \cup \Gamma^1$.

The ordered set $\ddot{\Gamma}^k$ is used to create a univariate parametric curve $C_{MS}(v)$ interpolating the sequence of points in this set as an approximation of the model space surface-surface intersection curve, in the process generating a knot vector V that contains unique knots describing points $\ddot{\Gamma}^k$ on $C_{MS}(v)$. We refer to these knots $v_\beta$ as originating from the significant point locations on the surfaces $v_a$ as well as the internal surface knots $v_{x^j}$. There are plenty of methods to accomplish this interpolation and parametric curve formation, as well as refining and subdividing this curve to achieve an approximation of the surface-surface intersection to a user specified tolerance. Any of these methods can be employed to furnish additional knots that are specific to the description of the parametric curve $v_\psi$.

Having generated a knot vector V, this will be used to form the global reparametrized space for the reconstructed surfaces. This will also be used to sample the necessary isocurves required for these processes. The Greville abscissae $v_\gamma$ of V serve as locations on $C_{MS}(v)$ to find points to sample the requisite isocurves. Points on the model space curve $C_{MS}(v_\gamma)$ may be mapped to a surface knot $\bar{x}_\gamma{}^i$ onto $S_i(\bar{x}_\gamma{}^i, y_\gamma{}^i)$ via a minimization of the distance between the point and surface. This is accomplished by solving the determinate system of surface-surface intersection equations where $x^i = \bar{x}_\gamma{}^i$ has been specified. This may also be interpreted as the intersection of the isocurve of surface at $S_i(\bar{x}_\gamma{}^i, y_\gamma{}^i)$ with $S_k(x^k, y^k)$, k≠i, which is a directly solvable mathematical problem, commonly articulated and offered in current CAD applications. These points will be referred to as $P_\gamma$ and used to furnish isocurves at the necessary locations.

Having created knot vector V and having solved for the surface-surface intersection points $P_\gamma$, the purpose of the Pre-SSI WatertightCAD algorithm has been fulfilled for downstream processes. In some embodiments, one novel aspect of the Pre-SSI WatertightCAD algorithm is the exactness and compactness of generating the minimum amount of information required from original objects. This is due to solving for the isocurve sampling points directly, using theoretically accurate CAGD equations with common computational methods found within CAD systems. This data does not depend on intermediary elements from other operations (i.e., conventional b-rep solid modeling Boolean operations), thereby making the WatertightCAD algorithm a process in which data is derived from the input data with the least amount of processing required. Such methods have been absent from both literature in the field as well as techniques in current applications.

Parameterization Change Handling Using Embedded Extensions, Inserted Extraordinary Points, and $C^0$ Points The following paragraphs present additional algorithmic detail regarding the parameterization change handling, step 310 of FIG. 15, of the WatertightCAD methodology.

In the processing of both Pre-SSI and Post-SSI algorithms, a necessary step occurs such that changes in parameterization are handled to match the intent of the user regarding the final form of the parameterization and control point organization of the reconstructed geometry. Multiple schemes are available, distinguished by the resulting continuity, complexity, and structure. Hereinafter, this algorithm may be referred to as the parameter change handling algorithm.

Both Pre-SSI and Post-SSI algorithms result in the same input to the parameter change handling algorithm. This input data includes a knot vector V with knots of distinct types forming specifically clustered segments, and surface-surface intersection points $P_\gamma$.

Knot vector V, by construction, will contain knots originating from three sources. The first source will be from the significant point locations defined by knots $v_\alpha$. The second source will be from the internal surface knots $v_{x^j}$. Thirdly, the last source of knots are associated with those used in the description of the parametric curve $v_\psi$ approximating the surface-surface intersection, in addition to the above source of knots, as to satisfy tolerance criteria.

Significant point knots $v_\alpha$ of types 0 and 1 define changes in which parameterization change handling is required. These significant points are unique in that they either define a parametric degeneracy or that they characterize a change from a classified region $x^i$ to the complementary classified region $y^i$. In doing so, the points where they occur on surface $S_i$ necessitate distinct operations that result in equivalent geometries (surface point sets) with very different parameterizations.

When significant point knots $v_\alpha$ of types 0 or 1 are encountered, one of three different methods may be employed, defining the parameter change handling algorithm. Hereinafter, for the parameter change handling algorithm, we refer to these three methods as:

1. $C^0$ points;
2. Embedded Extensions; and
3. Inserted Extraordinary Points

Each of these three methods will be defined in detail below.

One of the three methods in the parameter change handling algorithm is specified to complete either the Pre-SSI and Post-SSI algorithms. The downstream operations require the completion of the parameter change handling algorithm to successfully complete the operations defining full execution of the respective algorithm.

$C^0$ Points

Specifying $C^0$ points is equivalent to running either the Pre-SSI or Post-SSI algorithms without any intervention at this point. There are no additional operations taken and the data in the previous stages serve as input to the downstream stages (i.e., flow through of information).

Making the designation of $C^0$ points results in $C^0$ surface continuity at points mapped from knots $v_\alpha$ of types 0 or 1 to points on surface $S_i$ when global reparameterization and reconstruction occurs. By not selecting one of the other two methods of the parameter change handling algorithm, processing the remainder of operations in the Pre-SSI or Post-SSI algorithms results in lines of $C^0$ surface continuity at $S_i$ $(s^i, t^i)_{type\ a0}{}^i$ and/or $S_i(s^i, t^i)_{type\ a1}{}^i$ reflected in the global parameter space of $\bar{\Psi}$, The realization of the $C^0$ point selection will vary as per the significant point knot type 0 or 1. Making the designation of a $C^0$ point is on a point-by-point basis and not required as inclusive to a group based on designation.

Figure 40:
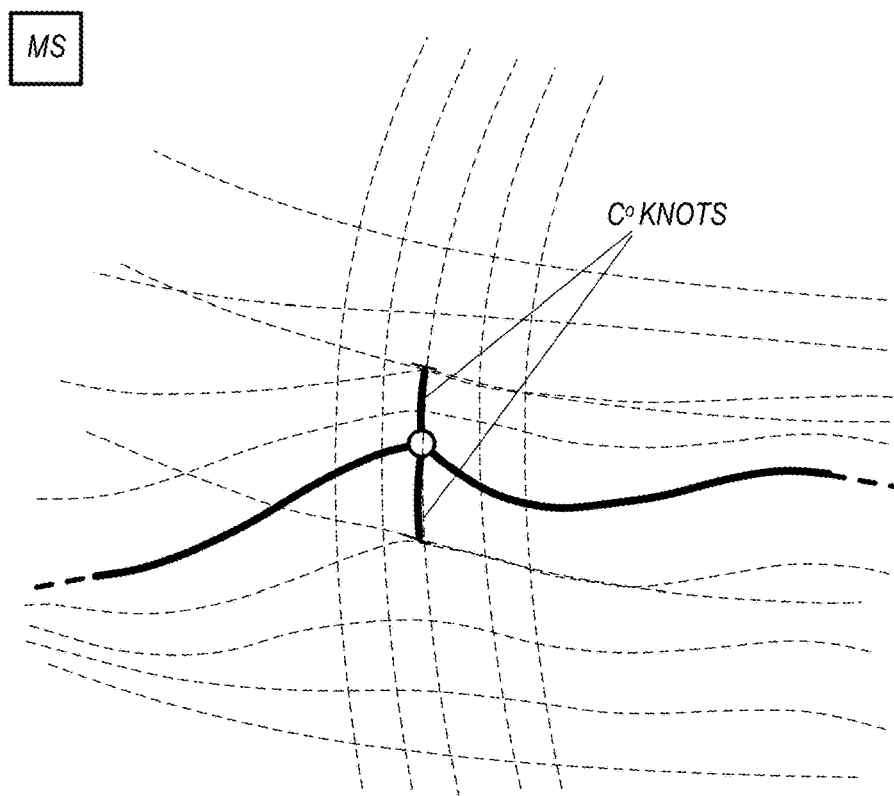
FIG. 40 is an illustration of $C_0$ knots and corresponding significant point types that may be produced from downstream global reparameterization and reconstruction operations, according to some embodiments.
Figure 40:
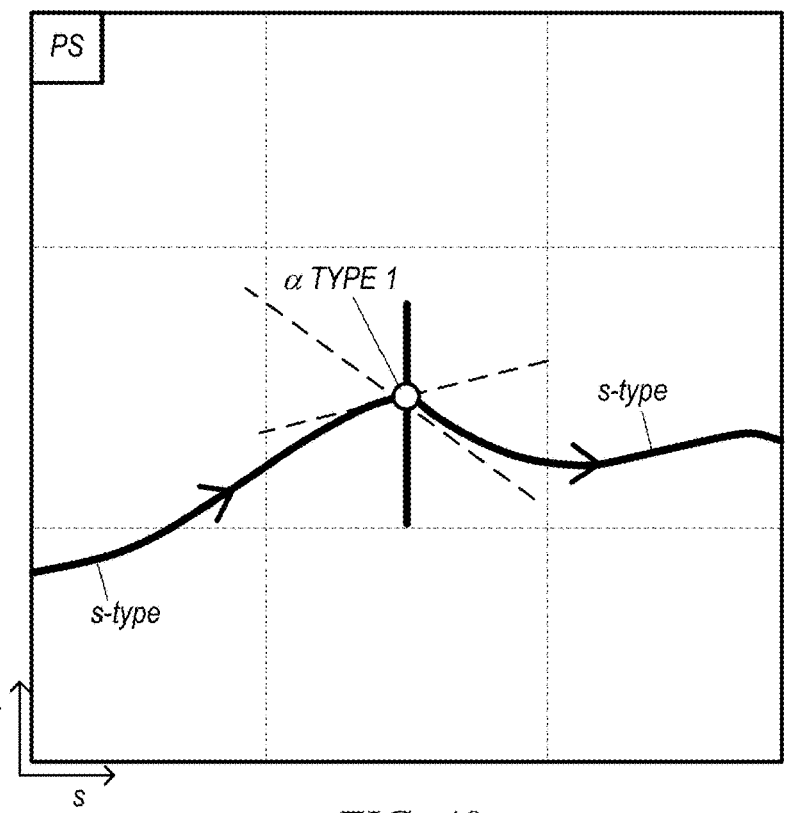

In the instance where a $C^0$ point of significant point knot type 0 occurs, a line of $C^0$ surface continuity at points mapped from knots $v_{0\alpha}$ on surface $S_i$ in the $y^i$ direction will be produced from downstream global reparameterization and reconstruction operations. This is demonstrated in an example in FIG. 40.

Figure 41:
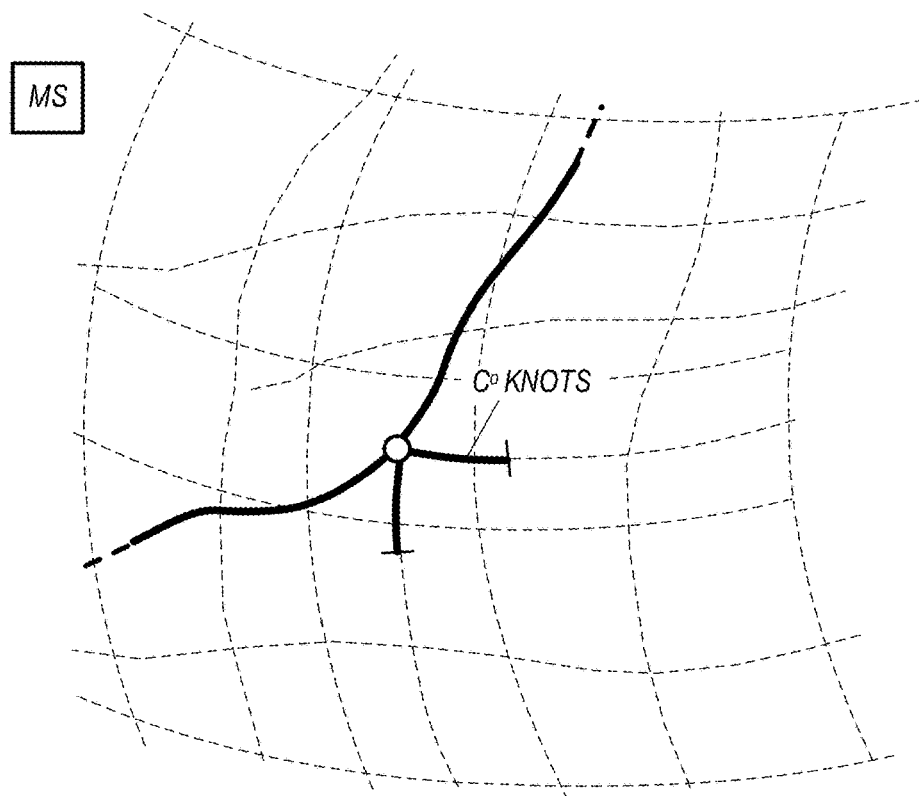
FIG. 41 is another illustration of $C_0$ knots and corresponding significant point types that may be produced from downstream global reparameterization and reconstruction operations, according to some embodiments.
Figure 41:
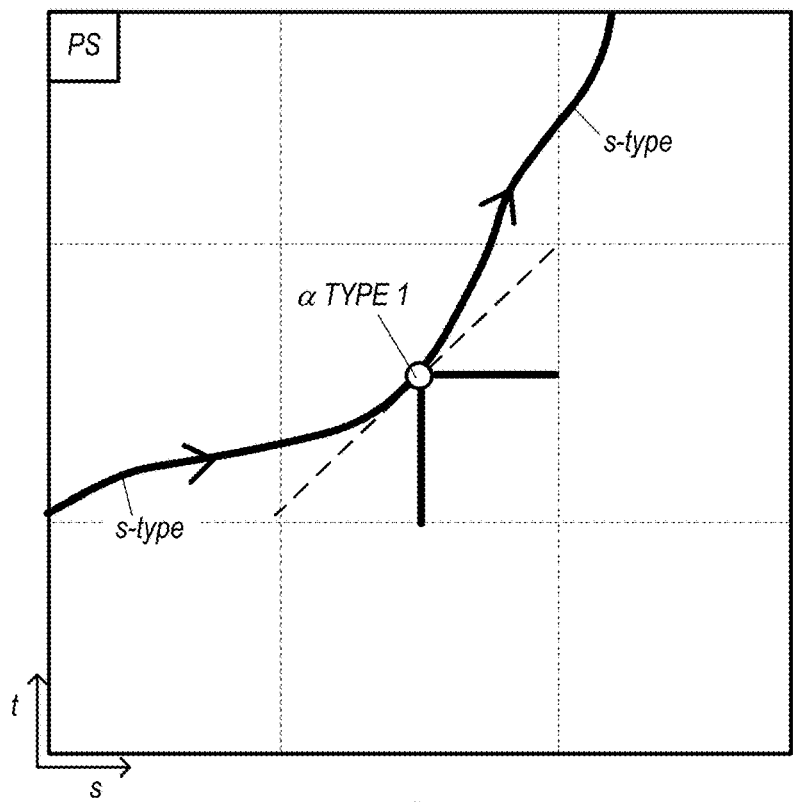

In the instance where a $C^0$ point of significant point knot type 1 occurs, a line of $C^0$ surface continuity at points mapped from knots $v_{0\alpha}$ on surface $S_i$ in $x^i$ and $y^i$ directions outwards from radius of curvature of the original parameter space trim curves will be produced from downstream global reparameterization and reconstruction operations. Another way of saying this is that the curve normal vector indicates $C^0$ surface continuity of the reconstructed surface in the $x^i$ and $y^i$ directions. This is demonstrated in an example in FIG. 41.

Embedded Extensions

Specifying Embedded Extensions is equivalent to running either the Pre-SSI or Post-SSI algorithms with the same set of surface-surface intersection trim curves designated as input to the parameter change handling algorithm but with additional extensions made to the individual curves. The details of the process to create these extensions are outlined below.

Making the designation of Embedded Extensions results in surface continuity greater than $C^0$ at points mapped from knots $v_\alpha$ of types 0 or 1 to points on surface $S_i$ when global reparameterization and reconstruction occurs. By selecting the Embedded Extensions method of the parameter change handling algorithm, processing the remainder of operations in the Pre-SSI or Post-SSI algorithms results in continuity greater than $C^0$ at $S_i(s^i, t^i)_{type\ \alpha 0}{}^i$ and/or $S_i(s^i, t^i)_{type\ \alpha 1}{}^i$ reflected in the global parameter space of $\tilde{\Omega}$, The operations defining the Embedded Extensions selection are the same for either significant point knot type 0 or 1, but with differing results. Making the designation of Embedded Extensions is on a point-by-point basis and not required as inclusive to a group based on designation.

In the instance where an Embedded Extensions is specified for a significant point, the parameter space trim curve $C_{PSi}(u^i)=[s^i(u^i), t^i(u^i)]^T$ is extended in a particular fashion in the domain of the original parameter spaces $\Omega^i=[s_{min}{}^i, s_{max}{}^i]\times[t_{min}{}^i, t_{max}{}^i]\subset \mathbb{R}^2$. The goal of the process is to extend the curve at its clustered end point $C_{PSi}(u_{END}{}^i)$ containing arbitrary tangent derivative $dC_{PSi}/du_{END}{}^i=[ds^i/du_{END}{}^i, dt^i/du_{END}{}^i]^T$ with a $C^{p-1}$ extension such that it smoothly curves to orient to a new end $C_{PSi}(u_{EXT}{}^i)$ whose tangent curve vector is parallel to the classified section parameter, $y^i$, at arbitrary value $x^i=\overline{y}^i$, i.e. $d\overline{y}^i/du_{EXT}{}^i=0$. We will refer to the extended version of $C_{PSi}(u^i)$ as $C_{PSi\_EXT}(u^i)$ Spline curve extensions are commonly covered in CAGD literature and are featured commonly in CAD applications. The particular extension used here has not been documented to date for the purposes described.

The trace of the $C_{PSi\_EXT}(u^i)$ can be evaluated to furnish a set of model space points $SOP_{MS\_EXT}$ lying on surface $S_i$. These points can be interpolated using standard techniques in CAD to furnish an extended version of $C_{MS}(v)$ denoted $C_{MS\_EXT}(v)$. Similar to $C_{MS}(v)$, $C_{MS\_EXT}(v)$ will not lie directly on surface $S_i$. This is not the purpose of creating $C_{MS\_EXT}(v)$, rather, to have the new end point $C_{MS\_EXT}(v_{EXT})$ tangent to an isoparametric curve of the classified section parameter, $y^i=\overline{y}^i$, $S_i(x^i, \overline{y}^i)$.

Having created $C_{MS\_EXT}(v)$ such that it smoothly transitions from $C_{MS}(v_{END})$ to a point $C_{MS\_EXT}(v_{EXT})$ whose tangent vector aligns with the isoparametric curve of the classified section parameter, $y^i=\overline{y}^i$, $S_i(x^i, \overline{y}^i)$, the downstream operations of global reparameterization and reconstruction can now be processed normally. The curve extensions created by the above process create unique and advantageous parametric and surface properties at $S_i(s^i, t^i)_{type\ \alpha 0}{}^i$ and/or $S_i(s^i, t^i)_{type\ \alpha 1}{}^i$ of the reconstructed surface (e.g., properties such as geometric and parametric continuity, parametric structure, parametric fidelity, mesh resolution, mesh aspect ratio, mesh skew, mesh taper, etc.), reflected in the new global parameter space of $\tilde{\Omega}$.

Figure 42:
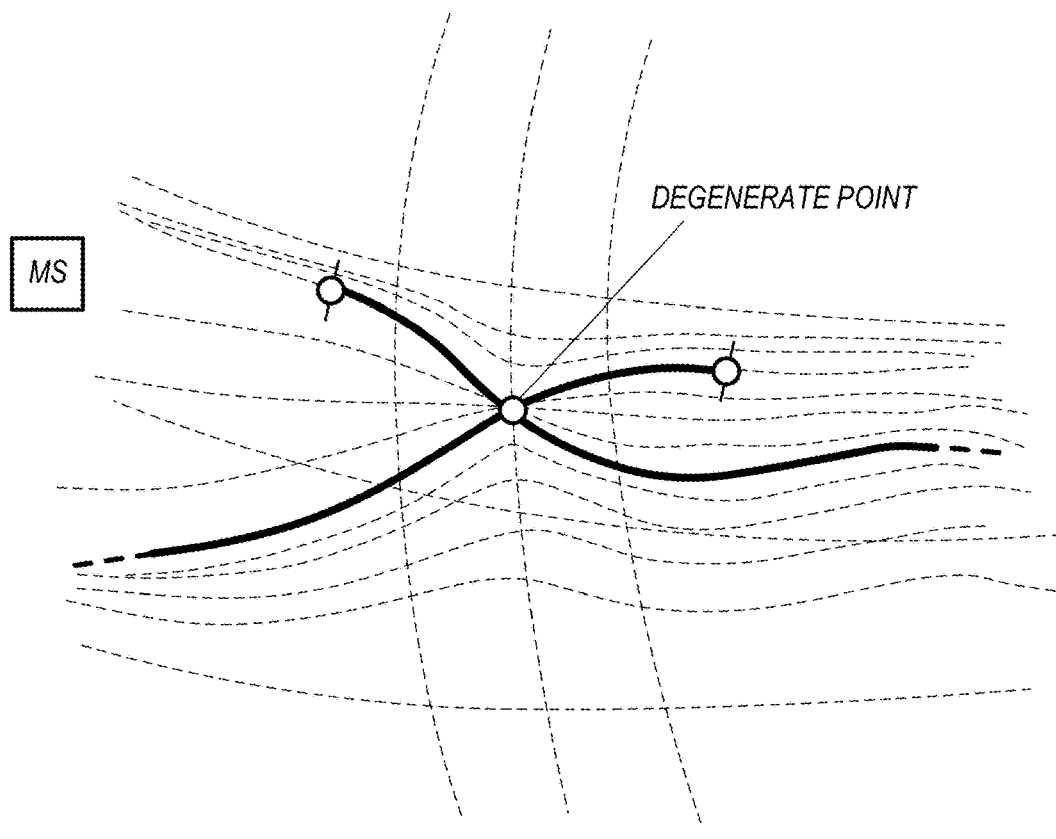
FIG. 42 is an illustration of an example of the embedded extensions for the significant point knot type 0, according to some embodiments.
Figure 42:
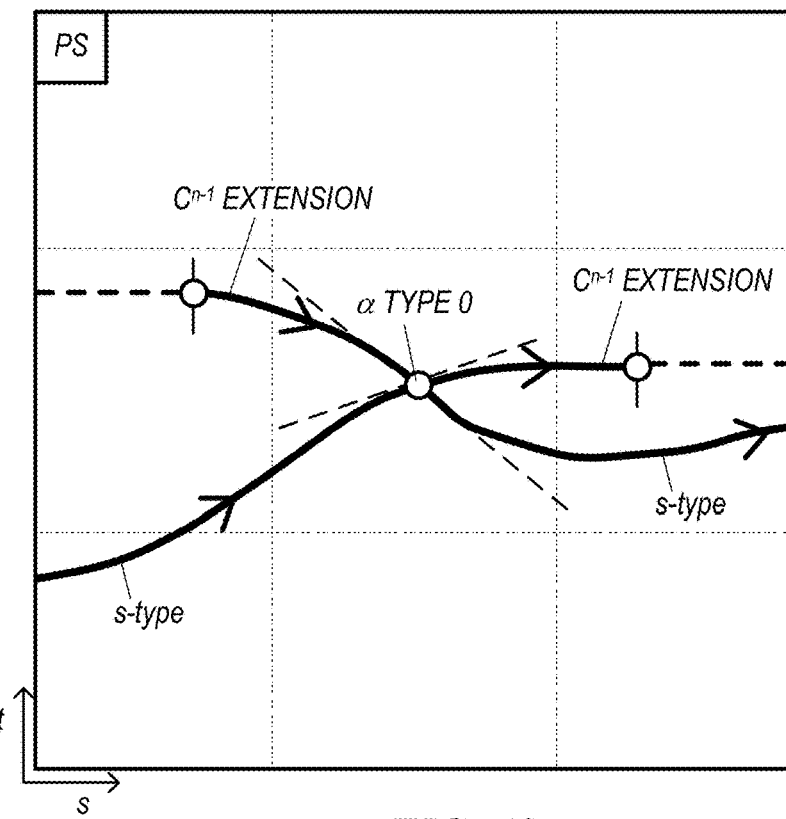
Figure 43:
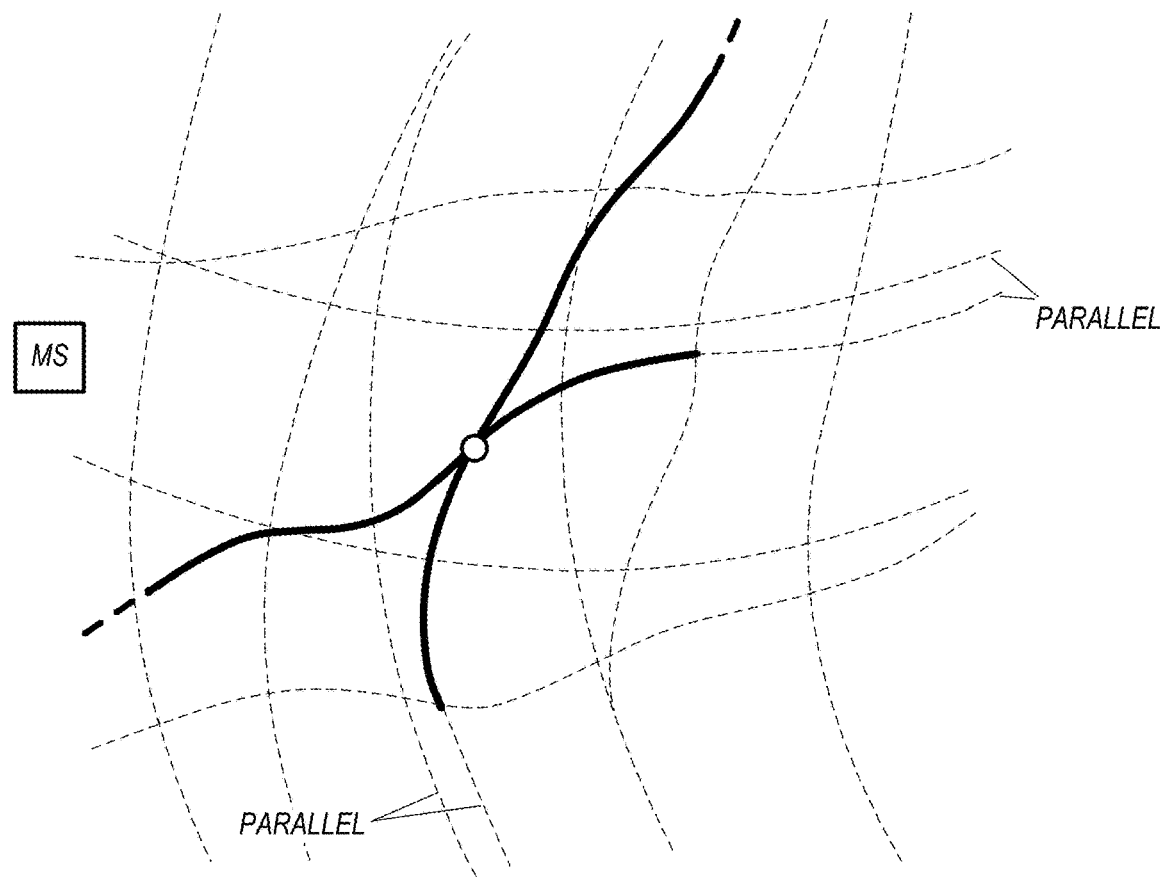
FIG. 43 is an illustration of an example of the embedded extensions for the significant point knot type 1, according to some embodiments.
Figure 43:
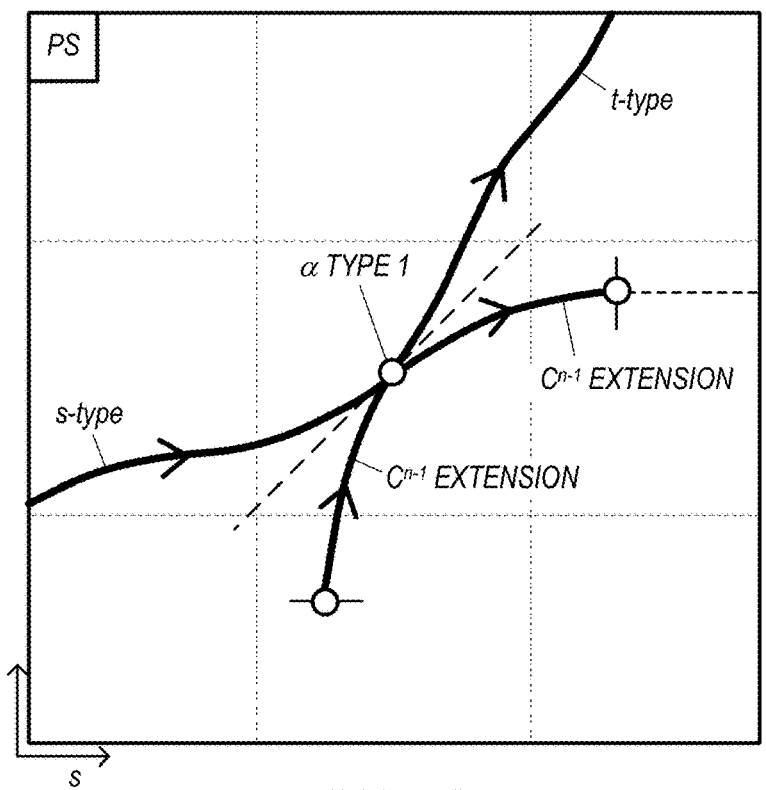

Examples of the Embedded Extensions for the significant point knot types 0 and 1 are depicted in FIG. 42 and FIG. 43, respectively, showing how the significant point knot types affect the final objects.

Inserted Extraordinary Points

Specifying Inserted Extraordinary Points is equivalent to running either the Pre-SSI or Post-SSI algorithms with the same set of surface-surface intersection trim curves designated as input to the parameter change handling algorithm but with an additional trim curve created exclusively for the purposes of altering the parameterization and extraordinary point characterization of the object. To date, the use of such techniques has never been documented nor utilized in any available CAD application.

Making the designation of Inserted Extraordinary Points results in surface continuity greater than $C^0$ at points mapped from knots $v_\alpha$ of type 1 to points on surface $S_i$ when global reparameterization and reconstruction occurs. By selecting the Inserted Extraordinary Points method of the parameter change handling algorithm, processing the remainder of operations in the Pre-SSI or Post-SSI algorithms results in continuity greater than $C^0$ at $S_i(s^i, t^i)_{type\ \alpha 1}{}^i$, reflected in the global parameter space of $\tilde{\Omega}$.

Making the designation of Inserted Extraordinary Points is on a point-by-point basis and not required as inclusive to a group based on designation.

In the instance where an Inserted Extraordinary Points is specified for a significant point, an additional parameter space trim curve $C_{EPi}(r^i)=[s^i(r^i), t^i(r^i)]^T$ is created in a particular fashion in the domain of the original parameter spaces $\Omega^i=[s_{min}{}^i, s_{max}{}^i]\times[t_{min}{}^i, t_{max}{}^i]\subset \mathbb{R}^2$. The goal of the process is to establish a new curve used to modify the parameterization of $S_i$ when used in combination with the downstream operations of global reparameterization and reconstruction processed normally.

$C_{EPi}(r^i)=[s^i(r^i), t^i(r^i)]^T$ is constructed to be a new curve segment normal to the curve $C_{PSi}(u^i)=[s^i(u^i), t^i(u^i)]^T$ (orthogonal to the curve tangent) at the specified significant point, $C_{PSi}(u_\alpha{}^i)=[s^i(u_\alpha{}^i), t^i(u_\alpha{}^i)]^T$.

The simplest construction of $C_{EPi}(r^i)=[s^i(r^i), t^i(r^i)]^T$ is a line segment that extends in both the negative and positive directions normal to the curve $C_{PSi}(u^i)=[s^i(u^i), t^i(u^i)]^T$, the distance away in each direction being an arbitrary specified distance. More complex constructions of $C_{EPi}(r^i)$ are admissible, as long as they extend in both the negative and positive directions normal to the curve $C_{PSi}(u^i)$, but are not necessary.

The trace of $C_{EPi}(r^i)$ can be evaluated to furnish a set of model space points $SOP_{MS\_EP}$ lying on surface $S_i$. These points can be interpolated using standard techniques in CAD to furnish an inserted extraordinary point model space curve denoted $C_{MS\_Ep}(\rho)$. Similar to $C_{MS}(v)$, $C_{MS\_EP}(\rho)$ will not lie directly on surface $S_i$. This is not the purpose of creating $C_{MS\_EP}(\rho)$, rather, to have the new curve normal to an isoparametric curve of the classified section parameter, $y^i = \bar{y}^i$, $S_i(x^i, y^i)$.

Having created, $C_{MS\_EP}(\rho)$ such that it is a new curve normal to an isoparametric curve of the classified section parameter, $y^i = \bar{y}^i$, $S_i(x^i, y^i)$, the downstream operations of global reparameterization and reconstruction can now be processed normally. The inserted extraordinary point model space curves created by the above process create unique and advantageous parametric and surface properties at $S_i(s^i, t^i)_{type\ \alpha 1}{}^i$ of the reconstructed surface (e.g., properties such as geometric and parametric continuity, parametric structure, parametric fidelity, mesh resolution, mesh aspect ratio, mesh skew, mesh taper, etc.), reflected in the new global parameter space of $\tilde{\Omega}$.

Figure 44:
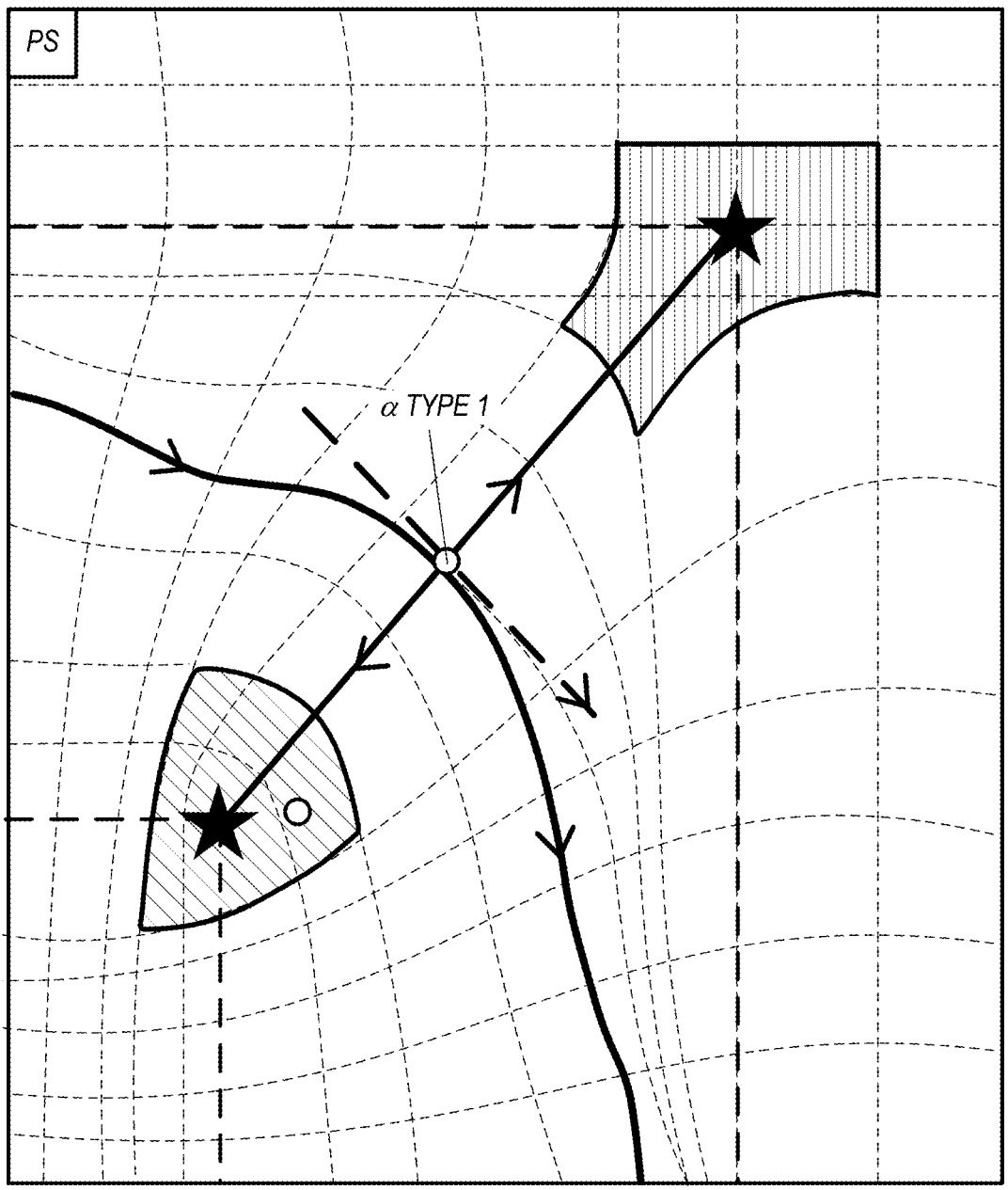
FIG. 44 is an illustration of an example of the inserted extraordinary point technique, according to some embodiments.

An example of the Inserted Extraordinary Point technique is depicted in FIG. 44.

Figure 45:
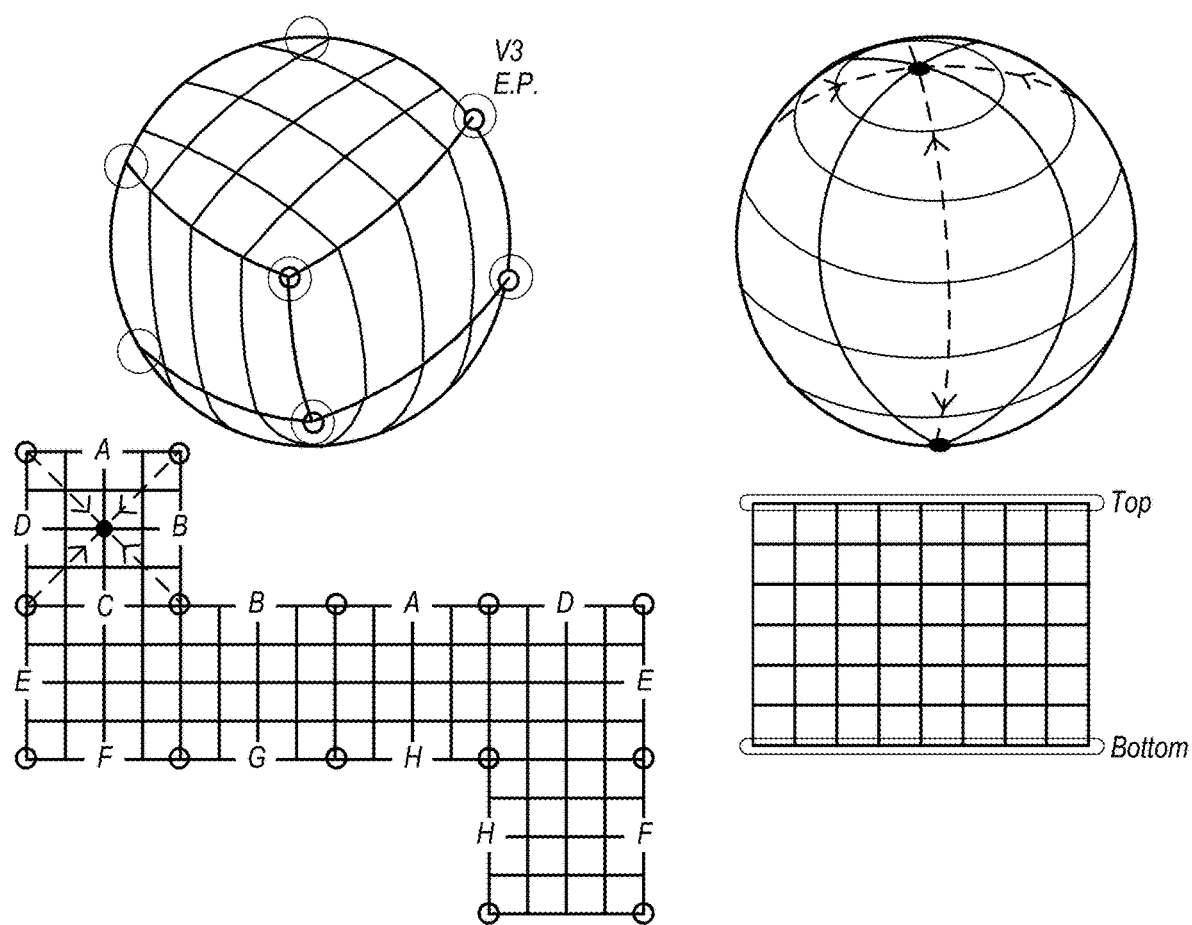
FIG. 45 is an illustration of an instance wherein the surface of a sphere is modified from a quadball configuration to that of a standard single patch configuration with degenerate points at the poles, according to some embodiments.

The parameter change handling algorithm modifies the input information created by both Pre-SSI and Post-SSI algorithms to create unique and advantageous parametric and surface properties at $S_i(s^i, t^i)_{type\ \alpha 0}{}^i$ and/or $S_i(s^i, t^i)_{type\ \alpha 1}{}^i$ of the reconstructed surface (e.g., properties such as geometric and parametric continuity, parametric structure, parametric fidelity, mesh resolution, mesh aspect ratio, mesh skew, mesh taper, etc.), reflected in the new global parameter space of $\tilde{\Omega}$. Multiple schemes are available, distinguished by the resulting continuity, complexity, and structure, as detailed by the $C^0$ Points, Embedded Extensions, or the Inserted Extraordinary Points methods. As such, the parameter change handling algorithm can be used to reparametrize a surface even without a surface-surface intersection or Boolean operation specified. By invoking the Inserted Extraordinary Point technique, untrimmed objects may experience the benefits of the processes herein at selected extraordinary points and/or degenerate points. FIG. 45 depicts such an instance in which the surface of a sphere is modified from a quadball configuration to that of a standard single patch configuration with degenerate points at the poles.

Graphics Device

In one set of embodiments, a graphics device including a graphics processing unit (GPU) (or a plurality of GPUs) and memory may be configured to perform a method (e.g., any of the method embodiments described herein, or, any combination of the method embodiments described herein, or any subset of any of the method embodiments described herein, or, any combination of such subsets). A GPU program stored in the memory may be executed by the GPU, in order to perform said method. The graphics device may enable said method to operate in real time. The graphics device may be configured for coupling to or interfacing with a computer system. The graphics device may be controlled by host software (e.g., CAD software) executing on the computer system.

Some embodiments may be realized in any of the following various forms.

1. A method comprising:

receiving first and second geometric input data that respectively specify first and second input surfaces in a model space;

creating first and second geometric output data that respectively specify first and second output surface patches, wherein the first and second geometric output data are created so that:

a boundary portion of the first output surface patch meets a boundary portion of the second output surface patch in a continuous fashion along at least a portion of a model space curve, wherein the model space curve approximates a geometric intersection of the first input surface and the second input surface, wherein the first output surface patch geometrically approximates a subsurface of the first input surface, wherein the second output surface patch geometrically approximates a subsurface of the second input surface.

2. The method of claim 1, wherein the first input surface includes a first tensor product spline surface, wherein the first geometric input data includes a first pair of knot vectors and a first set of surface control points, wherein the second input surface includes a second tensor product spline surface, wherein the second geometric input data includes a second pair of knot vectors and a second set of surface control points.

2B. The method of claim 2, wherein the first and second tensor product spline surfaces are NURBS surfaces (or T-Spline surfaces).

3. The method of claim 1, wherein the first output surface patch geometrically approximates the subsurface of the first input surface to within model tolerance, wherein the second output surface patch geometrically approximates the subsurface of the second input surface to within the model tolerance 4. The method of claim 1, wherein the boundary portion of the first output surface patch corresponds to a boundary isocurve of the first output surface patch, wherein the boundary portion of the second output surface patch corresponds to a boundary isocurve of the second output surface patch.

5. The method of claim 1, wherein said receiving and said creating are performed as part of a Boolean operation in a CAD software system.

6. The method of claim 1, further comprising:

numerically computing a set of intersection points that at least approximately reside on the geometric intersection of the first input surface and the second input surface;

computing geometric data (e.g., knot vector and curve control points) that specify the model space curve, based on the set of intersection points; and storing the geometric data that specify the model space curve.

7. The method of claim 1, further comprising:

traversing a boundary representation to obtain the first and second geometric input data, wherein the boundary representation models topological and geometric structure of an object.

8. The method of claim 7, further comprising:

updating the boundary representation in response to said creating the first and second geometric output data.

9. The method of claim 8, further comprising:

after having performed said update of the boundary representation, executing an engineering analysis (e.g., a physics-based analysis) based on the boundary representation, to obtain data predicting physical behavior of the object. (The predictive data may be used in various ways, e.g., to: generate display output to a user, for visualization of the physical behavior; calculate and output a set of performance limits for a manufactured realization of the object; identify locations of likely fault(s) in a manufactured realization of the object; select material(s) to be used for manufacture of the object; direct a process of manufacturing the object; direct automatic changes to geometry of the boundary representation; etc.)

10. The method of claim 9, wherein said engineering analysis includes (or is) an isogeometric analysis.

11. The method of claim 8, further comprising:
after having performed said update of the boundary representation, manufacturing (or directing a process of manufacturing) the object based on the boundary representation.

12. The method of claim 8, further comprising:
after having performed said update of the boundary representation, generating an image of the object based on the boundary representation and displaying the image.

13. The method of claim 8, further comprising:
after having performed said update of the boundary representation, generating a sequence of animation images based on the boundary representation and displaying the sequence of animation images.

14. The method of claim 1, further comprising:
any subset of the features, elements and embodiments described in the specification and Figures.

15. The method of claim 1, wherein said creating the first geometric output data includes:
determining a first set of isocurve data specifying a first set of isocurves of the first input surface on a region within a parametric domain of the first input surface;
dividing the first set of isocurves at respective locations based on the model space curve, to obtain a second set of isocurve data specifying sub-isocurves of the respective isocurves;
computing surface control points for the first output surface patch based on control points for said portion of the model space curve and a proper subset of the second set of isocurve data.

16. The method of claim 15, wherein said sub-isocurves are reparametrized to a common parametric interval and cross-refined to achieve a common knot vector prior to said computing the surface control points for the first output surface patch.

17. The method of claim 1,
wherein said computing the surface control points for the first output surface patch comprises solving one or more linear systems of equations that relate said surface control points to the control points for said portion of the model space curve and said at least a portion of the first set of isocurve data.

18. A method for designing an object (e.g., a part for an automobile, an aircraft, a submarine, a boat, an electronic device, etc.), the method comprising:
reconstructing trimmed surfaces in a boundary representation model of the object, so that the reconstructed trimmed surfaces meet in a $C^0$ continuous fashion along their respective trim boundaries; and
updating the boundary representation model based on the reconstructed trimmed surfaces.

19. A method for designing an object, the method comprising:
constructing trimmed surfaces that meet in a $C^0$ continuous fashion along their respective trim boundaries; and
updating a boundary representation model of the object based on the constructed trimmed surfaces.

20. A method comprising:
receiving first and second geometric input data that respectively specify first and second input surfaces in a model space;
creating first geometric output data that specify a first set of output surface patches;

creating second geometric output data that specify a second set of output surface patches;
wherein the first and second geometric output data are created so that:
a boundary portion of a union of images of the first set of output surface patches meets a boundary portion of a union of images of the second set of output surface patches in a continuous fashion along at least a portion of a model space curve,
wherein the model space curve approximates a geometric intersection of the first input surface and the second input surface,
wherein the union of the images of the first set of output surface patches geometrically approximates a subsurface of the first input surface,
wherein the union of the images of the second set of output surface patches geometrically approximates a subsurface of the second input surface.

21. The method of claim 20, further comprising any subset of the features recited in claims 1-19.

22. The method of claim 20,
wherein the first input surface includes a first tensor product spline surface, wherein the first geometric input data includes a first pair of knot vectors and a first set of surface control points,
wherein the second input surface includes a second tensor product spline surface, wherein the second geometric input data includes a second pair of knot vectors and a second set of surface control points.

23. The method of claim 20,
wherein the image of each of the first set of output surface patches geometrically approximates a corresponding portion of the first input surface to within model tolerance,
wherein the image of each of the second set of output surface patches geometrically approximates a corresponding portion of the second input surface to within the model tolerance.

24. The method of claim 20, further comprising:
traversing a boundary representation to obtain the first and second geometric input data, wherein the boundary representation models topological and geometric structure of an object; and/or
updating the boundary representation in response to said creating the first and second geometric output data.

25. The method of claim 24, further comprising:
performing refinement on the first input surface, the second input surface and the model space curve to obtain:
a one-to-one correspondence between portions of the model space curve and knot intervals of the first input surface; and
a one-to-one correspondence between portions of the model space curve and knot intervals of the second input surface;
for each of the portions of the model space curve, performing operations including:
creating a corresponding one of the first set of output surface patches on the corresponding knot interval of the first input surface;
creating a corresponding one of the second set of output surface patches on the corresponding knot interval of the second input surface,
wherein a boundary portion of the created output surface patch of the first set meets a boundary portion of the created output surface patch of the second set in a continuous fashion along a corresponding portion of the model space curve.

26. The method of claim 25, wherein said performing refinement includes:

identifying significant points on a trajectory of a first parametric trim curve that resides in a parametric domain of the first input surface;

refining the first input surface based on the identified significant points;

refining the second input surface based on the identified significant points.

27. The method of claim 26, wherein the first geometric input data define a first spline mapping for the first input surface, the method further comprising:

numerically computing a set of intersection points in the parametric domain of the first input surface, wherein images of the intersection points under the first spline map at least approximately reside on the geometric intersection of the first input surface and the second input surface; and computing and storing geometric data (e.g., knot vector and curve control points) that specify the first parametric trim curve, based on the set of intersection points.

28. The method of claim 25, wherein said performing refinement includes:

identifying one or more interior surface knots of the first input surface;

refining the first input surface at the one or more interior knots; and refining the second input surface based on the one or more interior knots of the first input surface.

29. The method of claim 25, wherein said performing refinement includes:

identifying one or more knots of the model space curve;

refining the first input surface based on the one or more knots of the model space curve;

refining the second input surface based on the one or more knots of the model space curve.

30. The method of claim 25, wherein said creating the corresponding output surface patch of the first set includes:

reparametrizing first and second boundary isocurves of the output surface patch to achieve parametric agreement with the corresponding portion of the model space curve.

31. The method of claim 25, wherein said creating the corresponding output surface patch of the first set includes:

determining a first set of isocurve data specifying a first set of isocurves of the first input surface on a region within a parametric domain of the first input surface;

dividing the first set of isocurves at respective locations based on the model space curve, to obtain a second set of isocurve data specifying sub-isocurves of the respective isocurves;

computing surface control points for the output surface patch based on control points for the corresponding portion of the model space curve and a proper subset of the second set of isocurve data.

32. A computer-implemented method for modifying an object comprising at least two surfaces, to create trimmed surfaces that meet in a continuous fashion, the method comprising:

receiving and storing input data including:

first and second spline surfaces;

a model space trim curve that approximates an intersection of the first and second spline surfaces in a model space;

extracting first and second initial surface patches respectively from the first and second spline surfaces based on the input data;

extracting a portion of the model space trim curve;

constructing a first output patch based on curve control points of said portion of the model space trim curve and sampled sub-isocurve data from the first initial surface patch;

constructing a second output patch based on the curve control points of said portion of the model space trim curve and sampled sub-isocurve data from the second initial surface patch;

wherein the first and second output patches are constructed so that a boundary portion of the first output patch meets a boundary portion of the second output patch along said portion of the model space trim curve.

33. The method of claim 32, wherein the first and second output patches are constructed so that, for each of the first and second output patches:

the image of said output patch is within model tolerance of a corresponding portion of the corresponding initial surface patch.

34. The method of claim 32, wherein the input data also includes first and second parameter space trim curves that correspond respectively to the first and second spline surfaces.

35. The method of claim 32, wherein at least one of the first and second output surface patches is of Bézier form in at least one parametric direction.

36. The method of claim 32, wherein said portion of the model space curve is of Bézier form.

37. A method for reconstructing at least two tensor product spline surfaces to provide that the surfaces meet with $C^0$ continuity along at least a portion of a model space curve, wherein said at least two tensor product spline surfaces each map from a corresponding 2D parameter space into a common model space, and each has a corresponding trim curve that resides in the corresponding 2D parameter space, wherein the model space curve resides in the model space and approximates a geometric intersection of said at least two tensor product spline surfaces, the method comprising:

for each of said at least two tensor product spline surfaces, performing operations including:

generating a set of surface control points for a surface patch from at least a portion of the tensor product spline surface, wherein a portion of the trim curve of the tensor product spline surface traverses a 2D domain of the surface patch from a first boundary to a second boundary opposite the first boundary, wherein the first boundary corresponds to a minimal value of a selected coordinate of the 2D domain, wherein the second boundary corresponds to a maximal value of the selected coordinate of the 2D domain;

for each of at least three values of the selected coordinate, dividing a corresponding isoparametric curve of the surface patch into a corresponding pair of sub-isoparametric curves at a corresponding location determined based on the model space curve, wherein said at least three values of the selected coordinate include the minimal value, the maximal value and at least one intermediate value;

generating a set of surface control points for a first output patch based on control point data including:

(a) for each of the at least one intermediate value, a corresponding set of interior curve control points of a first sub-isoparametric curve of the sub-isoparametric curve pair corresponding to the intermediate value;

(b) for the minimal value of the selected coordinate, a first set of curve control points of a first sub-isoparametric curve $SI_{1,min}$ of the sub-isoparametric curve pair corresponding to the minimal value;

(c) for the maximal value of the selected coordinate, a second set of curve control points of a first sub-isoparametric curve $SI_{1,max}$ of the sub-isoparametric curve pair corresponding to the maximal value;

(d) curve control points for said portion of the model space curve.

38. The method of claim 37, wherein said control point data also includes: (e) curve control points for an isoparametric curve of the surface patch along a third boundary of the 2D domain, wherein the third boundary corresponds to either a maximal value or a minimal value of a complementary coordinate of the 2D domain.

39. The method of claim 37, wherein said at least three values of the selected coordinate include at least four values of the selected coordinate.

40. The method of claim 37, wherein the maximal value and/or the minimal value of the complementary coordinate of the 2D domain is (are) selected based on user input.

41. The method of claim 37, wherein the first set of curve control points does not include a curve control point of the sub-isoparametric curve $SI_{1,min}$ that is closest to the model space curve, wherein the second set of curve control points does not include a curve control point of the sub-isoparametric curve $SI_{1,max}$ that is closest to the model space curve.

42. The method of claim 37, wherein the first output patch is generated so that a boundary isoparametric curve of the first output patch maps onto the portion of the model space curve.

43. The method of claim 37, further comprising:

traversing a boundary representation object model to identify at least two topological faces that meet along a topological edge, wherein the boundary representation object model includes geometric data for each of the topological faces and the topological edge, wherein each tensor product spline surface and its corresponding trim curve are included in the geometric data associated with a corresponding one of the topological faces, wherein the model space curve is included in the geometric data associated with the topological edge.

44. The method of claim 43, further comprising:

for each of said at least two topological faces, generate a corresponding set of output geometry using at least the set of surface control points of the first output patch, and update the geometry associated with the topological face based on the corresponding set of output geometry.

45. The method of claim 44, further comprising, after said updating the geometry of each of said at least two topological faces:

performing an isogeometric finite element analysis based on the boundary representation object model, to obtain analysis data characterizing physical behavior of the boundary representation object model; and outputting at least a subset of the analysis data for visualization via a display device.

46. The method of claim 44, further comprising, after said updating the geometry of each of said at least two topological faces:

performing a finite element analysis on a polygonal mesh generated from the boundary representation object model, to obtain analysis data characterizing physical behavior of the boundary representation object model; and outputting at least a subset of the analysis data for visualization via a display device.

47. The method of claim 44, further comprising, after said updating the geometry of each of said at least two topological faces:

manufacturing (or directing the manufacture) of a physical object based on the boundary representation object model.

48. The method of claim 47, wherein said manufacturing includes directing an additive manufacturing device to manufacture the physical object based on the boundary representation object model.

49. The method of claim 44, further comprising, after said updating the geometry of each of said at least two topological faces:

generating a 2D image based on the boundary representation object model, relative to a set of viewing parameters (such as a model space viewpoint, a model space viewing direction, a view projection); and displaying the 2D image via a display device.

50. The method of claim 44, further comprising, after said updating the geometry of each of said at least two topological faces:

generating a sequence of animation images based on the boundary representation object model; and displaying the sequence of animation images via a display device, to animate the object model.

51. The method of claim 44, further comprising, after said updating the geometry of each of said at least two topological faces:

generating a three dimensional mesh based on the boundary representation object model;

performing one or more of the following processes on the three dimensional mesh:

executing an engineering analysis on the three dimensional mesh;

manufacturing a physical object based on the three dimensional mesh;

displaying an image based on the three dimensional mesh;

displaying a sequence of animation images based on the three dimensional mesh.

52. The method of claim 43, wherein said at least two tensor product spline surfaces comprise three or more tensor product spline surfaces, wherein said boundary representation object model represents an object that is not a 2-manifold.

53. The method of claim 43, wherein said boundary representation object model represents a solid object whose topological boundary represents a 2-manifold.

54. The method of claim 37, wherein said operations also include:

prior to said dividing of the isoparametric curves, reparametrizing the selected coordinate of the surface patch to achieve parametric agreement with the portion of the model space curve.

55. The method of claim 37, wherein said generating the set of surface control points for the first output patch includes solving a linear system that relates interior ones of the surface control points of the first output patch to (a).

56. The method of claim 37, further comprising:

for each of said at least two tensor product spline surfaces, identifying significant points of the corresponding trim curve, and refining the tensor product spline surface based on the identified significant points;

transferring knot information between the model space curve and each of said at least two tensor product spline surfaces;

refining the model space curve and said at least two tensor product spline surfaces based on the transferred knot information, wherein said portion of the model space curve is a Bézier portion of the model space curve, wherein, for each of said at least two tensor product spline surfaces, the corresponding surface patch is of Bézier form in at least the corresponding selected coordinate tensor product.

57. The method of claim 37, wherein said portion of the model space curve is a Bézier portion, wherein the number of said at least three values of the selected coordinate is equal to the degree of said Bézier portion plus one.

Bivariate Spline Reparameterization 1.0 A method for reparametrizing a bivariate parametric surface using a bivariate spline function, the method comprising:

receiving and storing input data comprising:

a first surface knot vector of the bivariate parametric surface to be reparametrized;

a curve knot vector of a trim curve to which the bivariate parametric surface will be reparametrized;

a target surface knot vector for a reparameterization of the bivariate parametric surface;

a field of height values for the bivariate spline function;

determining a control net for the bivariate spline function based on the input data, wherein bivariate spline function and the determined control net specify the reparameterization of the bivariate spline surface;

reparametrizing a set of isocurves of the bivariate parametric surface using the bivariate spline function and the determined control net;

computing and storing a bivariate output surface based on the reparametrized set of isocurves.

1.1 The method of claim 1.0, wherein said receiving, said determining, said reparametrizing and said computing are performed for each of a plurality of surfaces involved in a Boolean operation in order to obtain a watertight boundary representation of an object.

1.2 The method of claim 1.1, further comprising performing one or more of the following operations on the watertight boundary representation:

executing a computational engineering analysis on the watertight boundary representation to predict physical behavior of the object;

3D printing the object based on the watertight boundary representation;

generating and/or displaying and/or storing a 3D graphical rendering of the object based on the watertight boundary representation;

directing a numerically controlled machine to manufacture the object based on the watertight boundary representation.

2.0 A method for reparametrizing a bivariate parametric surface using a bivariate spline function, the method comprising:

receiving input data comprising:

a first surface knot vector of the bivariate parametric surface to be reparametrized;

a curve knot vector of a trim curve to which the bivariate parametric surface will be reparametrized;

a target surface knot vector for a reparameterization of the bivariate parametric surface;

one or more curvature tolerances;

determine a control net for the bivariate spline function based on the input data, wherein the bivariate spline function and the determined control net specify the reparameterization of the bivariate spline function;

reparametrizing a set of isocurves of the bivariate parametric surface using the bivariate spline function and the determined control net;

computing and storing a bivariate output surface based on the reparametrized set of isocurves.

Pre-SSI Algorithm (Correct by Construction)

3.0 A method for determining surface-surface intersection data to support a Watertight Boolean CAD operation on a set of two or more surfaces, the method comprising:

determining a set of division points on the surface-surface intersection, wherein said determining includes:

for each surface, determining a first set of points comprising significant points and internal surface knots by cluster;

exchanging the first sets between surfaces to obtain for each surface a corresponding second set of points that is a superset of the corresponding first set;

merge the model space images of the second sets into a combined model space point set that is ordered according to topology of the SSI.

3.1 The method of claim 3.1, further comprising:

performing a watertight Boolean CAD operation based on data including at least the set of division points, to obtain a watertight boundary representation of an object.

3.2 The method of claim 3.1, wherein said performing the watertight Boolean CAD operation includes:

for each of the surfaces, reparametrizing a set of isocurves of the surface using a bivariate spline function.

3.3 The method of claim 3.1, further comprising performing one or more of the following operations on the watertight boundary representation:

executing a computational engineering analysis on the watertight boundary representation to predict physical behavior of the object;

3D printing the object based on the watertight boundary representation;

generating and/or displaying and/or storing a 3D graphical rendering of the object based on the watertight boundary representation;

directing a numerically controlled machine to manufacture the object based on the watertight boundary representation.

4.0 A method for parameter change handling, to support a process of watertight geometry construction, the method comprising:

for a given point of a plurality of points, selecting a parameter change handling (PCH) algorithm, wherein the points are points on a geometric intersection between input surfaces, where PCH algorithm is selected from a set of available PCH algorithms including a null algorithm, an embedded extensions algorithm and an extraordinary point insertion algorithm;

performing the selected PCH algorithm on the given point to obtain a tensor product spline output surface closely approximating the geometry of a tensor product spline input surface.

4.0.1 The method of claim 4.0, wherein the tensor product spline output surface is reparametrized with specific properties at and around the given point.

4.1 The method of claim 4.0, wherein the null algorithm is a pass through algorithm that does nothing;

wherein the embedded extensions algorithm performs tangent extension without introducing extraordinary points;

wherein the extraordinary point insertion algorithm introduces an extra (fictitious) curve that is orthogonal to the parameter space trim curve at the given point (e.g., acknowledging the mesh the user is looking for).

4.2 The method of claim 4.0, wherein the selected PCH algorithm creates curves for reparameterization and geometry construction (or reconstruction) at the given point.

4.3 The method of claim 4.0, wherein the selected PCH algorithm ensures curve continuity when the given point is an inflection point.

4.4 The method of claim 4.0, wherein the selected PCH algorithm changes the parameterization of a tensor product spline surface closely approximating the geometry of the tensor product spline surface input around the given point.

4.5 The method of claim 4.0, wherein the selected PCH algorithm creates unique curves for reparameterization and/or reconstruction that create unique reparameterization and/or continuity and/or targeted surface structure at inflection points.

4.6 The method of claim 4.0, further comprising:
generating a watertight boundary representation of an object based on specific reparameterization properties desired at computed inflection points; and
performing one or more of the following operations on the watertight boundary representation:
executing a computational engineering analysis on the watertight boundary representation to predict physical behavior of the object;
3D printing the object based on the watertight boundary representation;
generating and/or displaying and/or storing a 3D graphical rendering of the object based on the watertight boundary representation;
directing a numerically controlled machine to manufacture the object based on the watertight boundary representation.

5.0 A method for parameter change handling (PCH), to support a process of watertight geometry construction, the method comprising:
for a given point of a plurality of points including extraordinary and/or degenerate points on a geometric input surface;
performing an extraordinary point insertion type of PCH algorithm on the given point to obtain a tensor product spline output surface closely approximating the geometry of a tensor product spline input surface.

5.0.1 The method of claim 5.0, wherein the tensor product spline output surface is reparametrized with specific properties (e.g., any combination of the following properties: geometric and parametric continuity, parametric structure, parametric fidelity, mesh resolution, mesh aspect ratio, mesh skew, mesh taper, etc.) at and around the given point.

5.1 The method of claim 5.0,
wherein the extraordinary point insertion algorithm introduces an extra (fictitious) curve that is orthogonal to a parameter space trim curve at the given point (e.g., acknowledging the mesh the user is looking for).

5.2 The method of claim 5.0,
wherein the method has no dependence on surface-surface intersections or Boolean operations of solid model boundary representations;
wherein the input is a single surface containing all of the requisite information to perform the operations listed.

6.0. A method comprising:
constructing and storing a boundary representation model of an object, wherein the boundary representation model includes output surfaces, wherein an isocurve of a first of the output surfaces meets an isocurve of a second of the output surfaces in a continuous fashion.

6.1 The method of claim 6.0, wherein the first output surface and the second output surface are non-planar surfaces.

6.2 The method of claim 6.0, wherein said constructing the boundary representation model of the object is performed as part of a Boolean CAD operation on a set of two or more input surfaces, wherein each of the output surfaces corresponds to a respective one of the input surfaces.

6.2.1 The method of claim 6.2, wherein, for each pair of the input surfaces that geometrically intersect, the corresponding pair of output surfaces meet in a continuous fashion along respective isocurves.

6.3 The method of claim 6.0, further comprising:
performing a computer-based engineering analysis on the object based on the boundary representation model (without any need for gap-remediation on the boundary representation model), wherein the computer-based engineering analysis calculates data representing physical behavior of the object; and
storing and/or displaying the data representing the physical behavior of the object.

6.4 The method of claim 6.3, wherein the data represents one or more of:
a predicted location of a fault in the object;
a decision on whether the object will tolerate (or survive or endure) a user specified profile of applied force (or pressure or stress or thermal stimulus or radiation stimulus or electromagnetic stimulus);
a predicted thermal profile (or stress profile) of an engine under operating conditions.

6.5 The method of claim 6.0, further comprising:
directing one or more numerically controlled machines (without any need for gap-remediation on the boundary representation model) to manufacture the object based on the boundary representation model, wherein physical surfaces of the manufactured object meet in a continuous fashion.

6.5.1 The method of claim 6.5, wherein the numerically controlled machines include one or more of the following: a numerically controlled mill, a numerically controlled lathe, a numerically controlled plasma cutter, a numerically controlled electric discharge machine, a numerically controlled fluid jet cutter, a numerically controlled drill, a numerically controlled router, a numerically controlled bending machine.

6.6 The method of claim 6.0, further comprising:
employing a 3D graphics rendering engine to generate a 3D graphical model of the object based on the boundary representation model (without any need for gap remediation on the boundary representation model); and
storing and/or displaying the 3D graphical model of the object (e.g., as part of a 3D animation or movie).

6.7 The method of claim 6.0, further comprising:
performing 3D scan on the boundary representation model to convert the boundary representation model into a data file for output to a 3D printer (without any need for gap remediation on the boundary representation model);
transferring the data file to a 3D printer in order to print a 3D physical realization of the object.

6.8 The method of claim 6.0, further comprising:
manufacturing a portion of a body (e.g., a hood or side panel or roof section) of an automobile based on the boundary representation model of the object.

6.9 The method of claim 6.0, further comprising:
manufacturing a portion of a body of a boat (or submarine) based on the boundary representation model of the object.

6.10. The method of claim 6.0, further comprising:
downloading each of the output surfaces to a corresponding robotic manufacturing device; and
directing the robotic manufacturing devices to manufacture the respective output surfaces; and assembling the manufactured output surfaces to form a composite physical object.

A method for constructing a model of a physical object, wherein the physical object is configured to be aligned with other physical objects, the method comprising any of the methods described herein in the Detailed Description as well as any of the methods/medium operations in the claims section below.

A method for constructing models of two physical objects, wherein the two physical object are configured to be aligned with each other along at least one edge shared by the two physical objects, the method comprising any of the methods described herein in the Detailed Description as well as any of the methods/medium operations in the claims section below.

A method for constructing models of two image objects to be displayed on a display, wherein the two image objects are configured to be aligned with each other along at least one edge shared by the two image objects, the method comprising any of the methods described herein in the Detailed Description as well as any of the methods/medium operations in the claims section below.

A method for constructing a model of an image object be displayed on a display, wherein the image object is configured to be aligned with at least one other image object along at least one edge shared by the image object and the at least one other image object, the method comprising any of the methods described herein in the Detailed Description as well as any of the methods/medium operations in the claims section below.

A method for displaying an image of an object on a display device, the method comprising:
constructing a model of a first portion of the image object be displayed on the display device, wherein the first portion of the image object is configured to be aligned with at least one second portion of the image object along at least one edge shared by the first portion and the at least one second portion, wherein said constructing comprises any of the methods described herein in the Detailed Description as well as any of the methods/medium operations in the claims section below; and
displaying the image object on the display device based on the constructed model.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method for modifying a computer-aided design (CAD) model of a tangible object, the method comprising:
    performing, by the computer:
        storing geometric input data describing first and second input surfaces associated with the CAD model, wherein the first and second input surfaces are described in a first and second parameter space domain, respectively;
        reparametrizing the first and second input surfaces into a common third parameter space domain;
        constructing a modified CAD model of the tangible object comprising first and second output surfaces, wherein the first and second output surfaces are described in the third parameter space domain, wherein the first and second output surfaces are representations of at least portions of the first and second input surfaces, respectively, and wherein the modified CAD model exhibits increased inter-surface continuity between the first and second output surfaces relative to the first and second input surfaces; and
        storing the modified CAD model in memory.

2. The method of claim 1, wherein said reparametrizing comprises, for a set of sampled isocurves for each of the first and second input surfaces, constructing a tensor-product surface that maps the first and second parameter space domains to the third parameter space domain.

3. The method of claim 1, wherein the first and second output surfaces are within a predetermined or user-definable error tolerance of the first and second input surfaces, respectively.

4. The method of claim 1, wherein the first and second input surfaces and the first and second output surfaces are non-uniform rational basis splines (NURBS).

5. The method of claim 1, wherein said modifying is performed as part of a Boolean operation in a computer-aided design (CAD) software system.

6. The method of claim 1, the method further comprising:
    prior to said reparametrizing the first and second input surfaces into the common third parameter space domain:
        constructing intermediate trim curves comprised within at least one of the first and second input surfaces; and
        reparametrizing at least one of the first and second input surfaces based on the intermediate trim curves.

7. The method of claim 1, the method further comprising:
    prior to said reparametrizing the first and second input surfaces into the third parameter space domain:
        selecting a parameter change handling (PCH) algorithm, wherein the PCH algorithm is selected from a set of available PCH algorithms including a null algorithm, an embedded extensions algorithm, and an extraordinary point insertion algorithm; and
        reparametrizing the first and second input surfaces based on the selected algorithm.

8. The method of claim 7,
    wherein the null algorithm is a pass-through algorithm that does nothing;
    wherein the embedded extensions algorithm performs tangent extension without introducing extraordinary points;
    wherein the extraordinary point insertion algorithm introduces an intermediate trim curve that intersects a model space trim curve and is orthogonal to the model space trim curve at the intersection.

9. The method of claim 1, wherein said reparametrizing comprises constructing a basis spline function to map each of the first and second parameter space domains into the third parameter space domain.

10. The method of claim 1, the method further comprising:
    executing an engineering analysis on the modified CAD model to obtain data predicting physical behavior of an object described by the CAD model.

11. The method of claim 10, wherein the engineering analysis comprises an isogeometric analysis.

12. The method of claim 1, the method further comprising:
    directing a process of manufacturing an object described by the modified CAD model.

13. The method of claim 1, the method further comprising:

generating an image of an object based on the modified CAD model.

14. The method of claim 1, the method further comprising:
generating a sequence of animation images based on the modified CAD model and displaying the sequence of animation images.

15. The method of claim 1, wherein said reparametrizing the first and second input surfaces into the common third parameter space domain comprises:
iteratively performing said reparametrizing on successive patches of the first and second input surfaces, wherein the successive patches of the first and second input surfaces are delineated by characteristic points of a geometric intersection of the first and second input surfaces.

16. A non-transitory computer-readable memory medium comprising program instructions which, when executed by a processor, are configured to modify a computer-aided design (CAD) model by causing the processor to:
store geometric input data describing first and second input surfaces associated with the CAD model, wherein the first and second input surfaces are described in a first and second parameter space domain, respectively;
reparametrize the first and second input surfaces into a common third parameter space domain;
construct a modified CAD model of the tangible object comprising first and second output surfaces, wherein the first and second output surfaces are described in the third parameter space domain, wherein the first and second output surfaces are representations of at least portions of the first and second input surfaces, respectively, and wherein the modified CAD model exhibits increased inter-surface continuity between the first and second output surfaces relative to the first and second input surfaces; and
store the modified CAD model in the memory medium.

17. The non-transitory computer-readable memory medium of claim 16, wherein said reparametrizing comprises, for a set of sampled isocurves for each of the first and second input surfaces, constructing a tensor-product surface that maps the first and second parameter space domains to the third parameter space domain.

18. The non-transitory computer-readable memory medium of claim 16, wherein the first and second output surfaces are within a predetermined or user-definable error tolerance of the first and second input surfaces, respectively.

19. The non-transitory computer-readable memory medium of claim 16, wherein the first and second input surfaces and the first and second output surfaces are non-uniform rational basis splines (NURBS).

20. The non-transitory computer-readable memory medium of claim 16, wherein said modifying is performed as part of a Boolean operation in a computer-aided design (CAD) software system.

21. The non-transitory computer-readable memory medium of claim 16, wherein the program instructions are further executable by the processor to cause the processor to:
prior to said reparametrizing the first and second input surfaces into the common third parameter space domain:
constructing intermediate trim curves comprised within at least one of the first and second input surfaces; and
reparametrizing at least one of the first and second input surfaces based on the intermediate trim curves.

22. The non-transitory computer-readable memory medium of claim 16, wherein the program instructions are further executable by the processor to cause the processor to:
prior to said reparametrizing the first and second input surfaces into the third parameter space domain:
selecting a parameter change handling (PCH) algorithm, wherein the PCH algorithm is selected from a set of available PCH algorithms including a null algorithm, an embedded extensions algorithm, and an extraordinary point insertion algorithm; and
reparametrizing the first and second input surfaces based on the selected algorithm.

23. The non-transitory computer-readable memory medium of claim 22,
wherein the null algorithm is a pass-through algorithm that does nothing;
wherein the embedded extensions algorithm performs tangent extension without introducing extraordinary points;
wherein the extraordinary point insertion algorithm introduces an intermediate trim curve that intersects a model space trim curve and is orthogonal to the model space trim curve at the intersection.

24. The non-transitory computer-readable memory medium of claim 16, wherein said reparametrizing comprises constructing a basis spline function to map each of the first and second parameter space domains into the third parameter space domain.

25. The non-transitory computer-readable memory medium of claim 16, wherein the program instructions are further executable by the processor to cause the processor to:
executing an engineering analysis on the modified CAD model to obtain data predicting physical behavior of an object described by the CAD model.

26. The non-transitory computer-readable memory medium of claim 25, wherein the engineering analysis comprises an isogeometric analysis.

27. The non-transitory computer-readable memory medium of claim 16, wherein the program instructions are further executable by the processor to cause the processor to perform one of:
directing a process of manufacturing an object described by the modified CAD model;
generating an image of an object based on the modified CAD model; or
generating a sequence of animation images based on the modified CAD model and displaying the sequence of animation images.

28. The non-transitory computer-readable memory medium of claim 16, wherein in reparametrizing the first and second input surfaces into the common third parameter space domain the program instructions are further executable to cause the processor to:
iteratively perform said reparametrizing on successive patches of the first and second input surfaces, wherein the successive patches of the first and second input surfaces are delineated by characteristic points of a geometric intersection of the first and second input surfaces.

29. A non-transitory computer-readable memory medium comprising program instructions which, when executed by a processor, are configured to modify a computer-aided design (CAD) model by causing the processor to:
store the CAD model in the memory medium, wherein the CAD model comprises a plurality of input surfaces comprising first and second input surfaces that cross in space along at least one intersection curve shared by the first and second input surfaces, wherein the first and second input surfaces are parametric surfaces that are described in a first and second parameter space domain, respectively;

reparametrize the first and second input surfaces into a third parameter space domain, wherein, in reparametrizing the first and second input surfaces into the third parameter space domain, the program instructions are further executable to cause the processor to:

identify a series of points along the at least one intersection curve;

construct a series of isocurves based on the identified series of points, wherein the constructed series of isocurves define the third parameter space domain;

construct a modified CAD model of the tangible object comprising first and second output surfaces, wherein the first and second output surfaces are described in the third parameter space domain, wherein the first and second output surfaces are representations of at least portions of the first and second input surfaces, respectively, and wherein the modified CAD model exhibits increased inter-surface continuity between the first and second output surfaces relative to the first and second input surfaces; and store the modified CAD model in the memory medium.

* * * * *